United States Patent [19]
Burney

[11] Patent Number: 4,829,445
[45] Date of Patent: May 9, 1989

[54] DISTRIBUTED ROUTING UNIT FOR FULLY-AUTOMATED FLEXIBLE MANUFACTURING SYSTEM

[75] Inventor: Roger D. Burney, Sunnyvale, Calif.

[73] Assignee: National Semiconductor Corporation, Santa Clara, Calif.

[21] Appl. No.: 24,794

[22] Filed: Mar. 11, 1987

[51] Int. Cl.[4] .......................................... G06K 17/00
[52] U.S. Cl. .................... 364/478; 198/349; 364/468; 235/376
[58] Field of Search .............................. 364/468, 478; 198/339.1, 340, 341, 348, 349, 350; 104/88; 235/376

[56] References Cited

U.S. PATENT DOCUMENTS

| | | | |
|---|---|---|---|
| 3,803,556 | 4/1974 | Duffy | 198/349 |
| 3,854,889 | 12/1974 | Lemelson | 198/348 |
| 4,472,783 | 9/1984 | Johnstone et al. | 364/478 |
| 4,588,880 | 5/1986 | Hesser | 235/376 |
| 4,604,704 | 8/1986 | Eaves et al. | 364/478 |
| 4,630,216 | 12/1986 | Tyler et al. | 364/478 |
| 4,646,245 | 2/1987 | Prodel et al. | 364/478 |
| 4,682,261 | 7/1987 | Benson et al. | 364/468 |

Primary Examiner—Allen MacDonald
Attorney, Agent, or Firm—Limbach, Limbach & Sutton

[57] ABSTRACT

Segments-in-process (SIPs) of material are automatically routed through a material handling system by distributed routing units under the guidance of a host computer system. The material handling system comprises a network of intersecting material paths. A distributed routing unit is located at material path intersections. Information relating to the source, destination and identity of a SIP is provided to the host computer system by a client process. Typically the destination of the SIP is a process machine located on a material path. Upon receipt of the information from the client process, the host defines a sequence of distributed routing units through which the SIP will move from its source to its destination. Each distributed routing unit in the sequence is then provided with information which enables each unit to identify the SIP and to perform a task with respect thereto. The tasks are then sequentially performed such that the SIP is routed through the defined sequence to its destination. The SIP may be routed to its destination when the host computer system is off line.

40 Claims, 20 Drawing Sheets

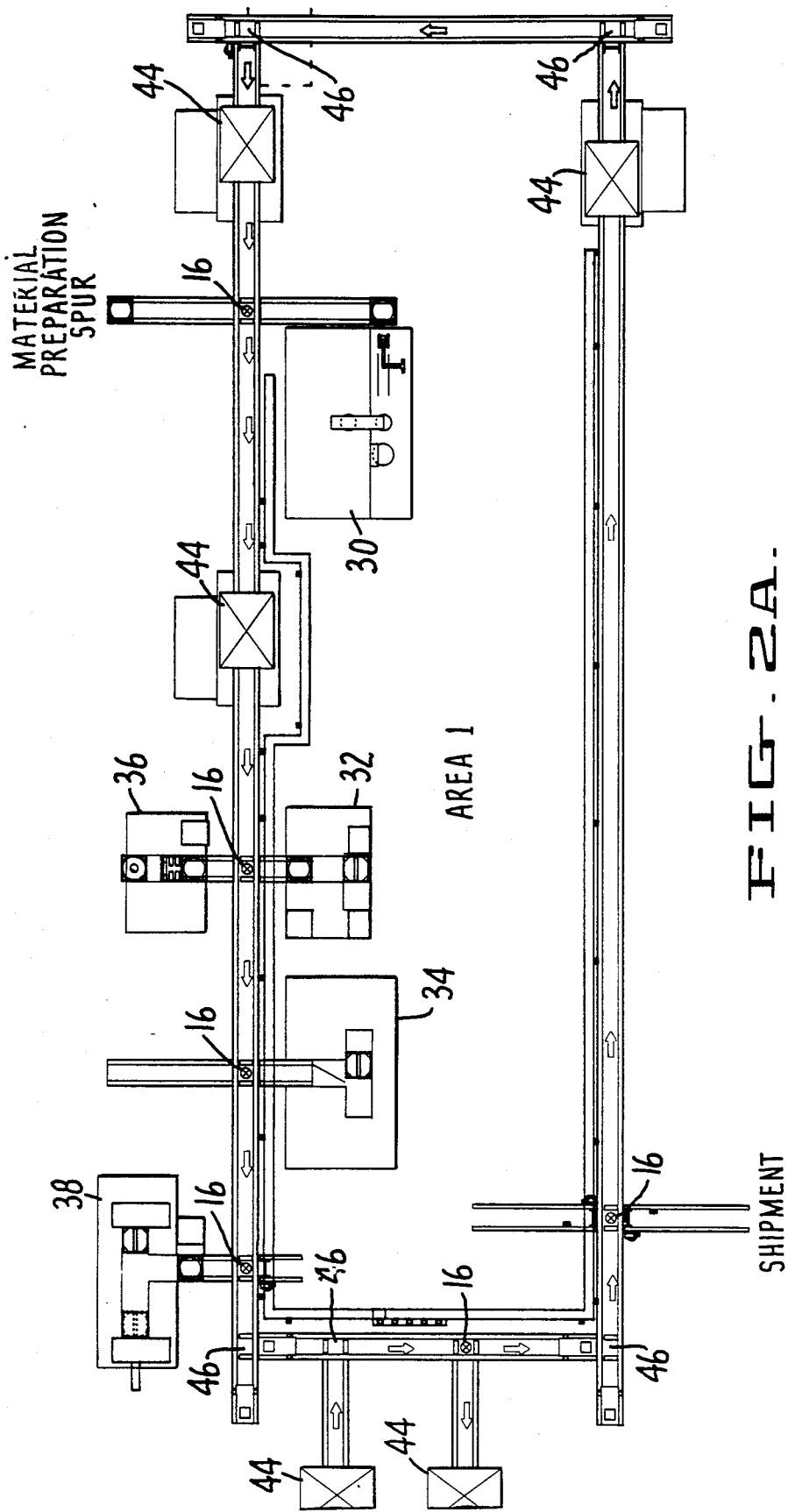

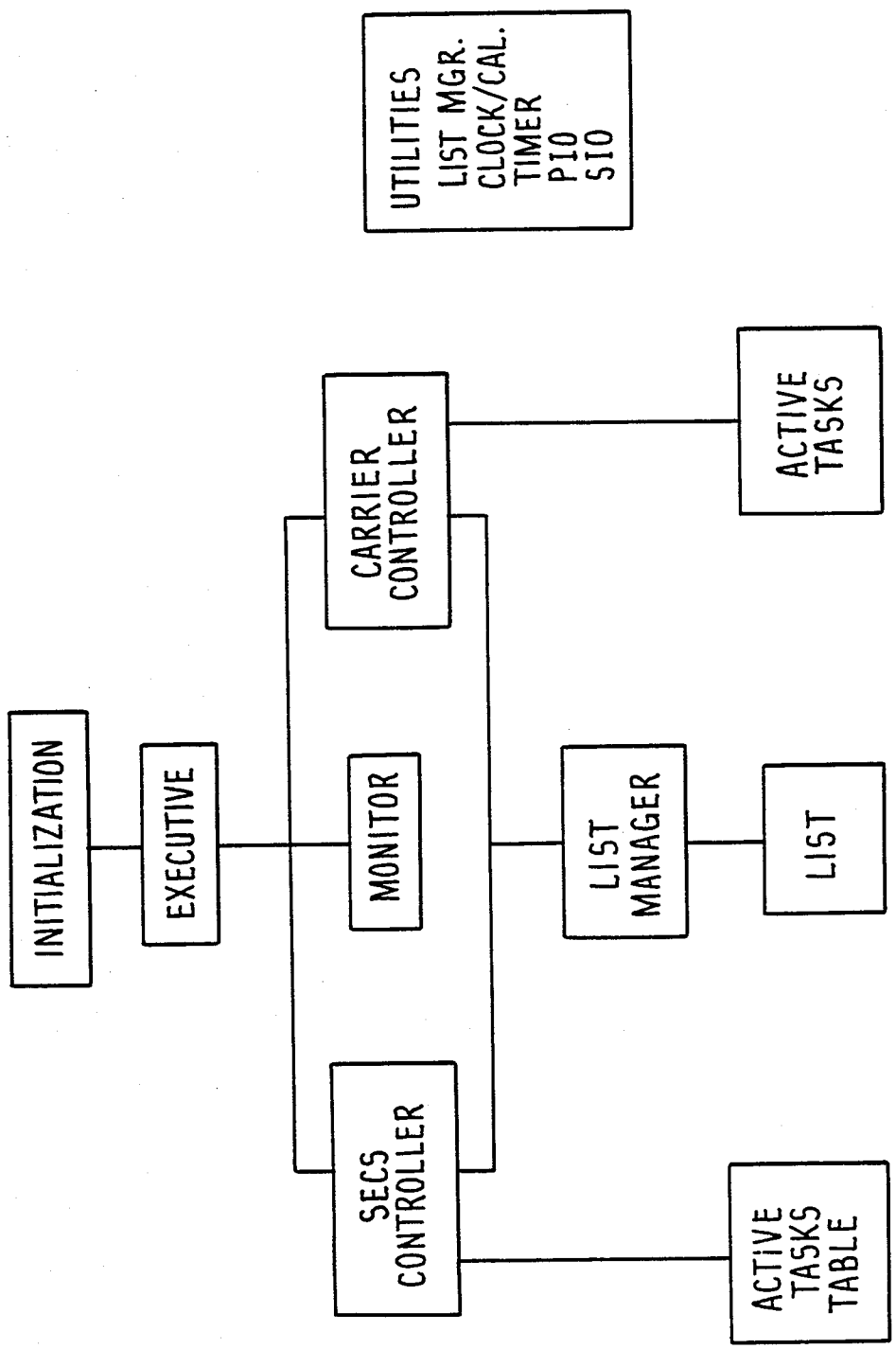

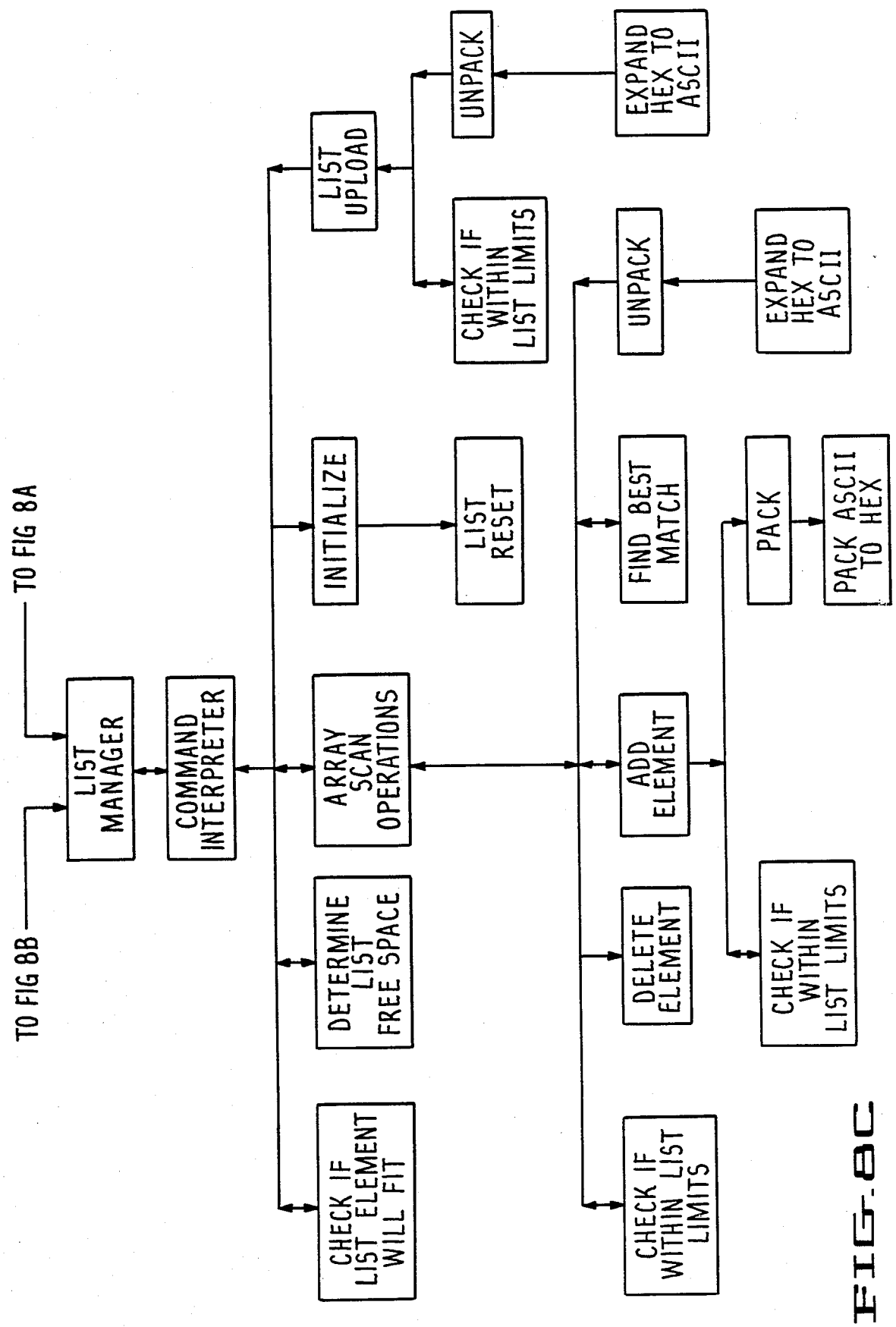

CARRIER CONTROLLER
DECISION TREE

2-D STATION ARRANGEMENT

CARRIER CONTROLLER PROCEDURES

SECS CONTROLLER PROCEDURES

EXECUTIVE PROGRAM EXECUTION

FIG. 14. SAMPLE DECISION TREE TABLE. CC

CARRIER CONTROLLER STRUCTURE

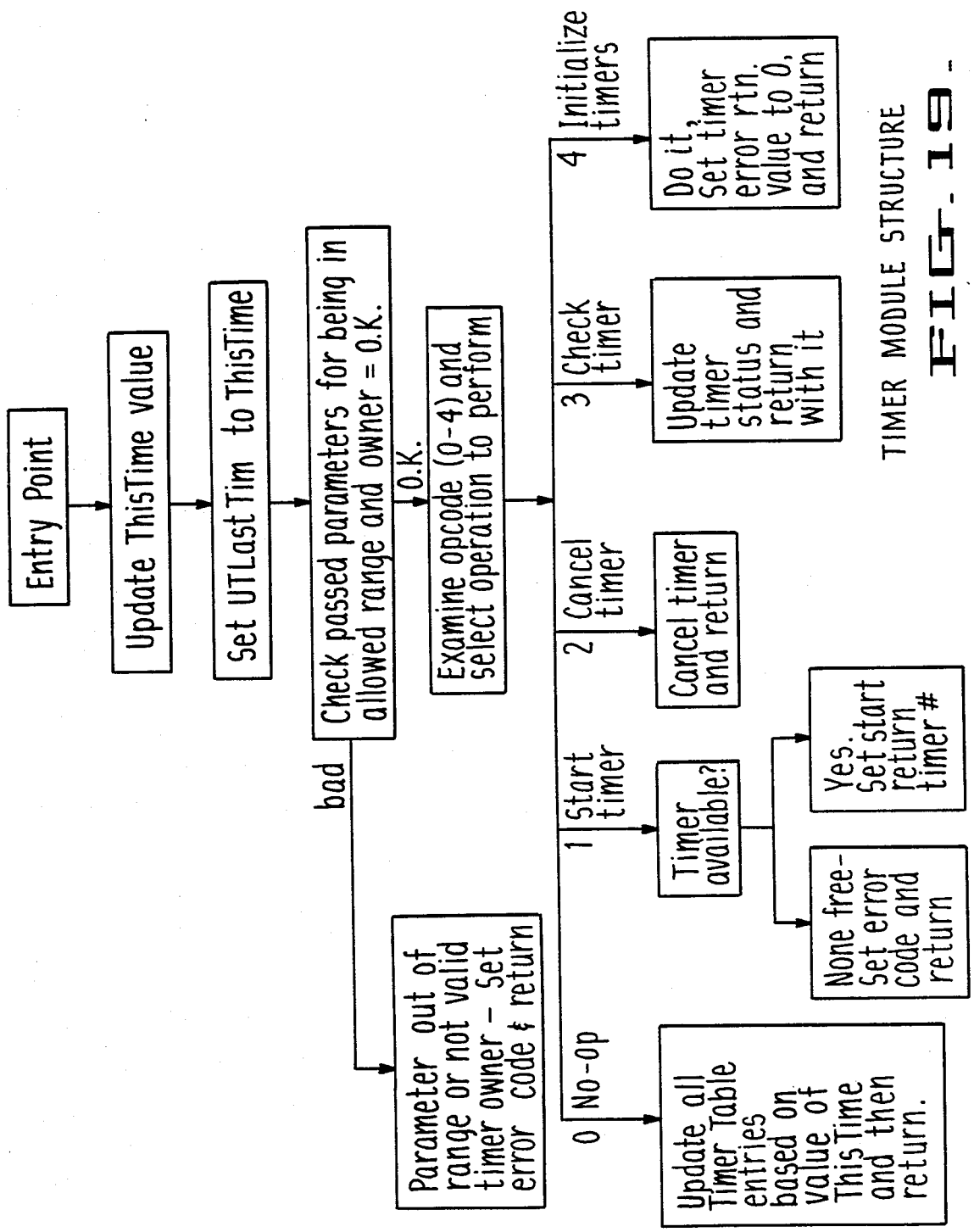
FIG. 19. TIMER MODULE STRUCTURE

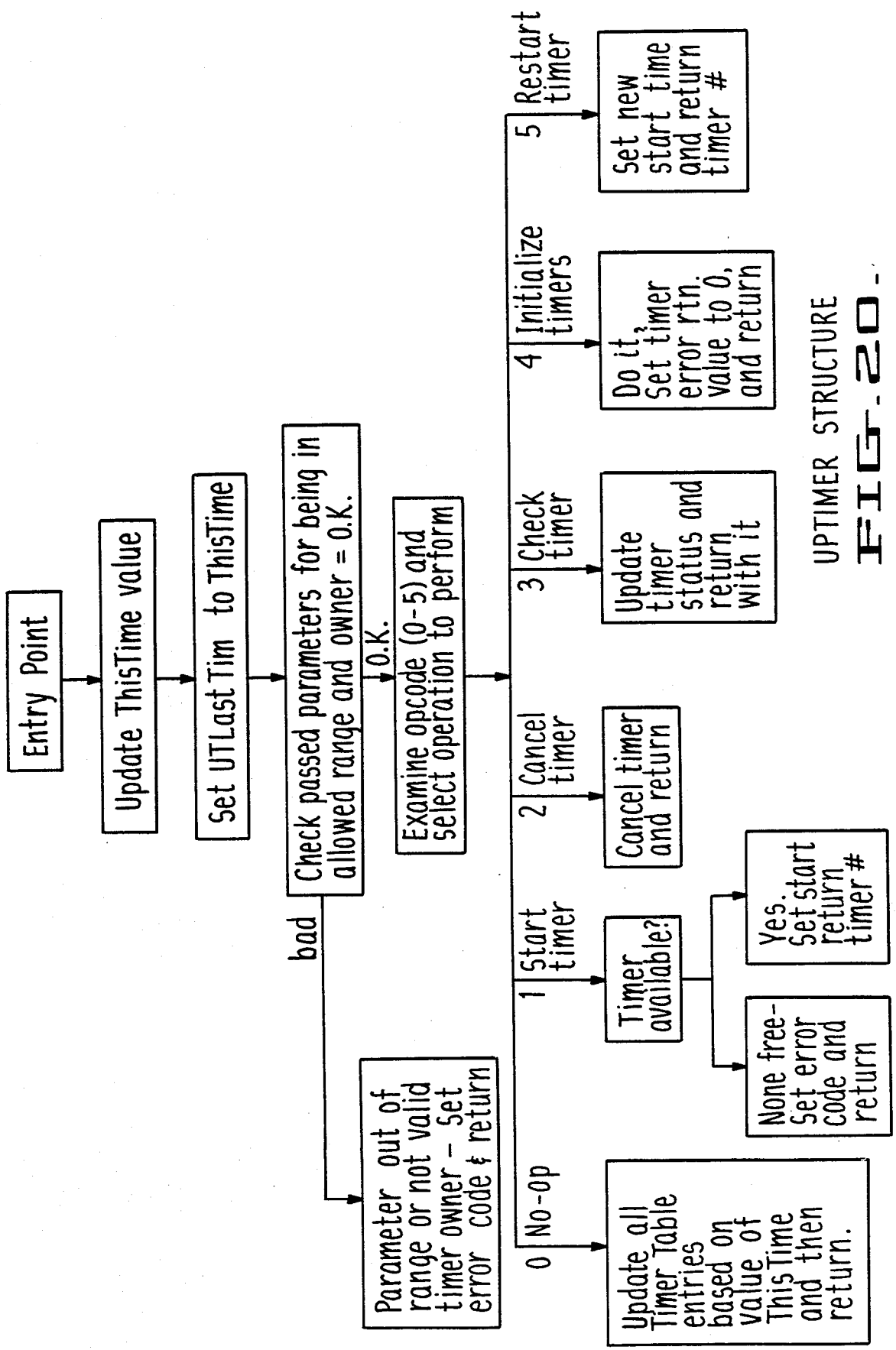
FIG. 20. UPTIMER STRUCTURE

DISTRIBUTED ROUTING UNIT FOR FULLY-AUTOMATED FLEXIBLE MANUFACTURING SYSTEM

BACKGROUND OF THE INVENTION

1. Field of the Invention

The present invention relates to automated factories and, in particular, to a system and method for flexible, operatorless manufacturing.

2. Discussion of the Prior Art

Conventional industrial material handling systems can be divided into three general categories: processing by class, processing by real time material control and processing by synchronous material movements.

Systems that utilize processing by class include all serial process lines as well as some hardware-specific installations that allow for parallel process cells.

Serial systems, as the name implies, process material by passing it from one process cell to the next cell in a preconfigured line with no choice of which machine will perform the next process step. Serial process systems suffer from the limitation that the down time of the entire line is the compound of the down times of each of the individual process cells. If any process cell in a serial line is not functioning, then the entire line is not functioning. Although significant improvements can be made in serial systems by holding or buffering work in progress (WIP) between process steps to pad the effect of one cell's down time on other process steps, this buffered WIP not only increases the throughput time of the line, but also increases the overhead cost of WIP in the factory.

The most obvious shortcoming of a serial processing system is the requirement that each cell in the line process material at the same speed. Few production process lines utilize steps that each take the same amount of time. This means that fast process cells must remain idle while slow process cells complete their tasks. The net effect is that all cells in the system are governed by the slowest cell.

Serial manufacturing systems are analogous to daisy chain communications networks. A daisy chain network only works when all members of the chain are intact. Buffers can be used to minimize the impact of sporadically operating members, but buffers tend to slow down network throughput. Relationships between members must be static and simple. Furthermore, daisy chain network members can relate only to directly adjacent members on the network.

Examples of simple, well-known automated serial process lines include car washes and automatic film development machines.

In a modification of the standard serial process system, parallel cells are arranged in banks to perform each process step. The use of banks of cells makes it possible to use a different number of machines for different process steps. Process step cell banks can be sized so that the production rate of each process step is the same as that of the production rate of every other process step in the process line. This is called line balancing. Line balancing improves machine effectiveness compared to a pure serial line in applications that require different amounts of time to perform each process step.

For example, assume that a manufacturing line requires two process steps. The process cell for step 1 builds three parts per hour. The process cell for step 2 builds four parts per hour. Twenty-four parts per hour are desired. In a serial process line, eight discrete flow lines would be used, each composed of one process cell 1 and one process cell 2. The combined output of the eight flows would be twenty-four parts per hour. Each machine would be forced to run at three parts per hour, leaving process cell 2 idle in each flow 25% of the time.

Now assume that banks of process cells are used to perform the above-described process. The definition of a bank is "a number of process cells each of which performs an identical process". Material process status is monitored by marking the material carrier; in this case, the material carrier would be marked "not processed", "through process step one", or "finished"). The status of a carrier in a sequential manufacturing line can be inferred from the location of the carrier in the factory. A balanced pair of process banks can be constructed composed of eight cells of process step 1 for process bank 1 and six cells of process step 2 for process bank 2. Process bank 1 will output twenty-four parts per hour of half processed parts, and process bank 2 will complete these twenty-four units at the same rate. Therefore, no machines will be idle.

The use of banks of process cells also minimizes the effect of machine failure. If one of the machines performing each process step fails, the output of the serial line will drop by 2/8 of its capacity (assuming the failed machines were in different flows); in comparison, the output of the line using process banks will drop by only ⅛ of its capacity.

Another approach to serial processing is to use loops to feed parallel process cells. Material status is determined by identifying the loop or branch in the system in which the material carrier is located, or by the position of material status indicators built into the material carriers. The material status indicators can be mechanical buttons which typically record status as "processed" or "not processed", and, in some cases, "good" or "reject" material. Separate material carrier identification indicators can be used to uniquely identify each carrier.

Serial processing with parallel cells is analogous to a point-to-point network. The path a message may take in a point-to-point network must be established in advance at the time of system definition. Once the system has been defined, system redefinition is impractical because it takes too much time to change the network linkages to accommodate changes in data flow requirements.

A simple example of a serial process with parallel cells is a laundromat with one washing machine and more than one dryer.

As stated above, processing by class is best suited for production applications in which process cell linkages are simple and static. All of the information required for a routing decision to be made along the material path in a "processing by class" system is encoded in the material carrier signature. Material status is implied by the position of the material carrier in the system. Routing information does not change for a given carrier signature once the carrier is placed in the process line. The degree of expected control in a "processing by class" system does not require finer detail than the class of a carrier. Material need not be traced through the process line with any more specificity than the fact that the previous process step has been performed.

A second category of industrial material handling systems is processing by real time control. Real time control systems typically use a single host computer, which implies a potential single point of failure. Some real time systems use a back-up host, but these systems typically use a shared multi-drop communication media that can also be a single point of failure. Thus, in real time control systems, when the host computer stops or when host communication stops, so does production.

Real time control is best suited for production applications in which there is no requirement that processing continue while the host computer is off line. Factory size and complexity must be limited within the bounds of available computing power.

An example of a real time control system is a space craft launch, navigation, and fuel management system.

A third category of industrial material handling system is synchronous movement material handling. These systems typically use one or more queues which are waiting for a shared resource. In one such system, a resource detection conveyor system, material carriers returning to the main conveyor line are held until the returning carrier can be inserted into a gap in the main line traffic flow. Problems arise when loop traffic becomes too heavy and the main line becomes saturated with material waiting to be processed. In this instance, the main line acts like a bus-master forced to hold the token forever. Machines returning a material carrier to the main line in order to accept another carrier find it impossible to do so until the WIP levels are reduced. This scenario results in a stand off between the material handling system and the process machine. Both the material handling system and the machine require the other to initiate an action to reduce WIP on the main line.

Resource detection is analogous to token passing in networking architectures. Every network member must wait while a pre-requisite task is completed.

Examples of systems that use resource detection include airport traffic control queues for take-off and landing and toll road collection booths.

Resource detection works well when average demand for a resource is significantly below the peak demand for the same resource. Queues tend to average out demand and to decrease the instantaneous requirements, allowing average demand to decrease over time.

Dedicated resource systems, as the name implies, are limited in their ability to effectively use the resource. A resource that could do the job might be much more available, but is not dedicated to the required job. A simple analogy is the use of a private elevator as compared to an escalator; an escalator can handle much more traffic than a large number of private elevators.

Time slicing networks use a type of dedicated resource. Systems requiring the resource must wait for it while other systems that may not require use of the resource take a turn.

None of the systems described above provide all of the following desirable features in a single material handling system:

1. The capability to allow material to change carriers;
2. The capability for dynamic re-routing;
3. The capability to identify and re-dispatch lost material carriers;
4. The capability to identify when and where the contents of a specific material carrier were processed for each step in the system, after the material is completely processed;
5. The capability to orient, identify and verify material carriers;
6. The capability to dynamically re-orient material carriers; and
7. The capability to locate a specific material carrier within the material handling system within a specific time after issuing a location request.

SUMMARY OF THE INVENTION

The primary object of the present invention is to provide a new standard for automated flexible manufacturing systems.

It is also an object of the present invention to provide a material handling system which implements material routing on the basis of segments-in-process of material.

It is an object of the present invention to provide uninterrupted transport of material to and from process machines while the system's host computer is off line.

It is an object of the present invention to provide a material handling system that minimizes work in progress before and after each process step.

It is an object of the present invention to provide a material handling system that increases production yield by minimizing material handling losses.

It is an object of the present invention to provide a material handling system that eliminates direct labor used to transport material by implementing operatorless material flow.

It is an object of the present invention to provide a material handling system that decreases indirect labor used to track material.

It is an object of the present invention to provide a material handling system that optimizes production throughput by redirecting material flow for effective line balancing as dictated by process machine efficiency.

It is an object of the present invention to provide a material handling system that improves the timeliness and accuracy of material status information without causing yield losses attributable to the mistracking of material by the material flow monitoring system.

It is an object of the present invention to accommodate factory floor reconfiguration without software revision.

It is an object of the present invention to reduce material handling system development overhead by using a standard communications protocol throughout the system.

These and other objects of the present invention are accomplished by providing a loosely-coupled automated material handling system in which material to be processed is selectively and asynchronously transported to process machines located on a closed-loop network of intersecting material paths.

An intelligent distributed routing unit, or DRU, is located at key network intersections.

The DRU is the heart of the present invention. It is both the link between process machines within the material handling system and the link between the material handling system and a host computer system.

Each DRU in the system controls the actions of an associated network sub-system and implements the communications required to transport material between process machines in a coordinated effort among all of the DRUs in the system. The DRUs divert material to and from the main material flow, using a standard communication protocol for all material monitoring, material reporting, program control and handshaking.

Each DRU can asynchronously direct material toward a desired destination within the material handling system without continuous guidance from the host computer system.

Each DRU encompasses a specific domain. A DRU's domain is defined by reference to the intersection of a main material path with other material paths, either process machine spurs or other branches of the main path. Each DRU includes a scan lift/transfer mechanism located at the material path intersection. A Ready station is located upstream of the transfer mechanism on the main path. A Gone station is located downstream of the transfer mechanism on the main path. A Wait station is located adjacent to the lift mechanism on each spur or branch.

Each DRU also includes the means for detecting a segment-in-process (SIP) of material that is entering its domain, identifying a task to be performed by the DRU with respect to that SIP, implementing the task, and then internally logging in the fact that the task has been completed. As stated above, these operations can be independently performed by the DRU whether the host computer is on line or off line.

Thus, according to a preferred method for practicing the present invention, a SIP is automatically routed through a material handling system under the guidance of a host computer system. The material handling system comprises a main material path and a number of material path spurs which intersect with the main path. Each spur has a number of process machines associated with it. A distributed routing unit of the type described generally above, and which is described in detail below, is located at each intersection of the main path and a spur. Information relating to the source, destination and identity of a specific material set is provided to the host computer system from a client process, such as production scheduling. Typically the destination of the material set is a process machine. Upon receipt of such information from the client process, the host computer system defines a sequence of distributed routing units through which the SIP will move from its source, usually a material preparation area or another process machine, to the destination process machine. Each distributed routing unit in the defined sequence is then provided with information which enables it to identify the SIP and to perform a specified task with respect to the SIP to move it toward its destination. The tasks are thus sequentially completed such that the SIP is routed through the defined sequence to the last distributed routing unit in the sequence. The last distributed routing unit then executes its task to divert the material to the spur conveyor on which the destination process machine is located.

Once the material is on the destination spur, the distributed routing unit initiates a "handshake" with the destination process machine to complete the transfer. The distributed routing unit initiates the handshake by transmitting a message to the process machine requesting that the machine receive the material. If it is ready to receive the material, the process machine transmits a message back to the distributed routing unit granting the request. When the distributed routing unit receives the grant message, it sends the material down the spur to the machine. The machine, in turn, transmits a message to the distributed routing unit confirming that the material has been received. The distributed routing unit stores the confirmation message and informs the host that the machine has confirmed receipt of the material. The host then transmits its own confirmation message back to the distributed routing unit. The process machine then processes the material and returns it to a material carrier, but not necessarily the one that delivered the material. Using a handshake procedure similar to that described above, the machine sends the carrier containing the processed material back to the distributed routing unit. The distributed routing unit then routes the material toward the next process machine through a new sequence of distributed routing units defined for this material. If the host will be off line for an extended period of time, the distributed routing units can stay in operation by having their tasks downloaded.

DESCRIPTION OF THE DRAWINGS

FIGS. 2A and 2B combine to provide a schematic diagram illustrating a material handling conveyor system which utilizes distributed routing units in accordance with the present invention;

FIG. 7 is a schematic block diagram illustrating generally the internal architecture of a distributed routing unit;

FIGS. 8A–8D combine to provide a schematic block diagram illustrating in detail the internal architecture of a distributed routing unit;

FIG. 19 is a block diagram illustrating the structure of the Timer module; and

FIG. 20 is a block diagram illustrating the structure of the Uptimer module.

DETAILED DESCRIPTION OF A PREFERRED EMBODIMENT

Figure 1:
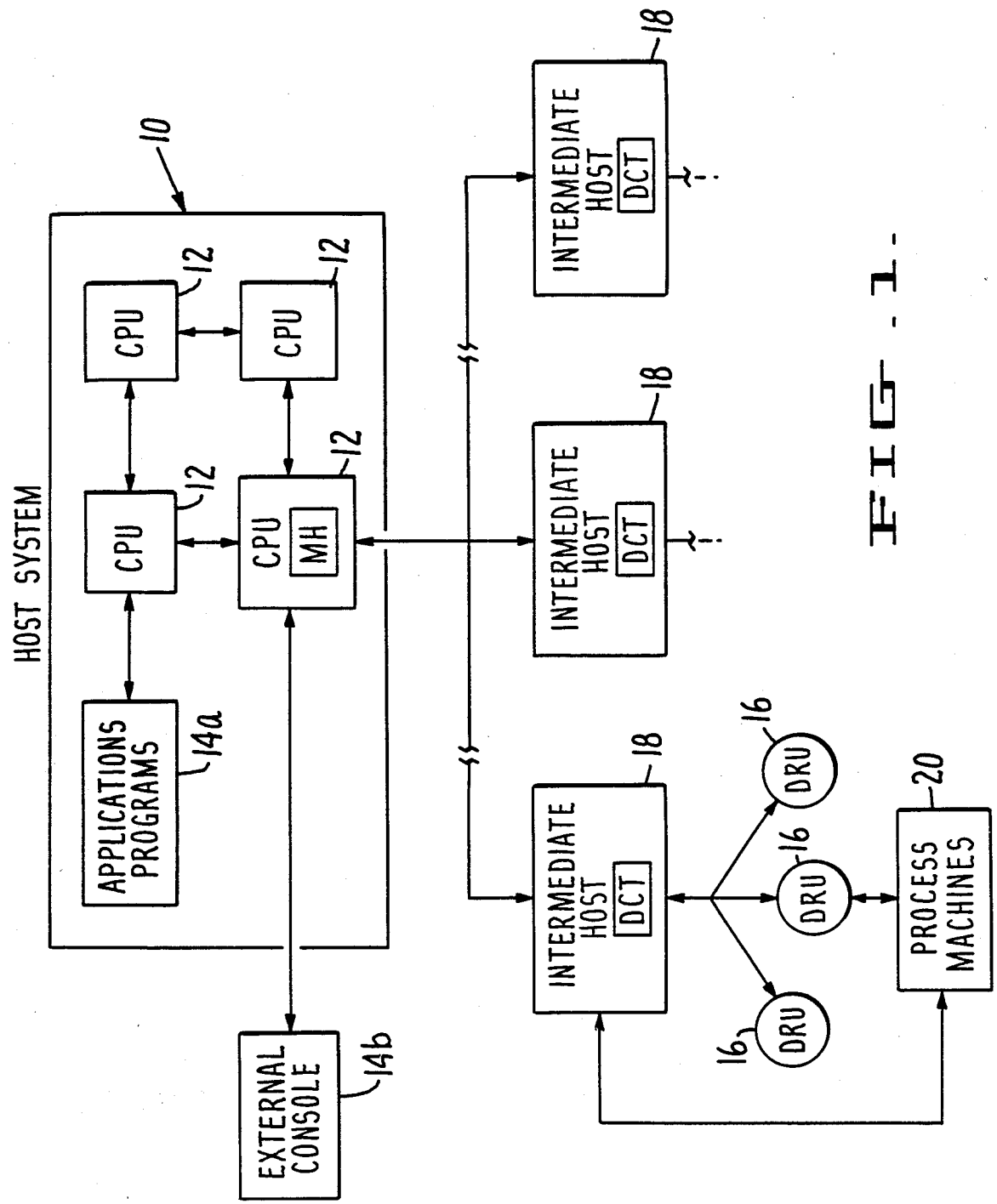
FIG. 1 is a schematic block diagram illustrating a material handling system which utilizes distributed routing units in accordance with the present invention.

A truly fully-automated, flexible manufacturing system requires that the entire production facility, including the material handling system, retain all the options of process lines that utilize human operators to make low level factory floor decisions. Just as in a human-tended production line, in which the functionality of the factory is distributed across various levels of management and labor, functions in an operatorless factory floor must also be distributed across several levels of automated sub-systems.

Typically, these sub-systems become very dependent on each other, or "tightly coupled", in a real time control system. In a truly automated factory, these sub-systems must be able to function independently for short periods of time, just as a human tended factory must. It should be understood from the outset that the concept of the present invention is applicable to any material handling system which comprises a network of intersecting material paths along which segments-in-process, or SIPS, of material move from a source to a destination under the guidance of a computer (A "segment-in-process" or "SIP" of material is a quantity of material or work in process moving as an entity within the network.). Thus, while the invention is described below in the context of SIPs contained in material carriers moving along a conveyor network and wherein individual SIPs are identified by scanning a bar code on the carrier, it also applies, for example, to systems which utilize automatic guided vehicles ("smart carts") or to systems which utilize radio transmitting tags for SIP or carrier identification.

The material handling system described below is a conveyor network which includes intelligent independently-operable subsystems called distributed routing units, or simply DRUs. A DRU guidance system installed in a host computer network assists the actions of these DRUs, guiding the flow of material between process machines located within the conveyor system by means of a coordinated DRU team effort.

Each DRU in the system makes the decisions a material handling person would make in a conventional production line. However, as described in detail below, the material handling decisions made by the DRU are based upon more and better information than is available to the personnel in a conventional factory.

In a conventional factory, material handling personnel can continue to move material when the line manager is not on the line. Similarly, the DRUs can continue to move material through the conveyor system while the host computer system is off line. To accomplish this, both the DRUs and all of the production floor process machines are "loosely coupled" to the host system. This means that DRUs and process machines can continue to function when the host is off line using instructions the host has forecasted for the system in advance of events that require the information.

The design of the material handling system described herein is similar to collision detection in networking in that collision detection relies on the fact that it is unlikely that two elements will initiate the use of an available shared resource at the same instant. It also assumes that a resource tends to become available as peak demand passes.

FIG. 1 illustrates the communications hierarchy of a material handling system which utilizes distributed routing units, or DRUs, in accordance with the present invention.

In the illustrated configuration, the host computer system 10 consists of a cluster of interconnected central processing units 12, in this case, Digital Equipment Corporation (DEC) MicroVAX ™ computers. One of these CPUs holds a material handling software package MH which provides guidance for the operation of the material handling system. In this case, the software package is DEC proprietary material guidance software referred to as "UNICYCLE".

Commands are issued to the host computer system 10 by client processes. Two examples of client processes are shown in FIG. 1: applications program 14a (for example, production control) is internal to the host system 10, residing in one of the host CPUs 12; external console 14b communicates with the host system 10 through an interface.

In the described embodiment of the invention, the host computer system 10 uses intermediate host CPUs 18, also MicroVAX ™ computers, to communicate with the DRUs 16 within the material handling system. Each intermediate host 18 has a number of DRUs 16 associated with it and holds a DRU Control Task DCT for each of its associated DRUs. A DRU Control Task is, as will be described in greater detail below, a driver interface assigned to a specific DRU 16 by the host computer system 10.

A DRU 16 is located at each intersection in the material handling system conveyor network which requires a routing decision. Some DRUs associated with a particular intermediate host 18 may be in communication with process machines 20 located on the conveyor network. Each process machine, in addition to being in communication with its DRU 16, is also in communication with an intermediate host CPU 18.

Figure 2B:
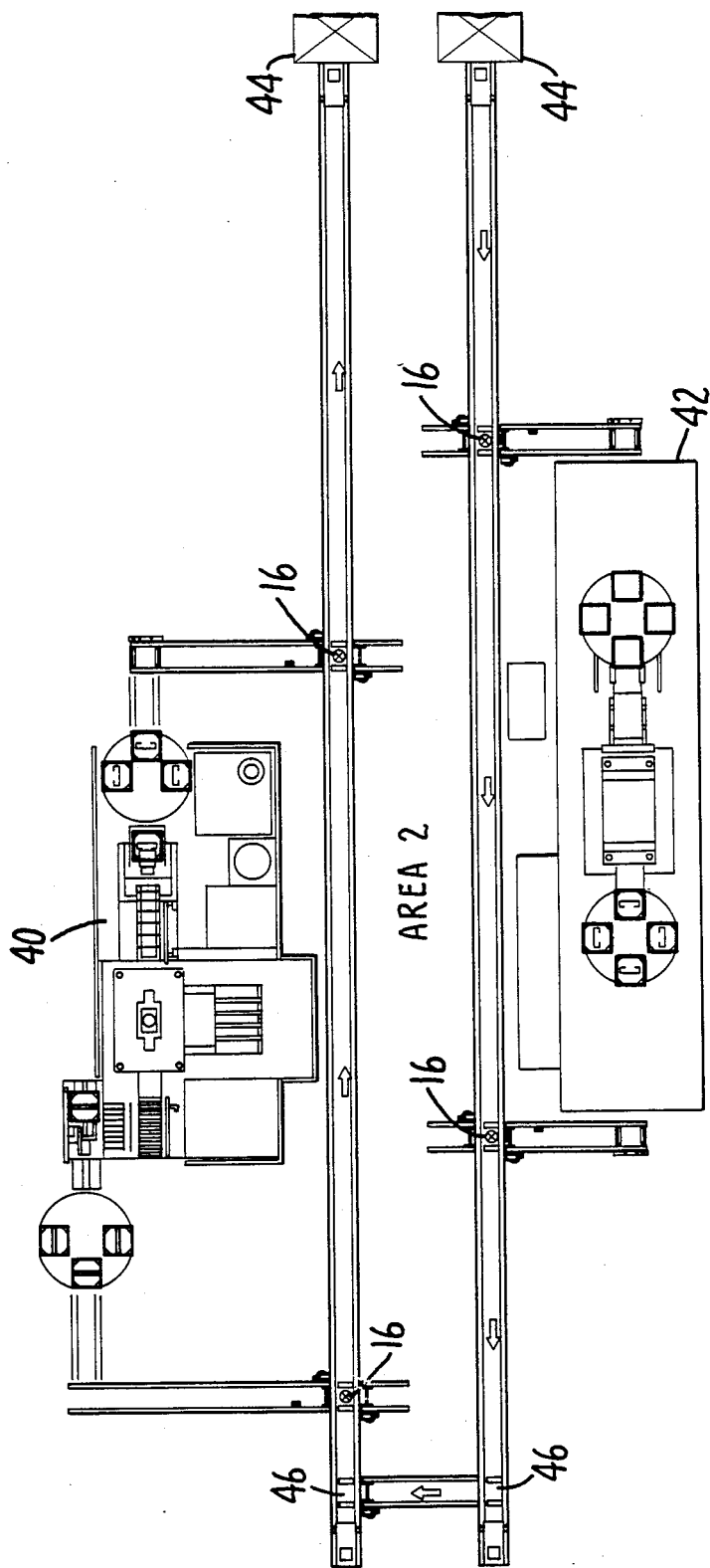

FIGS. 2A and 2B combine to show a simplified example of a material handling system conveyor network in the context of an assembly facility for semiconductor integrated circuits. Semiconductor IC die enter the conveyor network in wafer form at a Material Preparation Spur. As will be described in greater detail below, material carriers then transport the die through the network, via a sequence of DRUs 16, to a series of automated process stations including Wafer Saw 30, Die Attach 32, and a bonding station. In the example shown in FIG. 2, the bonding station of the assembly process is flexible, providing either for conventional wire bonding at Wire Bond Station 34 or for tape automate bonding at Inner Lead Bond and Outer Lead Bond Stations 36 and 38, respectively. As shown in FIG. 2B, the wire bonded die are then directed by an appropriate sequence of DRUs 16 to a Gang Pot Molding Station 40 and a Trim and Form Station 42 before being discharged from the conveyor network to Shipment.

In the event that machine scheduling within the network illustrated in FIGS. 2A and 2B so dictates, material carriers may be sent through a sequence of DRUs in a loop around Area I of the network. Elevators 44 are included at various locations within the network to compensate for height differences among the process machines. Corner controllers 46 execute directional changes at conveyor intersections where no routing decision need be made.

Figure 3:
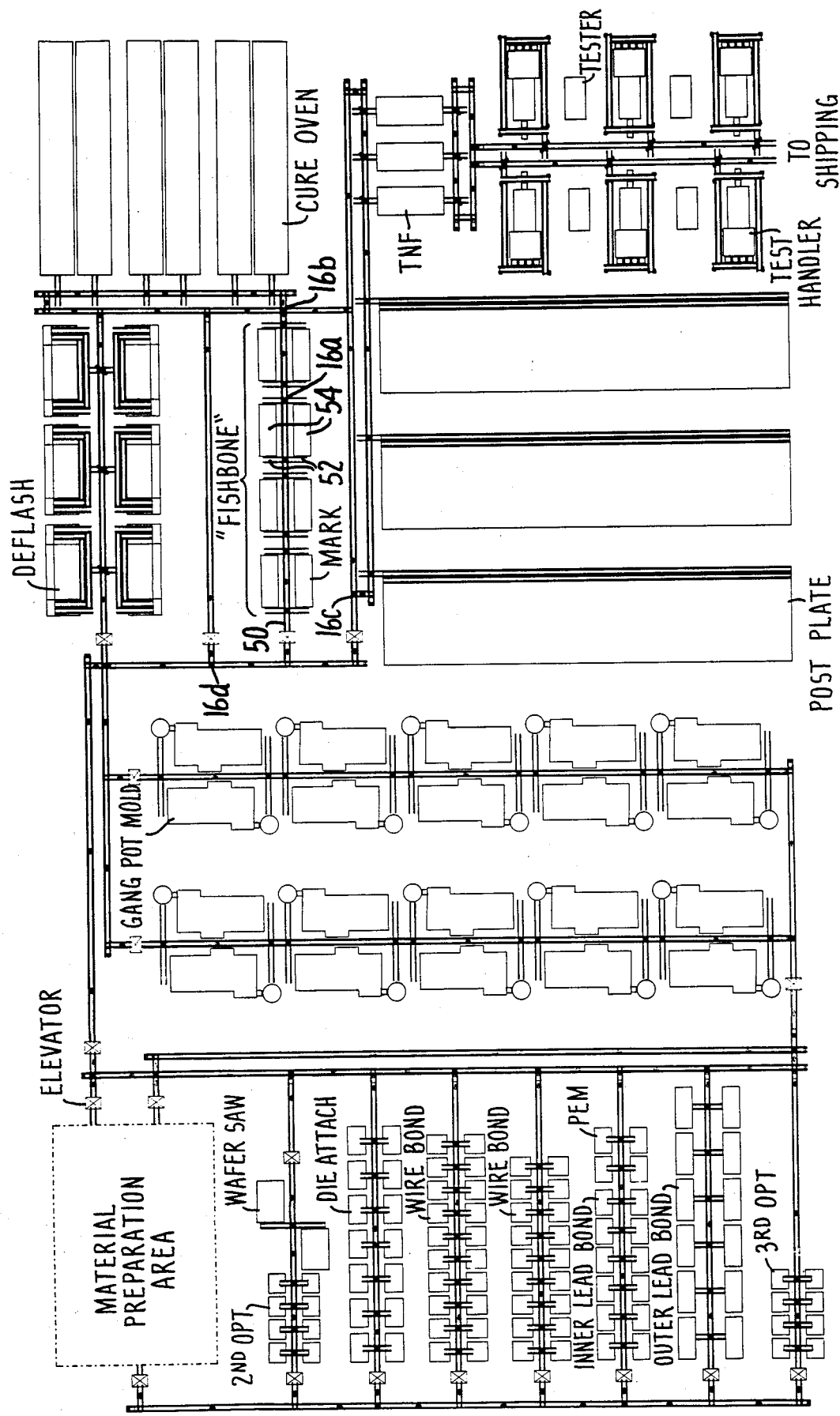
FIG. 3 is a schematic diagram illustrating a fully-automated, flexible manufacturing system which utilizes distributed routing units in accordance with the present invention.

FIG. 3 shows an example of a complete, fully-automated, flexible integrated circuit assembly plant. The conveyor network for the assembly plant consists of a number of intersecting conveyors with a DRU 16 located at each "decision-making" intersection. The network includes a number of "fishbones" which consist of a series of DRUs 16 located on a main line conveyor 50 with each DRU in the series having associated with it two spur conveyors 52 which intersect with the main line conveyor 50. Each spur conveyor 52 is connected to a process machine 54.

Each DRU 16 in the conveyor network is classified as one or more of the following types: Equipment DRU 16a, Routing DRU 16b, Sentinel DRU 16c or Loop Manager DRU 16d. Equipment DRUs 16a are described above. Routing DRUs 16b are characterized by the fact that they have at least two exits. Sentinel DRUs 16c are designated by the host computer system 10 at selected locations throughout the conveyor network and are assigned the function of identifying material carriers which have become "lost" or otherwise separated from the normal tracking procedures utilized by the system.

The conveyor network is comprised of a number of "loops". Each loop is specifically defined by a certain sequence of DRUs. Each loop includes a DRU which is designated as a Loop Manager. The Loop Manager DRU holds a local "table of contents" listing all material carriers then present in the loop.

The conveyor network is also divided into a number of "areas", each of which represents a logical grouping of process machines. Each process machine in the material handling system is associated with one, and only one, area.

Figure 4:
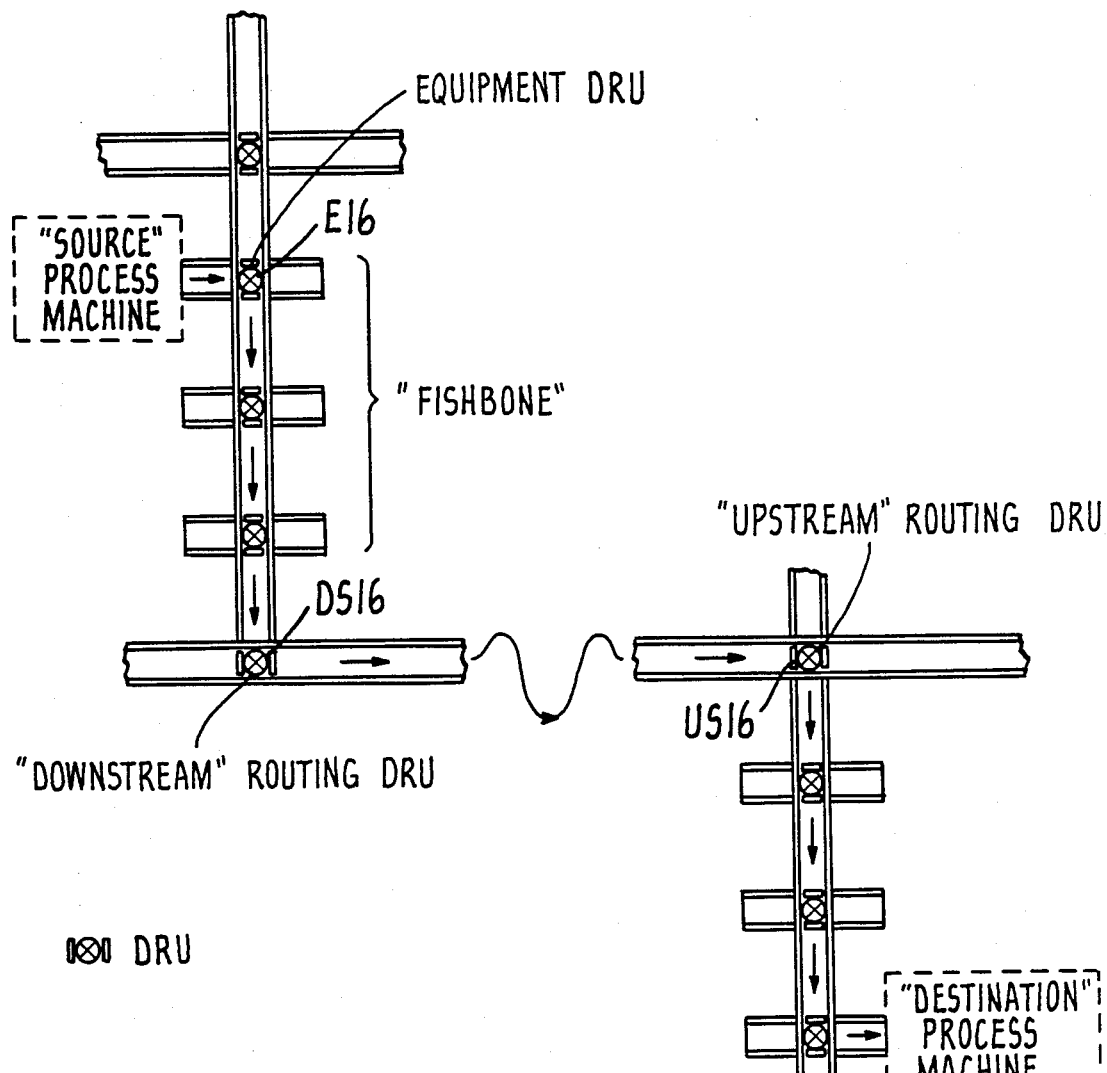
FIG. 4 is a schematic diagram illustrating a specific path from a specific source to a specific destination within a material handling conveyor system.

Referring to FIG. 4, in a typical operation performed by the material handling system, a command is issued by a client process to the host computer system 10 to move a specific SIP from a specific source, which can be either a specific process machine or a loop or an area within the network, to a certain destination, again, either a specific process machine or a loop or an area. Given such a command, the host computer system 10 first identifies a Downstream Routing DRU DS16 for the material carrier source and an Upstream Routing DRU US16 for the material carrier destination. Then, using a topology database, the host computer system 10 determines a path through a sequence of Routing DRUs from the source to the destination. The host system 10 then deploys the command for later activation. When the command is deployed, it is provided to the intermediate host CPU 18 associated with the Downstream Routing DRU DS16 required to execute the command. This information is stored by the intermediate host 18 in its DCT for the Downstream Routing DRU DS16.

When the Equipment Handling DRU E16 associated with the Source Process Machine identifies the carrier containing the material as having left the Source Process Machine, in a manner to be described in detail below, it notifies its associated intermediate host 18, thereby activating the command. The Downstream Routing DRU DS16 is then provided with information required for disposition of the carrier to initiate implementation of that command. Each Routing DRU along the predetermined path from the Source Process Machine to the Destination Process Machine is provided in turn with information related to its task in executing the command. Based on inputs provided to the material handling system subsequent to activation of the command, either from client processes or based upon data generated by the material handling system itself, the sequence of Routing DRUs through which the SIP will move may be dynamically, continuously and asynchronously modified.

Figure 5:
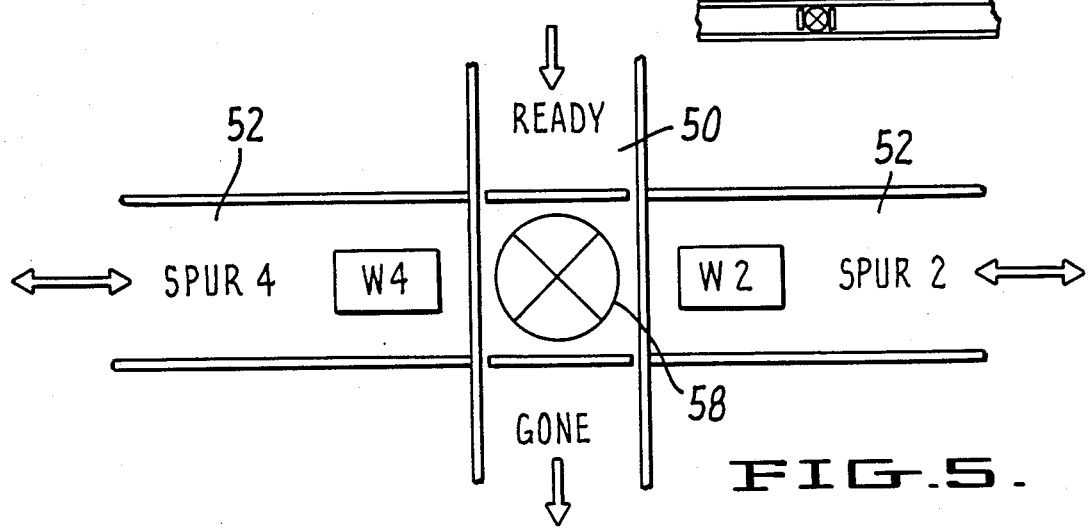
FIG. 5 is a schematic diagram illustrating the domain of a distributed routing unit.
Figure 6:
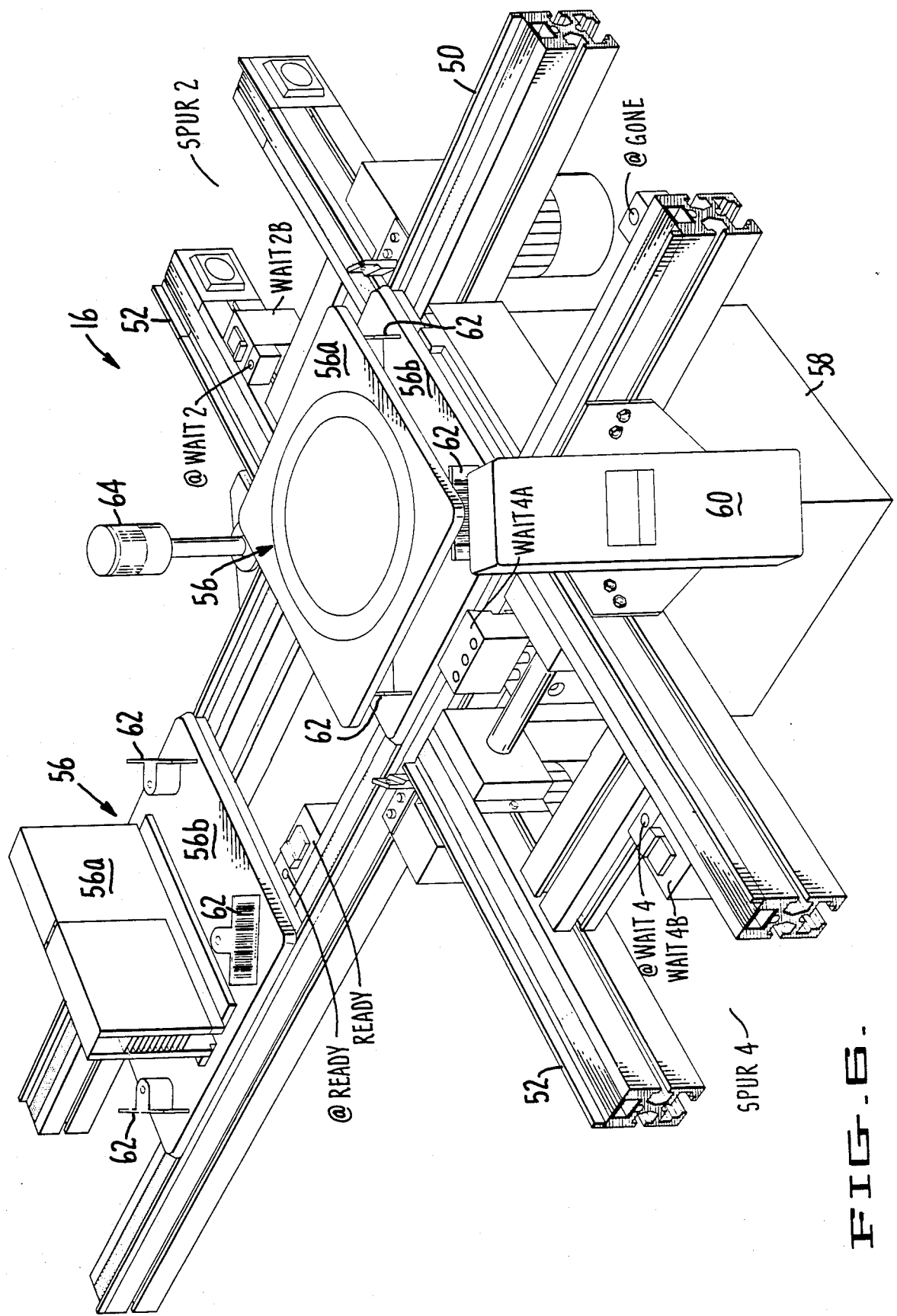
FIG. 6 is an isometric view illustrating a preferred embodiment of a distributed routing unit in accordance with the present invention.
Figure 8A:
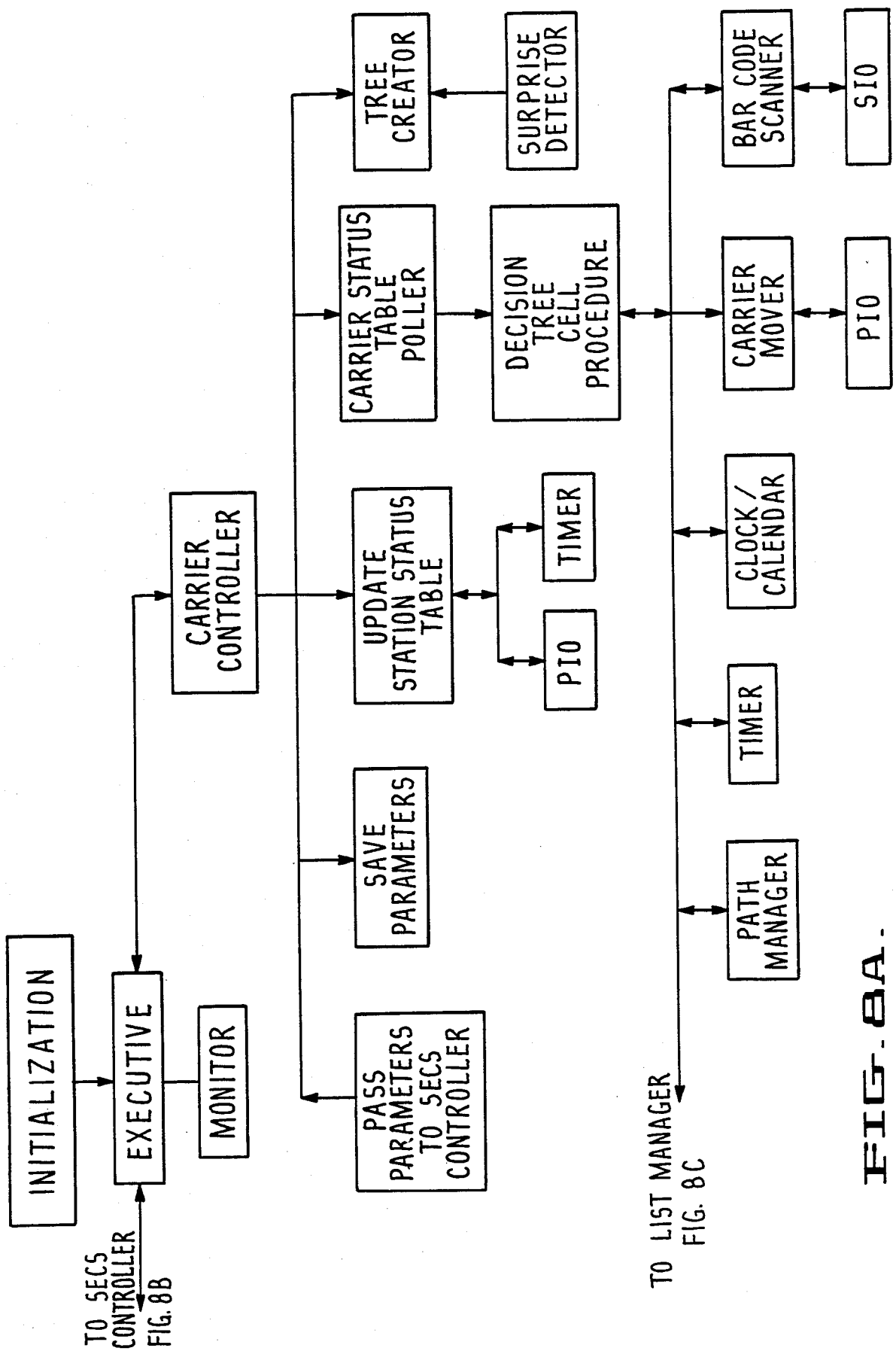
Figure 8B:
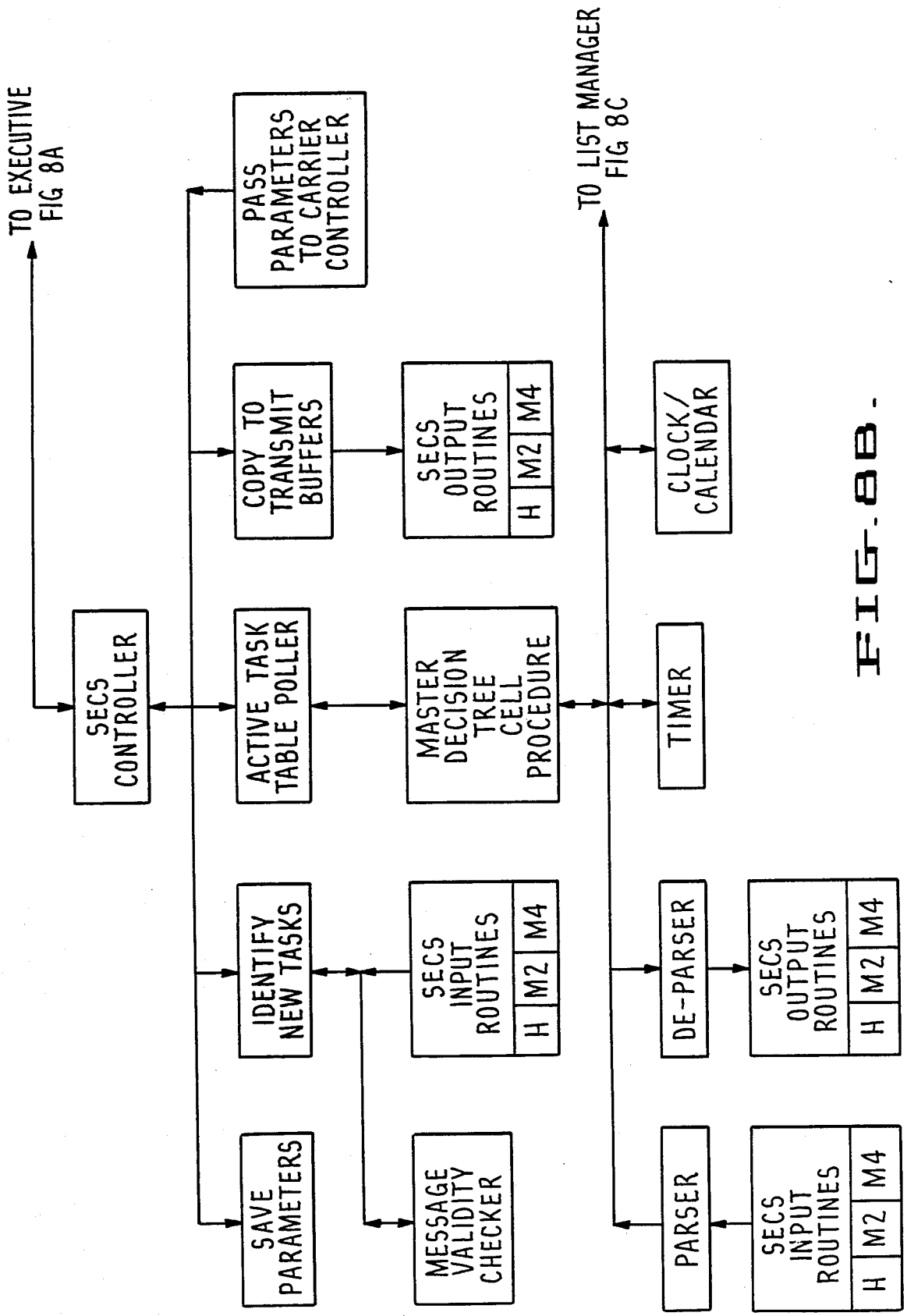
Figure 8D:
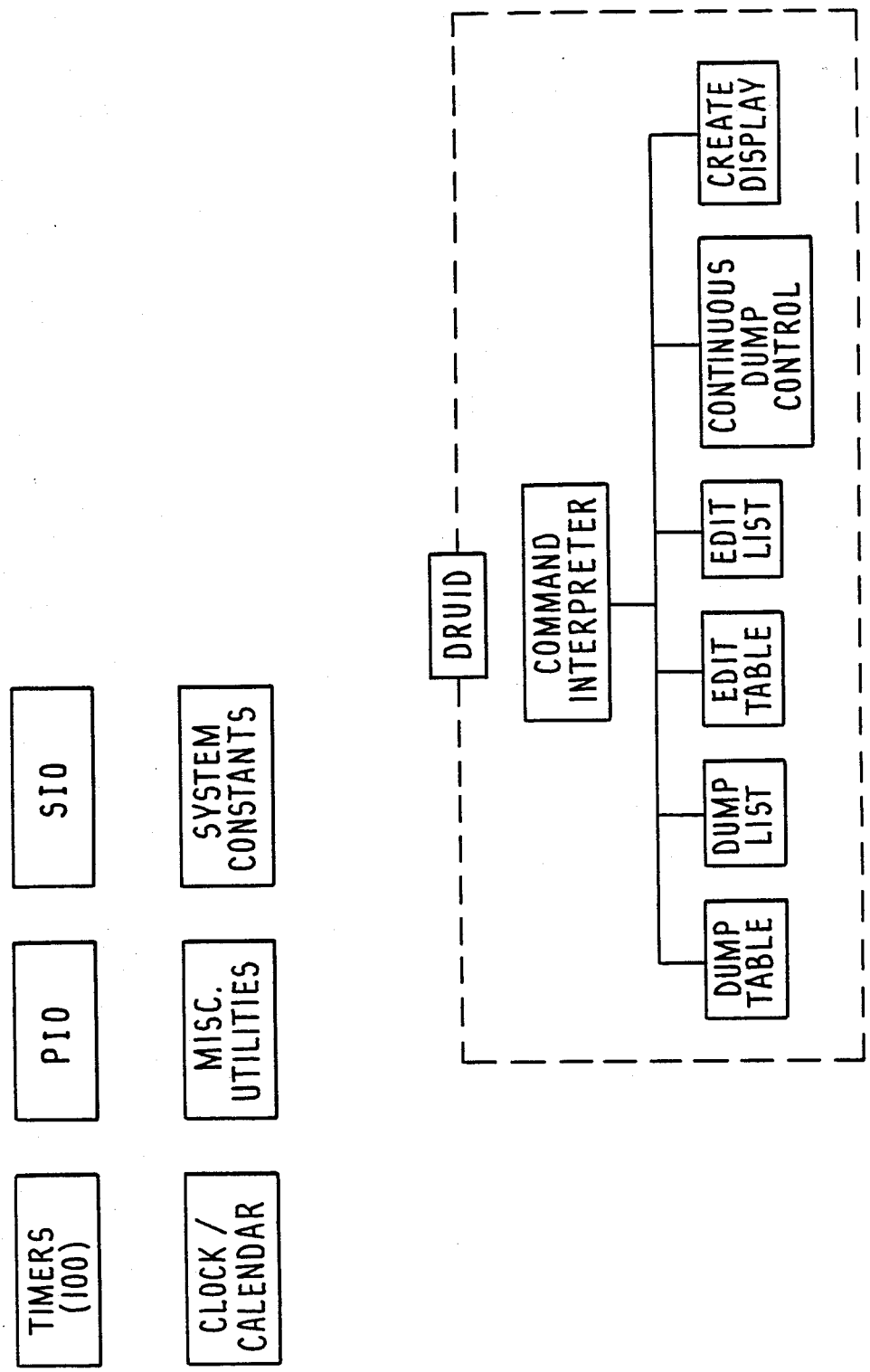

FIGS. 5 and 6 show the general hardware configuration of a DRU 16. As described above, DRUs are usually composed of a single intersection of the main conveyor line 50 and two side conveyor branches or spurs 52. The main conveyor line 50 is "always running" in one direction during normal operation, while a spur conveyor 52 may move in either direction, as shown by the arrows in FIG. 5. Conveyor spurs 52 are usually used to divert material carriers left and right from the main conveyor flow. The DRU 16 usually controls the movement direction of its associated conveyor spurs 52 (unless the spur is always "on" in one direction uncontrolled).

In most cases, spur flows terminate at a material port of a process machine 54, but are designed with enough flexibility to allow configurations where the material carrier is simply passed to another DRU 16 or to another section of conveyor network. These latter, "non-handshaking" conveyor spurs are unidirectional.

FIG. 6 provides a detailed illustration of a DRU 16. The DRU 16 includes a scan-lift transfer mechanism 58 which serves to both identify material carriers 56 and to either move material carriers 56 along the main conveyor line 50 or to transfer them to one of the associated spurs 52.

The DRU 16 also includes four status stations. A Ready station is located upstream of the scan-lift transfer mechanism 58 on the main line 50. A Gone station is located downstream of the scan-lift transfer mechanism 58 on the main line 50. Each spur 52 includes a Wait station: W2 and W4 for spur 2 and spur 4, respectively. All inbound non-handshaking spurs 52 are always running and have a Wait station. All outbound non-handshaking spurs do not require a Wait station.

Conveyor motors are usually turned off if they are not being used. The only motors that are always left on are motors for spurs dedicated to receive material through a non-handshaking virtual material port. All conveyor motors are driven by contactors with 24 volt DC coils. A minimum dead time on reversal of any motor is required to allow a motor to coast to a stop. The DRU 16 includes an interlock to prevent engaging a conveyor motor in opposite directions at the same time.

The DRU's scan-lift transfer mechanism 58 has three positions: (i) "up", to transfer a material carrier 56 onto or off of one of the spurs 52; (ii) "middle", to stop a material carrier 56 over the mechanism 58; and (iii) "down", to allow a carrier 56 to pass out of the DRU 16 to the Gone station.

The scan-lift transfer mechanism 58 is normally held in the middle position and returns to the lower position automatically if power is removed from air solenoid valves which control the movement of the mechanism.

Each DRU 16 detains material carrier traffic to prevent interference at the Scan station 58 by holding carriers upstream at the Ready position with a carrier stop when necessary. The DRU 16 uses the Wait port to clear the main line 50 during machine handshakes.

The term "port 21" refers to port 1 on spur 2. Similarly, port 41 refers to port 1 on spur 4. The DRU can send material to ports on the spurs 52 with numbers from 1 to 8. Since there is no DRU hardware associated with these ports, and in fact they may not involve any real hardware at all, these ports are referred to as virtual ports. All stops, proximity sensors, or other mechanisms associated with a virtual port are controlled by the process machine 54 serviced by the spur 52 on which the virtual port is located. Traffic arbitration of virtual ports is also a process machine-controlled function. The DRU 16 assumes a virtual port is always capable of receiving a carrier 56, since it has no way to determine the status of the machine-controlled virtual port area. It is for this reason that the DRU 16 makes the decision to initiate a task, such as to divert a carrier 56 from the main line 50, on the basis of carriers sensed at Wait stations, and carriers which are moving under an incomplete task.

The design requirements of the material handling system described herein call for material carriers 56 to have their contents removed by the process machine 54 and for the machine 54 to re-use the carrier 56 by refilling it with processed material, quickly returning it to the material handling system. This leaves a machine port almost always able to receive material.

A mimic of this original approach is utilized by some process machines 54 that are incapable of removing only the contents of the carrier and instead remove the entire carrier 56 from the spur 52. This approach still returns a carrier 56 to the system in such a manner that it will look like the former approach. Machines of this latter type require no special consideration by the material handling system. Therefore, the system design assumes that a system that will work for the first approach need not be modified to accept the second approach.

Referring back to FIG. 6, stop WAIT2A is on spur 2 between Wait port 2 and the main line 50. (It is not visible in FIG. 6 because it is hidden by material carrier 56 located in the Scan station.) It is used to stop carriers 56 that are returning to the main line 50 along spur 2 from continuing across the scan-lift transfer mechanism 58 and entering spur 4. Stop WAIT2A always stops the leading edge of the carrier 56 on the external perimeter of the carrier 56. It locates a carrier 56 accurately in WAIT2 or Scan depending on which side of the stop it is on. WAIT2A is a pop-up-stop and the only pop-up-stop on spur 2. Only pop-up-stops are capable of blocking carriers approaching the stop from both directions. For example, WAIT2B described below, will jam if a carrier approaches Wait W2 towards Scan while the stop is up.

Stop WAIT2B is on spur 2 and prevents carriers 56 from leaving Wait W2 when spur 2 is driving a carrier 56 in W2 towards PORT21. Stop WAIT2B should always be retracted if the spur is traveling inbound.

Mechanisms on spur 4 act the same as the corresponding mechanisms on spur 2.

When raised, stop READY catches the trailing edge of a carrier 56 attempting to exit the Ready position and prevents the carrier 56 from continuing downstream to the Scan station.

The @READY sensor will detect a carrier 56 being restrained by the READY stop. In the event that a carrier 56 passes through the Ready position without being stopped by the READY stop, the @READY sensor will detect the carrier's presence for a brief moment as the carrier passes through the Ready position.

The @GONE sensor will detect a carrier 56 being restrained by downstream traffic.

The @WAIT2 sensor detects a carrier 56 being restrained in the W2 station. In the event that a carrier 56 passes through the W2 station without being stopped by the appropriate WAIT stop, the @WAIT2 sensor will detect the carrier's presence for a brief moment as the carrier 56 passes through the Wait station.

The READY stop will only be raised when the Scan station 58 is busy. Most of the time, the READY stop will be down, allowing carriers 56 to enter Scan, be identified on the fly and if possible, pass through to the Gone position, if this is the correct destination, without being stopped. This is to maximize the effective through-put of the bar code scanner 60, to be described below, and to minimize shock to the carrier 56 contents.

All stops default to the "stop" position, except READY and Scan, which default to the lowered position. De-energized is the default for all cases. Stops use a single solenoid valve with a spring return to their up position when air is not applied. The READY stop that defaults to down and the lower signal of the scan-lift transfer mechanism 58 have solenoid valves installed using reverse logic, which allows air pressure to reach the mechanisms unless they are energized. All solenoid valves are turned off if it is not necessary to have them on.

A bar code scanner 60 is positioned at the intersection of the main conveyor line 50 and the spurs 52. The bar code scanner 60 is used to trace material carriers 56 traveling through the intersection of the main line 50 and the spur conveyors 52 and to detect the material carrier's orientation and identification. The orientation of all incoming carriers 56 to a process machine 54 has been corrected prior to entering the DRU spur.

Each carrier 56 has a unique set of four unique bar codes 62. Each side of the carrier 56 uses one element of the set. It allows the DRU 16 to identify not only which carrier 56 is being scanned, but also the orientation of that carrier 56. This information is used by the DRU 16 to associate the set of material contained in that carrier 56 with a specific task.

An alarm beacon 64 is also mounted at the DRU intersection to provide visual notice of abnormal operating conditions, as will be described in detail below.

As shown in FIG. 6, carriers 56 are composed of material magazines 56a permanently mounted to a standard pallet 56b.

Each DRU 16 has three types of software I/O interfaces.

1. The bar code scanner interface uses a RS232 port to control and communicate with the bar code scanner 60. A printable ASCII string which includes the bar code (currently stopped or about to stop) in front of the scan head is returned by the bar code scanner 60 upon request by the DRU 16.
2. The DRU 16 uses conveyor system components under its control to complete the required tasks on the material carrier 56 as previously downloaded by the host system 10.
3. The protocol interface uses SECS-2 protocol to communicate with interfacing process machines 54 and with the host network 10. A complete set of SECS messages is provided as described in Appendix A at the end of this description.

The bar code label 62 is positioned at a minimum range of 4 inches, and a maximum of 7 inches from the bar code scanner 60. Increases in depth of field of more than 10 inches do not seem to be of any advantage for this application, though they are permitted. The label 62 can be read when it is still or, with no drop in the reliability of the read, as it moves past the scanner 60 at 15 meters per minute. The bar code scanner 60 must make very reliable reads and be as maintenance free as possible. The scanner 60 uses a moving beam which rasters 0.25 inches high at a distance of 4 inches from the scanner. This raster is used to ensure a good read when dirt or label printing imperfections obscure one portion of the label 62, but not the entire width.

When the number of good reads reaches the threshold value, the scanner 60 transmits its data. A value of 0 threshold is interpreted as "Continue to Read" until Xoff received. When the number of attempts to read exceeds 255, (the maximum number of attempts allowed), the data is transmitted even if the threshold limit is zero and Xoff has not been received. The scanner 60 continues to scan, transmitting its data as necessary, until Xoff is received. The default threshold limit is 10.

The requirement of multiple reads and threshold limits requires processor time. Therefore, the scanner 60 makes the scans required and returns a value in 0.8 seconds from the time of the carriage return of the request to the time of the carriage return of the reply. Bar code label 62 readability is expected to be degraded, since the labels 62 are continuously kept in a manufacturing cycle. The bar code scanner 60 reads these labels 62 through a wide range of cycles without necessitating the replacement of the label 62. One bad read in ten is acceptable on a degraded label. It is very important to the successful operation of the material handling system that data never be incorrectly read. The probability of reading data three times and interpreting the contents of a bar code twice to be some incorrect data must be less than 0.0001 percent. When in doubt, a no read is returned.

When an Xoff message is received, the scanner 60 transmits its data. This data message contents are the following ASCII characters:
bar code contents
one space character
number of good reads with leading zeros if necessary to fill a 2 character ASCII field
carriage return
line feed If no good reads were made, the message contents are the following ASCII characters:
NO READ
one space character
number of attempts to read
carriage return
line feed
(maximum number of attempts is fixed at 255)

Bar codes 6 are read in a picket fence arrangement. Labels are never more than 3.5 inches long, since this is the length of the bar code surface.

For purposes of this description, the axis of the earth's local gravity is called the Y direction and the plane formed by the bar code label 62 is defined to form an X/Y plane. The Y direction is considered to be parallel to the bars of the bar code, and the X direction perpendicular to the bar code bars. The Z direction extends towards the scanner 60 normal to the label 62.

"Tilt" is a rotation about the Z direction. Tilt may be induced as a result of a combination of inaccurate placement of the label 62 on the carrier surface, tilt of the bar code surface relative to the carrier 56, tilt of the carrier 56 at read time relative to the conveyor system, and tilt of the bar code scanner mounting brackets. The total tilt may be as much as 10 degrees from being perpendicular to the raster of the scanner beam.

"Pitch" is a rotation about the X direction. The label may be leaning or pitched toward or away from the scanner 60 as a result of a combination of several factors. Air gaps between the label 62 and the carrier surface, pitch of the bar code surface relative to the carrier 56, pitch of the carrier 56 at read time relative to the conveyor system, and pitch of the bar code scanner mounting bracket relative to preferred mounting position all contribute to pitch between the label and the scanner beam. The total pitch may be as much as 5 degrees.

"Skew" is a rotation about the Y direction. The bar code label presentation is always made in a skew manner with skew being reduced as the carrier 56 approaches the Scan station. This skew can also differ carrier to carrier as a result of a combination of several factors. Air gaps between the label 62 and the carrier surface, skew of the bar code surface relative to the carrier 56, skew of the carrier 56 at read time relative to the conveyor system, and skew of the bar code scanner mounting bracket relative to preferred mounting position all contribute to skew between the label 62 and the scanner beam. The total skew may be as much as 12 degrees.

The label 62 is centered within 0.1 inches on the surface, which is planer within 0.01 inches, and the surface is repeatably located within 0.1 inches when the carrier 56 stops.

The bar code label 62, or bar code, serves as the serial number for a given material carrier 56 as well as an identification of the carrier orientation. The bar code also identifies associated fixtures 56a used to move material. These labels are of letter quality. The label 62 should be capable of multi-cycles through the production line without the need for replacement, since many production line environments will include harsh temperatures and chemicals.

The bar code label 62 is written in code 39 medium density. Medium density is defined as 5.2 characters per inch, MIL-STD-1189A, AIAG-B-1 3.0:1 (3:1 ratio of width of wide bar to narrow bar) and a Quiet Zone of 10 times the narrow bar width. The bar code label 62 has all information written in alphanumeric characters as well as bar code format. It has 16 character fields including a stop and a start character of * (asterisk).

The bar code is composed of 16 character fields from left to right as shown in Table 1 below.

TABLE 1

| FIELD | FUNCTION |
|---|---|
| 1 | Start code |
| 2,3 | Fixture type |
| 4 | Orientation |
| 5,6 | Reserved |
| 7-15 | Fixture serial number |
| 16 | Stop code |

Orientation is upper case ASCII U, D, L, R for up, down, left, and right, respectively. As stated above, bar code labels 62 are always used in sets of four. One set is composed of a label of each carrier orientation, with all other fields left the same.

Reserved fields are set to character 0. The bar code label 62 has a minimum width (along the Y axis) of 0.95 inches and a maximum width of 1.0 inches. Maximum length is 3.3 inches (along the X axis). The bar code uses minimum sized alphanumeric letters because they are used only if the bar code cannot be read and must be replaced. These characters are placed below the bar code bars along the X axis and must be legible. The maximum amount of available label area is used to print the bar code bars. The wide print field for the bar code is to make the reliability of a correct bar code read as high as possible.

The bar code must be scuff resistant, capable of surviving rough handling in the production environment. In an integrated circuit assembly application, the bar code must be able to go through an oven environment of 380 degrees Centigrade (640 Fahrenheit) for 24 hour cycles, and maintain its ability to be read by the bar code scanner 60.

The DRU 16 has four standard RS232 ports all capable of supporting SECS for communications to the host system 10 and for interfacing process machines 54. However, one port is used for the bar code scanner interface. The ports are dedicated in the following manner:
1. Host
2. Machine 2
3. Bar code scanner
4. Machine 4

The DRU supports an I/O interface with a minimum of 32 optically isolated relay outputs and switch closure inputs for control of the conveyor. These are installed using a block of 4 I/O units, with expansions available in units of 4 as required.

The DRU proximity sensors @READY, @WAIT2, @WAIT4 and @GONE described above are:
Short circuit proof (operator can wire up in any combination of the three wires without damage);
Operating voltage is 10–30 VDC 24 volts typical;
Allowable input power supply Ripple 10% maximum with no effect;
15% hysteresis maximum
Less than 2.5 volt drop across the input;
100 mA continuous load current;
300 mA Trigger-current for short-circuit protection;
Less than 1 Ma continuous leakage current in the non conducting mode;
False-pulse suppression on power up;
Protection against transients;
Operating temperature range −20 C. to 60 C.;
Meets NEMA 1,3,4 and 13 as well as IEC IP67 safety standards;
Shock resistant to IEC 64-2-27<30 g, 11 ms in all three planes;
Vibration response IEC 64-2-6;
12 mm diameter;
Normally open;
Unshielded; and
Required sensing distance 4 mm minimum.

The specifications for the DRU air solenoid valves are as follows:
MAX air pressure 150 PSIG;
Operating temperature 0 to 120 F.;
Maximum inrush current for 24 VDC 0.35 amps.

The specifications for the DRU motor contactors are as follows:
Clip mount to Omega type rail;
Minimum isolation voltage 3000 VAC;
Operating temperature −40 to 80 C.;
Control voltage range 3–32 VDC;
Control drop out voltage 1 VDC;
Maximum required input current 15 mA;
Requires Maximum load current available with 120 VAC line voltage 20 amps; and
Zero cross over switching.

The DRU 16 utilizes a conventional 16-bit microprocessor to meet the address space requirements of the DRU application program, which is described in detail below. The DRU microprocessor utilizes an OS-9 operating system.

Movement of material through the material handling system described above can be summarized as a sequence of events:
1. First the host system 10 receives a source, destination and identification bar code, as well as an alias for the contents of a specific material carrier to be moved, from a client process 12 (usually production scheduling).
2. The host 10 defines a path comprising a sequence of DRUs through which the specified material carrier 56 will be pass.
3. The host gives each DRU 16 along the carrier path (Routing DRUs) tasks, using SECS stream 127 list modifications, to "hand off" the material carrier 56 from Routing DRU to Routing DRU until the material carrier 56 arrives at the Destination DRU.
4. The Destination DRU diverts the carrier 56 to the spur 52 for the correct process machine 54.
5. The DRU 16 sends a material request to the machine 54.
6. The machine 54 grants the DRU's request.
7. The DRU 16 routes the material carrier down the spur towards the port within the machine 54 for the required material transfer.
8. The machine 54 senses the new material carrier.
9. The machine 54 sends acknowledgement to the DRU 16 of a material carrier transfer task completion.
10. The DRU 16 informs the host 10 that its task has been completed by sending the host 10 the DRU's History List (described below).
11. The host 10 acknowledges the completion of the task and deletes the entry from the DRU's History List.
12. The DRU 16 clears its History List and that particular task is terminated.
13. The machine 54 processes the material provided by the initial carrier and returns it to a carrier (not necessarily the one that brought the material).
14. Using a procedure similar to that described in the above-listed steps, the machine 54 sends the material back to the DRU 16.
15. The DRU 16 then sends the material toward the next process step in a direction designated for its carrier.

When the host 10 will be off line for an extended period of time, the DRU can have all list entries necessary to keep the DRU operating downloaded to it. When the DRU is operating without communication to the host network 10, it is said to be operating in "stand alone" or "static" mode. DRU information waiting to be transmitted while the host network is off-line is held by the DRU until the communication link is reestablished.

Normal DRU running mode is characterized by dynamic query and editing of the lists in the DRU by the host network. This mode is termed "dynamic" mode.

In dynamic mode, feedback from the DRU via the History List and Alarms allow the host 10 to react to events within the conveyor network. The bar code 62 is used to identify a carrier 56 in the DRU intersection and to trigger a list entry internal to the DRU. List entrys tell the DRU what to do with each carrier the DRU identifies.

In the preferred embodiment of the present invention, DRU list entries are monitored and maintained using four lists of instructions. These lists are called the Destiny List, the History List, the Block List and the Log List. The sum of the number of entries in each of these lists cannot exceed the available memory in the DRU. As entries are added or removed from these lists, memory space is dynamically allocated by the DRU to accommodate changes in the list length. If memory is not available for list entry data to be added to the History List, the DRU sends an alarm and goes off line, to prevent data from being lost.

In the particular embodiment of the invention described herein, each DRU has the list capacity to continue to function while the host computer system is off line for periods of up to fifteen minutes. The assumption underlying the fifteen minute forecast requirement is that fifteen minutes is the maximum time required to repair or replace a down host and to reinstall data required to resume control without interrupting operation of the material handling system.

Operation of the material handling system described herein is based on the following system criteria:
1. The host computer network 10 communicates with each DRU 16 within the conveyor system as an individual piece of equipment.
2. A DRU 16 governs each intersection on the conveyor where a routing decision must be made.
3. DRUs are able to complete initiated material tasks when the host network is off line.
4. The host computer network can redirect a material prior to identification of a task for that material by a particular DRU. This material redirection capability is necessary to accommodate the load changes imposed by unexpected machine slowdowns and malfunctions.
5. The host computer network only places tasks on a DRU's Destiny List that are expected not to fail. This means that attempts to handshake a material into a process machine will usually result in the material being accepted by the process machine.
6. If the exit of a material carrier forces a DRU to release a carrier to recirculate or be re routed, the host will attempt to reschedule material at a wider interval.
7. The conveyor system will not intentionally be used to buffer carriers.
8. Once a process machine's Destiny List has been loaded and all machine requests for information resulting from the loading of the machine's Destiny List have been fulfilled, no host communications are required for the machine to accept the carrier, process the material provided by the carrier, and return the material and the carrier to the conveyor system.
9. No real time control by the host is required at material arrival time to keep a process machine building parts. To accomplish this, a BIS number and all necessary information (which PPbody to use, which SVID to collect, what ECID (a standard SECS reference, Equipment Constant Identification) values to use, and which Alarms are in effect for a particular machine Destiny List entry) required for the machine to accept the carrier, process the material, and return the material and the carrier to the conveyor system has been sent down to the machine prior to the arrival of the material. The machine must be able to do this while the host is off line. The DRU plays no part in getting this information to the machines. A BIS number is a pointer to a location in a data base stored in the host which specifically identifies and characterizes the material contained in a carrier.
10. The main line traffic will be more or less constant with traffic levels low enough that the DRU may always release a carrier to Gone without a downstream traffic jam.

Process machines 54 within the material handling system must adhere to the following rules:
1. Machines will force the DRU to use the Shell Game (described below) less than 1 out of 10 attempts to transfer material.
2. Machines will only exhaust the available number of DRU attempts to transfer a material carrier into the machine during an error condition, where the system is feeding the machine too fast. This should happen less than 1 out of 100 attempts to transfer material.
3. Material transfer to a machine will not be blocked by carriers at lower numbered ports for a period of time that would cause the number of available attempts to transfer material to be exhausted more than 1 out of 1000 attempts to transfer material.
4. Once a machine has established a path via handshake to receive a carrier at a given material port, the machine will not attempt to send a carrier out of the same spur until after the incoming carrier is received.
5. Spurs will only be used to carry out one material transfer at a time. Any attempt to start a new material transaction prior to the completion of a current material transfer transaction using the same spur will be denied by the receiver (S4F63).
6. The DRU is expected to deliver at most one carrier per spur every 45 seconds.

The operation of the material handling system described herein is based on the following assumptions:
1. Material carriers will be unloaded and reloaded by a process machine, then quickly returned to the conveyor system prior to the arrival of another carrier headed for the same machine.
2. Overuse of the Shell Game, described below, and forced rerouting of carriers that must be purged to allow an existing carrier to reach the main line, could force the material handling system to work outside of the design boundaries. This could possibly make scheduled carrier deliveries late for machines all along a routing loop and cause severe detrimental effects on machine effectiveness and system efficiency.
3. It is unlikely that two carriers headed for the same spur will be adjacent to each other. Time delays inherent in the system, as well as a shuffling effect of upstream machines, will tend to spread out carriers and intersperse them with carriers existing and heading for the next process area.
4. It is assumed that a machine will accept a carrier, unload it and return it to the main conveyor line in about 10 seconds.
5. It is assumed that there is a 10 second window after the arrival of a carrier where spur contention by another arriving carrier is very unlikely to force the DRU to use the Shell Game or to purge a carrier. This window tends to get smaller and smaller as machines get faster and faster, requiring more frequent material deliveries.
6. The 10 second window is only designated as a rule of thumb to assist machine designs that do not use the unload and re-load method to appear to the material handling system as though they are always able to receive material. The DRU does not time this 10 second window, nor will the host. The 10 second window is only useful to tailor machine design in an effort to reduce the likelihood, and thereby the frequency, that carrier contingencies will arise.

Process machines within the material handling system follow the following rules:

1. Machines must remove and return material to conveyor spurs.
2. Machines must adhere to time windowing rules or the conveyor system will not deliver enough material.
3. Machines must have a material buffer on the input and on the output as required to produce for 15 minutes without a material carrier while a carrier that was forced to purge is re-circulated and re-routed back to the machine.
4. Machines may run out of work if the host cannot communicate to the machine and DRU for extended periods (more than 15 minutes).
5. Machines must keep their ports clear, quickly removing material from a carrier and returning spent material to the carrier. Total cycle time is of 15 seconds maximum for time-scheduled machines (defined below).

All material carriers that enter a DRU 16 should have an entry on the DRU's Destiny List that tells the DRU what to do with that carrier. Exceptions are considered an error condition. Each task entry in the Destiny List is composed of the following ATTIDs in the listed order:

| | | |
|---|---|---|
| * | List Entry Identifier | ATTID 16 (8 bytes) |
| * | carrier contents or BIS ID | ATTID 9 (16 bytes) |
| * | bar code | ATTID 0 (16 bytes) |
| * | source | ATTID 11 (2 bytes) |
| * | destination | ATTID 10 (2 bytes) |
| * | action | ATTID 19 (2 bytes) |
| * | Task enable Time-stamp | ATTID 21 (12 bytes) |
| * | cancellation time | ATTID 24 (12 bytes) |
| * | List entry Time-stamp | ATTID 20 (12 bytes) |

Action code is defined as follows:

```
Bit 2 mark task for History report
*    0:    Log only
*    1:    mark as History
Bit 4 handshake using stream 4
*    0:    do not handshake
*    1:    handshake
Bit 6 cancel destiny list entry after first match
*    0:    do not cancel entry until told to by host.
*    1:    use once then cancel
```

The destination/source bytes are used as et forth in Table 2:

TABLE 2

| (8 bits) | (8 bits) |
|---|---|
| spur | port |
| byte 2 | byte 1 |

DRU source or destination are defined as:

| | |
|---|---|
| READY = 11, | Spur 1, port 1 |
| SCAN = 00, | Spur 0, port 0 |
| GONE = 31, | Spur 3, port 1 |
| WAIT2 = 20, | Spur 2, port 0 |
| WAIT4 = 40, | Spur 4, port 4 |
| PORTnm = nm, | Spur n, port m |

Tasks which would result in damage to a piece of equipment, or at least are the result of an error condition, are entered on the Block list. Each task entry in the Block list is composed of the following ATTIDs in the listed order:

| | | |
|---|---|---|
| * | Task Identifier | ATTID 16 (8 bytes) |
| * | carrier contents or BIS ID | ATTID 9 (16 bytes) |
| * | bar code | ATTID 0 (16 bytes) |
| * | source | ATTID 11 (2 bytes) |
| * | destination | ATTID 10 (2 bytes) |
| * | action | ATTID 19 (2 bytes) |
| * | Task enable Time-stamp | ATTID 21 (12 bytes) |
| * | cancellation time | ATTID 24 (12 bytes) |
| * | List entry Time-stamp | ATTID 20 (12 bytes) |

Block list entries follow the same rules as Destiny list entries for wild carding, matching time-stamp usage, and task identifier usage, as described below.

The History list is a subset of the Log list. Bit one of the action code determines if tasks are to be flagged as a History list entry. The entry remains as part of the History list until an ACKC127 value of 6 is received from the host in a S127,F132 message. Each task entry in the History list is composed of the following ATTIDs in the listed order:

| | | |
|---|---|---|
| * | Task Identifier | ATTID 16 (8 bytes) |
| * | carrier contents or BIS ID | ATTID 9 (16 bytes) |
| * | bar code | ATTID 0 (16 bytes) |
| * | source | ATTID 11 (2 bytes) |
| * | destination | ATTID 10 (2 bytes) |
| * | action | ATTID 19 (2 bytes) |
| * | Task Initiated Time-stamp | ATTID 26 (12 bytes) |
| * | Task over time stamp | ATTID 25 (12 bytes) |
| * | query time stamp | ATTID 22 (12 bytes) |

All tasks that are carried out by the DRU are logged in its Log list. Each entry in the Log list is composed of the following:

| | | |
|---|---|---|
| * | Task Identifier | ATTID 16 (8 bytes) |
| * | carrier contents or BIS ID | ATTID 9 (16 bytes) |
| * | bar code (including carrier orientation, and carrier type) | ATTID 0 (16 bytes) |
| * | source | ATTID 11 (2 bytes) |
| * | destination | ATTID 10 (2 bytes) |
| * | action | ATTID 19 (2 bytes) |
| * | Task Initiated Time-stamp | ATTID 26 (12 bytes) |
| * | Task over time stamp | ATTID 25 (12 bytes) |
| * | query time stamp | ATTID 22 (12 bytes) |

Upon entry to the History list, the host is notified of the task s completion using an S127,F131 SECS message. The DRU generates all entries on the History list, but only the host may grant a removal by sending S127,F132 with ACKC127 value of 6. Separate entries are made for a carrier exiting a DRU port to a machine and entering a DRU port from a machine as called for by DRU tasks. The host sets the auto upload level by setting PBLSSU to a value other than zero. Zero is the power up default value of PBLSSU. The value of PBLSSU indicates the number of Log list entries that compose the buffer for DRU-initiated Log list updates. This means that when there are fewer than PBLSSU entries, the DRU initiates a Log list backup.

DRU-identified Log list backups are used to cause the Log list to be uploaded any time an entry must be written into one of the last PBLSSU entries in the Log list. In this way, PBLSSU is used to determine how much space is required to allow the Log list to continue to fill while it is trying to upload the Log list to the host. This upload uses S127,F131 to upload the Log list to the host. The Log list is only added to by a DRU. If there is no available memory for additions to any list, the oldest entry in the Log list not flagged as a current History list entry is deleted to accommodate the new data. Thus, the host may query the Log list just as it may query any other list, but data is not considered vital unless PBLSSU is set. The DRU operates according to the following power-up rules:

1. No carriers are allowed in from the Ready position until all carriers along the spur have been accounted for. This is consistent with defined task priorities. The DRU raises the READY stop and identifies all carriers in its domain. If all carrier bar codes in the DRU's domain are expected, then the DRU skips to the next step.
2. Carriers that are sensed by the DRU are moved to Scan. If carriers other than those expected by the DRU, based on conditions at power-down, are found, the unexpected carriers are placed in the Suspend state after they are identified. If more than one carrier is within the DRU's domain, the carrier with the highest priority for access is first moved to Scan. Because other carriers are attempting to move to Scan, carriers that are placed in the Suspend state may be quickly forced to the Pending state by the approach of another carrier head to Scan.
3. The spurs will continue searching for carriers until the spur appears to be clear for 6 seconds.
4. After all carriers found at power-up are disposed of, the DRU checks to see if its Destiny list is blank and its purge direction is Gone. If both conditions are true, then the DRU enters the "invisible" state, where the READY and Scan stops are lowered, allowing all material carriers to pass through without stopping in the DRU. If a spur is dedicated to non-handshaking inbound, it must continue to run and service carriers that arrive at the Wait station.
5. The bar code scanner is confirmed to be working.
6. The DRU sends a S1F1 message to the host and each process machine using the CJLK ECID values (where CJLK refers to a communications link) to determine the assumed machine type and SECS ID.
7. The host will reply with a S1F2 message confirming that it is functioning.
8. The equipment will reply with S9F1 unrecognized ID. The DRU will parse the header and determine the correct type and ID for this machine. The DRU will modify its ECID CJLK02 and CJLK04 accordingly.
9. The DRU will check for detectable discrepancies between the PJCJnn port configuration ECIDs and sensed configuration by scanning the sensors for a toggle feedback on its sensors. The PJCJnn ECIDs are modified if required.
10. If the DRU has entries in its Destiny list, it begins normal processing of carriers. If no entries appear in its Destiny list, then it remains in the invisible state until list entries are downloaded by the host.

After power-up, when a carrier enters the DRU, the DRU first checks its Destiny list to identify a task and then checks its Block list to verify that it is a legal task. If no task is initiated, the DRU holds the carrier at Scan and sends an Alarm (S5,F1 alarm code, 65, alarm ID 2) to the host requesting instructions. If the host fails to respond, the DRU continues to hold the carrier at Scan until another carrier contends for Scan (another carrier approaches the bar code scanner). This holding of the carrier is called the Suspend state. When another carrier approaches the Scan station of a DRU in the Suspend state, the DRU must resolve how to dispose of the "Suspend" carrier for which it has no task. To insure that the DRU gives the host a chance to intercede on a real time basis (if the host is available), the DRU enters the Pending state. When the DRU enters the Pending state, it begins counting down a counter. After a fixed time (ECID FXTM02), the carrier will be diverted in the Purge direction (ECID PURDIR).

The following rules are used to determine priority between tasks competing for the mechanisms in the DRU:

1. Carriers on a spur headed towards Scan take priority over carriers headed away from Scan. This is to give carriers exiting a machine and headed for the main line priority in most configurations over carrier which could be entering the machine from the main line.
2. Carriers on a spur that are headed towards Scan have priority decreasing as they get farther away from Scan. This is to ensure that carriers tend to clear a path for other carriers headed in the same direction.
3. Carriers on a spur that are headed away from Scan have priority increasing as they get farther away from Scan. This is to ensure that carriers tend to clear a path for other carriers headed in the same direction.

These rules lead to the following path arbitrations: PRIORITY FROM, TO

| PRIORITY FROM, TO |
|---|
| 1. SCAN, GONE |
| 2. WAIT2, SCAN |
| 3. WAIT4, SCAN |
| 4. WAIT2 roll, SCAN (Shell game) |
| 5. WAIT4 roll, SCAN (Shell game) |
| 6. READY, SCAN |
| 7. PORT1, WAIT |
| 8. PORT2, PORT1 |
| 9. PORTn+1, PORTn |
| 10. PORTn, PORT n+1 |
| 11. PORT1, PORT2 |
| 12. WAIT, PORT1 |
| 13. SCAN, WAIT |

The following is a step-by-step, detailed description of a DRU-to-machine material transfer:

1. The DRU senses that a carrier is entering the domain of the DRU. For purposes of this example, this carrier is called a "new" carrier. Also for purposes of this example, assume that the new carrier is upstream (READY) from the DRU and awaiting access to the DRU intersection (Scan) to be diverted to the spur 2 process machine. Also assume that downstream on the main line (Gone) is the direction towards the next closed conveyor loop (PURDIR), the prescribed path for carriers that cannot be read (NRDDIR) and the path used to send carriers through rotate station (ROTDIR).
2. The DRU clears all carriers through that are in the DRU domain and have higher priority than the new carrier. In this case, that includes carriers that are returning to the main line.

3. The DRU determines that the new carrier is the next carrier to be placed under the bar code scanner.
4. The DRU raises appropriate stops to ensure that carriers can only approach from the selected direction. In this case, the DRU raises stops WAIT2A and WAIT4A (if they are not already up) leading to the intersection to prevent any other carrier from entering the DRU from the spurs.
5. The DRU positions the scan-lift transfer mechanism to accept the new carrier. In this case, the scan-lift transfer mechanism is placed in its middle position to prevent the incoming carrier from passing straight through the DRU.
6. The DRU releases the new carrier to Scan. In this case, the DRU drops the upstream (Ready) stop, allowing the upstream carrier to move to the Scan position in front of the bar code scanner, and then raises it again after the carrier clears the Ready sensor for five de-bounce time intervals of 0.02 seconds each, to prevent other carriers from interfacing with the scan-lift transfer operation.
7. The DRU turns on the bar code scanner, which communicates to the DRU both the identification and the orientation of the new carrier currently at Scan.
8. The DRU decides which task to enable for the material set contained in the carrier based on the information it knows. This information consists of: carrier bar code including orientation field;

source where the carrier entered the DRU (in this case Ready);

BIS contained by the carrier (in this case not known);

ECID PURDIR the purge direction (in this case towards Gone);

ECID NRDDIR the no read direction (in this case towards Gone);

ECID ROTDIR the rotate direction (in this case towards Gone); and the contents of the DRU Destiny list as they apply to specificity. When a carrier identifies two entries, specificity rules are used to identify which entry to use. Items that are not known for the search key will only match a null or a wild card character in the searched list.

9. The DRU tries to identify a task for the carrier by searching the DRU Destiny list for an entry that matches the search key composed of known information about the carrier.
10. If the most specific match entry is found on the Destiny list to match in all fields except the orientation field of the bar code, the ECID ROTDIR (rotate direction) action is used. When the ROTDIR action is used, an Alarm is sent S5F1, ALCD 65, ALID 13 ALTX (Destiny list orientation mismatch) to let the host know of its apparent error. These errors typically are caused by human intervention. The amber warning beacon is turned on continuously until the rotational action to correctly orient the carrier is completed. ROTDIR actions are reported to the History list.
11. All tasks are qualified by making sure they are not on the DRU Block list before they are considered valid. If a carrier is in the wrong orientation for the most specific list entry, and the entry is also "blocked", the ROTDIR action is taken rather than placing the carrier in the Suspend state.
12. If there is a single match for this carrier entered on the Destiny list, the entry identifies the task the DRU is to associate with this carrier. If there is more than one match, the match with the highest specificity is used. Carriers that fail to identify a task from the Destiny list are considered an error.
13. If the carrier does not match a Destiny list entry, an Alarm is sent to the host (>S5,F1 alarm code 70 ID 13 ALTX BC xxxxxxxxxxxxxxxx from nn Not on list) and the carrier enters the Suspend state.
14. The Suspend state is a hold condition for the DRU. This state is used to suspend activities and to wait for the host to edit the DRU Destiny list and resolve the problem. Any time a carrier enters the Suspend state, the carrier is moved to the Scan position. Each time the DRU Destiny list is edited, a search is made. If a task for the carrier is identified, the carrier leaves the Suspend state and the task is executed. While in the Suspend state, the DRU blinks its amber warning beacon at a rate of 1 Hz. As stated above, the carrier automatically leaves the Suspend state if a second carrier approaches the scanner from any direction, thereby causing a conflict, forcing the DRU to make a decision. The task for the carrier then enters the Pending state.
15. While in the Suspend state or the Pending state, edit by the host of the Destiny list causes the DRU to make another read of the carrier bar code, along with another attempt to identify a task and solve the problem. Each failure to find a task causes an alarm (>S5,F1 alarm code 70 ID 13 ALTX BC xxxxxxxxxxxxxxxx from nn Not on list).
16. When the DRU enters the Pending state, the purge timer is started (ECID FXTM02). While in the Pending state, the DRU blinks its amber warning beacon at the rate of 2 Hz.
17. The amber warning beacon is off unless the DRU is in some abnormal state such as the Suspend state, Pending state, sending a carrier to ROTDIR or in one of the two Offline states. Each of these conditions can be detected by its distinctive pulse pattern on the DRU warning beacon.
18. If no task is found by the time the purge timer runs out, one last attempt to read the bar code and identify a task is made. If this attempt fails, the carrier is sent in the purge direction (ECID PURDIR) and an entry is made on the History list. If the BIS is unknown then "UNKNOWN BIS ID" is entered in the BIS field.
19. If a task has been identified from an entry in the Destiny list, a search is made of the Block list to see if the task is legal. If the task appears on the Block list, an alarm is sent to the host and the carrier for which the task was to be used enters the Suspend state. When blocking a task, the DRU sends an Alarm (>S5,F1 alarm code 70 id 16 ALTX Blocked entry number XXXX) The Suspend state is always handled as detailed above.
20. If entry is not on the Block list, then the task is valid, and the DRU attempts to begin execution of the task.
21. If the task is not obstructed by another carrier, such as a carrier at WAIT, the task is carried out.
22. If the path is blocked, the DRU will use wait stations in a judicious manner (the Shell Game), if possible, so as to allow the blocked path to clear without blocking access to the bar code reader. If a wait station cannot be used, the carrier will enter the Suspend state.

23. The Shell Game is named after the classic "rock under the three walnut shells" trick. The Shell Game is performed between the Scan location, and the two Wait stations W2 and W4. Because the Wait stations are always filled and emptied under DRU control, the DRU can tell if the Wait stations can be used to temporarily roll the carrier out of the Scan location and process other carriers that will most likely pass through the DRU.

24. All carriers destined for a process machine are first diverted clear of the main path to a carrier Wait station along the spur leading to the process machine.

25. The DRU raises a carrier stop to restrict the carrier to the Wait station instead of proceeding down the spur to the port.

26. The DRU records the time (Task Initiated Time Stamp) into the Wait station (TS1). TS1 will always be the time when the carrier is moved out of the Scan position for the first time (the beginning of the Shell Game, if used).

27. The DRU now has a carrier in the Wait station adjacent to the process machine to which it has been directed to deliver a carrier. As far as the DRU can sense, there are no carriers, or mechanisms preventing the completion of transporting this carrier from the Wait station to the process machine material port. The Shell Game is finished if an exiting carrier forced it to be used.

28. Unsolicited carriers appearing at any given stations for a DRU are called "beamed in" and are dealt with in the following manner. If the DRU discovers a beamed in carrier at one of its ports, the DRU will issue the host an Alarm (S5FI ALID 65 ALCD 16 ALTX BIP BC xxxxxxxxxxxxxxx port nn). The DRU will then process this carrier as follows: The DRU moves the carrier in question to the Scan position and tries to identify a task. If a task is identified with a match for material port source, the task is executed. If no task is found, the DRU sends S5F1 (ALCD 70 ALID 13 ALTX BC xxxxxxxxxxxxxx Not on any list) to the host and enters the Suspend state.

29. The DRU sends the process machine a S4,F1 (ready to send material) message which tells the process machine the port number where the material transfer is to happen and the BIS ID, i.e. what the carrier contains.

30. If the process machine cannot find the BIS ID together with the port number on any list, then it sends the host a S5F1 (ALCD 70 ALID 17 ALTX BIS xxxxxxxxxxxxxxx PTN nn not on list). The process machine will issue a S4F69 (Unsuccessful transfer handshake complete) to the DRU. S5F69 signifies lack of host provided coordination between the DRU's Destiny list and the process machine's Destiny list and is used only when no entry is found for the BIS (MID) and port number requested by S4F1. This S4F69 ends the transaction unsuccessfully. When the DRU receives a S4F69, it places the carrier in question into the Suspend state. The DRU informs the host of the lack of coordination by sending S5F1 (ALCD 65 ALID 14 ALTX Uncompleted task entry xxxxxxxxxxxxxxxx). The DRU will not attempt to re-initiate this transaction until the host edits the DRU's Destiny lists causing the DRU to recover from the Suspend state.

31. If the process machine determines that its internally controlled automated material handling is not functioning, then the process machine sends the host S5F1 (ALCD 65 ALID 1 ALTX Offline and unable to accept material). The process machine will issue S1F69 (Going off line) to the DRU. Upon receiving the S1F69 message, the DRU responds to the host by sending S5F1 (ALCD 7 ALID 1 ALTX adjacent equipment type XX id XX down). The DRU will hold the carrier at the carrier Wait station and will not attempt to send any more material until the process machine issues S1F1 (are you there request) signifying that the process machine has its material transfer mechanisms working again. The DRU will then proceed to restart the standard S4F1 sequence.

32. The process machine determines the status of the requested port. If the process machine determines that the input buffer corresponding to the port number requested in S4F1 is full and unable to receive any more material, then the process machine must send the host S5F1 (ALCD 65 ALID 10 ALTX M/C buffer full error port nn). The process machine sends S5F63 (Not ready to receive) to the DRU. The DRU holds the carrier at the wait station and enters the Poll state. In the Poll state, the DRU continues to attempt material transfer by issuing a S4F1 at a frequency of ECID RQFQS4 (request frequency S4), until the process machine replies with S4F3 (send material) or S4F69 (unsuccessful transfer handshake complete) or after polling ECID S4F1CT number of times. Note that the process machine will issue alarm S5F1 ALCD 65 ALID 10 ALTX (M/C buffer full error port nn) to the host only once per BID in the above polling sequence. The DRU will continue to poll S4F1 up to ECID S4F1CT number of times and then enter the Suspend state. If the requested port is not available due to normal processing of material, then the process machine issues the DRU S4F63 (Not ready to receive) placing the DRU task into the Poll state. Normal processing assumes that the process machine will not release empty carriers back to the main line, but instead re-use the carrier to return processed material to the main line. It is the process machine's responsibility to determine when it is to release empty carriers blocking material ports and to request empty carriers to transfer material out of the process machine's domain. The process machine may be forced to release an empty carrier to allow new material into a port if it does not have a normal amount of material in the internal process machine's buffers, such as when the process machine is initially filling its buffers. Process machines use an ECID to define the minimum total number of carrier loads (which may differ from machine to machine) that must be in the process machine's internal cycle for steady state processing. When fewer BISs than required are present in the DRU, attempts to handshake more material into a port blocked by an empty carrier, the process machine must handshake out the empty carrier to allow the new carrier to enter. The process machine may have to request an empty carrier when the host issues a remote command send telling the process machine to empty its material work area and material ports. The process machine requests an empty carrier by issuing a S5F1 (ALCD 65 ALID 5 ALTX M/C port XX Ready to send, no carrier ZZ) to the host. The host may choose to respond to a request for an empty carrier by routing a full carrier to the process machine, which the process machine can empty and reload with processed material. In most cases, the host will keep a steady stream of material scheduled to a process machine, making a request for an empty carrier necessary only when emptying a process machine for a mechanical reconfiguration by a technician.

33. If the requested port is undefined or the PTN and BIS ID do not appear together on the process machine's Destiny list, then the process machine will issue S5F1 (ALCD 70 ALID 17 ALTX BIS xxxxxxxxxxxxxxxx PTN nn not on list) to the host.

34. If the PTN and BIS ID are on the process machine's Destiny list together, then the process machine will issue a S4F3 (send material) to the DRU and the process machine will start timers on its Material Transfer Mechanism.

35. Upon receipt of a S4F3 (send material) message, the DRU starts its material transfer timer (MTM) and drops the Wait stop, moving the carrier along the spur toward the process machines material port.

36. If the DRU begins to send the carrier toward its material port, but the MTM timer exceeds t1, then the DRU will reset its MTM timer to zero and send the process machine S4F65 (Still in sender). The DRU will only issue S4F65 once per BIS ID in any particular handshake sequence. If the DRU experiences a second t1 timeout, then the DRU will issue the process machine a S4F7 (Not ready to send). A handshake sequence is defined as a task that starts with S4F1 and ends with SW4F5, S4F7, S4F63, S4F69, S1F69, or a t3 timeout. Upon receiving S4F65, the process machine resets its MTM timer to zero. The DRU will also send the host an S5F1 (ALCD 65 ALID 6 ALTX t1 time to leave sender error port nn). The above assumes that the carrier is now proceeding to the destined port, but is behind schedule according to the MT timer.

37. If the DRU finds the carrier jammed in its material port, it sends the process machine S4F7 (not ready to send) and sends the host S5F1 (ALCD 65 ALID 11 ALTX port nn still in sender state).

38. If the process machine receives the carrier at its material port, but the MTM timer exceeds t2 (time to receive), then the process machine resets its MTM timer to t2 and issues the DRU a S4F67 (Still in receiver). The process machine will only issue S4F67 once per BIS ID in any particular handshake sequence. If the second t2 timeout occurs then the process machine will issue the DRU at S4F63 (Not ready to receive). Upon receiving the S4F67, the DRU resets its MTM timer to t2. The process machine will also send the host S5F1 (ALCD 65 ALID 7 ALTX t2 time to receive error port nn). The above assumes that the carrier has been sensed by the process machine, as arrived at the prescribed destination, but is behind schedule according to the MTM timer.

39. If the process machine starts its material transfer mechanism and the carrier does not clear the process machine's carrier sensor, it sends the Host Computer S5F1 (ALCD 65 ALID 9 ALTX port nn stuck in receiver state). The process machine will issue a S4F5 (handshake complete) to the DRU, because there is nothing the DRU can do about it.

40. If the process machine does not issue the DRU a S4F5 (handshake complete with t3, then the DRU will send the host S5F1 ALCD 65 ALID 8 ALTX (t3 time to complete send error port nn). If the DRU cannot sense the carrier, the DRU assumes the carrier was "beamed out". If the DRU can sense the carrier, the DRU assumes the carrier was "beamed in".

41. The process machine sends the DRU S4F5 (handshake complete) message after the process machine senses the arrival of the carrier and has the carrier trapped so that changes in the direction of the spur do not affect the process machine's ability to locate the carrier.

42. The DRU records this time and places a task over time stamp (TOTS) on its History list.

43. When the machine unloads the carrier, the machine places a time into machine's input buffer (TS3) on its History lists.

44. The process machine activates its material transfer mechanism, which places the incoming material BIS into the input material buffer.

45. The DRU sends up the History list using an S127,F131 message.

46. The host acknowledges the History update using an S127,F132 message.

When an unsolicited carrier appears at a process machine sensor without a proper S4 handshake, it is called "beamed in" and is dealt with in the following manner. If the process machine discovers a "beamed in" carrier at one of its ports, the process machine will issue the host a S5F1 (ALID 65 ALCD 16 ALTX BIP PC %%%%%%%%%%%%%% port nn) using wild card characters for the bar code data. The process machine will then process this carrier by issuing the DRU a S4F1 with MID set to "UNKNOWN BIS ID".

The following is a step-by-step, detailed description of a machine-to-DRU material transfer:

1. If the process machine has a processed BIS of material available, but no empty carrier, then the process machine will send the host a S5F1 (ALCD 65 ALID 5 ALTX M/C port XX Ready to Send, no carrier xx). The process machine will continue processing (if possible) while it waits for incoming carriers.

2. If the process machine has a processed BIS of material available and an empty carrier is under process machine control, (normal steady state processing) the process machine transfers the material onto the empty carrier and informs the host that the material has been finished by sending a History list upload using S127,F131.

3. When a process machine has an empty carrier, the process machine sends the DRU a S4F1 ready to send material) message, which tells the DRU from which port of the process machine and the BIS ID of the material that is ready to be sent to the DRU. This process machine port number is equivalent to a spur relative port number for the DRU.

4. If the DRU determines that its conveyors or mechanisms are not functioning, or if it is off line, then the DRU sends the host a S5F1 (ALCD 65 ALID 1 ALTX Offline and unable to accept material).

The DRU will issue a S1F69 (Going Off Line) to the process machine. Upon receiving the S1F69 message, the process machine responds to the host by sending a S5F1 ALCD 7 ALID 1 ALTX (adjacent equipment type XX ID XX down). The process machine will not attempt to send any more material until the DRU issues a S1F1 (Are you there request) signifying that the DRU has got its material transfer mechanisms working again. The process machine will then proceed to restart the standard S4F1 sequence.

5. The DRU determines the status of the requested port. If the DRU cannot immediately accept the process machine's carrier due to normal processing (i.e., the material transfer system is still okay), then the DRU sends a S4F63 (Not ready to receive) to the process machine. The process machine holds the carrier at the output port and enters the Poll state. In the Poll state, the process machine continues to attempt material transfer by issuing a S4F1 at a frequency of ECID RQFQS4 (request frequency S4) until the DRU replies with S4F3 (send material) or S4F69 (unsuccessful transfer handshake complete) or after polling ECID S4F1CT number of times. If the process machine polls S4F1CT and still has not successfully sent out the carrier, (ALCD 65 ALID 15 ALTX Incomplete task on BIS xxxxxxxxxxxxxxxx).

6. If the DRU can't find a task for the BIS ID using a wild card field for the bar code (because it doesn't know the bar code yet), then it sends the host a S5F1 ALCD 70 ALID 17 ALTX (BIS xxxxxxxxxxxxxxxx PTN nn not on list). If the DRU can identify a task for the BIS ID in the S4F1 message, the DRU will issue a S4F3 (send material) to the process machine and the DRU will start a timer on its Material Transfer Mechanism. If no task can be identified, then the DRU will issue the process machine a S4F69 (Unsuccessful transfer handshake complete). Upon receiving the S4F69 stream, the process machine responds to the host by sending a S5F1 ALCD 65 ALID 15 ALTX (Incomplete task on BIS xxxxxxxxxxxxxxxx).

7. Upon receipt of a S4F3 (send material) message, the process machine starts its material transfer timer (MTM) and allows the carrier to be moved by the spur into the DRU Wait station where the DRU senses it.

8. If the process machine sends the carrier out of its material port but the MTM timer exceeds t1, then the process machine will set its MTM timer to zero and send the DRU S4F65 (Still in sender). The process machine will only issue S4F65 once per BIS ID in any particular handshake sequence.

9. If the process machine experiences a second t1 timeout, then it will issue the DRu a S4F7 (Not ready to send) message to terminate the material transfer transaction. A handshake sequence is defined as a task that starts with S4F1 and ends with S4F5, S4F7, S4F63, S4F69, S1F69, or a t2 timeout. Upon receiving S4F65, the DRU resets its MTM timer to zero. The process machine will also send the host S5F1 (ALCD 65 ALID 6 ALTX t1 time to leave sender error port nn). The above assumes that the carrier is proceeding to the destined port, but is behind schedule according to the MTM timer.

10. If the process machine finds the carrier jammed in its material port (carrier fails to leave sensor), it sends the DRU S4F7 (not ready to send) and sends the host S5F1 (ALCD 65 ALID 96 ALTX nn port blocked).

11. If the DRU receives the carrier at its wait station, but the MTM timer exceeds t2 (time to receive), then the DRU sets its MTM timer to t2 and issues the process machine a S4F67 (Still in receiver). If the DRU experiences a second t2 timeout, the DRU will issue the process machine a S4F63 (Not ready to receive) message to terminate the material transfer transaction. The DRU will only issue S4F67 once per BIS ID in any particular handshake sequence. Upon receiving the S4F67, the process machine resets its MTM timer to t2. The DRU will also send the host S5FI ALCD 65 ALID 7 ALTX (t2 time to receive error port nn). The above assumes that the carrier has been sensed by the DRU as arrived at the prescribed destination, but is behind schedule according to the MTM timer.

12. The DRU sends the process machine S4F4 (handshake complete) message, after the DRU senses the arrival of the carrier and has the carrier located properly.

13. If the DRU does not issue the process machine a S4F5 (handshake complete) within t3, then the process machine will send the host S5FI ALCD 65 ALID 8 ALTX (t3 time to complete send error port nn).

14. The DRU records the time of this transaction by placing a task initiated time stamp (TS7) onto its History list.

15. The DRU then holds upstream material from entering the Scan intersection.

16. The carrier is moved to the Scan intersection.

17. The bar code is read and associated to the BIS as given to the DRU by the process machine in the stream 4 handshake.

18. The DRU searches its list for a task.

19. The task is carried out by the DRU.

20. In normal processing, the source (the process machine port) will correspond with an entry in the Destiny list which has wildcards in BIS and bar code fields.

21. The DRU records this time for entry in the History list (TS8).

22. The DRU sends up the History list using an S127,F131 message.

23. The host acknowledges the History list update using an S127,F132 message.

Lists that use wildcards (Block, and Destiny), use to match on a character by character basis. The use of wildcards makes is possible that two entries with different contents can cause a match. In the case of multiple entries matching, the most specific entry stands. To establish the most specific entry, the following rules must be applied:

1. The entries which cause a match to an entry in descending order of specificity are:
BIS;
Bar code;
source.

The characters in the BIS, Bar code, and Source fields are evaluated to form a specificity score in the following manner:

Three fields are concatenated in the order given above to form a 34 character field;

A 34 bit binary number is formed by assigning the value 0 for wild-card characters, and the value 1 for non wild-card characters;

The entry with the highest numeric value thus obtained (the specificity score) is considered to be the most specific;

If there is a tie, the entry with the lowest binary valued action code is used;

If there is still a tie, the entry with the earliest time-stamp of when the entry was enabled in the list is considered to be more specific. This assumes actions should will be loaded by the host in the order they are expected to be executed by the DRU;

If there is still a tie, the entry with the earliest auto cancel time-stamp is considered to be more specific. This assumes actions should will be auto canceled in the order they are expected to be executed by the DRU.

2. If the BIS associated with a carrier is not known, such as when a carrier enters the DRU from the Ready position, the BIS is assumed to be all wild-cards for comparison purposes. Search key field with wildcards do not contribute to specificity.
3. If the BIS associated with the carrier (and thereby the search key) contains all wildcards, it does not contribute to specificity of the match.
4. Only the Destiny and Block list use wildcards. The only legal fields are:

BIS;
Bar code;
Source; and
Destination

The general architecture of the software executed by the DRU 16 is shown in FIG. 7. The DRU Executive module provides time management for the tasks to be executed by the DRU's internal central processing unit. The DRU SECS Controller module converts all communications to and from the DRU 16 to the appropriate format. The DRU Carrier Controller module manages material carrier movement on the conveyor network within the DRU's domain. The DRU List Manager module, given identifying information relating to a particular material carrier 56, either loads to or retrieves from the DRU list structure, as will be described in greater detail below. The Active Tasks Table retains a list of all DRU communications pending completion. The Active Tasks function retains the identity of all tasks being performed within the DRU's domain.

FIGS. 8A-8D combine to provide a detailed schematic block diagram of the DRUs software architecture.

As stated above, the DRU defines a system of hardware and software the basic mission of which is to recognize the arrival of material carriers within its domain and to dispose of those carriers in accordance with a particular set of rules. The instructions for disposing of material carriers are specified in four lists (Destiny, History, Log, and Block). These lists are supplied by the host computer system via a SECS protocol interface, which is described in detail below. The DRU also uses the SECS interface to inform the host of its actions in disposing of carriers, to handshake carriers into and out of process machines, and to perform various other peripheral functions.

Viewed in this way, the SECS Protocol Controller Module of the DRU software program is a servant to the primary function of the Carrier Control module, which is also described in detail below. Therefore, it is tempting to build the overall DRU software program by placing the Carrier Controller module at the top of the program hierarchy and having this module call all the other modules as utility procedures. Unfortunately, for this simple approach, each of three SECS interfaces must respond to asynchronous, interrupt-driven stimuli. For example, the host SECS interface receives List updates (among many other things) at times totally unrelated to material carrier handling; furthermore, the DRU's two machine SECS interfaces receive requests to handshake material carriers into the DRU at similarly unpredictable times. Therefore, if the DRU program were structured with the SECS Protocol Controller as a procedure called by the Carrier Controller, the SECS Controller would have to be re-entrant to deal with the case where an interrupt-driven event calls the SECS Controller while it is executing a call from the Carrier Controller.

To avoid the complication and portability problems that a re-entrant SECS Controller would pose, the DRU program's large-scale hierarchy places a simple Executive module above both the SECS Controller and the Carrier Controller, as shown in FIG. 6. These two major modules then have equal status in the program structure, despite the Carrier Controller's conceptually higher status.

The Executive module has two functions:
1. It alternately calls the SECS Controller and Carrier Controller modules, which are both implemented as procedures; and
2. It passes data between these two modules, since neither can call the other, but each must exchange data with the other.

A Monitor module provides down-loading capability and primitive de-bugging facilities. An Initialization module performs the required functions at DRU power-up. Both of these modules will also be discussed in detail below.

Since the DRU program is structured as two principal co-equal modules, there are actually two corresponding underlying models. However, the conceptual superiority of the Carrier Controller module over the SECS Controller module is demonstrated by the fact that the Carrier Controller's underlying model is also the model for the DRU as a whole.

From the standpoint of controlling any single material carrier in the material handling system, the basic DRU procedure is as follows:
1. Recognize the arrival of a new carrier in the DRU's domain;
2. Move that carrier to Scan;
3. Read the carrier's bar code;
4. Identify an action for the carrier; and
5. Dispose of the carrier by executing the specified action.

This sequence may be viewed as the trunk of the Carrier Controller's decision tree; anything that happens outside of this procedure happens because of an exception or a fault condition at a particular stage.

Each stage of the basic sequence listed above (except the first) has a definable list of fault conditions with which the Carrier Controller must deal. These fault conditions can, in principle, nest to any depth, but in reality have an actual defined maximum nesting depth.

The underlying model for the Carrier Controller (and therefore for the DRU), then, is a Decision Tree. The first item on the basic list mentioned above creates a Decision Table for the newly recognized material carrier. The remaining four items, and all the decision points that branch from them, are called Decision Tree Cells (or simply Cells).

The essential features of each Cell are (i) a procedure to call and (ii) one or more new Cell locations for the carrier in question according to the result of the procedure call. Since some of the procedures will not be able to return a result immediately (an example is the bar code scanner, which will take many milliseconds to return its result), each cell must also contain (iii) whether an immediate result is expected from the procedure call and, if not, the hang timer value; and (iv) the procedure to call if the hang timer expires.

The DRU must deal with more than one material carrier at a time and, potentially, as many material carriers as there are Stations in the DRU's domain. Therefore the Carrier Controller module maintains a list of active carriers and which Cell characterizes each active carrier's position in the Decision Tree. Other information, such as a Task Initiated Time Stamp, must remain associated with each active carrier. The action of the Carrier Controller is to scan the list of active carriers and call a Decision Tree Cell Procedure with the appropriate parameters for each active carrier.

Two main factors drive the choice for the SECS Controller's underlying model. First, the broad outline of the required processes is similar to that of the Carrier Controller. Second, the SECS Controller can be required to perform as many as five Tasks simultaneously, as illustrated in this example:

1. Receive multi-block message from host computer network.
2. While receiving that message, the DRU interrupts (it is the Master of the link) to send its own multi-block message; but the first task is still pending;
3. Priority message (Alarm) to host interrupts Task #2. Now both Task #1 and Task #2 are pending;
4. Message to/from Machine 2. The only DRU Machine message with a reply is Are You There?/On Line Data;
5. Message to/from Machine 4.

This particular example may not represent the maximum possible number of Tasks simultaneously assigned to the SECS Controller; it is just one obvious sequence of events that will stack up tasks for the SECS Controller.

The SECS Controller's requirement to handle up to five tasks at a time is structurally analogous to the Carrier Controller's requirement to handle up to 15 material carriers at a time. Since the basic decision processes are also similar, it is reasonable to choose a similar underlying model for the SECS Controller.

Although the SECS Controller's underlying model is similar to that of the Carrier Controller in broad outline, the two are very different in detail. From the standpoint of dealing with any single incoming SECS message, the basic procedure for the SECS Controller is:

1. Recognize a new message;
2. Receive the message;
3. Identify Stream and Function (where "stream" is a particular communications category and "Function" is a type of communication within a stream.);
4. Parse the message, if required;
5. When the message is complete, act upon it; and
6. If a reply is required, execute the sequence required for an outgoing message.

An outgoing message requires a similar sequence:
1. Recognize the new message;
2. Determine Stream and Function;
3. Assemble (de-parse) the message, if required;
4. Send the message; and
5. If a reply is required, wait for it, and execute the sequence required for an incoming message.

These two SECS Controller sequences are similar in form to the trunk of the Carrier Controller's Decision Tree and, in fact, are implemented in the SECS Controller's own Master Decision Tree. (As will be explained below, each Stream and Function can have its own simple decision tree to control any complex actions that are unique to that Stream and Function.) As with the Carrier Controller, anything that happens outside of these sequences happens because of an exception or a fault condition. The Cells in the SECS Controller's Master Decision Tree need the same information as the Cells in the Carrier Controller's Decision Tree.

The DRU program includes three principal sets of data structures, each associated with a major program module: the Carrier Controller Tables, the SECS Controller Tables and Buffers, and the Lists. The Carrier Controller Tables include a Decision Tree Table, a Carrier Status Table, a Station Status Table, and a Path Allocation Table. The SECS Controller Tables include a Decision Tree Table, an Active Task Table, and a Descriptor Table. The SECS Controller Buffers include an Outgoing Message Queue, Parsing Buffers, and De-parsing Buffers. The Lists are as described above: the Destiny, Block, History, and Log Lists. Each of these data structures is described in detail below.

The Decision Tree Table is a representation of the Carrier Controller's underlying model. It functions like a linked list of records, but with the ability to express more complex relationships than an ordinary linked list. An ordinary linked list has a linear structure. That is, each item in the list includes a pointer to the next item; if the last item in the list points to the first item, the linear structure becomes circular. The Decision Tree consists of a number of decision points, called Cells. Each Cell includes one or more pointers to the next Cell in the Decision Tree, the next Cell being chosen according to the result returned by a procedure call.

To help make the ideas embodied in the Decision Tree more concrete, part of the Decision Tree is shown in FIG. 8.

As shown in FIG. 8, the Cell Number completely characterizes a material carrier's location in the Decision Tree. The path to the trunk of the Decision Tree is indicated by the number at each level of nesting; and the Cell's level of nesting is implicit in the length of the Cell Number.

Each Cell is formed as a record containing the following information:
1. A vector to the procedure to call;
2. A list of all possible results the procedure can return and the corresponding next Cell Number for each;
3. Whether an immediate result is expected from the procedure, and if not, the hang timer value; and
4. A vector to the procedure to call if the hang timer expires.

The last two items allow for cases, like the Bar Code Scanner, which require many cycles through the polling loop to complete their actions.

The concept of "a vector to a procedure" requires explanation. The Cell's record structure is designed to allow a single Decision Tree Cell Procedure, called with appropriate parameters for each material carrier, to handle all the carriers regardless of their location in the Decision Tree.

There are two requirements for implementing the "vector to a procedure" concept:
1. The vector itself, as stored in the Cell's record, must be a number, preferably an integer, and preferably symbolically defined.
2. There must be a Procedure vector procedure. This procedure is called with the vector as an argument. By applying the vector to a series of case statements, or by a similar mechanism, the procedure selects and calls the target procedure.

The Decision Tree as a whole is implemented as an array of records, where each record is a Decision Tree Cell. Conceptually, the Decision Tree array has as many dimensions as there are levels of nesting. Assuming allowance for six dimensions, and that each dimension is six elements wide, a conceptual space of 6⁶ array elements is made, each of which is a record of about 16 bytes, for a total storage requirement of 746,496 bytes. This is obviously excessive, and there are no assurances that six dimensions represents the deepest level of nesting, or that six elements will suffice for the widest dimension.

Fortunately, most of this conceptual space is unoccupied, i.e., it contains no actual Cells. To make the storage requirements manageable, the Decision Tree is broken into two or three levels of arrays of arrays, allowing the storage allocation to be tailored to the real shape of the Decision Tree. These arrays of arrays are collectively called the Decision Tree Table. The Decision Tree contains about 100 Cells. Assuming 50% efficiency in tailoring the shape of the Decision Tree Table to the required Cells, the total storage requirement is 200 Cells × 16 bytes/Cell = 3200 bytes.

The Carrier Status Table holds all the information required to describe each material carrier in the DRU's domain. It takes the form of an array of fifteen records. The array index specifies the carrier, of which up to fifteen could be present at the same time. Each record contains a list of parameters. In the preferred embodiment, the following items are identified; more can be added if desired:
1. The Cell Number in the Decision Tree;
2. A flag that shows whether the current call of the Decision Tree Cell Procedure is the first call in this Cell. This information is needed for cases where the Cell's decision procedure does not return a result on the first call. In such cases, the Decision Tree Cell Procedure does slightly different things on the first call than it does on all subsequent calls;
3. Timer IDs for four timers that define time-out windows;
4. A place to store the Task Initiated Time Stamp;
5. A place to store the BIS;
6. A place to store the Bar Code;
7. A place to store the Source; and
8. Storage for any other items that must be buffered during carrier handling.

The Station Status Table holds two sets of information about each Station: the Current Status and the Previous Status. The Previous Status as implied, is obtained by copying from the Current Status before a new value is placed in Current Status.

Before describing the Station Status Table, the concept of Station must first be defined. This concept is broader than the physical stations (lower-case 's' implies informal use of the word) and includes so-called "virtual stations". A virtual station is located along a machine spur, but is not hardware defined. As explained below, a DRU may release a carrier from its domain to a virtual station on the spur. The receiving machine will then inform the DRU whether the carrier has arrived at the virtual station.

In summary, the set called Stations includes the following seven objects:
1. The five physical stations; and
2. The two virtual stations.

Figure 9:
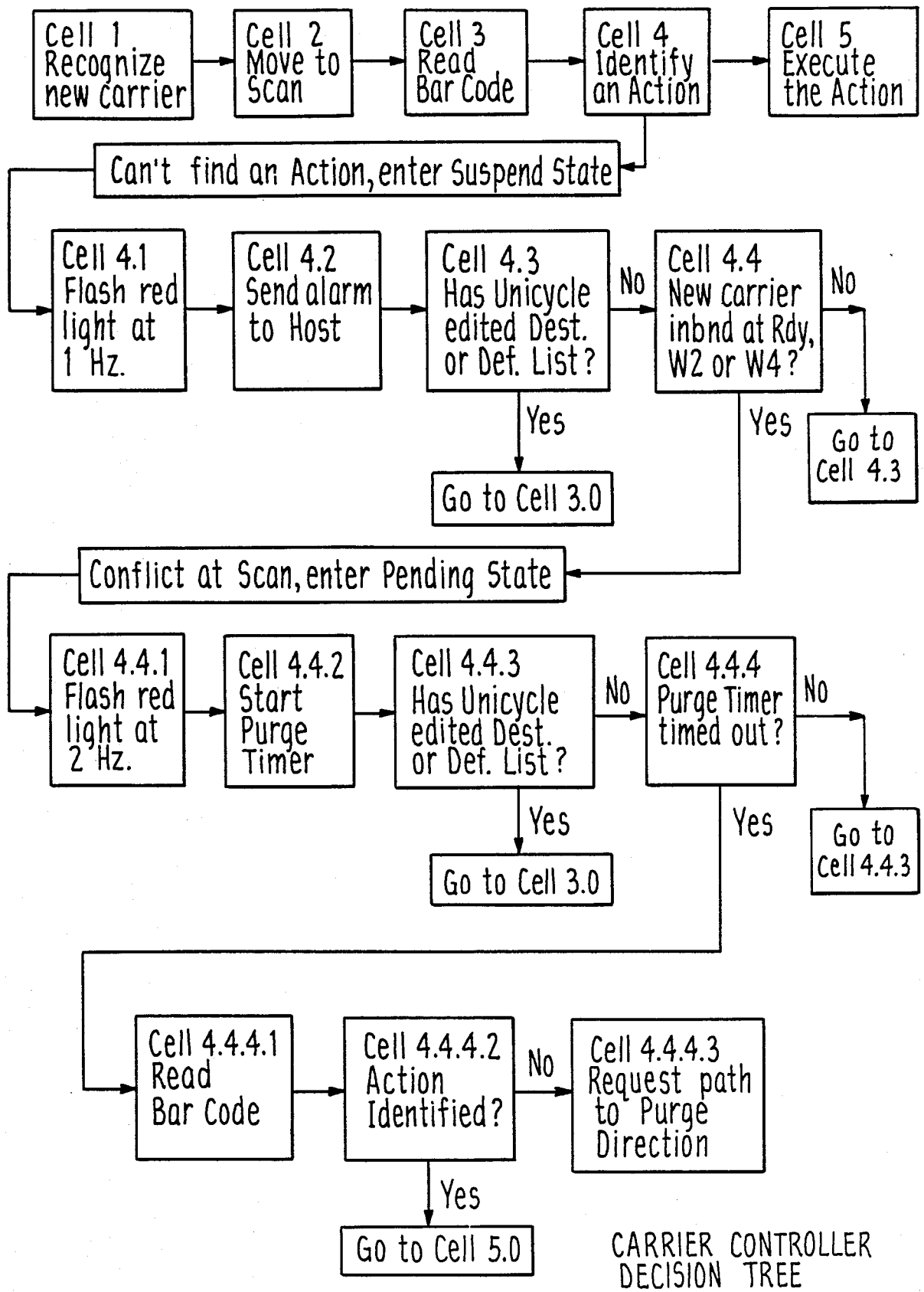
FIG. 9 is a flow sheet illustrating a portion of the Decision Tree of the Carrier Controller module.

The Stations are arranged in a 2-dimensional array, with the origin at Scan, to make the definitions of the fundamental carrier-movement concepts simple and natural. FIG. 9 shows an example of how this might be done. The axes could be inter-changed, or the sign definitions reversed, if either change makes the representation more natural. This representation allows simple rules for defining such concepts as adjacency between two Stations, the direction of a path, and how to execute moves between Stations. These rules will be defined below in the discussion on algorithms.

The Station Status Table is a 3-dimensional array of 1-byte integers. Two of the dimensions are as shown in FIG. 9 (so not all the elements of the array are used). The third dimension encompasses two such 2-dimensional planes: one for the Current Status, and one for the Previous Status, as defined above.

Each Station can take on one of four fundamental Statuses:
1. Empty—no material carrier is in the Station, as indicated by the Station's carrier sensor, and no carrier is on its way into the Station;
2. Becoming Occupied—no carrier is in the Station, but one is on its way into the Station;
3. Occupied—a carrier is in the Station, as indicated by the station's sensor, and the carrier has not started a move out of the Station; or
4. Becoming Empty—a carrier is in the Station, but has started a move out of the Station.

The Becoming Occupied and Becoming Empty Statuses occur during carrier moves between adjacent Stations, and have time windows associated with them. The times are referenced to the start of the physical motion, and are defined by two timers: the Min. Time and the Max. Time. The timing of a motion is OK when the change in Status occurs during the interval while the Min. Time has expired and the Max. Time has not expired. Each motion between adjacent Stations requires two such time windows: one for the source Station, and one for the destination Station. Thus a total of four timers is required during a carrier motion. Scratchpad space for the required timer IDs is provided in the Carrier Status Table record structure described below.

The above implies a total of eight possible Status values. These are encoded in four bits, as shown in the following Table 3:

TABLE 3

| | | | | |
|---|---|---|---|---|
| 0 | 0 | 0 | 0 | Empty |
| 0 | 0 | 0 | 1 | Becoming Occupied, < min. time |
| 0 | 1 | 0 | 1 | Becoming Occupied, time OK |
| 1 | 1 | 0 | 1 | Becoming Occupied, > max. time |
| 0 | 0 | 1 | 1 | Occupied |
| 0 | 0 | 1 | 0 | Becoming Empty, < min. time |
| 0 | 1 | 1 | 0 | Becoming Empty, time OK |

TABLE 3-continued

```
1 1 1 0  Becoming Empty, > max. time
```

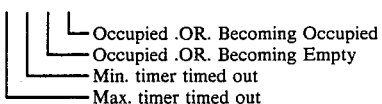

This coding is designed to make the entry and interpretation of the Status Table's data easy for the various procedures that use the table. The algorithms and the procedures are described below.

The Path Allocation Table holds a representation for each carrier of its currently allocated Path, if it has one. A Path is defined as a list of Stations through which the carrier is to move, along with the direction of the move. With this definition, each Station can be allocated to more than one carrier at a time. To give the model complete generality, the Path Allocation Table is implemented as a 2-dimensional array. One dimension defines the carrier, the other defines the Station. Each array element identifies whether a Station is allocated to a carrier, and if so, the direction of the allocation. Thus, each element can take on the values shown in Table 4:

TABLE 4

```
0 0 0 0  Not allocated
0 0 0 1  Allocated Inbound - toward Scan
0 0 1 0  Allocated Outbound - away from Scan
0 1 0 1  Roll2 Inbound - returning from Shell Game
         to Wait 2
0 1 1 0  Roll2 Outbound - Shell Game to Wait 2
1 0 0 1  Roll4 Inbound - returning from Shell Game
         to Wait 4
1 0 1 0  Roll4 Outbound - Shell Game to Wait 4
```

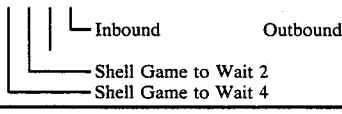

The SECS Controller has two different kinds of data structures: three tables function analogously to the tables used by the Carrier Controller and a set of buffers is required to hold messages and commands. The three SECS Controller Tables include a Master Decision Tree Table, an Active Task Table, and a Stream/Function Descriptor Table. It is defined that a Task encompasses the entire process from recognizing a new message through completing the reply, if a reply is required. This is so the Master Decision Tree Table can encompass a time-out while waiting for a reply. Like the Carrier Controller's Decision Tree, each Cell of the SECS Controller's Master Decision Tree is formed as a record containing the following information:

1. A vector to the procedure to call;
2. A list of all possible results the procedure can return, and the corresponding next Cell Number for each;
3. Whether an immediate result is expected from the procedure and, if not, the hang timer value; and
4. A vector to the procedure to call, or the next Cell Number to go to, if the hang timer expires.

Note that Item 4 above is slightly different from the Carrier Controller's Decision Tree Cell; this is because it is intended that all SECS time-outs will be encompassed in the Master Decision Tree. Like the Carrier Controller's Decision Tree Table, the SECS Controller's Master Decision Tree Table is divided into a number of levels of arrays of arrays to keep memory requirements within practical limits.

The SECS Controller's Active Task Table is analogous in function to the Carrier Controller's Carrier Status Table. It holds the required information on each currently active Task. As noted above, each Task is defined to encompass the initial message plus its reply, if any. It is defined that a message is never interrupted in either direction in mid-block. Up to five Tasks may be active at once (possibly more), so the Active Task Table takes the form of an array of at least five records. Each record holds the following information:

1. The Cell Number in the Master Decision Tree;
2. Stream and Function;
3. The Source or Destination (host or process machine); and
4. Any other information that may be required to characterize a Task's state.

The Stream/Function Descriptor Table allows one Master Decision Tree Procedure to handle the disparate requirements of the various SECS messages that the DRU must handle.

The Stream/Function Descriptor Table takes the form of an array of records, one record for each of the 33 valid Stream/Function combinations. These are placed in a Stream and Function sequence so the program can search the list for valid Stream/Function values.

The first two fields of the record are Stream and Function. The remaining fields characterize the Stream and Function with the following information:

1. Single or Multiple blocks?
2. Reply required?
3. Which sources and directions are valid? (I.e., Host→DRU, DRU→Host, Machine→DRU, DRU→Machine.)
4. A Parsing Model, which has two parts:
   a. The message structure—a program-readable version of the information in the message description's "Structure" section as described above; and
   b. For incoming messages, where the data goes; for outgoing messages, where it comes from.
5. A definition of the action required when the complete message has been received or sent, as applicable. If the complexity of the actual problem warrants it, this may take the form of a subsidiary decision tree.

The SECS Controller Buffers include an Outgoing Message Queue, Parsing Buffers, and De-parsing Buffers. The low-level routines that service each SECS port also require their own input and output buffers.

The Outgoing Message Queue is an array into which requests for outgoing messages are placed. The SECS Controller moves Tasks from this queue into the Active Task Table as soon as there is no conflicting Task already in that Table. "Conflicting Task" is defined as an outgoing message to the same destination. An Alarm is placed in the Active Task Table immediately unless an Alarm is already there.

Entries can be placed into the Outgoing Message Queue either by the SECS Controller itself, or by the Executive carrying an instruction from the Carrier Controller.

The Outgoing Message Queue is built as a statically allocated array of records. Each record contains the following information:
1. Stream and Function;
2. Destination; and
3. Where to find any required information (e.g., ALCD, ALID, ALTX, etc.).

The Outgoing Message Queue must be able to handle up to 15 minutes' worth of messages while the host computer network is down. It is defined that List updates to the host are suppressed while the host is down and the DRU is in the Static Mode. Thus, the only messages that can accumulate during this time are Alarms. Conceivably, about 200 Alarms could occur in that time. However, if Item 3 above is represented as a pointer, each queued message only takes about 8 bytes; thus, allowing this much space in the queue will not use an unacceptable amount of memory.

The Parsing Buffers are used for incoming messages; the De-parsing Buffers are used for outgoing messages.

One set of the buffers just described is required for each SECS port.

When the low-level input routine for a given SECS port has a full block (or equivalently, all of a single-block message or of the last block of a multi-block message), the block is copied to the input said of the Parsing Buffer. The Parser uses the Parsing Model for the current Stream and Function to convert the data to the parsed format in the output side of the Parsing Buffer. This operation is very simple for the process machine SECS ports, since they use only single-block messages. For the host port, where multi-block messages are possible, the input side must have two blocks' worth of storage to accommodate cases where an item's data straddles a block boundary. The Parser must be able to keep track of its place in the message structure between calls, so that it will require a small amount of global storage for this data. The output side of the process machine Parsing Buffers need accommodate only one block, but the output side of the host Parsing Buffer must accommodate the parsed version of the largest possible SECS message, 32K bytes.

For each SECS port, the input side of these buffers contains two blocks, to allow an item to straddle a block boundary. Outgoing data is first placed in the input side, and the De-parser uses the Parsing Model of the current Stream and Function to convert the data to the required message format. The output side of the De-parsing Buffer contains two blocks, so a full block can be copied to the self-draining buffer of the low-level output routine for the SECS port while the other block is being filled.

The contents of each List element are detailed elsewhere. A List element contains seven heterogeneous fields, totalling 62 bytes, and ranging from two to sixteen bytes per field. Each List element is therefore implemented as a record, and the List itself is an array of records.

In addition to the seven fields of the List element proper, an eighth field defines whether the record contains an active member of the List. This field is initially cleared to "inactive" for the entire array. As each element is added to the List, this field is set to "active." When an element is deleted from the List, this field is set to "inactive." This scheme makes it unnecessary to move List elements around as the List changes.

Array space for each List is statically allocated for the maximum allowable size of 200 List elements. Statically defined arrays are used to avoid the complex memory management problems that frequently-edited linked lists impose.

Although the Lists are stored in statically allocated arrays, the arrays are treated rather like FIFO buffers in that new items are added "behind" the newest member of the List, rather than being placed on top of the oldest inactive member. This method can provide the desirable ability to read some of the most recent inactive items in the Lists, as a means of recovering from a disaster. To implement this method, two pointers are kept that are analogous to a FIFO buffer's input and output pointers. These pointers keep track of where to put the next List element (the "head" of the List), and where the oldest currently valid List element is (the "tail" of the List). The head and tail pointers define the range for searches. The head pointer defines where to add new entries. If the head pointer catches up to the tail pointer, new entries are inserted into unused space within the search region. If there is no unused space there, a List overflow occurs.

Specific algorithms will now be defined that use the above-described data structures to accomplish the DRU's mission.

The Carrier Controller algorithms contain a mixture of general rules that derive from the shape of the data structures, rules for moving and detecting material carriers, and broad outlines of two key procedures.

Some simple rules are first provided that derive from the array representation of the Stations:
1. Two stations are defined as "adjacent" if their co-ordinates are equal in one axis and differ by one in the other axis;
2. Since allocated carrier paths always either start or end at Scan, the following rules define the various kinds of Path:
   a. An outbound Path has a non-zero destination co-ordinate in either axis,
   b. An inbound Path has a non-zero source co-ordinate in either axis, and
   c. A Shell Game Path has zero co-ordinates in both source and destination. (The direction of a Shell Game path includes the target Wait station and whether the current move is inbound or outbound.);
3. An inbound Path is constructed by making the carrier's y-axis co-ordinate zero (if it isn't already), then making the carrier's x-axis co-ordinate zero:
4. An outbound Path is constructed by making the carrier's x-axis co-ordinate equal the Destination's, then making the carrier's y-axis co-ordinate equal the Destination's.

The Path Allocation Procedure is called with a request for a path with a given Source, Destination, and Direction. The procedure grants or denies the request, and if the request is granted, enters the allocation status into the Path Allocation Table, in accordance with the following rules:
1. Inbound Path from Ready, Wait2, Wait4, and Gone is always allocated;
2. Inbound Path from any other Station is allocated unless that Station is allocated outbound;
3. A request for an inbound Path from a Station that is allocated outbound can only result from an Illegal Surprise. In this case, the outbound carrier(s) on the previously existing Path(s) is/are stopped, the old Path(s) de-allocated, and new Path(s) to Scan allocated. Next, the request for an inbound Path for the Illegally Surprising carrier is granted, and the carrier(s) in the way is handled by the Shell Game to the extent possible;

4. Outbound Path to any port is allocated unless that spur is allocated inbound. If the spur is allocated inbound, the denial results in a request for the Shell Game to the opposite Wait Station. If the Shell Game request is denied, the carrier is sent to the Purge direction (always Gone for the first deliveries);

5. A Shell Game Path is allocated if the Wait Station is Empty.

When the Carrier Mover Procedure is called by the Decision Tree Poller, it takes the logical Carrier Number as its argument and indexes into the Allocation Table to find the carrier in question. The carrier is assumed to be, or to have just been, at the trailing end of the carrier's allocated Path. Depending on the Status of the assumed location and the next location in the Path, the Carrier Mover Procedure will execute one of the following two processes, or neither of them:

1. If the Station Status Table shows that the assumed location is Empty and the next location in the allocated Path is occupied, the assumed location is de-allocated for the carrier in question (i.e., the Carrier Mover cleans up after itself). If the next location is the end of the allocated Path, the move is complete and the entire Path is de-allocated.
—or —.

2. If the Station Status Table shows that the assumed location is occupied and the next location in the allocated Path is empty, the next motion is initiated if it passes the following criteria:
   a. For destination Stations other than Scan, the move is made only if the destination Station is not allocated in the opposite direction.
   b. When the destination Station is Scan, if more than one motion into Scan is pending, the conflict is resolved by the following priorities:
      1. Wait 2
      2. Wait 4
      3. Wait 2 roll (only if Wait 4 not allocated inbound)
      4. Wait 4 roll (only if Wait 2 not allocated inbound)
      5. Ready
      6. Gone The following steps are required to start a carrier motion between Stations:

1. Set the current location in the Station Status Table to Becoming Empty;
2. Set the next location for the allocated Path in the Station Status Table to Becoming Occupied;
3. Call the Parallel I/O (PIO) Module with argument(s) as required to define the outputs that must be energized or de-energized to start the motion;
4. Start two timers which define the permitted time window for the source Station to reach the Empty state; and
5. Start two timers which define the permitted time window for the target Station to reach the Occupied state.

The Surprise Detector is the DRU's tool for detecting the arrival and departure of material carriers into and out of its domain. In this sense, the definition of a Surprise is broader than "beamed-in" carriers and "beamed-out" carriers, though it includes both.

A Positive Surprise represents the arrival of a carrier that the DRU didn't previously have in its Station Status Table. This can result from a beamed-in carrier, but more commonly will result from the arrival of a carrier at Ready, or from the granting of handshaking permission to a process machine to send a carrier to the DRU. In this last case, the entry/exit Station is set to Occupied when the handshaking permission is granted.

A Positive Surprise that results from a beamed-in carrier of any sort is an Illegal Surprise. Carriers which generate an illegal Surprise are taken to Scan where the bar code is read and reported to the host.

A Negative Surprise can result from a beamed-out carrier, but can also result from a carrier becoming stuck between Stations (the two are indistinguishable).

The Surprise Detector uses the Station Status Table shown in Table 3 above. This table, which shows the definition of the bits in each table entry, is repeated below in Table 5, with the addition of an arbitrary definition of most-significant bit (MSB) and least significant bit (LSB) for use by the rules given afterward.

TABLE 5

| MSB | | | LSB | |
|---|---|---|---|---|
| 0 | 0 | 0 | 0 | Empty |
| 0 | 0 | 0 | 1 | Becoming Occupied, < min. time |
| 0 | 1 | 0 | 1 | Becoming Occupied, time OK |
| 1 | 1 | 0 | 1 | Becoming Occupied, > max. time |
| 0 | 0 | 1 | 1 | Occupied |
| 0 | 0 | 1 | 0 | Becoming Empty, < min. time |
| 0 | 1 | 1 | 0 | Becoming Empty, time OK |
| 1 | 1 | 1 | 0 | Becoming Empty, > max. time |

- Occupied .OR. Becoming Occupied
- Occupied .OR. Becoming Empty
- Min. timer timed out
- Max. timer timed out Recall that this table contains both the current and the previous Status of each Station. In the normal course of events, the previous Status for any Station should be as in the line above the current Status (looping around at the ends). In the sequence above, the two LSBs are, in effect, a Gray Code, i.e., only one of the bits changes at a time. Thus, one source for Surprises is finding that the two LSBs are different in more than one bit. The Surprise is positive if the LSB is set, negative if the LSB is clear.

The time-outs provide the other source for Surprises: A Positive Surprise results if the current Status is Occupied and the Occupied Min. Timer is not timed out. Similarly, a Negative Surprise results if the current Status is Empty and the Empty Min. Timer is not timed out.

Within the Carrier Controller module, there is a polling procedure the basic function of which is to poll each active carrier and attempt to advance each carrier along the Decision Tree. In broad outline, the process requires the following steps:

1. Use the PIO Module to update the Station Status Table;
2. Use the Surprise Detector to make a Carrier Status Table entry for any newly arrived carriers; and
3. For each active carrier in the Carrier Status Table, call the Decision Tree Cell Procedure to advance the carrier in the tree if the step defined in the current Cell has been completed.

The Decision Tree Cell Procedure is called once per carrier polling loop for each active carrier. It takes as its parameters the carrier number, the carrier's location in the Decision Tree (as described by the Step Number), and any other information it might need. In broad outline, the procedure performs the following operations:
1. Use the Cell Number to index into the proper Cell in the Decision Tree;
2. Is this the first time in this Cell for this carrier?
    - Yes, call the specified procedure.
      Is an immediate result expected?
        - No, clear First Time flag and exit.
        - Yes, set Cell Number per result and set First Time flag, or flag illegal result.
    - No, has a result been generated yet?
        - Yes, set Cell Number per result and set First Time flag, or flag illegal result.
        - No, has hang timer expired?
        - No, exit.
        - Yes, flag it and exit.

In addition, exception handling is required for the case where the procedure specified in the Decision Tree Cell returns an illegal result (i.e., a result with no next Cell specified) and for the case where the hang timer expires while waiting for the procedure to return a result.

The SECS Controller algorithms contain rules for defining the start and end of a Task, rules for checking the validity of a message's Stream and Function, and broad outlines of two key procedures.

A SECS Controller Task is defined to encompass the entire exchange of message and reply, if there is a reply. The initial message always has an odd-numbered Function. A Task can be initiated either by receiving a message at a SECS port or by having a valid Task in the Outgoing Message Queue.

More formally, a SECS Controller Task starts when either
1. The first block of an incoming message with an odd-numbered Function is received; or
2. A Task in the Outgoing Message Queue meets the following requirements:
    a. No task already in the Active Task Table has the same Destination, or the same Source and a reply is required, unless the candidate Task is an Alarm.
    b. If the candidate Task is an Alarm, it qualifies immediately, unless an Alarm is already in the Active Task Table.

A Task which meets these rules is placed in the Active Task Table.

A Task ends and is removed from the Active Task Table when any of the following occurs:
1. An incoming message is aborted;
2. If an incoming message requires no reply, when the complete message has been received and acknowledged;
3. If an incoming message requires a reply, when the reply has been sent and acknowledged;
4. If an outgoing message requires no reply, when the message has been sent and acknowledged; or
5. If an outgoing message requires a reply, when the complete reply has been received and acknowledged.

The following validity checks apply to incoming messages when they first appear at a SECS port and to candidate Tasks from the Outgoing Message Queue (incoming messages are checked when the first block is received; outgoing messages can be checked before they are placed on the Outgoing Message Queue):
1. If the Function is odd-numbered, the Stream and Function are checked against any Tasks already in process. If a match is found, there is an error. If no match is found, the Stream and Function are checked for validity against the Stream/Function Descriptor Table. If the Stream and Function are not in the Descriptor Table, there is an error. When all these tests are passed, a new Task is created.
2. If the Function is even-numbered, the Stream and Function are checked against any Tasks already in process. If the Stream and Function define a valid reply to an existing task, the message is associated with that Task. If no match is found for an existing Task, or if the Stream and Function belong to a task for which no reply should exist, or if the Stream and function are not in the Descriptor Table, there is an error.

The primary task of the SECS Controller module is to poll the Active Task Table and execute the Master Decision Tree for each active Task. Before polling the Active Task Table, it first adds any valid new Tasks in the Outgoing Message Queue or that arise from incoming messages at the SECS ports.

In broad outline, the process requires the following steps:
1. Check the three SECS Serial I/0 (SIO) input handlers and the Outgoing Message Queue for new Tasks per the criteria described above;
2. Check the three SECS SIO output handlers. For each, if the self-draining buffer is empty and there is anything in the De[parsing Buffer, copy the next block to send to the self-draining buffer; and
3. For each active Task in the Active Task Table, call the Master Decision Tree Cell Procedure to advance the Task in the tree if the step defined in the current Cell has been completed.

For the first deliveries, only one incoming message can exist at a time for each SECS port. Only two outgoing messages can exist at a time (a long message and an Alarm that takes priority while that message is being transmitted). In principle, an arbitrary number of messages can be stacked on the Outgoing Message Queue. Except for Alarms, the outgoing messages are serviced in the order in which they are placed on the queue.

A Task is removed from the Active Task Table only when it is complete, as defined above In case of an abort during an outgoing message, the Cell Number in the Master Decision Tree is set to 1 (the first Cell), to make the Task start over. In the case of an abort received during an incoming message, the Task is cancelled.

The Master Decision Tree Cell Procedure has the same function as the Carrier Controller's Decision Tree Cell Procedure. It is called once per SECS Controller polling loop for each active Task. It takes as parameters the Task number, that Task's location in the Master Decision Tree (as described by the Step Number), and any other information it might need. In broad outline, the procedure performs the following operations:
1. Use the Step Number to index into the proper Cell in the Decision Tree.
2. Is this the first time in this Cell for this Task?
    - Yes, call the specified procedure.
      Is an immediate result expected?
        - No, clear First Time flag and exit.
        - Yes, set Step Number per result and set First Time flag, or flag illegal result.

- No, do we have a result yet?
  - Yes, set Step #per result and set First Time flag, or flag illegal result.
  - No, has hang timer expired?
    - No, exit.
    - Yes, flag it and exit.

In addition, exception handling is required for the case where the procedure specified in the Master Decision Tree Cell returns an illegal result (i.e., a result with no next Step specified) and for the case where the hang timer expires while waiting for the procedure to return a result. The SECS time-outs can be implemented with hang timers for the appropriate Cells.

Those DRU program modules that use the data structures and the algorithms described above will now be described. This section will also discuss how the DRU program modules relate to each other in the overall structure of the program.

Referring to FIG. 6, which shows the general structure of the DRU program, two aspects of the program's structure deserve special mention:

1. The Executive module is, in fact, just a polling routine, with the additional responsibility for managing the exchange of data between the Carrier Controller and the SECS Controller. In basic outline, the Executive calls the two Controllers alternately, carrying messages between them as required.
2. Five major program modules are listed as Utilities. These modules are each implemented as a procedure which can be called from anywhere in either Controller module. To avoid requiring any of these modules to be re-entrant, it is defined that a Utility must complete its required action in a single call to the module's procedure and in a short enough time so that the overall scan time (through all the nested levels of polling) will not be significantly affected by the Utility's execution time. The Clock/Calendar, Timer, PIO, and SIO modules already fit this mold. The List Manager is forced into this mold by defining that any call to it passes, returns, or searches for only one List element. Operations such as writing or reading many List elements are managed loops constructed in the SECS Controller's Decision Trees for the specific Stream/Functions that require them.

The Monitor module is required only in DRU embodiments without disk drives; the function of the Monitor is performed by the DRU operating system in disk-based units.

In PROM-based DRUs (i.e., ones without disk drives), the Monitor performs two basic functions: it functions as a simple debugger, and it includes a down-loading facility.

The broad outline of the Monitor's program is as follows:

1. It gets control on power-up, and checks whether the memory space where the application program is stored contains PROM. If it does, the Monitor assumes that the PROM contains a valid program and transfers control to it. If the application memory space contains RAM, the Monitor enters a loop where it waits for input from either the Terminal SIO port or the host SECS port. Input from the Terminal controls a primitive debugger, which provides facilities for reading and writing memory, controlling output ports, and executing at a specified address.
2. If the input from the host SECS port is an object file in the appropriate format, targeted to addresses in the application program's memory space, that object file is loaded into memory. Other input from the Host SECS port is reported as an error to the Terminal SIO port.
3. When down-loading is complete, the Monitor reports that fact to the Terminal port, and waits for a debugger command. This might be a memory dump to verify the load, or a command to execute the down-loaded program.

Initialization is the start of the internal DRU program, whether in disk-based or PROM-based systems. The Initialization module is executed when the DRU is first powered up and when the hardware Reset switch is pressed. It clears all Tables and Lists and sets all stored parameters to their default values. The Initialization routine is also responsible for setting up the PIO, SIO, Timer, and Clock/Calendar hardware as may be required.

In basic outline, the Executive module consists of a forever loop which contains just two procedure calls, one to the Carrier Controller and one to the SECS Controller. In addition, the Executive's forever loop may contain some subsidiary functions. Two such functions are as follows:

1. If required, the Executive will make a dummy call to the Timer module on each loop. This might be required if the Timer procedure must be called at some minimum frequency to guarantee that it never loses track of its count.
2. If required, the Executive will handle power-down sequencing. Whether this is required will depend on how much of the system is battery-backed. The Executive will only be able to deal with this problem if the DRU CPU and memory are battery-backed.

Part of the Executive's principal function is to carry data between the Carrier Controller and the SECS Controller. This function allows each module to pass data and instructions to the other as if by a procedure call, without requiring either module actually to call the other. This function is implemented using a parameter-passing record, which must be declared globally in order to be visible and accessible to both major modules.

Each time the Executive calls one of the Controller modules, the parameter-passing record contains an op-code and any associated data (which may be thought of as operands) for the called Controller module from the other Controller module. The op-code may be a no-op (do nothing) in the event that a Controller module has no instructions or data to pass to the other Controller module.

Each Controller module is responsible for performing the following operations on the parameter-passing record each time it is called:

1. 1 Act on the op-code and operand(s) if possible; if they cannot be acted upon immediately, save them in an appropriate place.
2. Before returning control to the Executive, put the next op-code/operand for the other Controller module into the parameter-passing record. If there is none, the Controller module must set the op-code to no-op.

It is possible for one execution of a Controller module to produce more than one op-code/operand for the other Controller module. To avoid requiring more than one parameter-passing record, it is defined that outgoing op-code/operands are buffered as necessary in a queue and passed up to the Executive one item at a time.

The basic structure of the parameter-passing record might look like this:

```
TYPE
PARM PASSING = record
    opcode: integer; {0 = no-op, > =1 TBD}
    tarqet: integer; {0 = Carrier Contr., 1 = SECS
        Contr.}
    error: integer; {0 = OK, 1 = input queue
overflow, others TBD}
        <operand1 thru operand n>: details TBD
```

In summary, the only responsibility the Executive has with respect to the parameter-passing record is to detect errors passed to it from the Controller modules and to report any errors to the DRU's terminal port. Once the Executive has detected and reported an error, it must clear the op-code to no-op, so the next Controller module called won't be confused.

The Carrier Controller is implemented as a procedure that is called by the Executive. The required functions were outlined above; they are now defined to one more level of detail.

Each time the Carrier Controller procedure is called, it carries out the following five operations, each of which should itself be implemented as a procedure call:
1. Save any op-code/operand data from the parameter-passing record;
2. Update the Station Status Table using the PIO module and, if applicable, any new information from the parameter-passing record;
3. Call the Tree Creator Procedure to activate any newly recognized carriers in the Carrier Status Table;
4. Scan the Carrier Status Table and call the Decision Tree Cell Procedure for each active carrier; and
5. Place any required op-code/operand data for the SECS Controller in the parameter-passing record, or a no-op if there is none.

Figure 10:
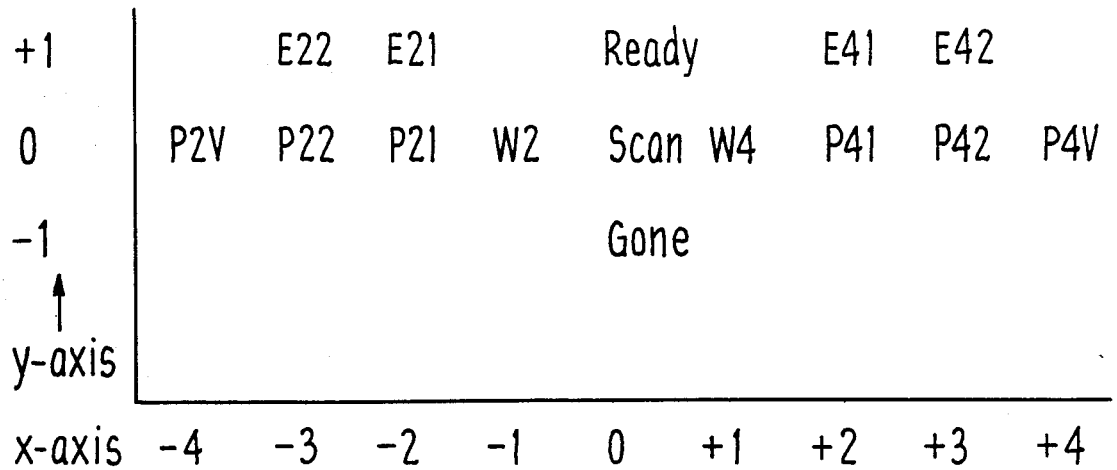
FIG. 10 is a table illustrating an example of a possible Station 2-dimensional arrangement.

These five procedures, and their subordinate procedures, are shown graphically in FIG. 10. The functions of these procedures are defined below.

The Save Parameters procedure uses the op-code to determine the destination and possibly the format of the associated operands. The following list provides an idea of the kind of information the SECS Controller will pass to the Carrier Controller:
1. A machine requests permission to handshake a carrier into the DRU.
2. A machine grants, denies temporarily, or denies forever permission to handshake a carrier out of the DRU.
3. The host has edited the Destiny List (this information is used in the Suspend and Pending States).
4. The host has issued a "vaporize pallet" command.

From the viewpoint of this procedure, each op-code specifies the destination of the associated operand(s). The outline of this procedure is as follows:
1. Read the op-code.
 - If it is no-op, return.
2. Copy the operand(s) to the target address(es) implied by the op-code.

Depending on the shape and uniformity of the operands for all the op-codes, the operation of copying operands could be either hardcoded or table-driven.

The Update Station Status Table procedure maintains the Station Status Table using three sources:
1. The PIO module is a utility procedure that provides the current status of all sensors. The Station Status Table Update Procedure takes the raw PIO module inputs and creates any virtual sensors (like at Scan) that may be required. This procedure is also responsible for implementing sensor "debouncing."
2. Inputs from the SECS Controller, as saved by the Save Parameters procedure, can cause the imaginary entry/exit Stations to become Occupied or Empty.
3. The Carrier Status Table is scanned for carrier motion timers. The status of each such timer is determined by calling the Timer module and the Station Status Table is updated accordingly. (This operation is placed here, rather than made part of the Decision Tree Cell Procedure so that the Surprise Detector (part of the Tree Creator) will have unambiguous information about timeouts that can cause the creation of a Decision Tree.)

The Tree Creator is a procedure that recognizes and acts upon the existence of a new material carrier in the DRU's domain. The Tree Creator performs the following steps:
1. Call the Surprise Detector. This is a procedure which implements the rules described above;
2. If there is a Positive Surprise, find the first available Carrier Number in the Carrier Status Table, and set the Decision Tree Cell Number for that carrier to Cell #1 (the first Cell in the Decision Tree). An unused Carrier Number is defined by having its Cell Number set to zero; and
3. If there is a Negative Surprise, place a command in the SECS Controller command queue to inform the host of a Still in Sender. (But the Negative Surprise itself does not cause the carrier to be vaporized. That happens only when the task specified by the Decision Tree is completed, or on receipt of a "vaporize carrier" command from the host.)

The Poll Carrier Status Table procedure scans the Carrier Status Table. For each carrier with a non-zero Decision Tree Cell Number, the Decision Tree Cell Procedure is called with the parameters listed above.

The Decision Tree Cell Procedure uses any subordinate procedures that it needs. Some of these are discussed below with respect to Utilities: the List Manager, the PIO module, the SIO module, the Timer, and the Clock/Calendar. The following three important procedures are used only by the Decision Tree Cell Procedure: Path Manager, Carrier Mover, and Bar Code Scanner.

The Path Manager Procedure controls the allocation of Paths to material carriers. It receives requests from the Decision Tree Cell Procedure to allocate a Path to a carrier. It takes as arguments the two end points of the Path and the Direction (the concept of "direction" is formally defined above). These arguments are processed according to the algorithm described above to produce one of two results: either the request is granted or it is denied. If the request is granted, the Path Manager updates the Path Allocation Table to show the new Path. In either case, the result (granted or denied) is returned to the calling routine.

The Carrier Mover Procedure executes the physical material carrier moves. It receives requests from the Decision Tree Cell Procedure to move particular carriers. It receives the Carrier Number as an argument, and executes the algorithm described above using the Carrier Status Table and the Station Status Table to determine whether the requested move can be made. If the requested move can be made, the procedure uses the ECIDs supplied by the host that define the mechanical configuration of the DRU, and any other information required, to set the hardware output signals to the levels required to execute the move. The procedure returns to the calling routine a result specifying whether the requested move was initiated or not.

The Carrier Mover is responsible for implementing all timing restrictions required by the node's mechanical hardware. These include:

1. Enforcing dead time between motor reversals, and
2. Enforcing non-overlap between up and down lift mechanism commands.

This responsibility will often make it impossible for the Carrier Mover to execute an instruction in one call to its procedure. In such cases, the Carrier Mover must begin by starting any required timers and return with a "not finished" result. The Decision Tree Cell Procedure must stall at this point until the Carrier Mover's time-outs are complete and the procedure returns with a "finished" result.

The bar code scanner interfaces through an SIO port the low-level drivers of which are similar to, and possibly identical with, the SECS drivers. The low-level driver requirements are similar: the transmit buffer must be self-draining and the receive buffer must be filled by an interrupt-driven routine. When everything works correctly, the bar code scanner will never send characters to the SIO receiver unless it has been commanded to do so. Thus, the receive buffer can be polled when a message from the bar code scanner is expended and otherwise ignored. The Bar Code Scanner Procedure receives as an argument from the Decision Tree Cell Procedure a command, e.g., to start a read operation. The Bar Code Scanner Procedure responds by filling the self-draining transmit buffer with the required characters, then returning to the calling routine with a "not finished" result.

The Decision Tree Cell Procedure uses the "not finished" result to stall at the current Cell, so each polling loop will call the Bar Code Scanner Procedure again (until a "finished" result is returned or the hang timer times out). During these repeated calls, waiting for a result, the procedure must keep track of what it is doing. To do this, it must use global variables.

When the low-level receive routine indicates that the message has been received, the Bar Code Scanner Procedure returns one of several "finished" results to the calling routine. These might include: Good read, No read, Alarm.

Based on this result, the Decision Tree must take the appropriate action. This will usually consist of copying the bar code to the appropriate place in the Carrier Status Table. Whatever the action, the low-level receive buffer will serve as the source for the data.

The Pass Parameters to SECS Controller Procedure empties the SECS Controller command queue, one item at a time. As the rest of the Carrier Controller is executed, other procedures within it may have placed one or more commands (i.e., op-code/operand sets) destined for the parameter-passing record in the command queue. On the average, there will usually be nothing in the queue, but in principle there can be some maximum number of items and the queue must be sized to handle that maximum. As the final action of each call from the Executive to the Carrier Controller, this procedure pulls a command off the queue and copies it to the parameter-passing record. If the queue is empty, this procedure must clear the op-code to no-op.

Like the Carrier Controller, the SECS Controller is implemented as a procedure that is called by the Executive. The required functions were outlined above; they are now defined to one more level of detail.

Each time the SECS Controller procedure is called, it carries out the following five operations, each of which should itself be implemented as a procedure call:

1. Save an op-code/operand data from the parameter-passing record;
2. Check the three SECS SIO input buffers and the Outgoing Message Queue for new Tasks;
3. Check the three SECS SIO output buffers. For each, if the self-draining buffer is empty and there is anything in the de-parsing buffer, copy the next block to send to the self-draining buffer;
4. Scan the Active Task Table and call the Master Decision Tree Cell Procedure for each active Task; and
5. Place any required op-code/operand data for the Carrier Controller in the parameter-passing record, or a no-op if there is none.

Figure 11:
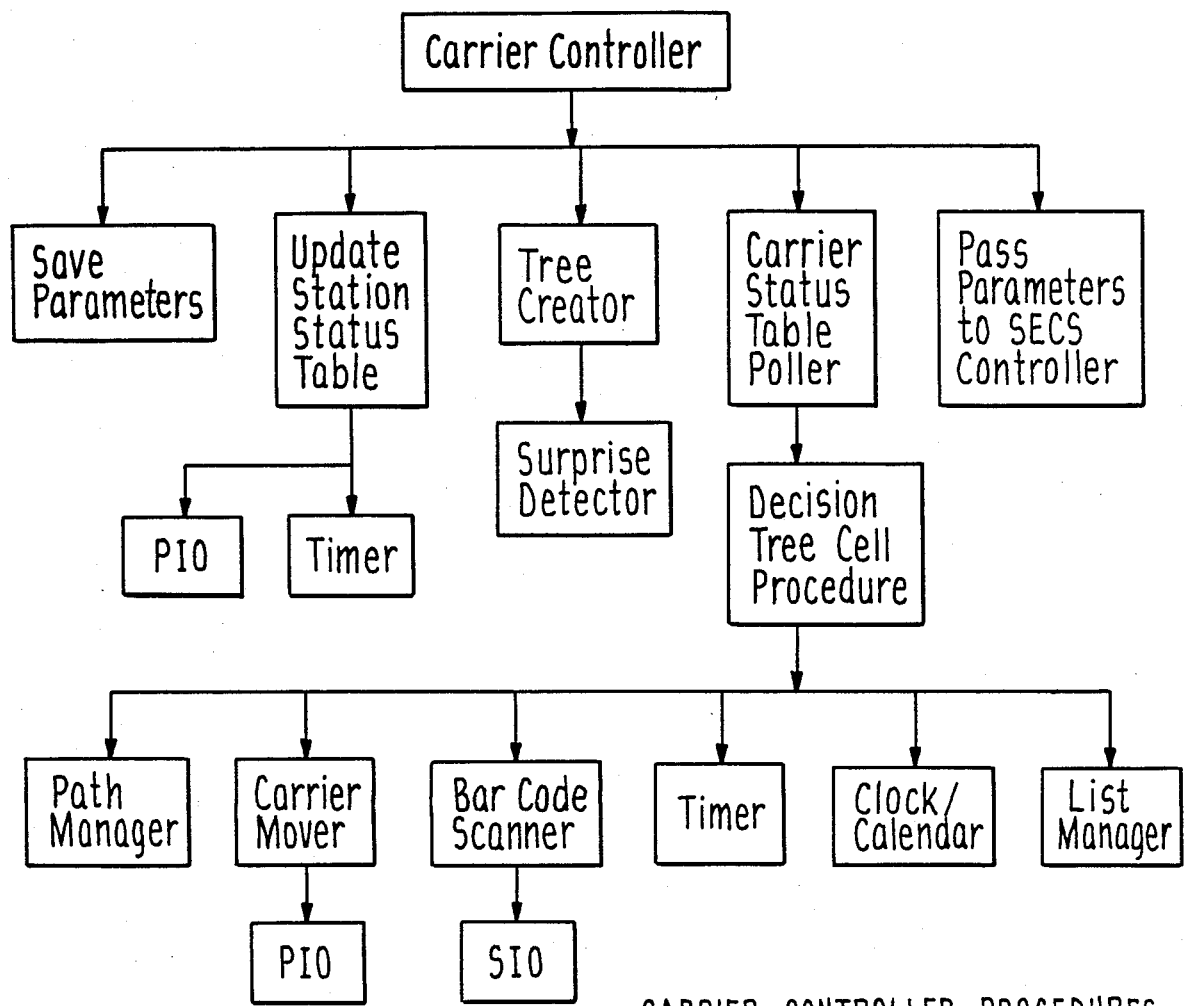
FIG. 11 is a block diagram illustrating the procedures of the Carrier Controller module.
Figure 12:
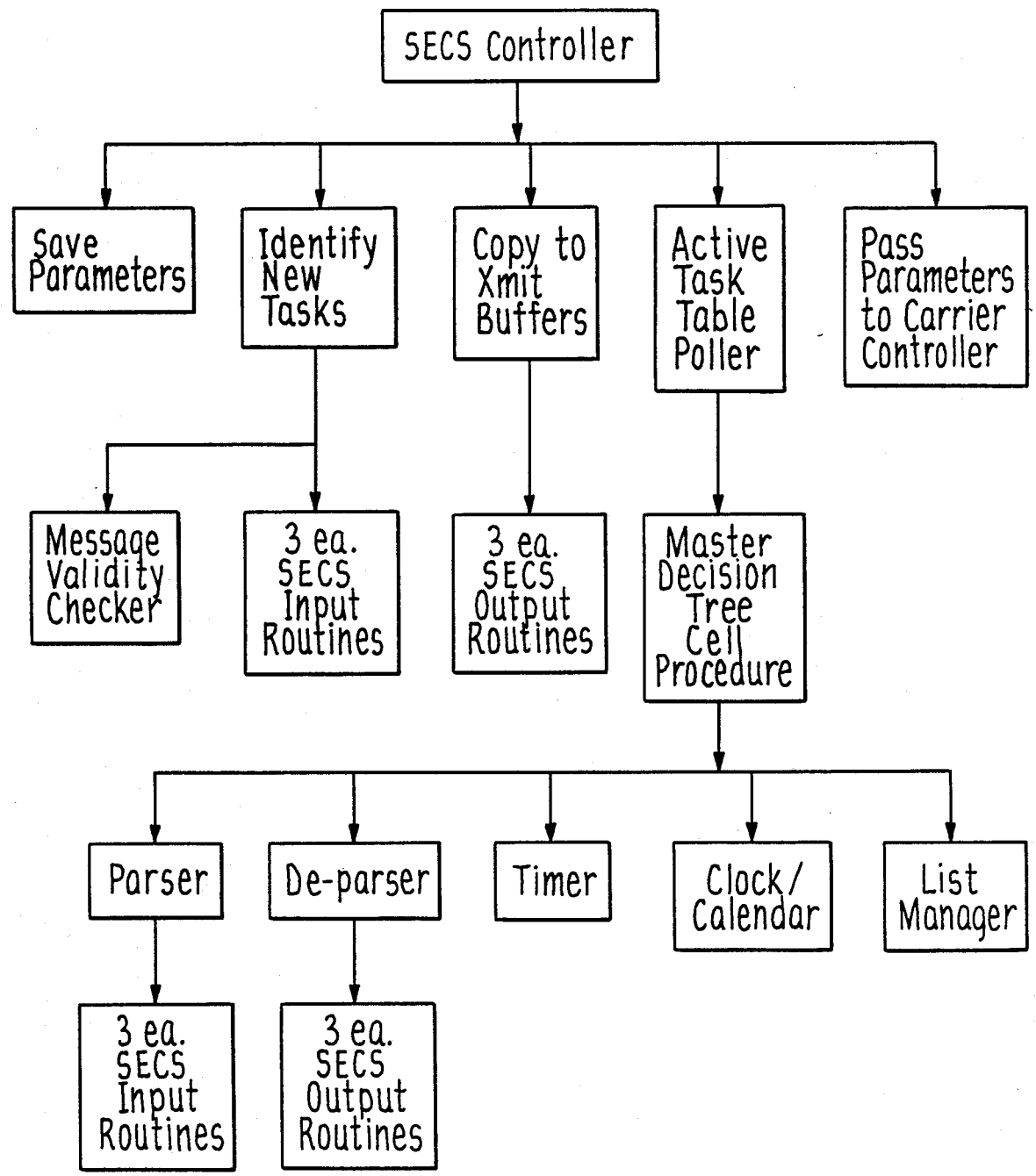
FIG. 12 is a block diagram illustrating the procedures of the SECS Controller.

These five procedures, and their subordinate procedures, are shown graphically in FIG. 11.

The Save Parameters procedure uses the op-code to determine the destination and possibly the format of the associated operands. The following list provides an idea of the kind of information the Carrier Controller will pass to the SECS Controller:

1. Request handshaking permission from a machine as specified in an Action Code.
2. Send an Alarm (for any of a number of reasons).
3. An Action is complete, send History List (or Pass List) to the host.

The Identify New Tasks procedure uses the algorithm defined above to identify new tasks and place them in the Active Task Table. When the SECS input routine returns the first block of a message, the Message Validity Checker is called to use the above-stated rules for validating the new message. If the message is not valid, the Message Validity Checker places the appropriate error message to the host on the Outgoing Message Queue.

The Copy to Transmit Buffer procedure checks each self-draining transmit buffer. If the buffer is empty, it checks the corresponding De-parsing Buffer, and copies the next block of data (if it exists) to the transmit buffer.

The Active Task Table Poller procedure is central to the SECS Controller. For each Task in the Active Task Table, the Active Task Table Poller calls the Master Decision Tree Cell Procedure wit the parameters listed above. The Master Decision Tree Cell Procedure uses any subordinate procedures it needs. Two important procedures, Parser and De-parser, are used only by the Master Decision Tree Cell Procedure and are described in detail below.

The Parser is responsible for converting the SECS-formatted input data stream into a format the rest of the DRU program can use. By using a Parsing Model for each Stream/Function and separate Parsing Buffers for each SECS channel, a single Parser procedure can handle any message for all three channels. In addition to the Parsing Buffers, the Parser requires a small amount of global storage (separate for each SECS channel) to keep track of what it is doing between calls.

Since items in the SECS messages can overlap block boundaries, the input side of the Parsing Buffer contains two blocks. Each time a complete block is received, it is copied into the block of the Parsing Buffer's input side that contains the oldest data (so the current block and the previous block are always available to the Parser). A call to the Parser causes any residual data from the previous block, plus as much data in the current block as represents complete items, to be converted to a program-readable format in the output side of the Parsing Buffer.

The "program-readable format" will be defined in detail in the discussion of the SECS Controller module below. The principle behind this format is to define a single, uniform coding for the data that can encompass all the possibilities in the Streams and Functions which must be implemented. This allows the Decision Tree Cell Procedures to manipulate the data as required, without knowing anything about the data itself.

The Parsing Model is described above. In effect, the Parsing Model defines the procedure for converting data from SECS format to the program-readable format. It also defines where to put the data. Single-block messages with simple targets, like ECID storage locations, need not use the output side of the Parsing Buffer at all; the Parser can place the output data directly in the target location.

Multi-block messages, e.g. List down-loads, require enough storage in the output side of the host's Parsing Buffer to contain the re-formatted version of the maximum size SECS message of 32K bytes. In such cases, the Parser accumulates the entire message in its output buffer, but the Decision Tree does not act on the message until it has been completely received without an Abort. When the message has been completely received, the Decision Tree loops through the Parser's output buffer one element at time, calling the List Manager as a utility to deal with that one element, until the buffer is empty.

In cases like the one just described, about two seconds will be required to empty a full Parsing Buffer output side, during which time about eight blocks of the next message might be received. Since the buffer is emptied much faster than it is filled, any sequence of messages can be accommodated by using a FIFO buffer for the host's Parsing Buffer output side. The only unusual requirement is that is must be possible to reset the buffer's input pointer to the start of a message in case that message is Aborted.

The De-parser procedure is the inverse of the Parser. It converts data from the program-readable format described above to the SECS message format, using the Parsing Model as a template. The De-parser receives data to format one item at a time and places the SECS-formatted data in the De-parsing Buffer's output side. Like the Parser, the De-parser requires a small amount of global storage (separate for each SECS channel) to keep track of what it is doing between calls.

The only multi-block message the DRU must transmit is List up-loads to the host. To keep this situation simple, it is defined that each message only sends one List, i.e., if more than one List must be up-loaded, each List uses a separate message.

The Utilities are procedures that are called from more than one place in the program. To qualify as a Utility, a procedure must return its result in a single call, and the execution time for that call may not have a significant effect on the total program scan time. This means that the execution time may not be more than about 2–5 milliseconds.

The following procedures have been identified as Utilities: List Manager, Timer, Clock/Calendar, PIO and SIO.

The List Manager manages all five Lists: Destiny, History, Log and Block. The operations required of the List Manager are as follows:
1. Add an item;
2. Delete an item;
3. Read an item;
4. Find a match;
5. Hierarchical search through Destiny, Default, and Block Lists Each of these operations, plus any others that may be required, is defined to the List Manager by an op-code supplied by the calling routine. The List Manager takes the following information as arguments:
1. The op-code, as described above;
2. The List to operate upon; and
3. Either the List's item number or the actual List element's data to operate upon.

The List Manager returns a three-part result:
1. Whether the item was found in the List;
2. If so, the List in which it was found, and
3. The List item itself.

The calling routine can interpret this result in accordance with the op-code it sent to the List Manager:
1. Add an item—If the item was already in the specified List, it is not added again. The "found" result indicates an error to the calling routine. A "not found" result indicates that the new item was added to the specified List.
2. Delete an item—If the item was not found, the "not found" result indicates an error to the calling routine. A "found" result indicates that the item was deleted.
3. Read an item—This function is used to up-load a List to the host. The SECS Controller calls the List Manager with item numbers, starting from zero and incrementing with each call. The List Manager returns the specified item, indexing from the List's "tail" pointer through the valid items. If the index passes the "head" pointer, the procedure returns a "not found" result to indicate to the calling routine that the item number is out of range. If the item number is valid, the item is returned to the calling routine with a "found" result.
4. Find a match—This function searches a specified List for a match with a candidate List item (the search key), which may contain wild cards. The calling routine receives either a "not found" result or a "found" result and the item as found in the List (which may contain fewer wild cards than the search key).
5. Hierarchical search—This function searches the Destiny and Block Lists hierarchically. This function must search for multiple matches, but will return only the match that is the most "specific". The calling routine receives either a "not found" result or a "found" result, the item as found in the List, and in which List it was found.

The Timer may be implemented as a single procedure, or as a separate procedure for each of the following functions: Start Timer, Cancel Timer, and Check Timer.

The Start Timer function takes as an argument a 4-byte integer time-out value in milliseconds. It returns a Timer Number for the calling routine to use as a handle during future exchanges with the Timer module.

The Cancel Timer function takes the Timer Number as an argument and cancels (or de-allocates) the specified timer. This function must be called when the action the timer was timing is complete (assuming the timer hasn't timed out), so the Timer Table doesn't fill up with unused timers.

The Check Timer function takes the Timer Number as an argument and returns a result specifying whether the timer has timed out. If the timer has timed out, it is cancelled.

One of the 24-bit counters in the PIO is clocked as a down-counter every 128 microseconds. When a timer routine is called, it reads the value in this counter. The routine detects underflow in the 24-bit counter by comparing the current and previous values of its MSB; if the 24-bit counter has under-flowed, an extension byte is decremented. This scheme requires the counter to be read no less often than once every 17.89 minutes, and will time intervals as long as 76.35 hours. The Timer Table is a statically allocated 2-column integer array. The row number is the Timer Number. Column 0 defines whether the Timer is active or not; Column 1 contains (for active Timers) the 4-byte timer count values that correspond to the time-out time. The number of rows (Timers) must be large enough to handle the maximum possible number of simultaneous Timers.

When a request is received to start a Timer, the Timer Table is searched for the first inactive Timer. The row number of this Timer becomes the Timer Number returned to the calling routine. To start the Timer, the counter is read to determine the current count value. The time-out value provided as an argument was expressed in milliseconds, so this must be converted to 128-microsecond ticks. The tick count is subtracted from the current counter value and stored in the Timer Table as the time-out value. The Active bit is then set to define the timer as allocated.

To cancel a Timer, the Active bit for the specified Timer is set to Inactive.

To check a Timer (i.e., to determine whether it has timed out), the counter is read and the current counter value compared with the time-out value in the Timer Table. If the current value is less than the table value, the Timer has timed out. (To take care of cases where the timer counter has rolled through zero count, this result must be exclusive-ORed with the exclusive-OR of the MSBs of the current timer and the time-out values.)

The Clock/Calendar is a procedure that either sets or returns the current date and time. It takes as arguments an op-code that defines whether to set or return the date and time and, if the op-code is to set time, the new values for date and time in the form of six integers. It returns the current date and time in the same form.

The PIO module performs low-level hardware I/O. It contains three procedures. Two of these read input ports and write output ports using an Opto-22 PAMUX-II system. The third procedure accesses two input ports that are connected to DIP switches. The switches set the equipment model number and ID for S1,F1.

The SIO module contains the hardware interface routines for all the serial ports. At a minimum, there must be an input and an output procedure for each of the three SECS ports and for the bar code scanner port. The remaining port, the console terminal, may be implementable with only the existing OS-9 I/O drivers.

The basic requirements for the SECS and the bar code scanner ports are:
Input routines
1. They must be interrupt-driven to fill "convenient" 257-byte buffers.
2. The Pascal program must be able to determine how many bytes are in the input buffers and read them without interfering with the interrupt-driven entry.

Output routines
1. The output buffers must be self-draining. That is, transmission of each byte must generate an interrupt that causes the next byte to be sent until the buffer is empty. Transmission of a block is started by forcing the first byte to be sent.
2. The Pascal program must be able to determine whether the self-draining output buffer is empty without interfering with the transmission process.

A common Header Module contains all compiler directives, global declarations and system constants. Global declarations are managed very carefully, since every program module can change global variables as well as read them. Globals include all the basic data structures, a scratch-pad that various procedures require to keep track of what they are doing between calls, and changeable system constants like ECID values. The Header Module also includes all hard-coded equates, to make them easy to find and change.

The Initialization module performs the essential "setting-up" of various programs and data prior to full operation of the DRU software. It initializes global variables as required, sends initialization commands to various modules, and oversees the entire initialization process until normal operation is achieved.

Because of its simplicity, the Initialization module contains no significant data structures or algorithms.

The Initialization module is divided into two different operations: Non-Polled and Polled operations. In general, when the DRU system is reset, the Non-Polled operations are performed in order, without any deviations. Then the Polled operations are performed. Initialization is concluded when all the modules that support these operations return the proper status to the Polled Initialization module and normal system operation has begun.

Non-Polled operations are initiated by a System Reset or Power-up operation. Its operations differ based on the state of the Reset Mode switch. In general, the following operations are performed in sequence:
1. Read all "system constants" out of ROM and store them as variables so they can be changed "on the fly", group them together into a special part of the Global Declarations section, and declare them at absolute addresses to facilitate their being changed by the user;
2. Initialize the Timer module;
3. Initialize the PIO module;
4. Read the Reset Mode switch to see if it is Cold or Warm boot;
5. Initialize all global variables as shown in Table 6 below;
6. Initialize the PJCJ ECIDs to their default values (Cold Boot only) as shown in Table 7 below;
7. Initialize all remaining non-polled "utility" modules in the following order (Cold and Warm Boot):

(i) SIO (ii) List Manager - "LstMgr(INT, Reset, All, LMELMT, LMRsults);". All the parameters are either enumurated types or global variables declared by the List Manager. (To do a Warm Boot replace "All" with "None" and keep all else the same.);

8. Clear the Command Queue (both Cold and Warm boots);
9. Send the Command Queue a New Poll command;
10. Put the appropriate Boot command (Cold or Warm) into the Command Queue for the Polled Initialization module; and
11. Return, which lets the program start the Executive.

TABLE 6

| Varname | Owner | Type | Init To | Description |
|---|---|---|---|---|
| INITSTATE | IN | Byte | 0 | Controls Init__Pol operation. |
| UTClkRun | UT | Integer | 0 | Flags clock/calendar state. |
| INCCINIT | IN | Boolean | Flase | See VAR discussion |
| INSCINIT | IN | Boolean | False | See VAR discussion |
| UTShowMsg | EX | Enum Type | DONTSHOW | Starts debugger NOT showing command queue traffic. |
| MMAlarmN | UT | Integer | 0 | Used in UTAlmBld procedure. |
| UTAllowd | UT | Longint | 0 | Used in Executive module to set max. allowed time per module before flagging it as cpu-hogging. |
| UTShoPol | UT | Boolean | False | Used in Exec. module to determine if display name of each module as it's polled. |
| UTNoPas | EX | Byte | 0 | Controls need for paswword used to invoke the debugger. |

TABLE 7

| ECIDs That Require Initialization. | | | |
|---|---|---|---|
| ECFXTM01 | IN | Integer | 10 |
| ECFXTM02 | IN | Integer | 10 |
| ECFXTM03 | IN | Integer | 10 |
| ECIOMS01 | IN | Longint | 0 |
| ECIOMS02 | IN | Longint | 0 |
| ECLNBOLS | IN | Byte | 200 |
| ECMLXFT1 | IN | Integer | 10 |
| ECMLXFT2 | IN | Integer | 60 |
| ECMLXFT3 | IN | Integer | 70 |
| ECNRDDIR | IN | Longinteger | $33310000 (S3-P1-A00) (This means that the MSB is ASCII "3", next is ASCII "1", bottom two bytes are binary 0's.) |
| ECPOTMOU | IN | Integer | 10 |
| ECPBLSSU | IN | Byte | 0 |
| ECPJCJ00 | IN | Integer | 8 |
| ECPJCJ31 | IN | Integer | 0 |
| ECPJCJ20 | IN | Integer | 3 |
| ECPJCJ21 | IN | Integer | 0 |
| ECPJCJ22 | IN | Integer | 0 |
| ECPJCJ23 | IN | Integer | 128 ($80) |
| ECPJCJ40 | IN | Integer | 3 |
| ECPJCJ41 | IN | Integer | 0 |
| ECPJCJ42 | IN | Integer | 0 |
| ECPJCJ43 | IN | Integer | 128 ($80) |
| ECPURDIR | IN | Longinteger | $33310000 |
| ECROTDIR | IN | Longinteger | $33310000 |
| ECRQFQS4 | IN | Integer | 10 |
| ECS4FICT | IN | Integer | 10 |

The following "System Constants" must be set to heir default values:

| UTMotRev | UT | (PIO) | Longint 300 | ms. to wait for motor reverse |
| UTLftCtr | UT | (PIO) | Longint 300 | ms. to wait for lift to center |
| UTDeboun | UT | (PIO) | Longint 40 | ms. for standard debounce time |
| UTSettle | UT | (PIO) | Longint 300 | ms. to wait at PIO__Init to be sure motors are stopped etc. before returning. |

The Polled Initialization rough operations sequence is as follows (polling loop active):
1. Checks INITSTATE;
2. If Done (INITSTATE >3), flushes Command Queue of commands for the Initialization module, does nothing else but return;
3. If Initializing (INITSTATE=0 to 3 inclusive), continues with normal operations.
4. Checks for commands for Polled Initialization in the Command Queue;
5. If none, return without doing anything;
6. If have one, read it and act on it; and
7. Loop back for next command until none, then return.

Upon receipt of the appropriate Cold Boot or Warm Boot command in the command queue, the Initialization module performs the following sequence:
1. Send cold/warm Initialize commands to the RC, CC, and the SC. Note that the commands must be sent in this order;
2. Wait until receive "Init Complete" messages from both the SC and the CC, then send out "Init Complete" messages to the CC and SC modules; and
3. Set the INITSTATE variable to "Done" (4). This causes the Initialization module to throw away any further messages it receives.

The proper operation in the event of an "Initialization Failure" is to try to loop around doing the following:
1. Flash the DRU's amber warning light in a specific pattern;
2. Send a message to the DRU console;
3. Send an Alarm of some type to the host in the hope that the serial link will start working again;
4. Re-run the Initialization sequence.

Normal polled operation now begins and the Initialization module shouldn't receive any messages on the queue until a re-boot or similar operation occurs.

The following provides the information required to call the Initialization module and to properly pass parameters back and forth:
1. Procedure DRU Boot; Entry;
This performs the non-polled initialization operations described above. The main body of the entire DRU program, where execution begins after a System Reset, calls this procedure as its very first action.
2. Procedure Init Pol; Entry;
This procedure performs the polled initialization operations described above. In general, it takes its commands from the Command Queue and places commands to other modules on that same queue. When initialization has been completed, as determined by the value of INITSTATE, it "goes to sleep" until another system reset or another call to DRU Boot awakens it. Any messages sent to it while in this state are read from the Command Queue, checked for valid parameter ranges, then ignored.

The Executive module acts as the "poller" for the pseudo-multitasking operations performed by the DRU software. It first activates one polled module, then another, and so on in a circular fashion. Between activations of the polled modules it performs housekeeping chores such as keeping the timers, PIO, Command Queue, and similar "utility" functions current. It does this by regularly activating them, allowing them to perform pending operations given them by other modules that couldn't be completed immediately, such as waiting for a Lift mechanism to reach its commanded destination.

There are no significant data structures or algorithms in the Executive module.

Figure 13:
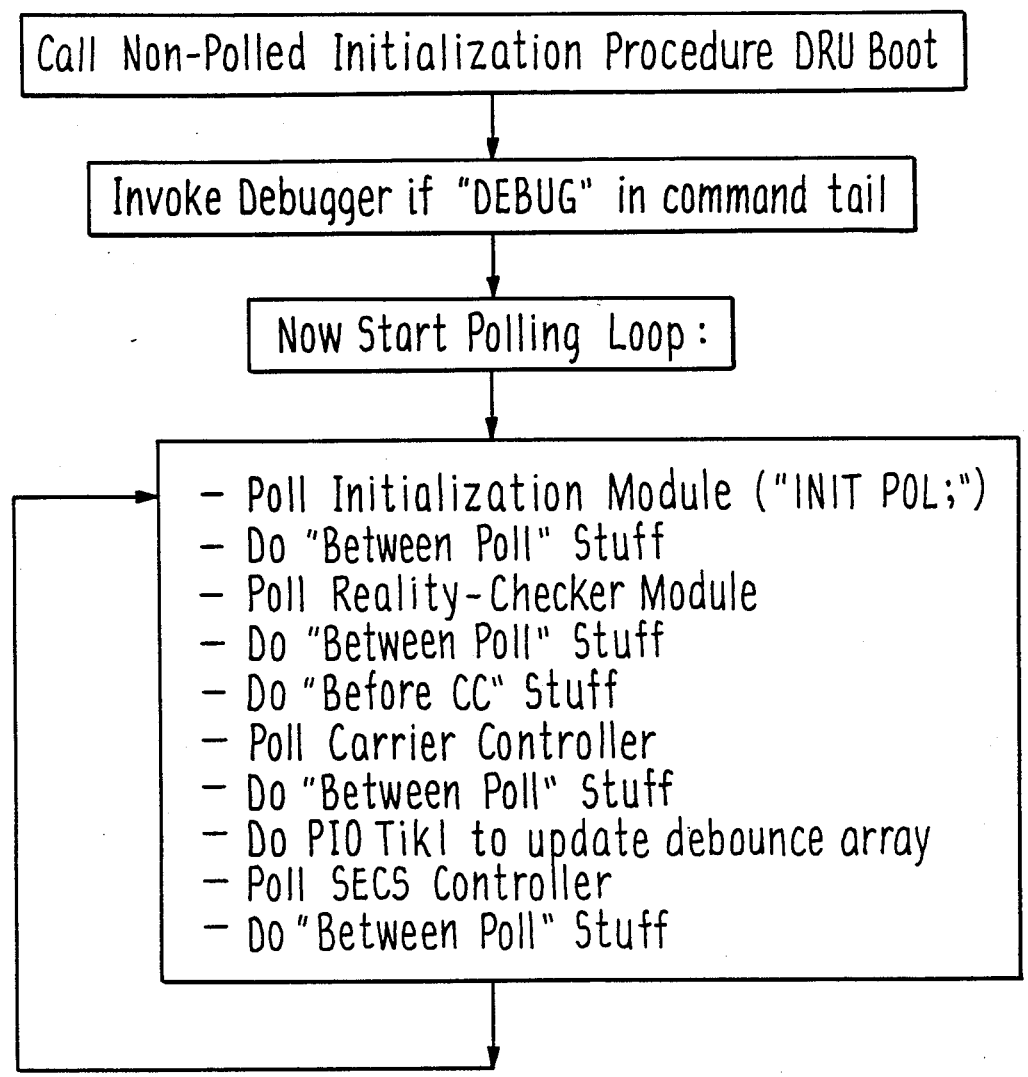
FIG. 13 is a flow chart which illustrates the program execution of the Executive module.

The Executive module is straightforward in its organization and execution. The operation of the module is shown in FIG. 13 which illustrates the normal path of program execution:

The "Between Poll" Stuff consists of:
- Flag the Command Queue that a new module activation is about to start by activating NEW POLL.

The "Before CC" Stuff consists of:
- Activate the Timer module using Opcode 0.
- Check to see if a "+" was pressed on the DRU console to call the Debugger into action.
- Check the Command Queue for messages to the Executive and act on them.
- Activate the PIO module using PIO Tik1.

A number of support operations are performed on an "on demand" basis.

The "Crash" routine is called by all modules, except those within the Debugger, whenever they wish to terminate the DRU program and return to the operating system. This is normally done only upon encountering a fatal error. The Crash Operation is initiated by the procedure call "Crash" with no operands. The "external" declaration for this procedure is "Included" in all DRU software modules that wish to access the Crash procedure.

The Crash operation goes through the following steps:
1. Turn on the amber warning beacon;
2. Prompt the operator to "Hit Return to OS-9";
3. Wait for the operator to press Return or "+";
4. Turn off the Warning Beacon;
5. If the operator typed "+", the Debugger is called and used as desired. If the password was wrong, or when the Debugger is finished, control passes to the following step in this list;
6. Call PIO Init to turn off all motors, the warning beacon, etc.; and
7. Return to OS-9.

The Debugger operation is invoked by typing a "+" on the console while the program is running in the polling loop. Once per each polling loop, the program checks for this key and, if pressed, it requests the user to enter the password. When the password is given, access to the Debugger is granted.

Whenever the password is successfully given, for a 30-minute time thereafter, the password will not be required, allowing re-entry to the Debugger by just typing "+". A Debugger command option exists to allow immediate cancellation of this 30-minute period, so that the password will be required at the next invocation of the Debugger.

There is no procedure declaration for the Executive module. It is the main program body and is automatically executed upon first execution of the program. The only procedure within this module that is called by other modules is the "Crash" procedure, which is called by simply invoking "CRASH;", as described above.

The Executive module communicates with other polled modules via the Command Queue.

The Executive module does not use any utility procedures but requires two Timers, one Uptimer and one Downtimer.

Turning now to a discussion of the Carrier Controller Module, the Carrier Controller Decision Tree is a model of the DRU's function. It can be thought of as a very high-level programming language. As stated above, each major step in the handling of material carriers is represented by a Cell in the Decision Tree Table. These Cells are referred to as "Decision Tree Cells."

The Decision Tree Cell Table is a linear array of records which contain the actual Decision Tree Cells. The first element of each record in the array is the "Logical Cell Number". The remainder of each Cell's record includes the vector to the procedure to call, a list of next-logical-Cell numbers for all possible results, etc. The Decision Cell Table is sorted by "Logical Cell Number" (i.e., 1.1.0.1, 1.1.0.2, 1.2.0.1, 1.2.0.2, 1.2.0.3, 2.1.0.1 ... ).

The terms "Logical Cell Number" and "Physical Cell Number" are introduced here. "Logical Cell Number" refers to the aforementioned Cell number (i.e., 2.1.0.4), and "Physical Cell Number" refers to the index number of the array element which actually contains the Cell.

A binary search is used to find a specific Logical Cell Number within the Decision Cell Table, in other words, to find the Physical Cell Number which corresponds to the desired Logical Cell Number.

By using this method to find target Cells within the Decision Cell Table, Cells refer to each other by Logical Cell Number (e.g., 2.1.0.74) rather than by the physical array position occupied by the target Cell. This allows Cells to be physically relocated within the array, as a result of programming changes, without impacting any Cells which might be pointing to the relocated Cell.

Cells refer to other Cells by Logical Cell Number. This Number is written as a string of ASCII decimal digits, separated by periods (e.g., 2.1.0.1, 2.13.0.152, 4.21.0.17). The Logical Cell Number is stored internally as an array of four bytes; each byte's value is stored in binary (e.g., 0..255).

The four fields within a Logical Cell Number are:

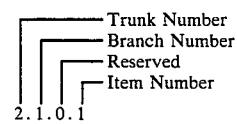

1. Trunk Number—Used to identify a major path through the Decision Tree. A zero in this byte for 'CurrentCellNumber' is used to flag an unused element in the Carrier Status Table. The following major trunks are defined:
    00—Invalid
    01—Reserved
    02—SECS Surprise—>Scan 03—Non-SECS Surprise—>Scan
04—Identify an Action
05—Scan—>Handshaking Machine
06—Scan—>Non-Handshaking Destination 2. Branch Number—Used to group together closely related Cells; no other meaning is attached to this byte's value. The reasoning behind this is as follows: Each Cell is assigned a unique Logical Cell Number which never changes. Therefore, as modifications are made to the Tree (Cells are inserted and deleted), the task of manually locating a specific Cell, conceptualizing its approximate location in the Tree, and identifying its neighbors could become very difficult.

3. The third byte is reserved for future use. In the described embodiment, it is always set to zero.

4. Item Number—Assigned sequentially to provide each Cell with a unique Logical Cell Number. This field is always "1" for the first Cell in a trunk or branch. To insure that the insertion of a new Cell at the beginning of a branch—before the Cell already labeled "1"—does not cause this rule to be violated, a dummy (no-op) Cell Procedure is used for the first Cell (Item Number 1), as appropriate.

The Decision Tree Handler does not attempt to interpret the Logical Cell Number to determine which Cell should be executed next. All possible next-Cell-Numbers are always explicitly defined in every Each Decision Tree Cell contains the following items:

1. Logical Cell Number.
2. Cell Procedure Vector—This "points" to the procedure that performs the Cell's function. It is called with two parameters, CELL STATUS and RESULT CODE. CELL STATUS is located in the Carrier Status Table; it is passed, unaltered, to the Cell procedure. CELL STATUS will already have been set to zero before the initial call to the Cell Procedure, indicating that this is the first time that the procedure has been called. The Cell Procedure sets this variable to a non-zero value before it returns. The exact non-zero value is of significance only to the Cell Procedure; it is used by the Cell Procedure to keep track of what it's doing between calls to the Carrier Controller. This eliminates the need for each Procedure to have it's own global for this purpose. The Decision Tree Handler stores the returned value in the Carrier Status Table. When the Cell Procedure has completed its task, it sets FIRST TIME to 255. This is not used by the Decision Tree Handler as a completion code; it will only be used for debugging. RESULT CODE is set to either zero or 255 when the Cell Procedure is called; the value 255 signals the Cell Procedure that the Hang Timer has expired. RESULT CODE is used by the Cell Procedure to return a Result Code back to the Decision Tree Handler. Zero is an invalid Result Code; it is used during debugging to indicate that a Cell Procedure did not exit properly. 255 means that the Cell Procedure's task is not complete. '1' through 'n' indicate that the Cell Procedure is complete and identify which Cell in the Next-Cell-List to branch to next. It is possible for a Cell Procedure to return a Result Code greater than the maximum number of Result Codes defined in the Decision Tree Cell. This is called an "Extended Result Code" and its value is always greater than 16. Most Cell Procedures return at most two or three different Result Codes. However, there are a few Cell Procedures which return a large number of results. Rather then wasting memory by having every Cell contain enough space to handle these few cases, and having to increase this space each time the large ones get larger, Extended Result Codes were developed. If a Result Code of 16 or more (except 255) is returned by a Cell Procedure, the Decision Tree Handler branches to the last Cell in the Next-Cell-Number list (e.g., if there are 5 possible Next-Cell-Numbers and the Cell Procedure returns a Result Code of 16, the Decision Cell Handler branches to the Cell corresponding to Result Code 5). That Cell uses the Previous Cell Result Code field in the Carrier Status Table to determine which Cell to branch to.

3. Hang-Timer value—0=immediate result, 1—n=hang time
Some Cell Procedures will not return a result the first time that they are called; they must wait for certain conditions before they can complete their work. Because the Carrier Controller's "time-slice" must be kept as small as possible, these Cell Procedures must wait until the next pass through the polling loop before testing again if these conditions have been met. An example of this is the Cell Procedure which reads a material carrier's Bar Code. This Cell Procedure calls the Bar Code Scanner Handler many times, waiting for the Bar Code Scanner to return a result. Cells which do not return an immediate result have a non-zero Hang-Timer value associated with them. The units are tenths of a second. Hang-Timers are error detecting devices; under normal operation, they should never expire. A Cell's Hang-Timer is set to a time interval which is more than long enough for the associated procedure to complete its function. If the Hang-Timer expires, it means that something went wrong. If the Decision Tree Handler discovers that a Hang-Timer has expired, it does one of two things: it immediately calls the Hang-Timer-Expired Procedure, if one is specified, or it branches to the specified Hang-Timer-Expired-Cell number.

Figure 14:
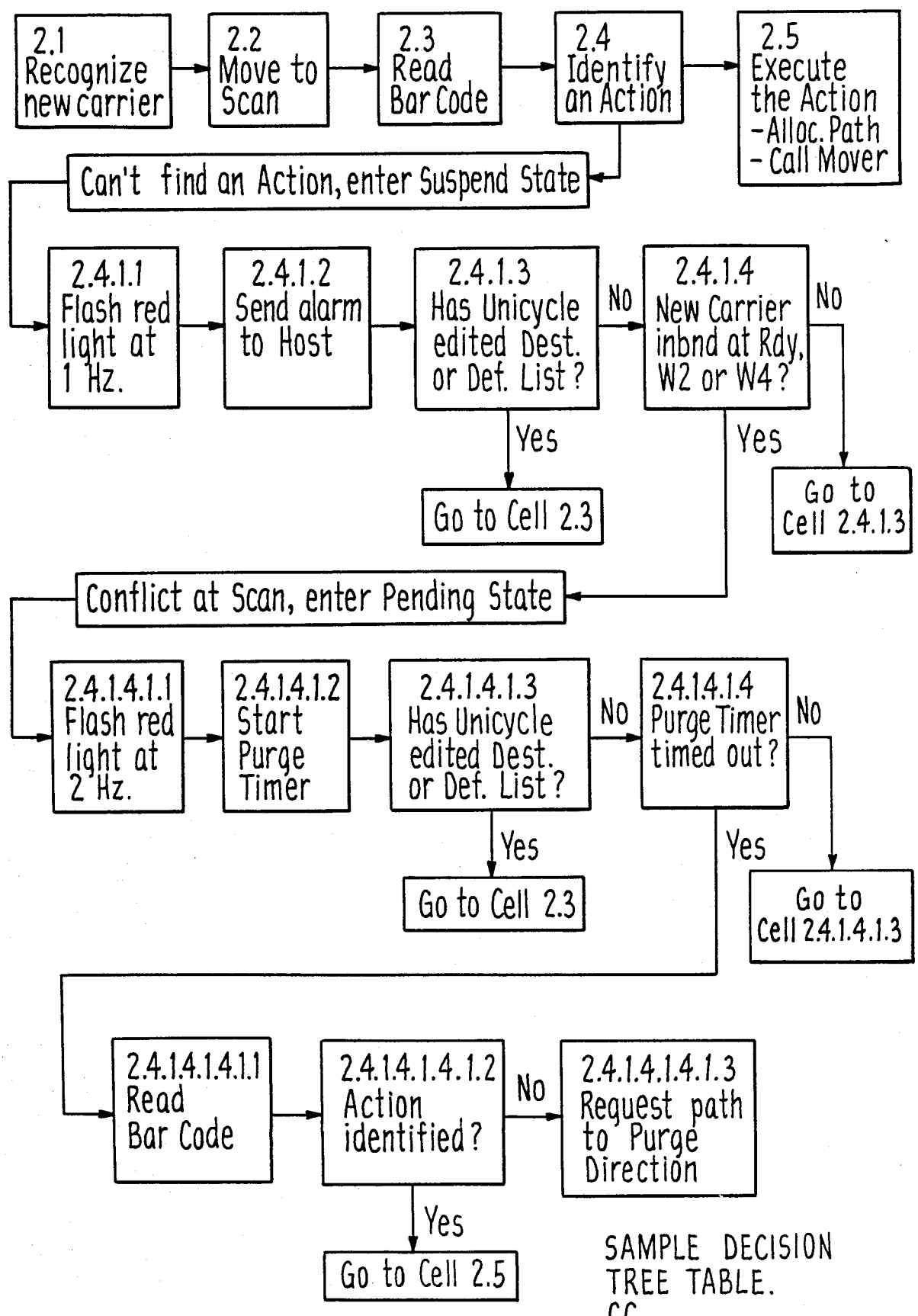
FIG. 14 is a flow chart illustrating a sample Decision Tree Table for the Carrier Controller module.

4. Hang-Timer-Expired Procedure Vector—This procedure is executed immediately after a Hang-Timer expires, during the current call to the Carrier Controller. The value of RESULT CODE is set to 255 before calling the Hang-Timer-Expired Procedure; this informs the procedure that the Hang-Timer has expired. This procedure is only needed if there is a hang-timer and something must be done immediately to resolve the problem caused by the expired Hang-Timer. The Hang-Timer-Expired Procedure is called with the same two arguments as the Cell Procedure. This allows the Hang-Timer-Expired Procedure to know what stage the Cell Procedure was in when the Hang-Timer expired. A sample Decision Tree Table is shown in FIG. 14.

The Carrier Status Table contains all of the information required to describe each material carrier in the DRU's domain. It can be thought of as the Carrier Controller's "Active Task Table."

Each element of the Carrier Status Table contains the following information about a Carrier:

1. Current Logical Cell Number (CurrentCellNumber)—The Carrier's current Logical Cell Number within the Decision Tree. An element of the Carrier Status Table is flagged as unused by setting the first byte of this field to zero.

2. Previous Logical Cell Number (PrevCellNumber)—The Logical Cell Number of the previous Decision Tree Cell. It is used for debugging, so that it can be determined how a particular Cell was arrived at.

3. Carrier Status (CarrierStatus)—A record of bytes which contain various loosely related information about the Carrier. The Carrier Status Bytes include:

Path Blocked Flag (PathBlocked)—This flag is set by the Path Manager if it determines that a carrier's Path has become blocked (e.g., by a beamed-in carrier);

Negative Surprise Flag (NegSurprise)—This flag indicates that the Event Detector has determined that the carrier has disappeared (beamed-out carrier, jam, reached destination, etc.);

State Flag (StateFlag)—This flag indicates if the carrier is in the Pending State, the Suspend State, or neither. It is used by the Warning Beacon Handler, etc. It is also used to indicate if the carrier is in the Poll State (DRU polling Machine); and Machine Handshake Request Pending Flag (HSReqPending)—This byte is set to 1 by the Decision Tree after a SECS Surprise. This informs the Decision Tree that it must temporarily deny any further Handshake Requests by the process machine while the Tree prepares to receive the carrier.

4. Type of Surprise (SurpriseType)—This field is set by the Tree Creator to indicate whether or not the Surprise was triggered by a SECS Handshake Request.

5. Current Station (CurrentStation)—The number of the Station currently occupied by this carrier. If the carrier is being moved, this field contains the number of the Station that the carrier is exiting. This field is used for several purposes (e.g., locating the "tail" of a carrier's Path in the Path Allocation Table, etc.). If this was a SECS Surprise and the carrier is still in the machine's domain, the Current Station will be one of the four imaginary Entry/Exit Stations.

6. Decision Tree Cell Status (CellStatus)—The Cell Status flag is used by the current Cell Procedure to keep track of what it's doing. It is set to zero by the Decision Tree Handler to indicate that this is the first time that the procedure has been called. The Cell Procedure will set the Cell Status to a non-zero value, the first time it is called (the actual non-zero value is assigned and interpreted only by the Cell Procedure itself).

7. Previous Cell Result Code (CellPrevResult)—This byte will be set to the final Result Code of the previous Decision Tree Cell. It is passed, unaltered, to the current Cell Procedure. In most cases the Cell Procedure will ignore this information. This is used for the few cases when a Cell needs more Result Codes than the somewhat arbitrarily established maximum. In these cases, the Decision Tree Handler will branch to the last Cell in the Next Cell list, and that Cell's procedure will use the Previous Cell Result Code to branch to the "true" next Cell.

8. Tree Cell Hang Timer Handle (HangTimerHandle)—The Hang Timer handle for the current Decision Tree Cell. This field will be zero if the Cell Procedure returns an immediate result.

9. MTM Timer Handle (MtmTimerHandle)—The Material Transfer Mechanism (MTM) timer handle. This field will be zero unless a carrier is being transferred to/from a process machine under handshaking control. The MTM Timer will use an Up-Timer ("stopwatch" style).

10. Poll State Timer Handle (PollTimerHandle)—This timer is used to determine for a machine, which is in the Poll State, to re-request Handshaking Permission before assuming that the machine has gone off line. This timer might also be used as a watch-dog when the DRU is in the Poll State.

11. Re-Poll Timer Handle (RePollTimerHandle)—This timer is used when the DRU is in the Poll State to determine how long the DRU should wait between Handshake Requests.

12. Re-Poll Counter Value (RePollCounter)—This counter is used when the DRU is in the Poll State to determine how many times the DRU should send Handshake Requests to a machine before the DRU assumes that the machine has gone off line.

13. List Found In (ListFoundIn)—This contains the name of the List in which the carrier's bar code or BIS was found. This information is used when the action is complete to determine which of the History lists to place the item in and which list to remove the item from.

14. Bar Code Field (BarCode)—This field contains the carrier's bar-code.

15. BIS Field (BISfield)—This field contains the carrier's BIS (MID) number, which was supplied by either the machine or the host (via the Destiny List).

16. Source Station (SourceStation)—The physical Station though which this carrier entered the DRU's domain. If this was a SECS Surprise and, therefore, the imaginary Entry/Exit Station is the point of entry, the Source Station will be set to the corresponding physical Port (i.e. reset the high-order bit of the "Spur nybble").

17. Destination Station (DestStation)—The physical Station through which the carrier is supposed to exit the DRU's domain. This information comes from one of the lists.

18. Action Code (ActionCode)—The Action Code describes what actions to take in order to get the carrier out of the DRU's domain (e.g., use handshake, Lift and Transfer, Lift and Index, Rotate, etc.). This information comes from one of the lists (or from ECIDs PURDIR, ROTDIR, or NRDDIR).

19. Time Stamp 1 (Time1 TOTS)—Time Stamp.

20. Time Stamp 2 (Time2 TITS)—Time Stamp.

The Station Status Table describes the status of each station in the DRU's domain. This includes whether the station is currently occupied, reserved, etc. ... It is also used to detect the arrival and departure of material carriers within the DRU's domain.

Carriers are described as "entering" and "exiting" Stations. This is to avoid confusion with the terms "Inbound" and "Outbound", which have very specific meanings: they refer to a carrier's direction relative to Scan.

Each DRU node can include as many as five Physical Stations. A Physical Station is a location along the mainline or a spur where a carrier can be detected, stopped, lifted, or otherwise physically controlled.

The Carrier Controller uses the term "Station" in a broader sense, in order to better represent the functionality of the DRU node (the upper-case 'S' in 'Station,' implies formal use of the word). In addition to the five Physical Stations, the following Logical Stations are defined:

1. Four imaginary Entry/Exit Stations; one associated with each Physical Port. These Stations are used to define where a carrier is between the time it leaves a port (destined for a handshaking Machine) and the time the machine indicates that it has received the carrier. Conversely, it defines where a carrier is between the time a machine asks for handshaking permission to send a carrier and the time it is actually sensed that a carrier is at the associated Physical Port. Entry/Exit Stations are only used with handshaking machines that use Physical Ports. They are never used with non-handshaking machines.

2. Twelve Virtual Stations which are use to send and receive material from handshaking and non-handshaking machines that do not use Physical Ports (i.e., that don't use Stops, Lifts, etc.).

The set of supported Stations is summarized in the following Table 8.

TABLE 8

SET OF SUPPORTED STATIONS

| STATION TYPE | NAME | MNEMONIC | 2-BYTE CODE |
| --- | --- | --- | --- |
| Physical Stations | Ready | RDY | 11 |
| " | Scan | SCN | 00 |
| " | Gone | GON | 31 |
| " | Wait2 | W2 | 20 |
| " | Wait4 | W4 | 40 |
| Virtual Ports | Port23 | P23 | 23 |
| " | | | |
| " | Port28 | P28 | 28 |
| " | Port43 | P43 | 43 |
| " | | | |
| " | Port48 | P48 | 48 |
| Entry/Exit Stations | — | E21 | A1 |
| " | — | E22 | A2 |
| " | — | E41 | C1 |
| " | — | E42 | C2 |

Note that an imaginary Entry/Exit Station is identified by setting the high-order bit of the nybble containing the Spur number.

The 'CCstNuXY' procedure will accept a two-byte Station number and translate it into the corresponding X-Y Path/Station Table coordinate. The 'CCXYstNu' procedure will translate from X-Y back to a 2-byte number.

The X-Y Path/Station Table is the primary means of recognizing that a carrier has entered the DRU's domain. When a Station's status changes from unoccupied to occupied the DRU recognizes the presence of a new carrier. This is referred to as a "Surprise." The term "Surprise" is not, used in the customary sense of being taken unawares . The Carrier Controller expects to be surprised, it's a normal, healthy part of a DRU's life. Unless, that is, the Surprise occurs at a point where carriers would not normally enter the DRU's domain (this is an "Illegal Surprise"). In summary, the term Surprise, as used herein, describes a normal occurrence, not an Alarm condition. An Alarm condition is triggered by what is termed an Illegal Surprise.

A Positive Surprise represents the detection of a carrier at a Station within the DRU's domain that the Station Status Table indicates is "Empty". Conversely, a Negative Surprise represents the disappearance of a carrier from a Station that the Station Status Table indicates is "Occupied".

Positive and Negative Surprises can be either Legal or Illegal. A Legal Positive Surprise occurs when a carrier is detected at a valid entry-point into the DRU's domain (such as when a carrier arrives at Ready). An Illegal Positive Surprise occurs when a carrier is detected at a Station into which carriers do not normally arrive; as stated above, this is also referred to as a "beamed-in" carrier.

A Legal Negative Surprise occurs when a carrier reaches its destination and disappears from the DRU's domain. An Illegal Negative Surprise occurs when a carrier disappears prior to reaching its destination; as stated above, this is also referred to as a "beamed-out" carrier. However, a Negative Surprise is not necessarily a beamed-out carrier, it could be a jam; the two cases are treated as one because the DRU has no way of distinguishing between them.

Figure 15:
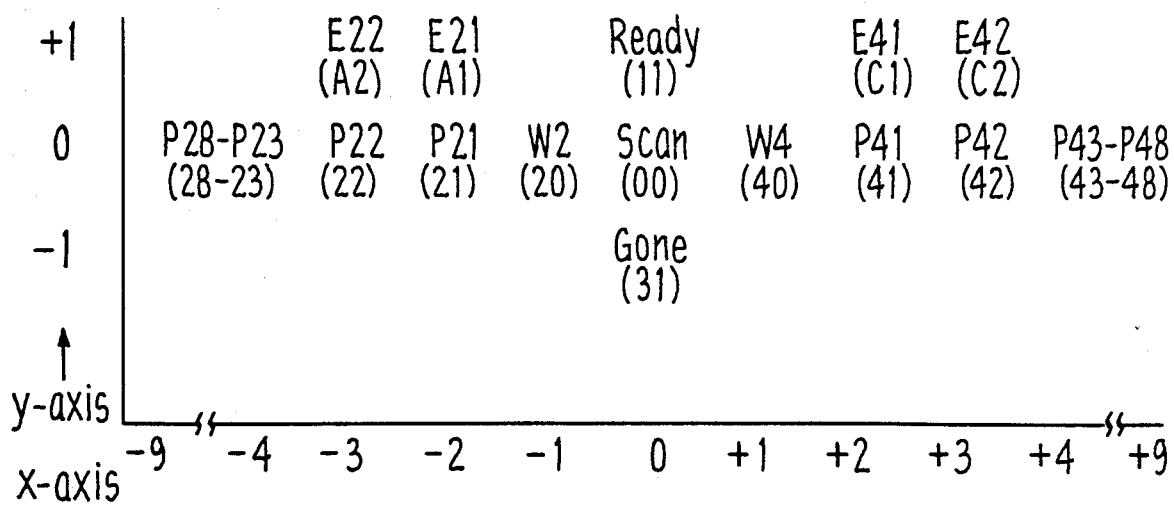
FIG. 15 is a table illustrating a Station Status Table.

As shown in FIG. 15, the Station Status Table can be viewed conceptually as a pair of two-dimensional arrays. The X- and Y-axes are a graphic representation of the DRU node's generic physical layout. The two are used for the Current Status and for the Previous Status. Current and Previous Statusare key elements of the Event Detector and their function will be described in greater detail below.

This organization is important because it allows the node's layout and function to be described in a very general way and, therefore, make good use of data structures to describe the logic required to perform the DRU's various functions.

This two-dimensional logical structure creates a relatively large amount of unused space within the Station Status Table. In order to conserve memory, the table is physically implemented as a pair of linear arrays. The table's logical X,Y plane is compressed into a single X-axes. The two- to one-dimensional mapping is accomplished by invoking the Station/Path Table Indexer procedure.

It may seem unnecessary to worry about the small amount of memory that would be wasted by a two-dimensional physical structure. However, it will be seen from the discussion that follows that the Path Allocation Table shares the same logical structure and, because of its size, the Path Allocation Table would waste a significant amount of memory if uncompressed.

The Station Status Table is an array of records. Each record contains the following:

1. The Station Engagement bits—Four bits which define a Station as Occupied, Empty, Becoming-Occupied, Becoming Empty, and Min. and Max. Timer timed-out status.
2. Station Reserved bit—Used to indicate that a Lift/Index is "spoken for", i.e. that it is raised and must be held that way until the machine asks for handshaking permission to send the carrier back to the DRU. The Path Manager makes use of this bit.
3. Valid Start-Point bit—A Surprise at this Station is Legal.
4. Min. Timer handle—Minimum time for this Station to become Empty/Occupied.
5. Max. Timer handle—Maximum time for this Station to become Empty/Occupied.

6. SettleTimerHandle—Set by the Event Detector when a carrier is first sensed at a Station. No physical action may be taken until this Timer reaches zero (indicating that the carrier has had sufficient time to actually reach the stop and stop moving). The timers values are stored in a global table ('CCSetTab') based on the type of Station.

The Status bits (items 1–3) are all contained in a single 16-bit integer. The Timers will each use one byte.

Station status bit usage is illustrated in Table 9

TABLE 9

```
7 6 5 4 3 2 1 0
. . ? ? 0 0 0 0   Empty
. . ? ? 0 0 0 1   Becoming Occupied, < min. time
. . ? ? 0 1 0 1   Becoming Occupied, time OK
. . ? ? 1 1 0 1   Becoming Occupied, > max. time
. . ? ? 0 0 1 1   Occupied
. . ? ? 0 0 1 0   Becoming Empty, < min. time
. . ? ? 0 1 1 0   Becoming Empty, time OK
. . ? ? 1 1 1 0   Becoming Empty, > max. time
```

- Occupied .OR. Becoming Occupied
- Occupied .OR. Becoming Empty
- Min. timer timed out
- Max. timer timed out
- Station Reserved
- Valid Start-Point The rules for interpreting the station status bits are as follows:
1. Bit rules:
   - Becoming Empty>max. time=carrier obstructed (unable to leave Station).
   - Becoming Empty<min. time=Okay (shouldn't be gone yet).
   - Becoming Occupied>max. time=beamed-out carrier or carrier obstructed.
   - Becoming Occupied<min. time=Okay (shouldn't be there yet).
   - Occupied<min. time=Positive Surprise (beamed-in carrier).
   - Empty<min. timer=Negative Surprise (beamed-out carrier) or sensor failure (not a jam).
   - Expired timers never indicate a Positive Surprise.
2. Definitions:
   - Static Bits - Bits 0 & 1.
   - Dynamic Bits - Bits 2 & 3.

The Path Allocation Table holds a representation of all Paths currently allocated to the various carriers within the DRU's domain. It can accommodate a unique Path for every carrier in the Carrier Status Table.

As defined above, a Path is a list of Stations through which a carrier is to move, along with the Direction of the move. It is possible (in fact, likely) that a single Station might be allocated to several Paths at the same time.

As stated above, the terms "Inbound" and "Outbound" are use to describe a direction of movement relative to Scan. An Inbound Path leads toward Scan; an Outbound Path leads away from Scan. Similarly, an Inbound carrier is moving toward Scan from a spur or the main line; an Outbound carrier is moving away from Scan.

A description of a specific Path has three components:
1. Origin—The Station at which the Path begins.
2. Goal—The Station at which the Path ends. The term "goal" was selected because it describes the Station at which the Carrier Controller would like a carrier to end up. This may not actually be the case, if the Path happens to become blocked during the move.
3. Direction—The direction of movement relative to Scan (i.e., Inbound or Outbound). In this context, the term "direction" combines the customary meaning, that is, "which way," with the concept of the Shell Game. In a Shell Game Path, Direction also indicates what (if anything) to do when the carrier reaches its Goal Station.

These terms were chosen to reduce the possibility of confusion between a carrier's final "Destination", a move's "destination Station", and a Path's "destination" (now referred to as a Path's Goal).

The Path Allocation Table uses the same graphic representation of the DRU's generic physical layout as does the Station Status Table. To conserve memory, the table's logical X,Y plane is compressed into a single X-axes. The two- to one-dimensional mapping is accomplished by invoking the Station/Path Table Indexer procedure.

A pointer to the tail of each Path is located in the Carrier Status Table ('CurrentStation').

When a moving carrier is close enough to a Station to trip its sensor, it may not yet be resting against the Station's Stop. For example, the leading edge of a carrier arriving at Scan will trip the sensor when the carrier is still several inches away from the Stop.

When the Event Detector discovers that a sensor has changed to showing occupied, it will change the Station's status to Occupied; it will also set the Station's Sensor Settle Timer to the value returned by the 'GetSettleTime' function (which uses the Sensor Settle Time Table, 'CCSetTab').

The algorithms used by the Carrier Controller implement the following Station-related rules:
1. Two Stations are defined as adjacent if their co-ordinates are equal in one axis and differ by one in the other axis;
2. An Outbound Path has a non-zero Destination co-ordinate in either axis;
3. An Inbound Path has a non-zero Source co-ordinate in either axis;
4. A Shell Game Path is uniquely defined. It has two ports, and Outbound port and an Inbound port;
5. An Inbound Path is constructed by making the carrier's Y-axis co-ordinate zero (if it isn't already), then making the carrier's X-axis co-ordinate zero; and
6. An Outbound Path is constructed by making the carrier's X-axis co-ordinate equal the Goal's X-axis, then making the carrier's Y-axis co-ordinate equal to the Goal's Y-axis.

The Path Manager is called with a request for a Path with the Carrier Number, the Origin Station, the Goal Station and a Direction. The procedure grants or denies the request and, if the request is granted, enters the allocation status into the Path Allocation Table in accordance with the following rules:
1. Inbound Path from Ready, Wait2, Wait4, and Gone is always allocated;
2. Inbound Path from any other Station is allocated unless that Station is allocated Outbound. However, handshaking is not granted until the entire Spur is not allocated Outbound;

3. A request for an Inbound Path from a Station that is allocated Outbound can only result from an Illegal Surprise. In this case, the Outbound carrier(s) on the previously existing Path(s) is/are stopped, the old Path(s) de-allocated, and new Path(s) to Scan allocated. Now the request for an Inbound Path for the Illegally Surprising carrier will be granted and the carrier(s) in the way will be handled by the Shell Game insofar as possible;

4. An Outbound Path to any Port is allocated unless that Spur is already allocated Inbound. If the Spur is allocated Inbound, the denial results in a request for the Shell Game to the opposite Wait Station. If the Shell Game request is denied, the carrier is sent to the Purge direction (always Gone for the first deliveries); and 5. A Shell Game Path is allocated if the Wait Station is Empty.

When the Carrier Mover Procedure is called by a Decision Tree Cell Procedure, it takes the Carrier Number as its argument and indexes into the Allocation Table to find the carrier in question. The carrier is assumed to be, or to have just been, at the trailing end of the carrier's allocated path. Depending on the Status of the assumed location and the next location in the Path, the Carrier Mover Procedure will execute one of the following two processes, or neither of them:

1. If the Station Status Table shows that the assumed location is Empty and the next location in the allocated Path is Occupied, the assumed location is de-allocated for the carrier in question (i.e., the Carrier Mover cleans up after itself). If the next location is the end of the allocated Path, the move is complete so the entire Path is de-allocated.

—or—

2. If the Station Status Table shows that the assumed location is Occupied and the next location in the allocated Path is Empty, the next motion is initiated if it passes the following criteria:
    a. For destination Stations other than Scan: The move is made only if the destination Station is not allocated in the opposite direction.
    b. For destination Station=Scan: If more than one motion into Scan is pending, the conflict is resolved by the following priorities:
        1. Wait 2
        2. Wait 4
        3. Wait 2 roll (only if Wait 4 not allocated inbound)
        4. Wait 4 roll (only if Wait 2 not allocated inbound)
        5. Ready
        6. Gone The following steps are required to start a carrier motion between Stations:

1. Set the current location in the Station Status Table to Becoming Empty;
2. Set the next location for the allocated Path in the Station Status Table to Becoming Occupied;
3. Call the PIO Module with argument(s) as required to define what outputs to energize or de-energize to start the motion;
4. Start two timers which define the permitted time window for the Source Station to reach the Empty state; and
5. Start two timers which define the permitted time window for the Target Station to reach the Occupied state.

Figure 16:
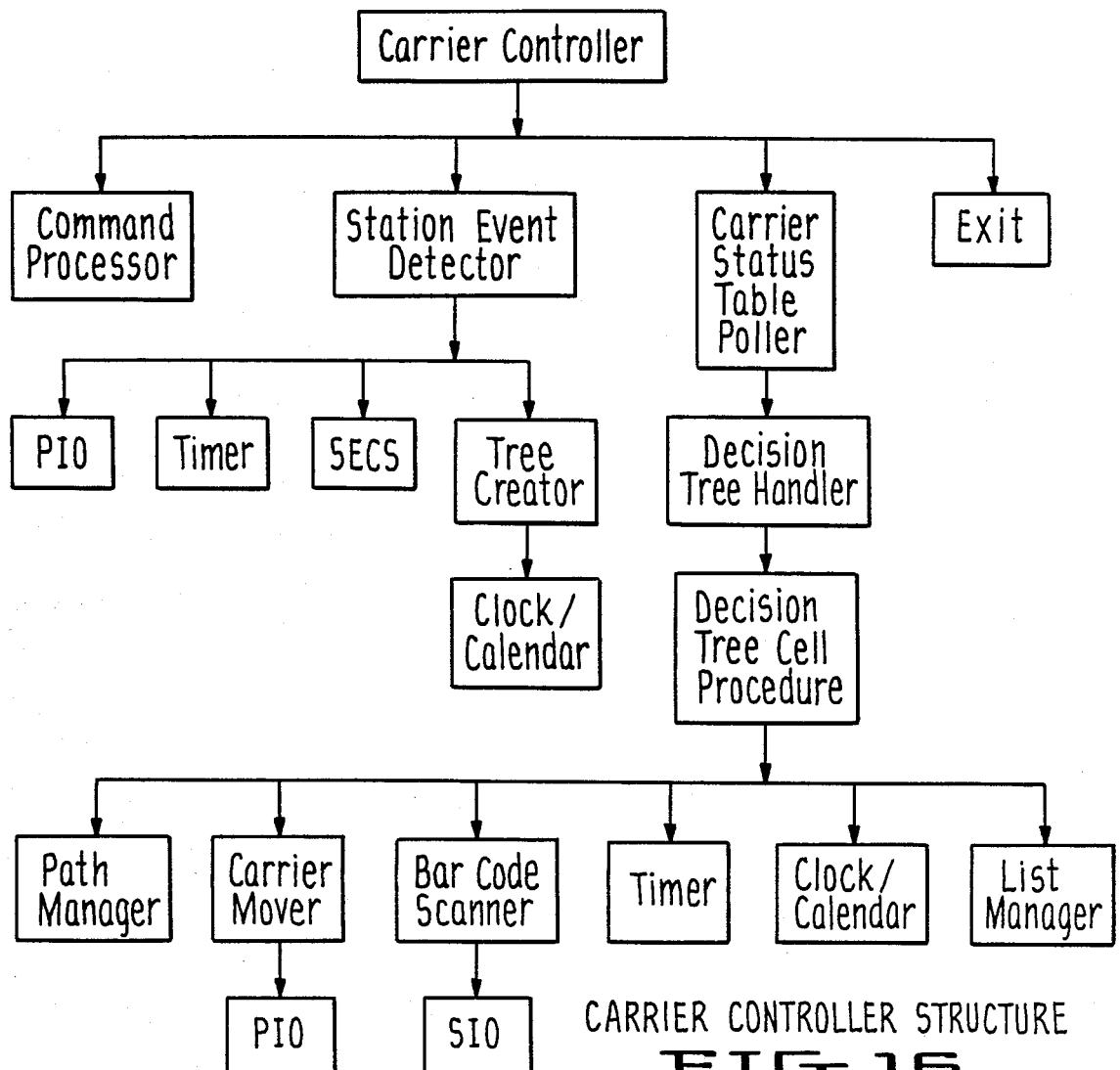
FIG. 16 is a block diagram illustrating the structure of the Carrier Controller module.

The structure of the Carrier Controller Module is shown in FIG. 16.

After DRU power-up and non-Polled Initialization, the Carrier Controller will be called for the first time by the Executive with exactly one command in the Command Queue. This will be one of the Initialization Commands (cold, warm, etc.).

The Carrier Controller does not yet have any idea that it just came alive. Therefore, the first thing it must always do is read the first command from the Command Queue to determine if the DRU is being initialized. The amber warning beacon is left ON until all detectable material carriers have been identified and an Initialization Status Flag is used. A Valid Start-Point bit is set in Station Status Table which says "a Positive Surprise here is legal" (and therefore does not generate an Alarm to the host). This bit is set (using ECIDs) for all Stations (Non-handshaking Real Ports, Ready, Wait if Virtual Port(s) on Spur, etc.) that are legal for Positive Surprises and for imaginary Entry/Exit Stations (which service handshaking Machines).

The Station Event Detector is responsible for recognizing that carriers have entered and exited the DRU's domain and for initiating appropriate action. The Event Detector procedure uses PIO, Timer, and SECS handshake requests as inputs to do three things:

1. It updates the Station Status Table.
2. It recognizes Positive Surprises and calls the Tree Creator to build a new element in the Carrier Status Table.
3. It recognizes Negative Surprises (Carrier exited the DRU's domain, beamed-out carriers, jams, etc.) and sets a bit in the Carrier Status Table indicating that this has occurred.

The Station Status TableMaintenance procedure maintains the Station Status Table using the following sources:

1. The PIO Shell is used to obtain the current status of all sensors. PIO is responsible for decoding the raw sensor inputs and for implementing sensor "debouncing."

Events that are sources of Positive Surprises, thereby triggering the Tree Creator, include the following:

1. A Station's Status changes from Empty to Occupied.
2. PIO changes Station from Becoming Occupied to Occupied before the Min-Timer has timed-out.
3. A SECS message requesting to handshake a Carrier out of a machine.

The Negative Surprise bit will be in the Carrier Status Table.

1. If the Carrier Mover has control of a carrier, it will check to see if the Negative Surprise bit is set and inform the Tree.
2. If the carrier is not being moved (e.g., it is at Scan or its Destination), the appropriate routine will check to see if the Negative Surprise bit is set.
3. The Event Detector must determine which carrier is associated with the Surprising Station. It will do this by scanning the Carrier Status Table for an active carrier with a match in its Current-Station byte.

The Event Detector will loop through existing Stations doing the following:

1. If the Station is an actual physical station (Physical Port, Wait, Scan, Ready, Gone), it will call PIO to obtain sensor inputs. The Station will be set to Occupied or Empty based on what is detected by the sensors. If a sensor indicates that a carrier is in a Station and that Station's status currently shows not-Occupied (either Empty, Becoming Empty, or Becoming Occupied), the Event Detector sets that Station's status to show Occupied and starts its Sensor-Settle-Timer to an appropriate value. Routines that act on Stations changing to Occupied delay any physical movement until the Sensor-Settle-Timer has expired. The Event Detector must know that a Station cannot go from Becoming Empty to Occupied or from Becoming Occupied to Empty. If it senses either of these conditions, it does nothing. The Event Detector may only alter bit-1 of a Station's Status; it may not alter bit-0. This leads
- PIO senses Empty (must set the two LSBs to 00).
- Does current Station Status bit-0=0?
- Yes, Set bit-1 :=0.
- No, Do nothing.

2. If the Station is an actual physical station (Physical Port, Wait, Scan, Ready, Gone) and it has an active Timer, the Timer Module is called and the Station Status Table is updated accordingly.

Virtual Ports do not use timers for Negative Surprise detection. There is no sensor at a Virtual Port and, therefore, nothing to tell whether the Port is Occupied or Empty.

Handshaking Virtual Ports will send the DRU a Handshake-Complete which triggers a Legal Negative Surprise. An MTM Timer greater than t3 triggers an Illegal Negative Surprise (Beamed-Out Pallet).

Non-Handshaking Virtual Ports are assumed empty as soon as the carrier leaves Wait.

Each Station has two timers: a Min Timer and a Max
1. If either of the above detects a Surprise:
   (i) If Positive Surprise, call the Tree Creator.
   (ii) If Negative Surprise, flag the Carrier Status Table.
   The Decision Tree Cell is responsible for initiating the Alarm to the host. The Tree Cell might actually be expecting the carrier to disappear (as when it reaches its final destination).
2. If this is an imaginary Entry/Exit Station or a handshaking Virtual Port, the Command List must be searched to look for relevant SECS/machine handshakes. These cause the imaginary Entry/Exit Stations and Virtual Ports to become Occupied or Empty.
3. Must save BIS and Source Station (see Tree Creator).
4. Check for conflicting SECS messages (two handshakes from the same port, etc.).
5. A machine's first Handshake Request is considered a Positive Surprise and the Event Detector will call the Tree Creator.

The first thing the new Tree does is set the Machine Handshake Request Pending Flag in the Carrier Status Table.

If subsequent Handshake Requests come from the same machine, the Event Detector knows that they are re-Polls because the Entry/Exit Station shows Occupied. The Event Detector will not call the Tree Creator; instead, it will do one of the following:

1. If the Machine Handshake Request Pending flag is set, the Event Detector will deny the machine's request by transmitting an S4F63 (NRR, Not Ready to Receive); the Handshake Request will be removed from the Command List.

2. If the Machine Handshake request Pending flag is not set, the Event Detector does nothing, leaving the Handshake Request in the Command List; the Decision Tree will respond to the request.

The Event Detector will not attempt to verify that the BIS has not changed since the machine's previous Handshake Request. The Tree will check for BIS mismatch when it takes over.

If a machine sends an S4F7, this message is placed in the Handshake Response Queue. The Tree will check this queue after it has finished allocating a Path, etc:
1. A handshake-Complete triggers a Negative Surprise.
2. If the SECS check detects a Surprise:
   (i) If Positive Surprise, call the Tree Creator,
   (ii) If Negative Surprise, flag the Carrier Status Table.

In this case, the Decision Tree is probably expecting the carrier to disappear.

The Tree Creator is called by the Event Detector each time a Station is found with a Positive Surprise. It locates the first unused position in the Carrier Status Table (identified by a zero trunk number in the 'CurrentCellNumber' field), assigns it to the Surprising carrier, and sets all initial values.

The Carrier Status Table element is initialized as follows:
1. Current Logical Cell Number (CurrentCellNumber)—Set to the proper trunk, depending on the type of Surprise (SECS vs. non-SECS).
2. Previous Logical Cell Number (PrevCellNumber)—Set to zeros.
3. Carrier Status (CarrierStatus)—Set as follows:
   A. Path Blocked Flag (PathBlocked)—Set to zero.
   B. Negative Surprise Flag (NegSurprise)—Set to zero.
   C. State Flag (StateFlag)—Set to zero.
   D. Machine Handshake Request Pending Flag (HSReqPending)—Set to zero.
4. Type of Surprise (SurpriseType)—Set to the Surprise Type passed by the Event Detector (SECS vs. non-SECS).
5. Current Station (CurrentStation)—Set to the Station where the Surprise occurred. This will be one of the six imaginary Entry/Exit Stations if this was a SECS Surprise at a Physical Port.
6. Decision Tree Cell Status (CellStatus)—Set to zero to indicate that this is the first time that the Cell Procedure has been called.
7. Previous Cell Result Code (CellPrevResult)—Set to zero.
8. Tree Cell Hang Timer Handle (HangTimerHandle)—Set to zero. If not already zero, send a debugging error message to the console.
9. MTM Timer Handle (MtmTimerHandle)—Set to zero. If not already zero, send a debugging
10. Poll State Timer Handle (PollTimerHandle)—Set to zero. If not already zero, send a debugging error message to the console.
11. Re-Poll Timer Handle (RePollTimerHandle)—Set to zero. If not already zero, send a debugging error message to the console.
12. Re-Poll Counter Value (RePollCounter)—Set to zero.
13. List Found In (ListFoundIn)—Set to zero.
14. Bar Code Field (BarCode)—Clear this field.

15. BIS Field (BISfield)—If this is a SECS Surprise, set this field to the BIS supplied by the machine. Otherwise, clear this field.
16. Source Station (SourceStation)—Set to the Station where the Surprise occurred. Except, if this was a SECS Surprise at a Physical Port (the Surprise was at an Entry/Exit Station) use the corresponding physical Port (i.e., reset the high-order bit of the "Spur nybble").
17. Destination Station (DestStation)—Set to zero.
18. Action Code (ActionCode)—Set to zero.
19. Time Stamp 1 (Time1 TOTS)—Set to zero.
20. Time Stamp 2 (Time2 TITS)—Set the TITS to the time of the Surprise.

The Carrier Status Table Poller (Active Task Poller) loops through each element of the Carrier Status Table and for each carrier with a non-zero Decision Tree Cell Number, calls the Decision Tree Handler with the Carrier Number as a parameter.

The Decision Tree Handler is the heart of the Carrier Controller. It attempts to advance the carrier within the Decision Tree. It interprets the information stored in the current Decision Cell, calls the Cell's Procedure, interprets result codes, and handles Hang-Timer time-outs.

The Decision Tree Handler structure is as follows:
1. Use the Carrier Number supplied by the Carrier Status Table Poller to find the carrier in the Carrier Status Table;
2. Get carrier's current Logical Cell Number from the table;
3. Locate the Physical Cell within the Decision Cell Table by using a binary search. Is the First-Time flag zero (is this the first time in this Cell for this carrier)?
   - Yes, Is a Hang-Timer value specified for this Cell?
     - Yes, Call the Timer module with the specified time value and store the Timer module supplied Timer-Number in the Carrier Status Table.
     - No, Set the Timer-Number in the Carrier Status Table to zero.
   - No, Is the Hang-Timer active (Hang-Timer Number not zero)?
   - Yes,
     - Call the Timer module to determine if the hang-timer has expired.
     - Has the Hang-Timer expired?
     - Yes,
       - Execute hang-timer expired procedure for the Cell if one exists.
       - Go to the Hang-Timer Expired Next Cell Number . . .
     - No, Continue.
   - No, Error (always a Hang-Timer, if not immediate result).
     - Call the Cell Procedure with two parameters, the First-Time flag, and the Result. The Cell Procedure will alter both of these values, therefore it must use Pascal's VAR keyword.
     - Store the First-Time flag value returned by the Primary-Procedure in the First-Time flag field of the Carrier Status Table. Use a special value (such as 255) to flag "procedure complete." This could be used to test for errors. If First-Time=255, for some reason the Cell was not advanced. This could be useful for debugging.
   - Is the Primary Procedure Result Flag non-zero (is the procedure complete)?
     - No, Exit.
     - Yes, Is a valid Next Cell Number specified for the Result code?
     - No, Error (should only occur during debugging). Sends message to console and SECS DRU General Alarm.
     - Yes,
       - Set the Current Cell Number in the Carrier Status Table to the Next Cell Number corresponding to the Result code.
       - Set the Previous Cell Number to the Cell we're now leaving. This way, if the Cell can't be found next time, the error message can include the number of the Cell that pointed nowhere, etc.
       - Cancel the Hang-Timer and reset Hang-Timer Number to zero.
       - Reset the First-Time Flag to zero. This way we can detect error by making certain that the First Time flag < > done when the Tree Handler is called.
   - End.

A Poll-State Decision Cell Procedure is called after a carrier destined for a handshaking machine reaches its intermediate Goal at Wait. This procedure will wait for the machine to grant or deny handshaking permission, for a Poll State time-out, count-out, etc. This procedure assumes that an S4FI (Ready to Send Material) has already been transmitted to the machine, and that the Poll-State-Timeout timer has been set to the largest possible SECS transaction timeout (plus a "fudge" factor).

The Decision Cell Procedures make use of several procedures, utilities, and modules. These include PIO, SIO, Timer module and List Manager. The following procedures are used only by the Decision Tree Cell Procedures:
1. The Path Manager procedure controls the allocation of Paths to Carriers. It receives requests from the Decision Tree Cell Procedure to allocate a Path to a Carrier. It takes as arguments the two end points of the Path and the Direction. These arguments are processed according to the algorithm described above to produce one of two results: either the request is granted or it is denied. If the request is granted, the Path Manager updates the Path Allocation Table to show the new Path. In either case, the result (granted or denied) is returned to the calling routine.

The Path Manager returns the following Result Codes:
001 = Path Granted—The requested Path was granted.
002 = Shell Game Path Granted—The requested Path would have blocked an Inbound Carrier; a Shell Game Path was Granted instead.
003 = Path Denied, blocked—Your Carrier is in the way of an Inbound Carrier; request a Shell Game Path.
004 = Path Denied, Purge—The requested Path could not be granted; Purge the Carrier.
255 = Not Complete—The Path is denied temporarily.

The Carrier Mover executes the physical material carrier moves. It receives requests from the Decision Tree Cell Procedure to move particular carriers. It receives the carrier number as an argument and executes the algorithm described above using the Carrier Status Table and the Station Status Table to determine whether the requested move can be made. If the requested move can be made, the procedure uses the ECIDs supplied by the host that define the mechanical configuration of the node and any other information required to set the hardware output signals to the levels required to execute the move. The procedure returns to the calling routine a result specifying whether the requested move was initiated or not.

The PIO is responsible for implementing all timing restrictions required by the node's mechanical hardware. These include:
1. Enforcing dead time between motor reversals.
2. Enforcing non-overlap between up and down lift mechanism commands.

This responsibility will often make it impossible for the Carrier Mover to execute an instruction in one call to its procedure. In such cases, the Carrier Mover must begin by starting any required timers and return with a "not finished" result. The Decision Tree Cell Procedure must stall at this point until the Carrier Mover's time-outs are complete and the procedure returns with a "finished" result.

The Carrier Mover moves more than just carriers. It moves lifts transfers and stops.

The Carrier Mover returns the following Result Codes:
001 = Move Complete The Carrier reached its Goal (the end of its Path).
002 = Intermediate Move Complete The Carrier reached an intermediate goal (a Path element with its Hold bit set).
*** = Abort Move:
  016 = Abort Move, Carrier blocked Get back to Scan.
  017 = Abort Move, Machine Abort The Machine sent the DRU an S4F69 midmove.
  018 = Abort Move, Negative Surprise The Carrier has disappeared (jam or BOP).
255 = Not Complete The move is still being executed.

The Carrier Mover procedure is as follows:
- Is this the First Time that the Carrier Mover has been called?
  - Yes,
    - Is the Current Station an Entry/Exit Station?
    Yes, Handle Lift to get Carrier into DRU (as appropriate) . . .
    No, continue
  No, Continue.
- Check the Negative Surprise Flag (NegSurprise) in the Carrier Status Table (which was set by the Event Detector), return RESULT = 18 if the flag is set (do not reset the flag).
- Check to Path Blocked Flag (SCT.PathBlocked), return RESULT = 16 if the flag is set (do not reset the flag).
- Check for SECS messages from the Machine (Abort, MTM, etc.)
- Based on CellStatus, do one of the following:
  10 Lift Carrier Outbound to Machine.
  20 Lift Carrier Inbound from Machine.
  30 Initiate Carrier Move.
  40 Move Carrier.

The Bar Code Scanner interfaces through an SIO port low-level drivers of which are similar to the SECS drivers. The low-level driver requirements are similar: the transmit buffer must be self-draining and the receive buffer must be filled by an interrupt-driven routine.

When everything works correctly, the bar code scanner will never send characters to the SIO receiver unless it has been commanded to do so. Thus, the receive buffer can be polled when a message is expected from the bar code scanner, and otherwise be ignored.

The Bar Code Scanner procedure receives as an argument from the Decision Tree Cell Procedure a command, e.g., to start a read operation. The Bar Code Scanner procedure responds by filling the self-draining transmit buffer with the required characters and then returning to the calling routine with a "not finished" result.

The Decision TreeCell Procedure uses the "not finished" result to stall at the current Cell, so each polling loop will call the Bar Code Scanner Procedure again (until a "finished" result is returned or the hang timer times out). During these repeated calls, waiting for a result, the Bar Code Scanner Handler Procedure must keep track of what it is doing. To do this, it uses the First-Time Flag and global variables.

When the low-level receive routine indicates that the message has been received, the Bar Code Scanner procedure returns one of several "finished" results to the calling routine. These might include: Good Read, No Read, and Alarm.

Based on this result, the Decision Tree must take the appropriate action. This will usually consist of copying the bar code to the appropriate place in the Carrier Status Table. Whatever the action, the low-level receive buffer will serve as the source for the data.

The Exit Carrier Controller is executed immediately before the Carrier Controller returns control back to the Executive.

The Station/Path Table Indexer is used to access the Station Status Table and the Path Allocation Table. Both tables are viewed logically as collections of two-dimensional arrays. In order to conserve memory, the tables are physically implemented as collections of linear arrays; each X,Y plane is compressed into a single X-axis. This procedure deals only with the X,Y to X compression, it does not deal with the logical Z-axis. This routine accepts as parameters the desired logical two-dimensional X,Y values and returns the corresponding index into the one-dimensional representation of the table.

The Station Number/Coordinate Translator translates the standard two-byte Station number to the X,Y coordinates of the Station, as used by the Station Status Table and the Path Allocation Table.

The Get Sensor Settle Time function returns the Sensor Settle Time (in milliseconds) for the specified Station based on the location of the Station and the type of Station.

The SECS Controller module is the component within the DRU software package responsible for managing the delivery and receipt of messages passed between interconnected elements of the material handling system. As indicated above, these messages conform to the Semi Equipment Communications Standard (SECS) protocol.

The SECS protocol provides for delivery of information in blocks less than or equal to 256 bytes in length. Each block usually contains a header, data, and a checksum, although message blocks do not require the data area. Messages consist of one or more such blocks. The successful transmission of any block requires "handshaking" between the sending and receiving ends of the communication line. The protocol assumes half duplex transmission, requiring the line to be "turned around" between transmitting and receiving sessions. The contents of a message header identifies the specific type of message being delivered.

For received messages, the management process requires not only the verification of each block for conformance to a strict format defined by the SECS Standard, but also the buffering and concatenation of related blocks into complete messages for subsequent interpretation. Since certain messages may be extremely long (i.e. multiple blocks), it is necessary to begin the interpretation process before an entire message has passed through the communication channel. For received messages, this process, called parsing, consists of the decoding of ASCII strings into more compact data types which can be efficiently used by other modules such as the Carrier Controller or the List Manager. Messages in the SECS Standard contain large quantities of ASCII text to define commands. The parsing procedure compares stored text associated with a given message with that received through the communication port as a method of verifying legal transmissions and determining what is intended by the sender.

Interpretation of a message may result in an immediate action being performed by the SECS Controller, or in a request for a co-resident module to process data within the message. Requests of this type are delivered in the form of "opcodes" addressed to a specific module (Carrier Controller) via a global queue.

As stated above, the Executive module calls the two subservient controller modules in an endless loop. With each pass through the loop, all opcodes addressed to the SECS Controller are removed from the global queue and processed accordingly. These opcodes dictate the subsequent actions to be taken by the SECS Controller.

For transmitted messages, the management process consists of detecting the conditions which dictate the delivery of messages, building individual message blocks containing appropriate ASCII text, and verifying that each block is successfully received by the designated partner in the DRU network. This translation process is called de-parsing and serves to expand memory efficient data structures into the less efficient data format required by the SECS Standard.

The DRU system design requires that each DRU must communicate with a host computer and two slave process machines (machine 2 and machine 4). All three communication paths use the SECS protocol and all three are asynchronous. This requires the SECS Controller to be able to deal with several simultaneous transactions, receiving and/or transmitting through each of three ports in response to real time interrupts from the respective UART devices while queuing other requests for action by co-resident modules.

A set of assembly language routines is accessible to the SECS Controller module for the purpose of moving individual characters of a message block to and from the UART devices dedicated to each of the communication lines. These routines maintain buffers sufficient to store one complete message block, including handshaking characters. A receive buffer is emptied by the SECS Controller and filled by the assembly language routines. A transmit buffer is filled by the SECS Controller and emptied by the assembly language routines.

The primary data structures used by the SECS Controller are designed to facilitate rapid searches based on key values. Key values are either Stream and Function data or Master Decision Tree Cell Numbers. All table searches use a binary search algorithm, isolating matching entries in the smallest number of iterations.

Entries in tables are organized in ascending key value. That is, the Master Decision Tree Table is organized in ascending Cell Number order and the Stream and Function Descriptor Table is organized in ascending Stream and Function order. When new entries are made in these tables, they must be placed in the proper position.

The Master Decision Tree Table is a matrix of all possible processing steps which can be invoked in order to move a Task from initiation to completion. As described above, a Task is the complete sequence of events required to deliver a SECS message and receive its reply in the transmit mode, or to receive a message and send its reply in the receive mode. (These "Tasks" are to be distinguished from the tasks performed by a DRU in the disposition of material carriers.). Messages which do not require replies are completely processed when all blocks of the message are properly transmitted through the channel and any actions designated by the message are performed. This may imply insertion of commands into the Command Queue destined for other modules in the Executive Polling Loop, or editing of any of the Lists using the List Manager utility. Each entry in the Master Decision Tree Table is identified with a unique Cell Number so that the current state of processing of any active Task which spans multiple polling cycles is known. On each subsequent polling cycle, Tasks in the Active Task Table are moved as far down the Master Decision Tree as is possible given the results of the executed procedures at each step.

The Active Task Table is a "roster" of messages which are currently using the dedicated communication hardware. Since all communication channels are half-duplex, only three conversations can be active simultaneously (i.e. one direction for the host, machine 2, and machine 4). The host channel allows for suspension of certain message processing in order to service higher priority Tasks. Consequently, the Active Task Table contains room for four unique Tasks, one of which is in suspension if the table is full.

The Outgoing Message Queue is used to accumulate message requests which cannot be immediately serviced due to the lack of availability of the appropriate communication channel. This queue grows as other modules in the system send commands to the SECS Controller and is gradually purged as active Tasks are completed and space in the Active Task Table becomes available.

All messages are tested for legality according to the content of the Stream and Function Descriptor Table prior to being serviced. Some messages are supported in only one direction, so a match for a specific Stream, Function, and Direction is required. If a received message is not located in the Stream and Function Descriptor Table, an S9 message is returned, indicating the type of mismatch detected.

When a message is found to be legal, a parsing or de-parsing model is used depending on the direction of transmission. Parsing models are used to evaluate the content of each received message. De-parsing models are used to construct outgoing messages.

Message headers are a requisite part of every message block. The system bytes of all replies to the host and all DRU-initiated Alarms must contain an exact copy of the system bytes received from the host. The content of the device ID bytes depends on the communication channel.

The SECS Controller Master Decision Tree Table is a "map" of all possible procedures which can be invoked in order to move a Task from recognition to completion. Several distinct paths may lead toward completion of a Task. The specific path used depends on the results achieved by the execution of individual procedures. This table is an array of records, each of which defines a position (i.e. a procedure to be executed) along one of the paths toward completion.

Each position along a given path is called a "Cell". A Cell is identified by a unique number and all Cells within the table are organized in ascending Cell Number order. The current state of processing of any active Task is defined by the Cell Number associated with that Task. On each pass through the Executive polling loop, each of the active Tasks in turn is tested against the criteria specified by its respective Cell Number. If a process specified by a Cell is completed, the Task is assigned the next Cell Number associated with a given path. This process continues until a complete path is traversed, at which time the Task is purged from the active Task table.

Figure 17:
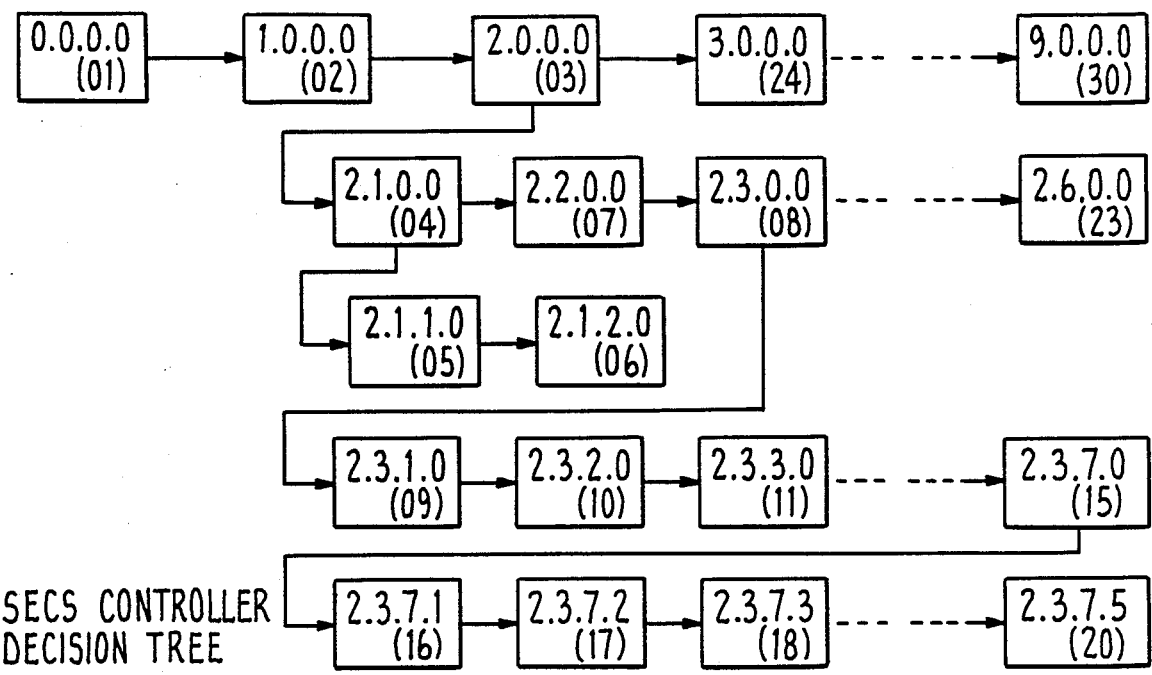
FIG. 17 is a flow chart illustrating the Decision Tree of the SECS Controller Module.

FIG. 17 is a representation of the SECS Controller Master Decision Tree structure. It is not intended as a representation of the specific Tasks performed by the SECS Controller, but rather as an illustration of the methodology of Task processing. A completed path is shown as any location which does not have a subsequent Cell Number. For example, reaching the Cell Number 2.6.0.0 indicates a completed path (i.e. a fully processed Task). If, however, the result of the processing at Cell 2.3.0.0 required the next level of the Decision Master Tree to be executed, then the first opportunity for a completed path would be at Cell 2.3.7.0.

The "depth" of the Master Decision Tree and the number of "branches" from each level are expandable without limitation. The depth of the tree determines the number of digits in the Cell Number. This Cell Number is expressed as:

TYPE Cell NO=ARRAY [1..MAX DEPTH] OF BYTE;

The branch location is a measure of the position along any given level (depth value). According to the above definition, there may be as many as 256 branches at any level; this could be expanded if the Cell Number definition was changed to an array of words.

If the Master Decision Tree shown in FIG. 17 represented all the currently defined decision paths for the SECS Controller, then the following declaration would be appropriate

CONST MAX DEPTH=4;

and the Cell Number 2.3.7.2 would be represented as:

DECISION TREE[17].NUMBER[1] := 2;
DECISION TREE[17].NUMBER[2] := 3;
DECISION TREE[17].NUMBER[3] := 7;
DECISION TREE[17].NUMBER[4] := 2;

Note that the subscript value for the variable "DECISION TREE" represents the ordered position of the Cell within the table. If each position at a given level is expressed as a byte value, then the maximum number of possible Cells is:

MAX CELLS=MAX DEPTH*256

Not all Cell Numbers must be found in the Master Decision Tree Table and, in practice, a small subset of this number is actually included. The Master Decision Tree Table is then defined as follows, where the value "NUMBER OF CELLS" is determined empirically:

TYPE DECISION TREE TABLE = ARRAY
[ 1 ... NO OF CELLS ] OF CELL DEF;

Each Cell is defined as:

TYPE CELL DEF = RECORD
  NUMBER: CELL NO;
  PROC INDEX: BYTE;
  NEXT PTR: LPTR;
  TIMER: INTEGER;
  EXP PATH: CELL NO;
END;

where
NUMBER identifies the current Cell Number,
PROC INDEX is an index value used to locate a procedure to execute,
NEXT PTR points to a list of next Cells associated with each possible return value from the procedure,
TIMER is a value to be used for extended timing if the process will not be completed during the current polling loop pass, and
EXP PATH identifies the next Cell Number in the event of expiration of the timer.

The NEXT PTR field is a pointer to a list of Cell Numbers associated with the return values from the procedure currently being executed. This pointer is required by Pascal to be associated with a single data type. That is, the maximum return value for any procedure dictates the size of the "Next cell list" for all NEXT PTR's.

For example, if the largest return value for any procedure is 5, then the following declarations would be used to describe the NEXT PTR field within a Cell:

CONST MAX RET = 5;
TYPE NEXT CELL LIST = ARRAY
[ 1 ... MAX RET ] OF CELL NO;
LPTR = NEXT CELL LIST;

The Active Task Table (ATT) contains a list of the messages currently being processed by the SECS Controller. This list is limited to a maximum of four Tasks, but will generally contain fewer than four at any given time. Although message transmission is always half-duplex, Tasks allocated to the host channel can be prioritized, resulting in the suspension of Tasks currently in the ATT while higher priority Tasks are entered and executed.

The transmission of Alarm messages to the host has the effect of terminating any host-initiated message currently in the ATT. The termination process includes sending an Abort message to the host. The host has the responsibility for re-initiating the message if appropriate. DRU-initiated messages currently in the ATT will be suspended rather than terminated. The suspension process includes sending an Abort message to the host, and revising the Cell Number in the ATT so that the entire transmission process will be repeated from the beginning when the host channel becomes available (i.e when all the Alarms have been transmitted).

There are seven different types of Tasks which can produce entries in the ATT. Only four of these can be present simultaneously. Referring to Table 10 below, Task numbers 1 and 3 cannot co-exist in the table. Similarly, Tasks 4 and 5, and Tasks 6 and 7 cannot co-exist.

The channels assigned to machine 2 and machine 4 can only contribute one Task each to the ATT. Once a Task for either of these channels is entered in the table, it must be completed before another Task can be entered. Since all messages transmitted or received via a process machine channel are single block types, processing of these messages is completed in the minimum number of polling loop passes.

TABLE 10

| Task Number | Task Description | Priority |
|---|---|---|
| 1 | Multi-block message from host | 03 |
| 2 | Multi-block messsage to host | 02 |
| 3 | Alarm message to host | 01 |
| 4 | Single block message from M2 | — |
| 5 | Single block message to M2 | — |
| 6 | Single block message from M4 | — |
| 7 | Single block message to M4 | — |

The host channel is treated differently than the process machine channels. A multi-block message being received from the host can be suspended in order to transmit a higher priority multi-block message. While processing the transmit Task, an Alarm (any S5 message) can cause the transmit Task to be suspended. However, the suspended receive Task is aborted at this point and purged from the ATT. This results in one Task in suspension while the Alarm message is being processed. Consequently, two Tasks relative to the host channel may reside concurrently in the ATT. Alarms are never delivered to the machine channels.

All outgoing messages are initially placed in the Outgoing Message Queue. Subsequent activation of the ID Tasks procedure will move a Task to the ATT if there is space available according to pre-defined rules.

The Active Task Table is defined as follows:

```
TYPE    TASK = RECORD
               NUMBER:  CELL NO;
               STRM:    BYTE;
               FUNC:    BYTE;
               DIR:     BYTE;
               DATA:    DPTR;
        END;
        INFO = ARRAY [ 1 ... 42 ] OF BYTE;
        DPTR = INFO;
VAR     ACTIVE TASK TABLE: ARRAY [ 1 ... 5 ] OF TASK;
```

Each Task entry in the table contains specific information about the current state of processing of that Task. The processing state is identified by the current Cell Number within the Master Decision Tree. On each successive invocation of the SECS Controller from the polling loop, the Cell Number within each of the TASK records in the ATT is advanced a maximum of one Cell. This assures equal processing time to each of the channels.

Each Cell Number is associated with a specific action performed by a dedicated procedure. New Cell Numbers are identified within the Decision Tree Table based on the returned value from the current procedure. When a procedure return value indicates that an immediate decision cannot be made, the current Cell Number is returned to the ATT so that on the next pass through the polling loop, another attempt is made to complete the Cell which could not be completed on the last pass. A timer is started the first time a Cell procedure returns a non-definitive result. If the timer expires before the procedure returns a definitive result, an alternate Cell Number for the error condition is placed in the ATT and will be processed during the next cycle. This sequence of events continues until the end of a Decision Tree path is detected, at which time the Task is removed from the ATT.

The Stream and Function of a given Task are required in order to provide a means of checking pending Tasks for entry into the ATT and for use by the parsing or de-parsing procedures. The DIR field of each Task entry takes one of six possible values:

| CONST | D H  | = 1; | { DRU to Host     | } |
|---|---|---|---|---|
|       | D M2 | = 2; | { DRU to Machine2 | } |
|       | D M4 | = 3; | { DRU to Machine4 | } |
|       | H D  | = 4; | { Host to DRU     | } |
|       | M2 D | = 5; | { Machine2 to DRU | } |
|       | M4 D | = 6; | { Machine4 to DRU | } |

The DATA field is a pointer to specific information which is to be incorporated with the message when it is de-parsed. This field will be discussed in greater detail below. Outgoing messages are placed in the ATT if there are no existing Tasks with the same Destination. Alarms are placed in the ATT if there are no other existing Alarms. There are no priorities within the Alarm group. That is, additional Alarms accumulate in the Alarm Queue whenever any Alarm is found in the ATT. The Alarm Queue must be completely purged before any pending Tasks directed to the host channel can be moved to the ATT from the Normal Queue.

Alarms are defined as any S5FI message. These messages are delivered only to the host. A second category of pseudo-alarm conditions exists. These are any of the S9 messages. However, these are automatic responses of the SECS Controller to improperly received messages and are never placed in the Outgoing Message Queue.

The Incoming Message Queues hold temporary results generated by parsing procedures. Parsed messages can result in the modification of global memory (ECIDs), the delivery of commands to other DRU modules via the Command Queue, or the editing of Lists via the List Manager utility.

Since activity can occur on all three channels simultaneously, space must be allocated for storage of individual blocks of three separate messages. The process machine channels are limited to single block messages and, consequently, require only one input buffer per channel to guarantee complete parsing of a message. For the host channel, multi-block messages are common and two identical block buffers are required to properly parse messages. This is because the data within a message can be arbitrarily segmented between two consecutive blocks and it may not be possible to identify the nature of the data which straddles two blocks.

The working portion of the incoming message queues is then defined as:

```
TYPE    BLK BUF = ARRAY [ 0 ... 255 ] OF BYTE;
        IN BUF  = ARRAY [ 0 ... 3 ] OF BLK BUF;
```

The first two members of the IN BUF array are allocated for parsing of host-related messages, while the remaining two service the machine channels. The two buffers allocated to the host are alternately filled with the most recent data received via the SIO routines. The buffer not currently being filled holds the residue data which straddles the block boundary. A portion of this data cannot be parsed until the buffer currently being filled is complete.

Since parsing is an ongoing process during the receipt of multi-block messages, intermediate parsing results must be stored in battery-backed RAM for subsequent secondary processing. The secondary processing takes place only if the entire message is successfully received. For example, as the host is transmitting the S127, F129 message (DELETE ENTRY LIST SEND), the intermediate parsing results will accumulate in the LIST Q. This LIST Q holds ELEMENT records as defined by the List Manager. Each ELEMENT record describes the characteristics of an individual material carrier. If this queue is partially filled when an error is detected in the receive message Stream, the content of the queue is purged and the List Manager is not called. If the complete message Stream is correctly received, the elements of the LIST Q will be delivered to the List Manager as part of the Decision Tree path. Results from the List editing process will then be returned to the host via an S127, F130 message (DELETE ENTRY LIST ACKNOWLEDGE).

```
TYPE  ELEMENT = RECORD
        BARCODE:      ARRAY [ 1 ... 16 ] OF CHAR;
        SOURCE:       ARRAY [ 1 ... 2 ] OF CHAR;
        DESTINATION:  ARRAY [ 1 ... 2 ] OF CHAR;
        ACTION:       INTEGER;
        BIS:          ARRAY [ 1 ... 16 ] OF CHAR;
        TIME1:        ARRAY [ 1 ... 12 ] OF CHAR;
        TIME2:        ARRAY [ 1 ... 12 ] OF CHAR;
      END;
      LIST Q    = ARRAY [ 1 ... MAX LMNT ]
      OF ELEMENT;
```

A similar queue is defined for holding commands to be delivered to other DRU modules.

```
TYPE  CMND DEF = RECORD
        LINK:    CPTR;
        SOURCE:  BYTE;
        TARGET:  BYTE;
        OPCODE:  BYTE;
        EXTEND:  BYTE;
        DATA:    INFO;
      END;
      INFO    = ARRAY [ 1 ... 42 ] OF BYTE;
      CMND Q  = ARRAY [ 1 ... MAX CMND ]
      OF CMND DEF;
```

The Outgoing Message Queues hold message delivery requests which can not be immediately processed due to lack of availability of the specified channel. Requests of this type are placed in one of two FIFO queues. The first queue is reversed for Alarms and the second for standard messages. When process machine communication channels become available, the first Task in the Normal Queue for the specified channel is moved to the Active Task Table and purged from the Normal Queue. When the host communication channel becomes available, the Alarm Queue is serviced first. Only when all Alarms are purged from the Alarm Queue will messages for the host be removed from the Normal Queue.

Entries in either queue are structurally identical to the TASK records described above. They contain the Stream and Function number of the message to be delivered, the Destination, and a pointer to a DATA field to be used by the de-parsing model. For example, the DATA field will contain ALID, ALCD, and ALTX for Alarm messages S5F1. The appropriate de-parsing model for a given message will know how to interpret the content of this DATA field.

The declaration of the Task record is repeated here for clarity:

```
TYPE   TASK = RECORD
                STRM:  BYTE;
                FUNC:  BYTE;
                DIR:   BYTE;
                DATA:  DPTR;
              END;
       INFO = ARRAY [ 1 ... 42 ] OF BYTE;
       DPTR = INFO;
VAR    ALARM Q: ARRAY [ 1 ... 200 ] OF TASK;
       NORM Q:  ARRAY [ 1 ... 100 ] OF TASK;
```

In the case of Alarm messages, the DATA field will point to an array which contains the ALCD, the ALID, and up to 40 ASCII characters representing the ALTX. The de-parser will use this information as the actual message block is constructed. The Alarm code is defined such that bit 8 is used as a flag to indicate whether the Alarm is being set or cleared.

The following is a representation of the bit assignments in the ALCD:

ALCD BYTE

| F C C C C C C C |     F = Flag Bit (0 = clear, 1 = Set)
                        C = Alarm Code Bits One table within the SECS Controller module is used to identify legal messages (i.e. those which have predefined parsing and de-parsing models and which have been defined as supportable in the specified direction). Records within this table are organized in Stream and Function order. A binary search algorithm is used to examine the table and to return the record number for a specified Stream, Function, and Direction, or a "not found" value if no such record exists. Consequently, table space is only assigned to currently supported SECS messages.

In the preferred embodiment of the present invention, seventy-two (72) SECS messages are supported by the DRU system design. These messages are listed in Appendix A hereto which is provided at the end of this detailed description.

The Stream and Function Descriptor Table contains the most basic information regarding supported messages. It includes specific Stream and Function numbers, legal Directions, and indices for locating parsing and de-parsing models. It is used to determine whether a request for processing is to be considered valid and, if so, where to find the appropriate model. This table is initialized at run time by the Initialization module.

The Stream and Function Descriptor Table takes the following form:

```
CONST MAX MSG   = 71;
      NOT FOUND = OFDH;
      D H       = 1;       { DRU to HOST    }
      D M       = 2;       { DRU to MACHINE }
      H D       = 3;       { HOST to DRU    }
      M D       = 4;       { MACHINE to DRU }
TYPE  SF DEF = RECORD
               STRM:    BYTE;
               FUNC:    BYTE;
               DIR:     ARRAY [ 1 ... 4 ]
                        OF BOOLEAN;
               PARSE:   BYTE;
               DPRSE:   BYTE;
               END;
VAR   SF TBL: ARRAY [ 0 ... MAX MSG ] OF SF DEF;
```

The PARSE and DPRSE fields of the SF DEF record are loaded with values which represent the position of the appropriate model in the parsing and de-parsing tables respectively. That is, if the parsing model for S4F1 is the 18th record in the parsing table, the PARSE field for the S4F1 entry in the Stream and Function Descriptor Table will be loaded with the value "18" by the SECS Initialization procedure.

Similarly, the Initialization procedure loads all fields of all records in the Stream and Function Descriptor Table following receipt of a "cold boot" command. The sequence of instructions would look something like the following for the S4F1 message (READY TO SEND MATERIAL):

```
    SF TBL[36].STRM    := 4;
    SF TBL[36].FUNC    := 1;
    SF TBL[36].DIR[1] := FALSE;
    SF TBL[36].DIR[2] := TRUE;
    SF TBL[36].DIR[3] := FALSE;
    SF TBL[36].DIR[4] := TRUE;
    SF TBL[36].PARSE   := 18;
    SF TBL[36].DPRSE   := 19;
```

If a particular message is not supported in a specific direction, the appropriate PARSE or DPRSE field of the record will contain the value "00", which accesses an "inert" model. Although this model should never be accessed, it acts as a second level of protection against processing errors. If any SF TBL[x].DIR[1] or SF TBL[x].DIR[2] fields are set to true, the DPRSE field will contain a usable model index value.

Each parser model is a memory structure which acts as a "recipe" for interpreting and testing the content of received message blocks. Messages are of two basic types: those which consist only of headers and those which consist of headers and data fields. If a message contains a data field, the organization of the data elements must be pre-defined so that the information received can be verified. This provides a second level of verification, since each received message block also contains a checksum.

The STRUCTURE definition for each message is contained in the SECS standard. For example, the message S1F2 (On Line Data) has a STRUCTURE definition as follows:

```
    STRUCTURE:    L,2
```

-continued

```
    1. <MDLN>
    2. <SOFTREV>
```

This indicates that the data field consists of a list of two elements and that each element is a specific data item. In addition, each of the data items will have a defined format so that the number of bytes for each data item is known. The SECS standard identifies 14 possible formats. These formats are summarized in Table 13 below. Format codes are defined as octal values in the SECS Standard. Table 13 provides a conversion to Hex values, since all tables for parsing and de-parsing models show values in Hex.

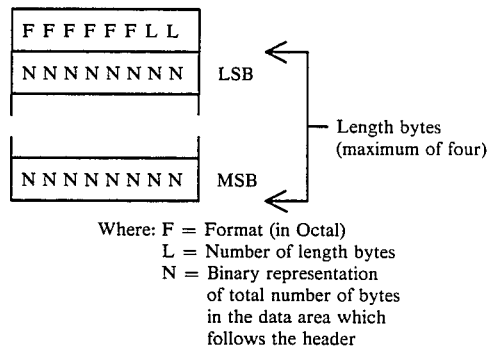

Where: F = Format (in Octal)
L = Number of length bytes
N = Binary representation
of total number of bytes
in the data area which
follows the header As shown above, every list and item begins with a "header." Each header consists of a format byte and up to four length bytes. The length bytes indicate the total number of item or list bytes which follow. The upper six bits of the format byte represent the octal value of one of the format codes. The lower two bits are used for defining the number of length bytes which follow.

Each parser model is a shorthand representation of a message STRUCTURE definition. Each model contains up to six "elements", each of which describes one level of nesting of a STRUCTURE definition. A maximum of six elements is needed. In order to describe the entire STRUCTURE, it is only necessary to define one complete path from the highest to the lowest nesting level. For example, the S127, F131 message is defined with a complicated STRUCTURE as shown in Table 11 below. The non-repetitious portion of this STRUCTURE is outlined, and it is this portion of the STRUCTURE which must be represented in the model.

At the highest level, a list of "n" items exists; each of the "n" items will have the same format. Each item is in turn another list. The second list has two items. The first is a LSTID with format 20H (binary format) and the second is another list. The processing algorithm keeps track of the number of repetitions of each layer that are required and continues processing until each repetition of each layer is exhausted.

As each list is encountered, the list size is used as a counter, with the understanding that all elements in the model below the current list definition must be repeated until the counter value has been exhausted. Counters established for lower level Lists must be completely exhausted before a higher level counter can be decremented.

TABLE 11

STRUCTURE:
```
L,n
  1. L,2
      1. <LSTID1>
      2. L,x
          1. L,a
              1. <ATTVAL1>
                  ȧ. <ATTVALa>
          ẋ. L,a
              1. <ATTVAL1>
                  ȧ. <ATTVALa>
```

In order to describe this structure, it is only necessary to identify the elements as shown below. Using this technique, as shown in Table 12 below, a table is developed which holds this shorthand representation for every supported "receive" message in the DRU environment.

Table 14 shows the totality of parsing models. Each element defines the format and length of a data segment at a particular level of the SECS STRUCTURE. Consistent with the SECS Standard, if the format code is 00H, a LIST is being defined.

Some messages provide for multiple formats for an item which is to be passed at a given level of the STRUCTURE. The parsing model must have a technique for evaluating the received format byte in these situations.

TABLE 12

| ELEMENT NUMBER | FORM |
|---|---|
| 01 | L,n |
| 02 | L,2 |
| 03 | <LSTID> |
| 04 | L,x |
| 05 | L,a |
| 06 | <ATTVAL> |

An extension to the format codes is provided for situations where a message STRUCTURE allows for more than one format type at a given level. For example, message S9F13 (CONVERSATION TIMEOUT) has the following STRUCTURE:

| | |
|---|---|
| MEXP | Format: 20 |
| EDID | Format: 10,20,3( ),5( ) |
| L,2 | |
| 1. <MEXP> | |
| 2. <EDID> | |

Note that the format for EDID can be any of 10 different types. It cannot be known in advance which type will be received. For this situation, the format value FFH in the Parsing Table is used as a flag that a "variable" format is to be expected. The received format will then be checked against a table of possible types as a low-level verification criterion. A miscompare will result in an S9F7 (ILLEGAL DATA) message being generated.

The Pascal declaration for the parsing model is an array of elements, where each element is a record describing one layer of the STRUCTURE. Complicated messages, such as S127, F131 (UPDATE LIST SEND), use all six elements to completely describe the STRUCTURE. Others, such as S1F69 (GOING OFF LINE), use only one element. The SIZE field of the model indicates how many of the ELEMENTS contain significant information. This value is used as a loop processing value by the parser.

```
TYPE MODEL =  RECORD
                SIZE: BYTE;
                BODY: ARRAY [1 .. 6] OF ELEMENT;
                END;
     ELEMENT = RECORD
                FORMAT: BYTE;
                LENGTH: WORD;
                INDEX: BYTE;
                END;
VAR PRS TBL : ARRAY [0 .. MAX PM] OF MODEL;
```

The INDEX field of each ELEMENT record contains a value to be used for locating a procedure which performs operations unique to that element and model. A list of such procedures is maintained. Some procedures are "general purpose" enough that they may be used to process similarly organized elements within different parsing models. Many procedures will be unique, being used by only one element of one parsing model. The procedures will be processed with the use of a Pascal "CASE" statement, where the CASE selector identifies a procedure in the list as the one which is to be executed.

Although the PRS TBL is allocated space by virtue of declaring it as a variable, the Initialization procedure must load all of the values shown in Table 14 into the appropriate fields of each ELEMENT record before the table can be used. An example of the initialization of the PRS TBL follows:

| | | |
|---|---|---|
| P127-131.SIZE := 6; | | {six elements in the array} |
| P127-131.BODY[1].FORMAT | := $00; | {format "00" implies a list} |
| P127-131.BODY[1].LNG | := $FFFF; | {value FFFF implies variable length} |
| P127-131.BODY[1].INDEX | := $1E; | {use the 30th procedure in the list} |
| . | | |
| P127-131.BODY[6].FORMAT | := $FF | {"FF" implies variable format} |
| P127-131.BODY[6].LNG | := $FFFF | {use receive value as length} |
| P127-131.BODY[6].INDEX | := $05 | {use the 5th procedure in the list} |

With the PRS TBL initialized, an element of a parsing model would be processed by first copying the entire model to a general purpose buffer (called PMOD BUF below) and then locating the desired parsing procedure using a symbolic reference for the CASE selector.

```
VAR PMOD BUF: MODEL;
    IDX: BYTE;
    ELEM CNT: BYTE;
```

```
IDX := VALID MSG (STRM,FUNC,DIR);
IF IDX < NOT FOUND
  THEN
    BEGIN
      PMOD BUF := PRS TBL[SF TBL[IDX].PARSE];
      .
      .
      .
      CASE PMOD BUF.BODY[ELEM CNT].INDEX OF
        01: ABORT;
        02: ONLINE;
        .
        .
        .
        32: P127 6;
    END;
END;
```

TABLE 13

| FORMAT BYTE | | DATA TYPE EQUIVALENTS | | |
|---|---|---|---|---|
| DATA TYPE | LNG BITS | OCTAL | HEX | DEFINITION |
| 000000 | xx | 00 | 00 | List |
| 001000 | xx | 10 | 20 | Binary |
| 001001 | xx | 11 | 24 | Boolean |
| 010000 | xx | 20 | 40 | ASCII |
| 011000 | xx | 30 | 60 | Signed Integer, 8 Byte |
| 011001 | xx | 31 | 64 | Signed Integer, 1 Byte |
| 011010 | xx | 32 | 68 | Signed Integer, 2 Byte |
| 011100 | xx | 34 | 70 | Signed Integer, 4 Byte |
| 100000 | xx | 40 | 80 | Floating Point, 8 Byte |
| 100100 | xx | 44 | 90 | Floating Point, 4 Byte |
| 101000 | xx | 50 | A0 | Unsigned Integer, 8 Byte |
| 101001 | xx | 51 | A4 | Unsigned Integer, 1 Byte |
| 101010 | xx | 52 | A8 | Unsigned Integer, 2 Byte |
| 101100 | xx | 54 | B0 | Unsigned Integer, 4 Byte |

TABLE 14

| MESSAGE | 01 FR | 01 LN | 01 IN | 02 FR | 02 LN | 02 IN | 03 FR | 03 LN | 03 IN | 04 FR | 04 LN | 04 IN | 05 FR | 05 LN | 05 IN | 06 FR | 06 LN | 06 IN |
|---|---|---|---|---|---|---|---|---|---|---|---|---|---|---|---|---|---|---|
| Sx,F0 | 00 | 0000 | 00 | — | — | — | — | — | — | — | — | — | — | — | — | — | — | — |
| S1,F1 | 00 | 0000 | 01 | — | — | — | — | — | — | — | — | — | — | — | — | — | — | — |
| S1,F2 | 00 | 0002 | 02 | 40 | 0006 | 03 | 40 | 0006 | 04 | xx | xxxx | xx | xx | xxxx | xx | xx | xxxx | xx |
| S1,F3 | 00 | FFFF | 05 | 40 | 0006 | 06 | xx | xxxx | xx | xx | xxxx | xx | xx | xxxx | xx | xx | xxxx | xx |
| S1,F5 | xx | xxxx | xx | xx | xxxx | xx | xx | xxxx | xx | xx | xxxx | xx | xx | xxxx | xx | xx | xxxx | xx |
| S1,F7 | xx | xxxx | xx | xx | xxxx | xx | xx | xxxx | xx | xx | xxxx | xx | xx | xxxx | xx | xx | xxxx | xx |
| S1,F69 | 00 | 0000 | 07 | — | — | — | — | — | — | — | — | — | — | — | — | — | — | — |
| S2,F1 | 00 | 0002 | | 40 | 0006 | | FF | FFFF | | xx | xxxx | xx | xx | xxxx | xx | xx | xxxx | xx |
| S2,F3 | 20 | FFFF | | xx | xxxx | xx | xx | xxxx | xx | xx | xxxx | xx | xx | xxxx | xx | xx | xxxx | xx |
| S2,F5 | 40 | 0006 | | xx | xxxx | xx | xx | xxxx | xx | xx | xxxx | xx | xx | xxxx | xx | xx | xxxx | xx |
| S2,F7 | 40 | 0006 | | xx | xxxx | xx | xx | xxxx | xx | xx | xxxx | xx | xx | xxxx | xx | xx | xxxx | xx |
| S2,F9 | 40 | 0006 | | xx | xxxx | xx | xx | xxxx | xx | xx | xxxx | xx | xx | xxxx | xx | xx | xxxx | xx |
| S2,F11 | 00 | 0000 | | — | — | | — | — | | — | — | | — | — | | — | — | |
| S2,F13 | 00 | FFFF | | 40 | 0006 | | xx | xxxx | xx | xx | xxxx | xx | xx | xxxx | xx | xx | xxxx | xx |
| S2,F15 | 00 | FFFF | | 00 | 0002 | 40 | 0006 | | FF | xxxx | | xx | xxxx | xx | xx | xxxx | xx | |
| S2,F17 | 00 | 0000 | | — | — | | — | — | | — | — | | — | — | | — | — | |
| S2,F18 | 40 | 000C | | xx | xxxx | xx | xx | xxxx | xx | xx | xxxx | xx | xx | xxxx | xx | xx | xxxx | xx |
| S2,F21 | A4 | 0001 | | xx | xxxx | xx | xx | xxxx | xx | xx | xxxx | xx | xx | xxxx | xx | xx | xxxx | xx |
| S2,F23 | 00 | 0005 | | FF | FFFF | | 40 | 0006 | | FF | FFFF | | FF | FFFF | | FF | FFFF | |
| S2,F25 | 20 | FFFF | | xx | xxxx | xx | xx | xxxx | xx | xx | xxxx | xx | xx | xxxx | xx | xx | xxxx | xx |
| S4,F1 | 00 | 0002 | | 20 | 0001 | | 40 | 0010 | | xx | xxxx | xx | xx | xxxx | xx | xx | xxxx | xx |
| S4,F3 | 00 | 0002 | | 20 | 0001 | | 40 | 0010 | | xx | xxxx | xx | xx | xxxx | xx | xx | xxxx | xx |
| S4,F5 | 00 | 0002 | | 20 | 0001 | | 40 | 0010 | | xx | xxxx | xx | xx | xxxx | xx | xx | xxxx | xx |
| S4,F7 | 00 | 0002 | | 20 | 0001 | | 40 | 0010 | | xx | xxxx | xx | xx | xxxx | xx | xx | xxxx | xx |
| S4,F63 | 00 | 0002 | | 20 | 0001 | | 40 | 0010 | | xx | xxxx | xx | xx | xxxx | xx | xx | xxxx | xx |
| S4,F65 | 00 | 0002 | | 20 | 0001 | | 40 | 0010 | | xx | xxxx | xx | xx | xxxx | xx | xx | xxxx | xx |
| S4,F67 | 00 | 0002 | | 20 | 0001 | | 40 | 0010 | | xx | xxxx | xx | xx | xxxx | xx | xx | xxxx | xx |
| S4,F69 | 00 | 0002 | | 20 | 0001 | | 40 | 0010 | | xx | xxxx | xx | xx | xxxx | xx | xx | xxxx | xx |
| S5,F2 | 20 | 0001 | | xx | xxxx | xx | xx | xxxx | xx | xx | xxxx | xx | xx | xxxx | xx | xx | xxxx | xx |
| S5,F3 | 00 | 0002 | | 20 | 0001 | | A4 | 0001 | | xx | xxxx | xx | xx | xxxx | xx | xx | xxxx | xx |
| S5,F5 | 00 | FFFF | | A4 | 0001 | | xx | xxxx | xx | xx | xxxx | xx | xx | xxxx | xx | xx | xxxx | xx |
| S9,F1 | 20 | 000A | | xx | xxxx | xx | xx | xxxx | xx | xx | xxxx | xx | xx | xxxx | xx | xx | xxxx | xx |
| S9,F3 | 20 | 000A | | xx | xxxx | xx | xx | xxxx | xx | xx | xxxx | xx | xx | xxxx | xx | xx | xxxx | xx |
| S9,F5 | 20 | 000A | | xx | xxxx | xx | xx | xxxx | xx | xx | xxxx | xx | xx | xxxx | xx | xx | xxxx | xx |
| S9,F7 | 20 | 000A | | xx | xxxx | xx | xx | xxxx | xx | xx | xxxx | xx | xx | xxxx | xx | xx | xxxx | xx |
| S9,F9 | 20 | 000A | | xx | xxxx | xx | xx | xxxx | xx | xx | xxxx | xx | xx | xxxx | xx | xx | xxxx | xx |
| S9,F11 | 20 | 000A | | xx | xxxx | xx | xx | xxxx | xx | xx | xxxx | xx | xx | xxxx | xx | xx | xxxx | xx |
| S9,F13 | 00 | 0002 | | 40 | 0006 | | FF | xxxx | | xx | xxxx | xx | xx | xxxx | xx | xx | xxxx | xx |
| S127,F129 | 00 | FFFF | | 00 | 0002 | | 20 | 0001 | | 00 | FFFF | | 00 | FFFF | | FF | xxxx | |
| S127,F131 | 00 | FFFF | | 00 | 0002 | | 20 | 0001 | | 00 | FFFF | | 00 | FFFF | | FF | xxxx | |
| S127,F132 | 00 | 0002 | 00 | FFFF | | 00 | 0002 | | 20 | 0001 | | 00 | FFFF | | 20 | 0001 | | |
| S127,F133 | 00 | FFFF | | 00 | FFFF | | 00 | 0002 | | 20 | 0001 | | FF | xxxx | | xx | xxxx | xx |
| S127,F135 | 00 | FFFF | | 20 | 0001 | | xx | xxxx | xx | xx | xxxx | xx | xx | xxxx | xx | xx | xxxx | xx |

All values in Hex
— Not Used (Header Only)
xx = Don't Care (Padded)
FR = Format (00 List, FF Variable)
LN = Length (FF Variable)
IN = Index Each de-parser model acts as a "recipe" for constructing actual SECS messages. Data to be incorporated into the message body is supplied by other modules in the polling loop via the Command Queue. The de-parser model follows the same general rules as described above for parsing models. The SECS Standard STRUCTURE definition for each message is represented as an array of elements, each of which describes one nesting level of the STRUCTURE. Some de-parser models must be dynamically constructed by the companion parser models because certain list sizes are not known in advance. Only when a received message is processed can the de-parser model for the reply be defined. However, once an incoming message is received, there is no difference in the way a de-parser model is used in order to construct an outgoing message.

For reference purposes, those models which are generated by the SECS Initialization module are called "fixed length" models, while those which must be constructed by a companion parser are called "variable length." Variable length models are confined to responses required for messages received from the host.

The model definition is consistent with the description provided above. A maximum of six elements is required to completely describe the non-repetitious portion of the most complicated SECS message STRUCTURE.

```
TYPE ELEMENT = RECORD
                 FORMAT: BYTE;
                 LNG: WORD;
                 INDEX: BYTE;
               END;
     MODEL =  RECORD
                 SIZE: BYTE;
                 BODY: ARRAY [1 ... 6] OF ELE-
                       MENT;
               END;
VAR DP12 : MODEL;
```

Unused elements of any model will be padded with inconsequential values. The first byte of each model defines the number of elements in the model, so that the processing algorithm will know when it has finished.

Each "ELEMENT" contains a byte which describes the format of the outgoing data, a word which describes the length of the outgoing data (in bytes), and an index value used to locate de-parsing procedures dedicated to each element of each model.

The FORMAT field of the ELEMENT record is defined exactly as specified by the SECS standard for data types. The lower two bits of the "FORMAT" byte are used as an indicator of the number of length bytes to follow. This value is known in advance for "fixed length" models, but must be calculated by the companion parser for "variable length" models. The upper six bits of the "FORMAT" byte will contain the data type description.

In the S1F2 example, the model would result in a memory arrangement as shown in Table 15 below. For messages containing only headers, the "FORMAT" byte will indicate a list, while the "LNG" bytes will be set to zero, to indicate a header only condition. The "INDEX" byte will specify a procedure which builds a header.

Variable Length models will also be arrays of records of type "ELEMENT," but the content of the elements will be determined by actions performed by the parser when it parses the corresponding primary message.

TABLE 15

| List Format | 0 0 0 0 0 0 0 1 | ←— List |
| List Element Length | 0 0 0 0 0 0 1 0 | ←— 2 Elements |
| Procedure Index | 0 0 0 0 0 0 0 0 | ←— |
| Item 1 Format | 0 1 0 0 0 0 0 1 | ←— ASCII Item |
| Item 1 Length | 0 0 0 0 0 1 1 0 | ←— 6 Bytes |
| Procedure Index | 0 0 0 0 0 0 0 1 | ←— Get Data Proc |
| Item 2 Format | 0 1 0 0 0 0 0 1 | ←— ASCII Item |
| Item 2 Length | 0 0 0 0 0 1 1 0 | ←— 6 Bytes |
| Procedure Index | 0 0 0 0 0 0 0 1 | ←— Get Data Proc |

TABLE 16

| MESSAGE | 01 FR | 01 LN | 01 IN | 02 FR | 02 LN | 02 IN | 03 FR | 03 LN | 03 IN | 04 FR | 04 LN | 04 IN | 05 FR | 05 LN | 05 IN | 06 FR | 06 LN | 06 IN |
|---|---|---|---|---|---|---|---|---|---|---|---|---|---|---|---|---|---|---|
| Sx,F0 | 00 | 0000 | 00 | — | — | — | — | — | — | — | — | — | — | — | — | — | — | — |
| S1,F1 | 00 | 0000 | 00 | — | — | — | — | — | — | — | — | — | — | — | — | — | — | — |
| S1,F2 | 00 | 0002 | 01 | 40 | 0006 | 02 | 40 | 0006 | 03 | xx | xxxx | xx | xx | xxxx | xx | xx | xxxx | xx |
| S1,F4 | 00 | FFFF | 01 | FF | xxxx | 04 | xx | xxxx | xx | xx | xxxx | xx | xx | xxxx | xx | xx | xxxx | xx |
| S1,F6 | 00 | FFFE | | xx | xxxx | xx | xx | xxxx | xx | xx | xxxx | xx | xx | xxxx | xx | xx | xxxx | xx |
| S1,F8 | 00 | FFFF | | 00 | 0002 | | 40 | 0006 | | FF | xxxx | | xx | xxxx | xx | xx | xxxx | xx |
| S1,F69 | 00 | 0000 | 00 | — | — | — | — | — | — | — | — | — | — | — | — | — | — | — |
| S2,F2 | 20 | 0001 | | xx | xxxx | xx | xx | xxxx | xx | xx | xxxx | xx | xx | xxxx | xx | xx | xxxx | xx |
| S2,F4 | 20 | 0001 | | xx | xxxx | xx | xx | xxxx | xx | xx | xxxx | xx | xx | xxxx | xx | xx | xxxx | xx |
| S2,F6 | 20 | FFFF | | xx | xxxx | xx | xx | xxxx | xx | xx | xxxx | xx | xx | xxxx | xx | xx | xxxx | xx |
| S2,F8 | 20 | 0001 | | xx | xxxx | xx | xx | xxxx | xx | xx | xxxx | xx | xx | xxxx | xx | xx | xxxx | xx |
| S2,F10 | 20 | FFFF | | xx | xxxx | xx | xx | xxxx | xx | xx | xxxx | xx | xx | xxxx | xx | xx | xxxx | xx |
| S2,F12 | 00 | FFFF | | 40 | 0006 | | xx | xxxx | xx | xx | xxxx | xx | xx | xxxx | xx | xx | xxxx | xx |
| S2,F14 | 00 | FFFF | | FF | xxxx | | xx | xxxx | xx | xx | xxxx | xx | xx | xxxx | xx | xx | xxxx | xx |
| S2,F16 | 20 | 0001 | | xx | xxxx | xx | xx | xxxx | xx | xx | xxxx | xx | xx | xxxx | xx | xx | xxxx | xx |
| S2,F17 | 00 | 0000 | | — | — | — | — | — | — | — | — | — | — | — | — | — | — | — |
| S2,F18 | 40 | 0012 | | xx | xxxx | xx | xx | xxxx | xx | xx | xxxx | xx | xx | xxxx | xx | xx | xxxx | xx |
| S2,F22 | A4 | 0001 | | xx | xxxx | xx | xx | xxxx | xx | xx | xxxx | xx | xx | xxxx | xx | xx | xxxx | xx |
| S2,F24 | 20 | 0001 | | xx | xxxx | xx | xx | xxxx | xx | xx | xxxx | xx | xx | xxxx | xx | xx | xxxx | xx |
| S2,F26 | 20 | FFFF | | xx | xxxx | xx | xx | xxxx | xx | xx | xxxx | xx | xx | xxxx | xx | xx | xxxx | xx |
| S4,F1 | 00 | 0002 | | 20 | 0001 | | 40 | 0010 | | xx | xxxx | | xx | xxxx | xx | xx | xxxx | xx |
| S4,F3 | 00 | 0002 | | 20 | 0001 | | 40 | 0010 | | xx | xxxx | | xx | xxxx | xx | xx | xxxx | xx |
| S4,F5 | 00 | 0002 | | 20 | 0001 | | 40 | 0010 | | xx | xxxx | | xx | xxxx | xx | xx | xxxx | xx |
| S4,F7 | 00 | 0002 | | 20 | 0001 | | 40 | 0010 | | xx | xxxx | | xx | xxxx | xx | xx | xxxx | xx |
| S4,F63 | 00 | 0002 | | 20 | 0001 | | 40 | 0010 | | xx | xxxx | | xx | xxxx | xx | xx | xxxx | xx |
| S4,F65 | 00 | 0002 | | 20 | 0001 | | 40 | 0010 | | xx | xxxx | | xx | xxxx | xx | xx | xxxx | xx |
| S4,F67 | 00 | 0002 | | 20 | 0001 | | 40 | 0010 | | xx | xxxx | | xx | xxxx | xx | xx | xxxx | xx |
| S4,F69 | 00 | 0002 | | 20 | 0001 | | 40 | 0010 | | xx | xxxx | | xx | xxxx | xx | xx | xxxx | xx |
| S5,F1 | 00 | 0003 | | 20 | 0001 | | A4 | 0001 | | 40 | 0028 | | xx | xxxx | xx | xx | xxxx | xx |

TABLE 16-continued

| MESSAGE | 01 FR | 01 LN | 01 IN | 02 FR | 02 LN | 02 IN | 03 FR | 03 LN | 03 IN | 04 FR | 04 LN | 04 IN | 05 FR | 05 LN | 05 IN | 06 FR | 06 LN | 06 IN |
|---|---|---|---|---|---|---|---|---|---|---|---|---|---|---|---|---|---|---|
| S5,F4 | 20 | 0001 | xx | xxxx | xx | xx | xxxx | xx | xx | xxxx | xx | xx | xxxx | xx | xx | xxxx | xx |
| S5,F6 | 00 | FFFF | 00 | 0003 | | 20 | 0001 | | A4 | 0001 | | 40 | 0028 | | xx | xxxx | xx |
| S6,F1 | 00 | 0004 | FF | xxxx | | FF | xxxx | | 40 | 000C | | 00 | FFFF | | FF | xxxx | |
| S9,F1 | 20 | 000A | xx | xxxx | xx | xx | xxxx | xx | xx | xxxx | xx | xx | xxxx | xx | xx | xxxx | xx |
| S9,F3 | 20 | 000A | xx | xxxx | xx | xx | xxxx | xx | xx | xxxx | xx | xx | xxxx | xx | xx | xxxx | xx |
| S9,F5 | 20 | 000A | xx | xxxx | xx | xx | xxxx | xx | xx | xxxx | xx | xx | xxxx | xx | xx | xxxx | xx |
| S9,F7 | 20 | 000A | xx | xxxx | xx | xx | xxxx | xx | xx | xxxx | xx | xx | xxxx | xx | xx | xxxx | xx |
| S9,F9 | 20 | 000A | xx | xxxx | xx | xx | xxxx | xx | xx | xxxx | xx | xx | xxxx | xx | xx | xxxx | xx |
| S9,F11 | 20 | 000A | xx | xxxx | xx | xx | xxxx | xx | xx | xxxx | xx | xx | xxxx | xx | xx | xxxx | xx |
| S9,F13 | 00 | 0002 | 40 | 0006 | | FF | xxxx | | xx | xxxx | xx | xx | xxxx | xx | xx | xxxx | xx |
| S127,F130 | 00 | 0002 | 00 | FFFF | | 00 | 0002 | | 20 | 0001 | | 00 | FFFF | | 20 | 0001 | |
| S127,F131 | 00 | FFFF | 00 | 0002 | | 20 | 0001 | | 00 | FFFF | | 00 | FFFF | | FF | xxxx | |
| S127,F132 | 00 | 0002 | 00 | FFFF | | 00 | 0002 | | 20 | 0001 | | 00 | FFFF | | 20 | 0001 | |
| S127,F134 | 00 | FFFF | 00 | 0002 | | 20 | 0001 | | 00 | FFFF | | 00 | FFFF | | FF | xxxx | |
| S127,F136 | 00 | FFFF | 00 | 0002 | | 20 | 0001 | | 00 | FFFF | | 00 | FFFF | | FF | xxxx | |

All values in Hex
— Not Used (Header Only)
xx = Dont's Care (Padded)
FR = Format (00 List, FF Variable)
LN = Length (FF Variable)
IN = Index A message block is defined as a buffer area used by the parser, de-parser, and Data Link modules as the smallest working unit of a complete message. Message block structure is illustrated in Table 17 below. The message block is defined as:

TYPE BLOCK=ARRAY [1..257] OF BYTE;

A message header structure is defined to match the definition of the SECS Standard so that a procedure can operate on passed parameters to produce the appropriate information for an outgoing message. A procedure called BLD HDR is called by the de-parsing module at the beginning of a message construction process. The header structure is defined as follows:

```
TYPE HDR = RECORD
    LENGTH: BYTE;
    DEV MSB: BYTE;
    DEV LSB: BYTE;
    STREAM: BYTE;
    FUNCTION: BYTE;
    BLK MSB: BYTE;
    BLK LSB: BYTE;
    SYSTEM: ARRAY [1 ... 4] OF BYTE;
END;
```

The "LENGTH" field is included in this structure so that it is compatible with the message block definition when overlayed on buffer areas. The BLD HDR procedure uses two pointers to determine where the requested message header is to be placed and where to locate the necessary information which goes into the header. The procedure is defined as follows:

```
            TYPE HDPTR =    HDR;
                 STPTR =    STAT;
PROCEDURE BLD HDR (LOC: HDPTR; DAT: STPTR);
``` where the parameter "LOC" is the address of the buffer to receive the message header and the parameter "DAT" is a pointer to the status information for the designated communication channel.

The message status includes the current Stream and Function of an active message for a specific communication channel, the reply flag, directional information, and the block number. One such record is available for each item in the Active Task Table. Message status is defined below:

```
TYPE STAT =  RECORD
             STREAM: BYTE;
             FUNCTION: BYTE;
             REPLY: BYTE;
             DIR: BYTE;
             BLK NO: BYTE;
             END;
```

Given the preceding structure definitions, a module might call the BLD HDR procedure as follows:

```
TYPE LONGHEX = ARRAY [1 ... 4] OF BYTE;
VAR LOC,DAT: LONGHEX;
    .
    .
    .
DAT := ADDR (M2 STAT);
LOC := ADDR (M2 BUF);
BLD HDR (LOC,DAT);
```

TABLE 17

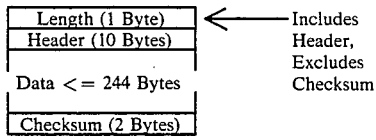

Includes Header, Excludes Checksum

The following algorithms are described as lists of actions to be performed in the sequence shown:
1. Initialization
   (i) When processing a "cold boot" command, the following actions must be performed:

Tables to be initialized:

Decision Tree Table (DTT)
   Active Task Table (ATT)
   Parser Table (PT)
   De-Parser Table (DPT)
   Stream and Function Descriptor Table (SFDT)

Queues and buffers to be purged:

Outgoing Message Queue (Normal and Alarm)
Incoming Message Buffer
Local Command Queue (ii) When doing a cold boot, the Initialization procedure must put S1, F1 (ARE YOU THERE REQUEST) in the outgoing message queue for the host, M2, and M4 ports. It also places an S2F17 (DATE AND TIME REQUEST) in the outgoing message queue (OMQ). It then sets flags indicating that the machines will respond with S9F1 (UNRECOGNIZED DEVICE ID). This will cause the parsing procedure associated with S9F1 to place another S1F1 message in the OMQ with the correct message header. The machines will then respond with an S1F2 (ON LINE DATA), and the INITIALIZATION module in the polling loop can then be informed that all the ports have been acknowledged. Until this sequence has been completed, the Carrier Controller is prevented from moving any carriers. If communication cannot be established with all of the ports, the Carrier Controller is notified via the Command Queue.

(iii) When processing a "warm boot" command, the Initialization procedure is responsible for aborting any Tasks currently in the ATT, and purging the OMQ, the Incoming Message Buffer, and the Local Command Queue.

2. Command Queue Usage (i) Procedure CMND IN is responsible for retrieving all the available commands from the Command Queue and moving them in the appropriate order to the Outgoing Message Queue. There may be some preferred entry sequence, because the OMQ is processed as a FIFO buffer. Alarms can be moved directly to the Alarm Queue.

(ii) Stream, Function, and Direction should be verified with the Valid Msg procedure before entering a Task in the OMQ.

3. Identifying New Tasks (i) If no Alarms exist in the ATT, then the OMQ is searched for any pending Alarms. If found, any host-to-DRU Task in the ATT is aborted and purged. Any DRU-to-host Task in the ATT is placed in suspension, with its Master Decision Tree Table Cell Number reset to "1.0.0". The new Alarm is then placed in the ATT for immediate processing.

(ii) If there are no DRU-to-host Tasks in the ATT, then the OMQ is searched for any pending DRU-to-host Tasks. If found, any host-to-DRU Tasks in the ATT are placed in suspension, with the Master Decision Tree Table Cell Number left in its current state. The new DRU-to-host Task is then placed in the ATT for immediate processing.

(iii) If there are no machine2 Tasks of any kind in the ATT, then the OMQ is searched for any pending DRU-to-Machine2 Tasks If found, the Task is placed in the ATT for immediate processing. If no such Task is found in the OMQ, the channel is examined for any "ENQ" requests. If found, a template for a machine2-to-DRU Task is placed in the ATT, effectively blocking any subsequent use of the channel until the single block message is received.

(iv) If there are no machine4 Tasks of any kind in the ATT, then the OMQ is searched for any pending DRU-to-Machine4 Tasks. If found, the Task is placed in the ATT for immediate processing. If no such Task is found in the OMQ, the channel is examined for any "ENQ" requests. If found, a template for a machine4-to-DRU Task is placed in the ATT, effectively blocking any subsequent use of the channel until the single block message is received.

Figure 18:
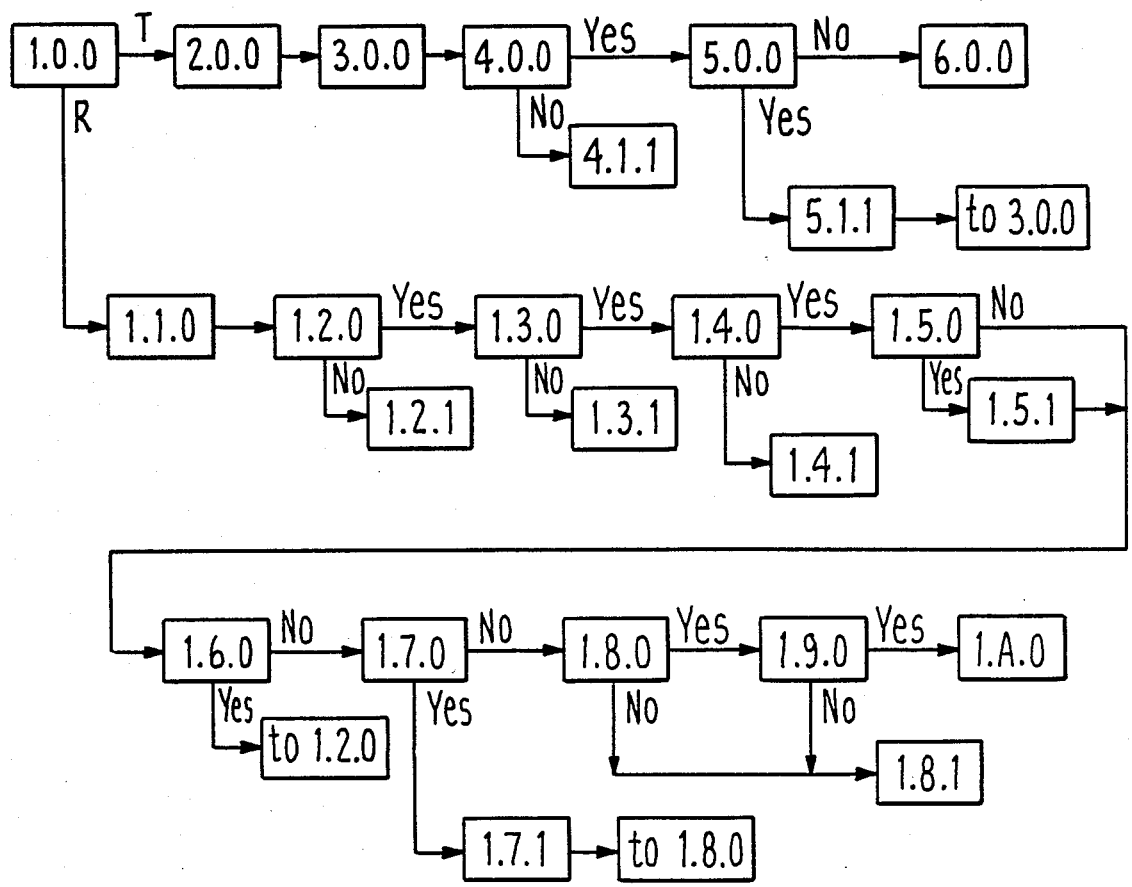
FIG. 18 is a flow chart illustrating, the branches of the Decision Tree of the SECS Controller module.

As shown in FIG. 18, the SECS Controller Master Decision Tree has two main branches, one each corresponding to the direction of communication. If a message in the Active Task Table (ATT) indicates the receive direction, then the path shown as the "R" decision from Cell 1.0.0 is taken. If a message in the ATT indicates the transmit direction, then the path shown as the "T" decision from Cell 1.0.0 is taken. The Master Decision Tree diagram has a corresponding list of procedure descriptions for each Cell, as shown in the following Table 18.

TABLE 18

| Cell | DESCRIPTION |
| --- | --- |
| 1.0.0 | Determine transmit direction |
| 1.1.0 | Locate parsing model |
| 1.2.0 | Enable receive and check for block complete |
| 1.2.1 | Copy Cell Number to ATT and start expiration timer |
| 1.3.0 | Block verify? (Includes handshake, checksum, and retry) |
| 1.3.1 | Send abort an purge Task from ATT |
| 1.4.0 | Parser model compares? |
| 1.4.1 | Send S9, F7 and purge Task from ATT |
| 1.5.0 | Variable format? (Requires building de-parser) |
| 1.5.1 | Build de-parser field |
| 1.6.0 | More blocks required? |
| 1.7.0 | Commands and/or Lists to be processed? |
| 1.7.1 | Build commands and buffer |
| 1.8.0 | Reply required? |
| 1.8.1 | Purge Task from ATT |
| 1.9.0 | Auto response by SECS Controller? |
| 1.A.0 | Purge Task from ATT and place response in ATT |
| 2.0.0 | Locate de-parsing model and initialize block count |
| 3.0.0 | Build a block, save the block count, and enable xmit |
| 4.0.0 | Block successfully transmitted? |
| 4.1.1 | Copy Cell Number to ATT and start expiration timer |
| 5.0.0 | Multi-block message |
| 5.1.1 | Increment block count |
| 6.0.0 | Purge Task from ATT |

The Master Decision Tree Manager, defined within the DO Tasks procedure, must perform the following operations:

1. Determine the number of Tasks in the ATT and use this count as a processing loop variable.
2. Get a Cell Number from an active Task, and locate the corresponding Cell record from the Master Decision Tree Table.
3. Execute the procedure identified by the Cell Number.
4. Use the return value from the procedure to locate a next Cell Number. If a next Cell Number exists, repeat steps 2 through 4. If there is no immediate result, start an expiration timer and record the current Cell Number in the Task record within the ATT. Then increment the loop variable and repeat steps 2 through 4.

In addition to this basic sequence description, the following items are responsibilities of the Master Decision Tree Manager:

1. The S4F1 message (Ready to Send Material) must be re-issued automatically whenever a process machine responds with an S4F63 (Not Ready to Receive). The number of retries allowable is specified by ECS4F1CT, and the frequency of retries will be ECS4F1CT per 15 minutes. If the machine handshake has not been completed at the end of the specified number of retries, the Carrier Controller is notified via the Command Queue.
2. A recovery procedure for unexpected device IDs from process machines is to be implemented. When the first improper ID is detected (assuming the original SECS Initialization sequence has been completed), an S9F1 (UNRECOGNIZED DEVICE ID) will be delivered to the machine. If a second device ID is detected, an S5F1 (ALARM REPORT SEND) is delivered to the host, indicating ALCD 71, ALID 01, ALTX "Communication link error on CJLKxx". The host may respond with S2F15 (NEW EQUIPMENT CONSTANT SEND) and alter the current device ID on the respective channel with a new ECCJLKxx. Subsequent communications with the machine would then be legal. There is no need to notify the Carrier Controller that these procedures have been invoked, since any significant delays in the movement of material would cause the Carrier Controller to generate its own Alarm messages.

The PARSER is responsible for using individual parsing models to verify the content of received messages and determine the actions to be performed if the received message is legitimate. Each parsing model consists of from one to six individual ELEMENTS. Each ELEMENT contains an index value which allows the PARSER to locate a lower level procedure. These procedures are dedicated to the specific requirements of a portion of the data field. Each time a list is encountered during parsing, the length of the list is used as a counter in a "REPEAT .. UNTIL" loop. If Lists are nested within Lists, the inner Lists are re-processed once for each pass through an outer loop. This recreates each redundant portion of the STRUCTURE diagram. A table of example parsing procedures is provided in Table 19 below.

As the data is being decoded, if procedure executions determine that information is to be passed to other modules in the polling loop, the command may be built incrementally, but will not be placed in the command queue until the entire message has been parsed and verified to correspond with the parsing model.

With respect to list management, a separate queue will be maintained the content of which will be oriented toward the parameter lists expected by the List Manager utility. Records of parameters will be built incrementally as the message is being parsed, but no list editing may occur until the complete message has been parsed and verified.

Referring to the parsing model summary provided in Table 14 above, notice that the "IN" column for each element of each message contains a unique value. The SxF0 message uses value "00" to locate a procedure which purges a transmit Task from the Active Task Table which contains the Stream and Function found in the header of the received Abort command. The Carrier Controller is then notified via the command queue. Similarly, message S1, F1 uses value "01" to locate a procedure which causes a response to be placed in the Outgoing Message Queue.

TABLE 19

| INDEX | DESCRIPTION |
|---|---|
| 00 | Purge the corresponding transmit Task from the ATT and notify the Carrier Controller of an Abort. |
| 01 | Set an auto response flag and queue an S1, F2 message. |
| 02 | Verify list length according to source type. If source is host, then the list length must be "0." Otherwise, list length is per the parser model. |
| 03 | Put string at variable "MxMDLN", where x represents the respective machine. |
| 04 | Put string at variable "MxSOFT", where x represents the respective machine. |
| 05 | If list length is "0", then set list length for response de-parser model to "9", and build SV table in order of SV1 through SV9. |
| 06 | Compare the received string against the SVID table. Use the match position as an index value for the order in which the corresponding Sv's are to be returned in the response de-parser model. |
| 07 | Change the global variable for processing status to off-line mode. |
| . | |
| . | |
| . | |

The DE-PARSER module is responsible for constructing actual SECS messages identified by a Stream and Function value. The module contains a series of specialized Function procedures accessed with a PASCAL CASE statement. These procedures handle all of the unique requirements of individual messages which do not conform to more generalized processing.

The DE-PARSER is called with the pointer to a de-parsing model as a parameter. It uses the contents of the model to determine data formats, locate the appropriate data values, and place information in the proper order into a working buffer to be delivered to the DATA LINK PROTOCOL module. The DE-PARSER keeps track of the block count, overlays a message header on the buffer area, calculates the number of bytes in the block and adjusts the first byte of the block accordingly. Checksum calculation is performed by the DATA LINK PROTOCOL module, since the procedure for doing so must reside there in order to verify received messages.

The DE-PARSER will be called as a result of one of the following events:
1. The Carrier Controller completes an action and intends to notify or complete a handshake with the host or a process machine;
2. The SECS Controller responds to an incoming message request by locating the appropriate data;
3. Either Controller generates an Alarm condition.

A table of example de-parsing procedures is provided in the following Table 20.

TABLE 20

| INDEX | DESCRIPTION |
|---|---|
| 00 | Build a standard header and transmit. |
| 01 | Process a fixed length list per the de-parser model. |
| 02 | Get the string at variable "MDLN." |
| 03 | Get the string at variable "SOFTREV." |
| 04 | Use current values in "SV TABLE" as element list. |
| . | |
| . | |
| . | |

The List Manager module, which will be described in detail below, is a utility which operates on records supplied by modules in the polling loop. These records identify material carriers and are associated with one of the four list types maintained by the DRU. These lists (Destiny, History, Log and Block) are the mechanism by which module carriers are routed through the conveyor system. The host has the ability to download new lists to the DRU at any time, or to examine the content of any list. This process takes place via the Stream 127 class of messages.

The SECS Controller uses the List Manager to respond to the Stream 127 class of messages. The List Manager is called as part of the Master Decision Tree path processing. The following example of the strategy employed when invoking the List Manager is given for the case of an S127, F129 message (DELETE ENTRY LIST SEND):

1. An active Task is identified as an S127, F129 message;
2. One block at a time is parsed, placing the appropriately constructed ELEMENTs in the LIST Q (the output side of the incoming message queue);
3. When the last block has been successfully received and parsed, the List Manager is called using the EDIT command for each list type to be processed. This denies the use of the List Manager by other modules while the lists are being modified.
4. The List Manager is then called once for each ELEMENT in the LIST Q, with the return status being saved for use by the de-parser for the S127, F130 message (DELETE ENTRY LIST ACKNOWLEDGE);
5. The S127, F130 message is then placed in the Active Task Table and processed accordingly. The status returned by the List Manager for each ELEMENT deleted from each list is sent to the host; and
6. When the complete S127, F130 message is transmitted to the host, the List Manager is instructed to terminate the editing process and make the lists available to other modules. The SECS Controller achieves this result by calling the List Manager with the command ENEDIT, specifying each of the affected lists.

The SECS Standard describes a methodology for establishing the direction of communication and the means for verification of messages transmitted through a half-duplex channel. This methodology, called the Data Link Protocol, eliminates line contention by defining one end of each channel to be a master and the other end a slave. The slave end of each channel is required to postpone any requests for transmission when both ends try to transmit simultaneously. Table 21 below shows how contention is resolved for each of the channel types.

TABLE 21

| CHANNEL | MASTER | SLAVE |
|---|---|---|
| HOST ⟵⟶ DRU | DRU | HOST |
| MACHINE ⟵⟶ DRU | MACHINE | DRU |

The SECS message transmission relies on the use of four handshake characters as shown in Table 22 below, and three error detection timers as shown in Table 23 below.

TABLE 22

| CHARACTER | VALUE | DESCRIPIION |
|---|---|---|
| ENQ | 05H | Request the line to send |
| EOT | 04H | Ready to receive |
| ACK | 06H | Correct reception |
| NAK | 15H | Incorrect reception |

The protocol is divided into three major processing sections: Establishing Transmission Direction, Message Block Transmission, and Message Block Acknowledgement. Multi-block transmissions, determined by the "E" bit in the Block Number field of the message header, are a repetition of the actions described in these sections.

In addition to the specific implementation of the Protocol criteria, the Data Link Protocol module performs the following checks on message blocks:

1. Compare device IDs against stored values to verify that the message is intended for the appropriate DRU. That is, the host must include the correct device ID for the DRU in each message header. Conversely, messages received from machines will contain a copy of the device ID for the respective machine. The DRU will maintain a memory image of the device IDs for both machines after performing the channel interrogation sequence described above;
2. Verify that the "R" bit is set to "0" for received messages and "1" for transmitted messages;
3. Maintain a block counter for each message in process to be used by the DO Tasks module. monitor the "E" bit in the message header to determine the last block in a multi-block message; and
4. Verify that reply messages have the "W" bit set to "0" indicating that no reply is expected.

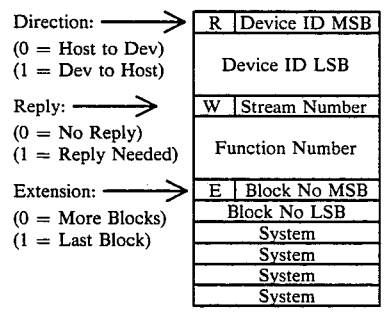

A communication session begins by monitoring the port for available handshake characters. If a line master receives an ENQ character and there is no current requirement for transmission, the line is granted to the slave by sending an EOT character.

If a line master receives an ENQ character but desires to transmit its own message, the line is denied by sending an ENQ character, forcing the slave to postpone its request and to send an EOT character.

If either the line master or slave sends an ENQ character and does not receive a response (either ENQ or EOT) within 25 seconds, a failure has occurred and the original character should be re-tried. A default value of three re-tries will be used before determining that the line is inoperative.

TABLE 23

| TIMER | DEFAULT VALUE | DESCRIPTION |
|---|---|---|
| T1 | 10 sec | Maximum time between characters |
| T2 | 25 sec | Maximum time from ENQ to EOT or from checksum to ACK |
| T3 | 120 sec | Maximum time for message reply |

With the line direction established, the sending end determines the actions of the receiving end. The first byte received indicates the number of bytes to be transmitted in the message block. The receiving end verifies that the T1 timer has not elapsed as each character is received. If not, a byte counter is incremented and tested against the first byte received. If all characters have not been received, the T1 timer is re-started, awaiting the receipt of the next character. When the last byte has been received, two additional bytes are expected. These bytes represent the 16 bit accumulated sum of all the bytes in the message block, excluding the first length byte. The high order eight bits of the checksum are sent first, followed by the low order eight bits.

The message block includes a header and a data area. The message header is always ten bytes in length, while the data area is variable. The total number of bytes in any message block, excluding the checksum, will be less than or equal to 254.

If the transmitted checksum matches the calculated checksum, the received message block is assumed to be valid according to the protocol. The receiving end of the line subsequently transmits an ACK character. The transmitting end of the line initiates timer T2 when the last checksum character has been delivered. If the ACK character is not received prior to the expiration of the T2 timer, an error is assumed and the message block must be re-transmitted. A NAK response will also cause the block to be re-transmitted.

The SECS Controller is organized into four major modules. With each invocation of the SECS Controller by the Executive, the four modules are called in sequence. At the completion of each module, a poll timer is examined to determine if the elapsed execution time is exceeding the maximum allocated time for one polling pass. If so, a graceful exit is performed, bypassing any remaining major modules.

The four major components of the SECS Controller are:
1. Get existing commands from Command Queue.
2. Determine new Tasks.
3. Process existing Tasks.
4. Put new commands on Command Queue Within the DO Tasks procedure, there are five distinct Functions which are invoked as appropriate:
1. Select an active Task.
2. Identify a procedure according to the Decision Tree Cell.
3. Use the parser model.
4. Use the de-parser model.
5. Interface with the List Manager as necessary.

The highest level of the SECS Controller serves to direct the sequence of operations and to monitor the amount of time consumed in the current polling cycle. The processing loop is responsible for the following Tasks:
1. Start a polling cycle timer.
2. Initialize the main module count.
3. Invoke a module from the module list.
4. Test the polling cycle timer.
5. Repeat the previous two steps until all modules have been called or until the polling cycle timer elapses.
6. Cancel the polling cycle timer.

If a test of the polling cycle timer indicates that the allocated time has expired, measures will be taken to assure that the SECS CTR procedure is exited gracefully. That is, all members of the Active Task Table will be left in a condition compatible with the next logical Cell in the Master Decision Tree Table. Appropriate flags will be set to indicate the status of transmit and/or receive message block counts for active Tasks.

The Initialization module is responsible for establishing the RAM resident values in all the tables described above. It loads all default values for ECIDs, and sets initial conditions for entering the Data Link Protocol algorithm in the idle loop.

Command OPCODEs are allocated for both "cold boot" and "warm boot" conditions. When a cold boot is indicated, all default values are loaded. The SECS Controller will automatically post messages S1,F1 to the host and to both machines. This is part of the interrogation process. Finally, an S2,F17 message to the host will be posted, so that the DRU Clock will be synchronized with the host.

When a warm boot is indicated, any Tasks in the Active Task Table originated by the DRU are aborted and the Cell Number associated with the Master Decision Tree Table is reset to the first Cell value so that the entire message will be re-transmitted. Any Tasks not originated by the DRU are aborted and purged from the Active Task Table. It is the responsibility of the peripheral at the other end of the communication channel to re-transmit the message if appropriate.

The CMND IN procedure is called by the root processing loop defined above. This procedure extracts all the command records from the Command Queue with TARGET fields equal to "SC." As commands are pulled out of the queue, they are placed in a Local Command Queue so that the command record can be re-assigned by the Utility Module.

Once all of the commands are locally buffered, each record is examined to determine the nature of the command based on the OPCODE. If the command is requesting a message to be delivered, the Stream and Function are validated with the VALID MSG Function. If legitimate, a record of type Task is constructed from the information available in the command record and placed in the Outgoing Message Queue. Otherwise, an error is displayed on a local CRT associated with the DRU.

If the command is not requesting a message to be delivered (such as a cold boot), the appropriate procedure for the command is invoked.

The ID Tasks procedure is responsible for managing entries to the Active Task Table. It operates on the Outgoing Message Queue and on flags generated by the Data Link Protocol procedure to establish the optimum number of simultaneous Tasks (i.e. the most efficient use of the three available communication channels). When there are no outgoing messages being processed, the communication lines are left in the "receive" mode so that the host or process machines can attempt to gain control with the "ENQ" handshake character.

The DO Tasks procedure contains calls to the Active Task Table Poller and, if Tasks are available, to the Master Decision Tree Manager. When the Master Decision Tree Manager is invoked, it operates on the Master Decision Tree Table to locate the appropriate Cell Number based on the current information in the Task record being processed. Either a parser or de-parser procedure is then called with the intention of moving the Task further down the Master Decision Tree path. If a delay is encountered, the Cell Number within the current Task is left unmodified.

One or more of the parsing and de-parsing procedures can invoke the Data Link Protocol procedure in order to cause a buffered message block to be accepted or transmitted respectively. Processing of Stream 127 messages generally calls for invocation of the List Manager utility as part of the Master Decision Tree mechanism.

Several error timers are used as part of the Data Link Protocol execution in order to verify handshaking and message reply activity.

A Pascal Function called VALID MSG returns a subscript from the SF TBL array whose corresponding record matches the Stream and Function numbers passed in the parameter list. If no match is found, or if the specified direction is illegal, the returned value represents an error code rather than a subscript value. The error code is then used to identify an appropriate response message in the Stream 9 group. Since there are only three possible errors, the VALID MSB Function provides for expansion up to 252 supported messages. The Function uses a binary search algorithm, and is defined in Table 24 below.

TABLE 24

Function VALID MSG (STRM, FUNC, DIR: BYTE): BYTE;

| RETURNED VALUE | DESCRIPTION |
|---|---|
| 00H-47H | Legal index values for defined messages |
| FDH | Illegal direction |
| FEH | No matching Function |
| FFH | No matching Stream |

The CMND OUT procedure operates on the Local Command Queue at the end of a polling cycle to determine what information is to be delivered. It then invokes the PUT CMND utility with a parameter list as defined below. All records in the Local Command Queue are moved to the system Command Queue when CMND OUT is invoked. The Local Command Queue is reused by CMND IN when the SECS Controller is invoked on the next pass through the polling loop.

All communication with the SECS Controller is performed via the Command Queue. The SECS Controller module is invoked by the Executive in the polling loop, and acts as an externally declared procedure to that module.

The Command Queue is a FIFO buffer used to temporarily store information to be passed between DRU modules. Generally, modules which pass information via the Command Queue are members of the Executive Polling Loop, but there are some exceptions to this rule. Blocks of information are called "commands", and these commands are inserted and removed from the Command Queue using utilities defined in the Utility Module.

The Function GET CMND is used to extract commands from the Command Queue. New commands are inserted into the Command Queue using the PUT CMND procedure.

Modules in the polling loop which insert and remove commands from the Command Queue include: Carrier Controller, Initialization and SECS Controller The List Manager, although technically a utility, also places commands into the Command Queue destined for the SECS Controller. It never extracts commands from the queue. The Executive module also inserts and removes commands from the queue even though it is not a member of the polling loop.

The Command Queue processing utilities are defined as follows:

```
PROCEDURE PUT CMND (SOURCE,
                    TARGET,
                    OPCODE,
                    MREC ID: BYTE;
                    DATA: INFO );
FUNCTION GET CMND (ID: BYTE): CPTR;
```

The PUT CMND procedure uses five parameters which serve to identify the originating module (SOURCE), the destination module (TARGET), the type of command (OPCODE), the number of records associated with the specified OPCODE, and the actual data to be delivered (DATA). The GET CMND Function uses one parameter to identify the requesting module and returns a pointer to one command record in the queue. The returned pointer points to the first command record found in the queue with a TARGET value equal to the ID parameter. Since there may be multiple command records resident in the queue for a given TARGET, it is the responsibility of each module using the GET CMND Function to remove all commands containing its TARGET value. All such commands have been removed when the returned pointer is "Nil". Additionally, as each pointer is returned, the receiving module must immediately copy the command record to a local buffer area, since the Utility Module will subsequently declare the removed command record to be "available" for new commands.

The Utility Module turns the parameters passed by the PUT CMND procedure into a command record which is defined as follows:

```
TYPE INFO = ARRAY [1 ... 42] OF BYTE;
CMND DEF = RECORD
              LINK: CPTR;
              SOURCE: BYTE;
              TARGET: BYTE;
              OPCODE: BYTE;
              MREC ID: BYTE;
              DATA: INFO;
              END;
CPTR =      CMND DEF;
VAR COMMAND : CMND DEF;
```

The MREC ID field provides for chaining of data fields for a given OPCODE by indicating whether or not multiple records are required for a complete understanding of the DATA field. The MREC ID byte value is interpreted as:

| E x x x M M M M |
|---|
| E = Extension Bit (0 = single 1 = multiple) |
| M = Multiple Record Number (binary) |

If the available 42 bytes in the DATA field of the first record is insufficient for any reason, the MREC ID byte would have the extension bit set to "1". The "M" bits would then indicate the record number of the extension so that up to 16 records for the same OPCODE could be chained. Each such record must have identical SOURCE, TARGET, and OPCODE fields. The Data Field Organization Table for the designated TARGET would then be expanded to indicate the content of each of the chained DATA fields.

The Command Queue is an array of such records:

VAR CMND Q:ARRAY [1..MAX CMND]OF
COMMAND;

The array size is limited to the number of records sufficient to accommodate the maximum expected command traffic for the five defined sources for one polling loop pass, since all commands for a given TARGET are removed within one pass. The Utility Module maintains a second queue called the AVAIL Q, which is an array of unassigned command records. When there are no commands in the Command Queue, all the command records are in the AVAIL Q. As records are entered into the CMND Q, the LINK field of each record points to the next command record so that order of assignment and de-assignment of records is unimportant.

The GET CMND Function locates a record in the CMND Q with a TARGET field equivalent to the ID value in the parameter list. If no such record is found, the returned pointer is set to "Nil" (i.e. all 0's).

Table 25 below lists module identification values for the DRU environment. Values are assigned even though they may not initially be involved in the Command Queue usage.

TABLE 25

| SOURCE/TARGET IDENTIFICATION | |
|---|---|
| VALUE | MODULE |
| 00 | Nil |
| 01 | AC Fail |
| 02 | Carrier Controller |
| 03 | Executive |
| 04 | Initialization |
| 05 | List Manager |
| 06 | PIO Interface |
| 07 | SECS Controller |
| 08 | Timer |

OPCODES are used to identify specific Functions to be performed by individual modules. A byte value provides for up to 256 unique Functions for each receiving module. OPCODE values 00H through 0FH are reserved for Functions which are common to all modules. OPCODE values 10H through FFH are individually defined for each module. OPCODES are intended to identify a particular class of Functions. When the class is known, the DATA field is then examined to determine more specific actions. For example, the Carrier Controller uses an opcode value 10H to indicate the class of Functions called "Machine Handshake". The specific handshake type is determined by the content of the DATA field.

The size of the DATA field has been chosen to accommodate the largest of the known commands (ALARM messages). For simplification, all commands use this data field size. Receiving modules know in advance how to interpret the contents of the data field for specific OPCODES according to the definitions in Tables 30 and 31 below.

As shown in Table 26 below, when the Carrier Controller receives a command with an opcode value of "10H", it knows that the data field is organized as shown in the second column of Table 26. This particular OPCODE requires the passing of a 1 byte port number and a 16 character BIS number. When the opcode value is "11H", the third column of Table 30 is the appropriate organization of the DATA field. As more opcodes are added, additional columns can be added to Table 26.

Command codes for various other modules are shown in Tables 27-29.

The Executive module must be informed of changes to ECIDs which affect port configuration, since it is responsible for periodically verifying outputs using the Toggle Function. If a mismatch is detected, an Alarm is delivered. The host would subsequently download a new set of ECIDs for port configurations. When the SECS Controller notifies the Executive of a change in ECIDs, the Toggle Function is re-activated and, if the new data is verified, an Alarm Clear is delivered.

The Initialization module must be informed by the SECS Controller when all of the communication ports (host, machine 2, machine 4, and bar code scanner) have been interrogated with the S1, F1 message (ARE YOU THERE). If all ports are verified, OPCODE value 11H is delivered. If any of the four ports do not respond to the interrogation message after an appropriate period of time, OPCODE value 12H is delivered. The Initialization module prevents the Carrier Controller from moving carriers until all such communication is established.

Requests for the delivery of Alarm messages always result in an S5, F1 message being sent to the host. Consequently, there is no requirement for Stream, Function, and Destination information to be supplied in the DATA field of the command record. The ALCD, ALID, and ALTX are placed in the 42 bytes of the DATA field, where byte 1 would be the ALCD, byte 2 the ALID, and bytes 3 through 42 would be the ALTX.

Requests for normal messages to be delivered require the Stream, Function, and Destination information to be supplied in the DATA field of the command record. With this information, the SECS Controller can locate the appropriate de-parsing model and build a complete message.

TABLE 26

| CARRIER CONTROLLER | | | |
|---|---|---|---|
| OPCODE | DESCRIPTION | OPCODE | DESCRIPTION |
| 00 | Nil | 10 | Remote Command |
| 01 | Cold Boot | 11 | machine Handshake |
| 02 | Warm Boot | 12 | List Update |
| 03 | | 13 | |
| 04 | | 14 | |
| 05 | | 15 | |
| 06 | | 16 | |
| 07 | | 17 | |
| 08 | | 18 | |
| 09 | | 19 | |
| 0A | | 1A | |
| 0B | | 1B | |
| 0C | | 1C | |
| 0D | | 1D | |
| 0E | | 1E | |
| 0F | | 1F | |

TABLE 27

| EXECUTIVE MODULE | | | |
|---|---|---|---|
| OPCODE | DESCRIPTION | OPCODE | DECRIPTION |
| 00 | Nil | 10 | ECID Modified |
| 01 | Cold Boot | 11 | |
| 02 | Warm Boot | 12 | |
| 03 | | 13 | |
| 04 | | 14 | |
| 05 | | 15 | |
| 06 | | 16 | |
| 07 | | 17 | |
| 08 | | 18 | |
| 09 | | 19 | |
| 0A | | 1A | |
| 0B | | 1B | |
| 0C | | 1C | |

TABLE 27-continued

EXECUTIVE MODULE

| OPCODE | DESCRIPTION | OPCODE | DECRIPTION |
|---|---|---|---|
| 0D | | 1D | |
| 0E | | 1E | |
| 0F | | 1F | |

TABLE 28

INITIALIZATION MODULE

| OP-CODE | DESCRIPTION | OPCODE | DESCRIPTION |
|---|---|---|---|
| 00 | Nil | 10 | Date and Time Set |
| 01 | Cold Boot | 11 | All Ports Interrogated |
| 02 | Warm Boot | 12 | Ports Not Responding |
| 03 | | 13 | Remote Command |
| 04 | | 14 | |
| 05 | | 15 | |
| 06 | | 16 | |
| 07 | | 17 | |
| 08 | | 18 | |
| 09 | | 19 | |
| 0A | | 1A | |
| 0B | | 1B | |
| 0C | | 1C | |
| 0D | | 1D | |
| 0E | | 1E | |
| 0F | | 1F | |

TABLE 29

SECS CONTROLLER

| OP-CODE | DESCRIPTION | OPCODE | DESCRIPTION |
|---|---|---|---|
| 00 | Nil | 10 | Machine Handshake |
| 01 | Cold Boot | 11 | Set Alarm Message |
| 02 | Warm Boot | 12 | Clear Alarm Message |
| 03 | | 13 | Remote Acknowledge |
| 04 | | 14 | |
| 05 | | 15 | |
| 06 | | 16 | |
| 07 | | 17 | |
| 08 | | 18 | |
| 09 | | 19 | |
| 0A | | 1A | |
| 0B | | 1B | |
| 0C | | 1C | |
| 0D | | 1D | |
| 0E | | 1E | |
| 0F | | 1F | |

TABLE 30

| | OPCODE TYPES | | |
|---|---|---|---|
| BYTE | REMOTE COMMAND | MACHINE HNDSHK | LIST UPDATE |
| 01 | Command Code | Handshake Type | List Name |
| 02 | | Port Number | |
| 03 | | BIS LSB | |
| . | | BIS LSB | . |
| . | | BIS LSB | |
| 17 | | BIS LSB | |
| 18 | | BIS MSB | |
| 42 | | | |

TABLE 30-continued

| MISCELLANEOUS DEFINITIONS | |
|---|---|
| VALUE | HANDSHAKE TYPE |
| 00H | Aborted Transaction |
| 01H | Ready to Send Material |
| 02H | Send Material |
| 03H | Handshake Complete |
| 04H | Not Ready to Send |
| 05H | Not Ready to Receive |
| 06H | Stuck in Sender |
| 07H | Stuck in Receiver |
| 08H | Unsuccessful Transfer |
| 09H | S4, F1 Retries Exhausted |

TABLE 31

| | OPCODE TYPES | | |
|---|---|---|---|
| BYTE | MACHINE HANDSHAKE | SET ALARM MESSAGE | REMOTE ACKNOWLEDGE |
| 01 | Stream | Alarm Code | Command Code |
| 02 | Function | Alarm ID | Cmd Ack Code |
| 03 | Channel | Alarm Text | |
| . | PIN MID LSB | Alarm Text | |
| . | MID LSB | | |
| 17 | MID LSB | Alarm Text | |
| 18 | MID LSB MID MSB | Alarm Text | |
| 42 | | Alarm Text | |

The SECS Controller utilizes a number of external utilities.

As described in greater detail below, the List Manager is a utility which provides for proper editing of any of the four defined list types (Destiny, History, Log and Block). This utility is invoked when any of the Stream 127 messages are processed by the SECS Controller.

The Utility Module, also described below, provides two management procedures for the manipulation of information to be passed to other modules.

The Utility Module provides the ability to assign various dedicated real time clocks for monitoring elapsed time. A value in the range 0 to 100 is assigned to specific timers when an elapsed time is given to the TIMER procedure with a "Start" command. Subsequent references to this specific timer will yield the current status of the timer. If the timer is no longer needed, it must be cancelled by the user. The user must periodically check the status of the timer to determine when the specified time increment has elapsed.

The Utility Module provides the ability to read or set the time of day. The SECS Controller uses this procedure in response to the receipt of the S2, F18 message from the host.

Character I/O via USART devices is handled by invoking assembly language subroutines. Four such routines are available to the SECS Controller. Character manipulation is performed using real time interrupts, but the interrupt servicing is transparent to the Pascal program. The assembly language routines maintain 300-character buffers for transmit and receive sessions. The transmit buffer cannot overflow as long as the buffer status is monitored before adding new transmit characters. Receive errors can include USART framing or overrun problems, as well as receive buffer overflows. At the selected baud rate (9600), characters are received approximately once per millisecond. Since messages are transmitted in blocks of 256 bytes with handshaking characters required before the next block can be transmitted, the Pascal program can turn the line around in preparation for a receive message and not have to monitor each received character in real time.

The SET SIO procedure is used to allocate a particular port for either the transmit or receive direction. When the line is "turned around" (i.e. changed from transmit to receive, or from receive to transmit), any character buffers maintained by the assembly language routines (external to the UART) are purged and any errors associated with characters not read by the SECS Controller are cleared.

The SIO STAT procedure is used to determine the state of the assembly language character buffers. That is, in the transmit mode, it indicates that the 300-character buffer is not full and will accept additional characters. In the receive mode, it indicates that one or more characters have been received and buffered since the last invocation of the SET SIO procedure. On exit, the formal parameter MODE has been modified to indicate the current setting of the line direction and the formal parameter STAT has been modified to indicate the condition of the appropriate buffer. The formal parameters CHN and DIR are enumerated types as defined below. The values for buffer status are:

```
CONST RBE = 00H; {Receive buffer empty}
      NORM = 01H; {No other specific condition exists}
      TBF = 02H; {Transmit buffer full}
      RB ERR = FFH; {Receive buffer overflow}
```

The SIO IN Function returns one character from the 300-character FIFO buffer which holds received characters. The SIO STAT procedure must be invoked prior to using SIO IN in order to verify that characters are available in the buffer for reading.

The formal parameter CHN is an enumerated type as defined above. The returned byte is the "oldest" available character in the receive buffer.

The SIO OUT procedure places a character in the 300-character FIFO transmit buffer. As long as the buffer is not full, additional characters may be supplied. Characters are moved to the UART transparent to the filling of the transmit buffer. A call to the SIO STAT procedure must be performed between each invocation of the SIO OUT procedure to verify that there is still room for additional characters. If an attempt is made to add a character to the buffer when the buffer is full, the character is ignored and an error is displayed on the local CRT.

The formal parameter CHN is an enumerated type as defined above. The parameter OUTCHAR is the character to be placed in the transmit buffer.

The SECS Controller is also responsible for initializing a number of global variables. By having direct access to the ECIDs, the SECS Controller can respond to many messages without requiring involvement of either the Executive or the Carrier Controller.

The following discussion is directed to the List Manager module, describing how the List Manager module relates to the overall DRU program, what the List Manager does, and highlighting unusual requirements or operations.

As stated above, the DRU uses four lists. Each list has a corresponding list ID LSTID for use within Stream 127 SECS messages, DRU inter-module communications, etc. The list IDs are as follows:

```
0  All lists
1  Destiny
2  History
3  Log
4  Block
```

The general features of the four lists are as follows:
Density List:
1. May contain wildcards.
2. Duplicate entries are not allowed within the Destiny List. For this purpose, a "duplicate entry" is defined as an exact character-by-character match in the BIS, Bar Code and Source fields (the Destination field is not considered; the same BIS, Bar Code and Source cannot be allowed to have multiple Destinations), where the % character counts as just another character, not a wildcard character.
3. The host's part of the List Entry Identifier must be unique across both the Destiny and the Block Lists. Actually, so must the DRU's part, but this happens automatically as discussed below.

Block List:
1. Duplicate entries are not allowed in the Block List. In this case, a "duplicate entry" is defined as an exact character-by-character match in the BIS, Bar Code, Source and Destination fields, where the % character counts as just another character, not a wildcard character.
2. As with the Destiny List, the host's part of the List Entry Identifier must be unique across both the Destiny and the Block Lists.

History List:
1. History List entry is made after a carrier has been dispatched by the DRU. Each entry includes as much of the BIS as the process machine knows, the entire bar code, the carrier Source and Destination and the procedure required to transfer the carrier between DRU and machine.

Log List:
1. The Log List contains the entire history of DRU activity, up to the number of List entries available to it. A bit in the Action code determines whether a Task created by a Destiny List entry is reported to the History List. Actions that are not reported to the History List are reported to the Log List. History List entries that have been acknowledged for deletion, by the host, are retained within the DRU's List Array, but are converted to Log List entries. In this sense, the History List can be viewed as a subset of the Log List.

New list elements have two new SECS fields, the List Entry Identifier and an additional time-stamp. All lists have congruent sets of fields in each element. The fields for the Destiny and Block Lists are as follows:

| | | |
|---|---|---|
| * List Entry Identifier | ATTID 16 | 8 bytes |
| * BIS | ATTID 9 | 16 bytes |
| * Bar Code | ATTID 0 | 16 bytes |
| * Source | ATTID 11 | 2 bytes |
| * Destination | ATTID 10 | 2 bytes |
| * Action | ATTID 19 | 2 bytes |
| * Task Enable Time-stamp | ATTID 21 | 12 bytes |
| * Cancellation Time | ATTID 24 | 12 bytes |
| * List Entry Time-stamp | ATTID 20 | 12 bytes |

This totals 82 bytes for these fields.

The fields for the History and Log Lists are the same as above except for the use of three time stamps, which are identified as follows:

| | | |
|---|---|---|
| * Task Initiated Time-stamp | ATTID 26 | 12 bytes |
| * Task Over Time-stamp | ATTID 25 | 12 bytes |
| * Query Time-stamp | ATTID 22 | 12 bytes |

List Entry Identifiers are used to identify specific list entries; they must be unique across all lists. For example, an entry in the Destiny List cannot have the same List Entry Identifier as an entry in the Block List. List Entry Identifiers are used primarily by the host to delete List entries (particularly History List entries).

The List Entry Identifier (LEID) field contains eight bytes, all ASCII decimal. This allows the data to be compressed internally to four bytes. The List Entry Identifier is composed of two four-byte Sub-LEID fields, one supplied by the host, and one by the DRU:

1. Host Sub-LEID—Supplied by the host when it downloads Destiny and Block List entries. This number is unique within a particular Intermediate Host. It is also unique within both the Destiny and Block Lists.
2. DRU Sub-LEID—This number is not actually stored in the DRU's internal lists; instead, it is the index where the entry is stored in the DRU's List Array (this will be detailed in a later section). This number must be unique (by design, it can't help but be unique). This number is also referred to as an entry's "Tag".

As far as the SECS protocol is concerned, List Entry Identifiers are defined as eight-byte fields. However, host downloads of the Destiny and Block Lists contain wildcards in the DRU's Sub-LEID. The host Sub-LEID must be unique within the DRU's Destiny and Block Lists. Duplicate host Sub-LEIDs will be rejected.

When the DRU completes an action which results in a History or Log List entry, it copies the host's Sub-LEID field from the Destiny List entry that spawned the action into the History or Log List. The History/Log List entry's DRU's Sub-LEID is the entry's index position within the List Manager's List Array. This insures unique identifiers for more than one task spawned by a given Destiny List entry, but preserves the host-supplied List Entry Identifier so the host can match up History List entries with the Destiny List entries that generated them.

As mentioned above, the DRU stores only the host Sub-LEID in its lists, packed into two bytes. The DRU Sub-LEID is synthesized from the List entry's position in the List Manager's List Array.

It must be possible to search a list using wildcards for the DRU's Sub-LEID of the List Entry Identifier, but a specific value for the host's Sub-LEID. This would be used, for example, to request an upload (using S127,F137 Search List Send) of all History List entries that were spawned by a particular Destiny List entry.

The List Entry Identifier for Destiny List entries is used as part of the alarm for auto-cancel timeouts, etc. The ALTX for blocked-task alarms should include the List Entry Identifier for both the Destiny List task that was blocked and the Block List entry that blocked it.

Storage space for each of the four Lists (Destiny, Block, History and Log) is dynamically allocated from a single "List Array." The absolute maximum size for this array is 1000 elements. In other words, the total number of entries in each of the four lists combined cannot exceed 1000.

Although referred to as an "array", the List Array is really not a single array; rather, it is a collection of several parallel arrays of integers and strings (actually "arrays of characters"). This is done mainly for speed improvement.

The List Entry Identifier, Source, Destination, and the three Time-stamp fields all contain ASCII data that can only be numbers or wildcards. These fields will be stored internally in a compressed form that uses one nibble per byte of uncompressed data. The storage requirements for these six fields totals 44 bytes (only the first four bytes of the List Entry Identifier are actually stored) in uncompressed form, so compressing them saves 22 bytes.

Each List Array element contains the fields identified in Table 33 below, which are actually elements of different individual arrays:

TABLE 33

| FIELD NAME | ACTUAL SIZE | STORED SIZE | BB RAM SIZE |
|---|---|---|---|
| List Entry Identifier | 8 | 2 | 2 |
| BIS | 16 | 16 | 16 |
| Bar Code | 16 | 16 | 16 |
| Source | 2 | 1 | 1 |
| Destination | 2 | 1 | 1 |
| Action | 2 | 2 | 2 |
| Time-Stamp-1 | 12 | 6 | 6 |
| Time-Stamp-2 | 12 | 6 | 6 |
| Time-Stamp-3 | 12 | 6 | 6 |
| List Status (LSTID, etc.) | 2 | 2 | 2 |
| List Linkage Pointer: Next | 2 | 2 | 2 |
| List Linkage Pointer: Previous | 2 | 2 | 0 |
| Access Chain 1 Pointer: Next | 2 | 2 | 0 |
| Access Chain 1 Pointer: Previous | 2 | 2 | 0 |
| Access Chain 2 Pointer: Next | 2 | 2 | 0 |
| Access Chain 2 Pointer: Previous | 2 | 2 | 0 |
| Access Chain 3/5 Pointer: Next | 2 | 2 | 0 |
| Access Chain 3/5 Pointer: Previous | 2 | 2 | 0 |
| TOTAL BYTES | 100 | 74 | 60 |

The four lists are implemented as bi-directionally linked lists. Each individual entry within a particular list points to the "next" entry in the list and the "previous" entry in the list.

The List Manager uses several linked lists, referred to as "Chains", to support dynamic list allocation and to speed up access to individual list entries; they are:

1. Free Chain—Links together all List Array elements that are not allocated to a list. After a Cold Boot, the Free Chain holds the entire List Array. All other lists are empty. As the host begins adding entries to the DRU's lists, List Array elements are taken from the Free Chain and appended to the appropriate List Chain. As list entries are deleted, they are removed from the appropriate List Chain and appended to the Free Chain.
2. Destiny Chain—Links together all List Array elements that are part of the DRU's Destiny List.
3. Block Chain—Links together all List Array elements that are part of the DRU's Block List.
4. History Chain—Links together all List Array elements that are part of the DRU's History List.
5. Log Chain—Links together all List Array elements that are part of the DRU's Log List.
6. Access Chain 1—These chains (there may be as many as 256 Access Chain 1's) link together all list entries that share the same hashing value in Access Table 1. Access Tables and Chains will be discussed in depth below.
7. Access Chain 2—See "Access Chain 1" above.
8. Access Chain 3/5—See "Access Chain 1" above.

The first and last entries in each List Chain and in the Free Chain are pointed to by 5 pairs of integer variables, which are referred to as the "First Linkage Pointer" and the "Last Linkage Pointer". Only the Next Linkage Pointers are kept in battery backed RAM. All other pointers are rebuilt at Warm Boot.

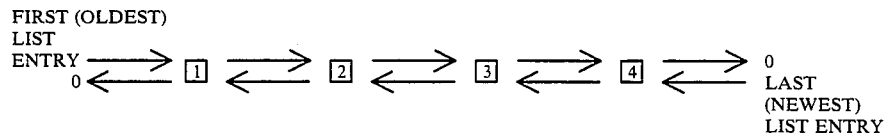

FIRST (OLDEST) LIST ENTRY ... LAST (NEWEST) LIST ENTRY

Each list entry includes a pointer to the next entry and previous entry in the same list. An entry is added to a list by inserting it after the existing last entry (the one most recently added); this is done by changing the last entry's Next Linkage Pointer to point to the new entry and changing the Last Linkage Pointer to point to the new entry.

List entries are deleted from a list by a corresponding set of changes to the pointers in the two entries surrounding the entry to be deleted. If entry #1 is to be deleted, the First Linkage Pointer is changed to point to the entry that follows the deleted #1 entry; also, the new entry #1's Previous Linkage Pointer is set to zero, signaling that it is the beginning of the list.

This scheme allows additions and deletions to be performed anywhere in a list. The First Linkage Pointer (an integer variable) will always point to the oldest entry in its associated list and the Last Linkage Pointer (also an integer variable) will always point to the newest. Even though this scheme allows adds to be performed anywhere, the List Manager will only add new entries to the end of lists.

As an example, assume that matters proceed normally, with a mixture of Tasks that are reported to either the History or the Log List. Assume that the host acknowledges the History List entries, but slowly, so there is always a small amount (say 5 items) of residue in the History List. Assume that LJLSBV is not set, so the Log List requires no automatic upload. At first, space for History List and Log List entries will be drawn from the Free Chain. As History List entries are acknowledged for deletion, they are converted to Log List entries. Eventually the list space fills up with Log List entries, a residue of History List entries, plus the Destiny and Block Lists as loaded from the host. After the Free Chain has been exhausted, the next request to add an entry to any list must be filled from the Log List. Such a request will be filled by sacrificing the oldest Log List entry (the first item in the Log Chain).

The speed of the List Manager is a major concern, both because of the requirement not to monopolize the CPU and because certain kinds of list operations must be carried out quickly in order not to make the DRU too slow to deal with the normal flow of material carriers.

Four special List Access Tables are used to speed up potentially slow list operations. The following List Access Tables (hashing tables and linear lists) have been defined:

1. List Entry Identifier—This table spans the Destiny and Block Lists. The hashing value is calculated on the List Entry Identifier's host Sub-LEID only. It is used to check for duplicate List Entry Identifiers before doing an Add operation and for deleting list entries when the DRU sub-field is not specified (is set to all '%' wildcards).

2. BIS, Bar Code, Source—This table spans only the Destiny List. The hashing value is calculated across these three fields as a group. The '%' character is treated as just another character, not a wildcard. It is used to check for duplicates when adding to the Destiny List.

3. Bar-Code-Specific Tasks—This table spans only the Destiny List, and covers only entries with no wildcards in the Bar Code field (except for an optional wildcard in the Bar Code's orientation field). The hashing value is calculated across all characters of the Bar Code except the orientation character. It is used to find an action for the Carrier Controller when the Bar Code is known.

4. Destiny List Residue—This table spans only the Destiny List, and covers only entries that do not qualify for Table #3. This is not really a hashing table, but just a serial list of the residue. This chain is used to find an action for the Carrier Controller when the Bar Code is not known.

The List Access Tables are not kept in battery-backed RAM. This requires rebuilding them at Warm Boot. Although there is no particular time constraint at Warm Boot time, Access Table initialization should be reasonably fast.

The various List Access Tables employ a hashing scheme that uses a one-byte checksum to compute the hashing value (carries out of bit 7 are ignored). This produces 256 unique hashing values. Each hashing table is a 256-element integer array of pointers to an associated Access Chain. A particular Access Chain links together all List entries that share the same hashing value (or other common trait).

Each List Access Table has an associated pair of integer arrays that are used to store pointers to the next and previous list entries in a particular Access Chain. Because a list entry cannot be in both the Bar-Code-Specific and the Destiny Residue Access Tables at the same time, these two Access Tables share common Access Chain arrays. The Access Chain arrays are as large as the number of entries in all lists combined; in effect, they are just more of the many fields that make up the List Array. Both "next" and "previous" pointers for the Access Chains are required so that, if a list entry is deleted, the Access Chain can be easily adjusted to maintain its integrity.

There are two types of Access Tables: Hashing tables (Access Tables 1-4), and the Destiny Residue (Access Table 5), which is not a table, but a simple integer pointer. The following rules define how Access Chains are structured:

1. A particular Access Table element points to the first list entry with its associated hashing value.
2. The first list entry in the Access Chain points to the "next" list entry in the Access Chain, and so on.

3. The last entry in the Access Chain has its "next" pointer set to zero.
4. Each list entry also points back to the "previous" list entry in the Access Chain.
5. The first list entry in the Access Chain points back to the List Access Table element which spawned the Access Chain. This pointer is stored as a negative number to distinguish it from a "normal" pointer (i.e., one that points back to the previous list entry). In the case of Access Table 5 (Destiny Residue), which shares an Access Chain array with Table 3 (Bar-Code-Specific), the first list entry in the Access Chain is set to zero. This indicates that it points back to the single integer Destiny Residue "table."

The Command Validation Table, shown in Table 34 below, indicates which commands are valid, depending upon the identity of the caller and which mode is active (Edit, Upload, etc.).

TABLE 34

| COMMAND | SECS CONTROLLER | | | | | CARRIER CONTROLLER | | | | | UT |
| --- | --- | --- | --- | --- | --- | --- | --- | --- | --- | --- | --- |
| | NO MOD | EDT | SRH | UPLOAD ATO | UPLOAD REQ | NO MOD | EDT | SRH | UPLOAD ATO | UPLOAD REQ | NO MOD |
| ColdBoot | n | n | n | n | n | n | n | n | n | n | Y |
| WarmBoot | n | n | n | n | n | n | n | n | n | n | Y |
| Add | n | Y | n | n | n | Y | n | n | n | n | n |
| Continue | Y | Y | Y | Y | Y | Y | n | n | n | n | n |
| Delete | n | Y | n | n | n | n | n | n | n | n | n |
| DeleteAll | ? | ? | ? | ? | ? | n | n | n | n | n | n |
| DeleteByTag | n | n | n | Y | n | Y | n | n | n | n | n |
| EditAdd | Y | n | n | n | n | n | n | n | n | n | n |
| EditDelete | Y | n | n | n | n | n | n | n | n | n | n |
| EditAbort | n | Y | n | n | n | n | n | n | n | n | n |
| EditEnd | n | Y | n | n | n | n | n | n | n | n | n |
| Find | n | n | n | n | n | Y | n | n | n | n | n |
| ReadByTag | n | n | Y | n | n | n | n | n | n | n | n |
| SearchStart | Y | n | Y | n | n | n | n | n | n | n | n |
| SearchNext | n | n | Y | n | n | n | n | n | n | n | n |
| SearchAbort | n | n | Y | n | n | n | n | n | n | n | n |
| SearchDone | n | n | Y | n | n | n | n | n | n | n | n |
| SuppressByTag | n | n | n | Y | n | n | n | n | n | n | n |
| Tickle | n | n | n | n | n | n | n | n | n | n | Y |
| UploadAuto | Y | n | n | n | n | n | n | n | n | n | n |
| UploadRequest | Y | n | n | n | Y | n | n | n | n | n | n |
| UploadNext | n | n | n | Y | Y | n | n | n | n | n | n |
| UploadAbort | n | n | n | Y | Y | n | n | n | n | n | n |
| UploadDone | n | n | n | Y | Y | n | n | n | n | n | n |

A search via a hashing Access Table would proceed roughly as follows:
1. Find the hashing value for the search key.
2. Use that hashing value as the index into the hashing value array. If the content of that array element is zero, there is no entry with that hashing value.
3. If the hashing value array contains a nonzero pointer, start at the target List element looking for matches. Continue following the Access Chain pointers from element to element until reaching a pointer of zero.

The List Access Tables are used to optimize speed. The following is intended to be both a complete list of the ways the List Manager is used and a description of the applicable strategies for optimizing speed:
1. Host downloads to Destiny and Block Lists—The List Manager must check each candidate entry against the Destiny and Block Lists for duplicate List Entry Identifiers. Access Table #1 speeds this up. The List Manager must check the Destiny List for duplicate entries in the BIS, Bar Code and Source fields. For this purpose, the '%' character is just another character, not a wildcard character; access Table #2 speeds this up. The List Manager must also check the Block List for duplicate entries in the BIS, Bar Code, Source and Destination fields; the Block List is searched sequentially because it is assumed to be small. Note that the Carrier Controller is not locked out during this operation.
2. Carrier Controller requests Hierarchical Search of Destiny and Block Lists—To begin with, Destiny List entries are divided into two classes:
   (i) Bar-Code-Specific—These entries are characterized by completely specific Bar Codes. These are accessed via Access Table #3. It is expected that most entries will fall in this class.
   (ii) All entries that do not qualify for Class A— These are accessed via Access Table #5; this Destiny List Residue will normally be small (say ten entries or less), so a sequential search will be fast enough.

Knowledge of the Search Keys that the Carrier Controller will supply for Hierarchical Searches are used to speed up searches of the Destiny List. If the Search Key's Bar Code is completely specific, Check Access Table #3. Most of the time, a matching entry will be found here. All entries of the appropriate hashing value must be checked, since more than one match may be found. The most specific (by the specificity rules) is used in case of multiple matches. The most specific match from this Access Table is probably the most specific in the Destiny List, but not necessarily; the Residue in Access Table #5 must also be checked. The entire Residue must be searched and the most specific match returned from both tables (if any).

The Block List Search Key encompasses the BIS, Bar Code, Source, and Destination fields. It is formed character-by-character from the most specific information available from the Carrier-Controller-supplied input search key and the Destiny List entry that made the best match with the input search key. When comparing the Block List Search Key with Block List entries, %'s in Block List entries are treated as wildcards, whereas %'s in the Key are treated as simple characters. The List Manager returns a result code according to whether it found the item on the Destiny List, the Block List, or neither; if the item was found, it is returned in the results buffer.

3. Carrier Controller deletes an entry for a completed Action—(This only happens for entries whose Delete bit is set in the Action Code.) The Carrier Controller saves the entry's Tag, so it just uses the List Manager's Delete-by-Tag operation.
4. Carrier Controller adds an entry for a completed Action to the History or Log List—There is nothing special about this task from the List Manager's narrow point of view. From the broader perspective, this is one of the List Manager's most important tasks, since this is where BIS/Bar Code association is made for completed tasks. If power fails while this task is pending, the Carrier Controller must complete it following a Warm Boot (all required information is stored in battery backed RAM).
5. SECS Controller does an automatic History List upload—This proceeds in the obvious way. No searching is required.
6. SECS Controller does an automatic Log List upload—This only happens if LJLSBV is nonzero. It is the same kind of task as Item 5 above.
7. Host requests upload of any list—This is the same kind of task as Item 5 above.
8. Host requests deletion of one or more items—The entries to be deleted will usually be defined by List Entry Identifier, so no searching will be required. During this operation, the List Manager will be in Edit Mode.
9. Host requests Search List Send (S127,F137)—Each search key requires searching either all lists or a specific list for all entries that match the search key. This requires the Search function. Since the speed of this task is not critical to DRU operation, conventional linear searching techniques can be used.

The host is required to save History List upload data in two places before allowing the DRU to delete the uploaded History List entries.
1. The DRU uploads History List entries (1 or more).
2. The host will acknowledge receiving them by using Acknowledge Code 0 (Accepted, do not delete, do not automatically upload again).
3. The DRU will not delete those entries from the History List at this time. They will remain in the list, but will not be uploaded again in subsequent automatic History List uploads. They will, however, be uploaded if the host specifically requests a History List Upload or issues a Search List Send.
4. Alternatively, the host might acknowledge some or all of the entries with ACK code 6 (Accepted, delete) if it is able to save them quickly in a safe place.
5. In the case of Item 4, the DRU will immediately delete those entries from the History List (actually, they are converted to Log List entries).
6. When the host has finally stored uploaded History List entries that were acknowledged with ACK code 0, it will delete those entries by sending S127,F129 messages (Delete List Entry) to the DRU. The DRU depends on the host to prevent the DRU's History List from filling up. The system's design priority is given first to assuring that BIS-Bar Code association is never lost, and second to processing carriers. The only consequence of having the DRU's History List fill up is that the DRU will go Offline/History List Overflow. That is much preferable to losing data.

Under certain circumstances, the DRU will upload the contents of the History and Log Lists without having received any request from the host to do so. These "automatic list uploads" use S127,F131 as follows:
1. The History List is automatically uploaded whenever it contains one or more entries that the host has not yet seen. Essentially, this means whenever something is added to the History List.
2. The Log List is automatically uploaded whenever some condition causes there to be less than ECID LJLSBV free entries available in the List Array. The List Manager only checks for this condition when LJLSBV has a nonzero value.

History List entries that have been successfully uploaded will either be deleted immediately (they are actually moved to the Log List) or Suppressed, depending on the host's ACK code. Suppressed entries will not be uploaded again in subsequent automatic History List uploads. However, they will be included in uploads initiated by the host with Dump List Send or Search List Send.

Log List entries that have been successfully uploaded are always Suppressed, they are never deleted (ACK 6 is treated just like ACK 0). As with the History List, Suppressed Log List entries will not be uploaded again in subsequent automatic Log List uploads, but they will be included in uploads initiated by the host with Dump List Send or Search List Send. Note that Log List entries which are successfully uploaded by Dump List Send or Search List Send are automatically Suppressed; this is not true of the History List.

Whenever an entry is uploaded to the host, its Query Time Stamp is set to the time that the entire upload was started. This insures that all list entries that were uploaded together have the same Query Time Stamp.

When the List Manager detects the need for an automatic list upload, it notifies the SECS Controller through the Command Queue. The List Manager sets an internal flag that suppresses further notifications for the same list until after the SECS Controller has completed the automatic upload. This flag must be stored in battery-backed RAM so that it will survive a power failure. The SECS Controller begins uploading the specified list as soon as it has completed any current and higher priority tasks. The sequence, as it relates to this subject, works as follows:
1. List Manager detects the need to automatically upload a list.
2. In the case of the Log List, it sends an Alarm to the host.
3. It notifies the SECS Controller through the Command Queue.
4. It sets the appropriate Auto Upload Notification flag.
5. The SECS Controller issues the UploadAuto command, and uses UploadNext to upload all non-Suppressed List entries.
6. After receiving the host's entire S127,F132 ACK message, the SECS Controller issues the Edit command. If it does not receive the host's entire S127,F132 message, it issues an UploadAbort command.

7. It then begins issuing SuppressByTag and DeleteByTag commands based on the host's ACK codes.
8. After it has Suppressed or Deleted all appropriate entries, it issues the EditEnd command.
9. The SECS Controller passes UploadDone to the List Manager.
10. The List Manager clears the appropriate Auto Upload Notification flag (assuming that this was an UploadAuto).

The List Manager will not protest if the SECS Controller passes an UploadAuto command for a List that the List Manager has not told the SECS Controller to upload. If ECID LJLSSU is zero (the default and only in-scope value), the DRU will continue processing carriers and adding entries to the History and Log Lists, taking elements from the Free Chain or the Log List as needed.

Two separate ECIDs are used for Log list monitoring. First is the Log List Buffer Size. The name for this ECID consists of three mnemonic atoms: LJ for "log"; LS for "list"; and BV for "buffer." The result is LJLSBV. Its default value is zero. The second ECID is for Log List Status, or LJLSSU. The purpose of LJLSSU is to define how the DRU reacts if LJLSBV is nonzero, the Free Chain is exhausted, there are no Suppressed entries in the Log List, and the DRU needs to add a new entry to one of its Lists. In effect, LJLSSU controls the DRU's response to Log List overflow.

There are two modes: In one, the default (and only in-scope) mode, it is more important to process carriers than to preserve Log List data. In the other mode, it is more important to preserve Log List data than to process carriers. In the default mode (process carriers), the DRU's response to Log List overflow is to behave as if LJLSBV were zero, whether it is or not. Because handling Offline/Log List Overflow is out of scope, the DRU will behave in this manner regardless of LJLSSU's value. In the other mode (preserve data), the DRU's response to Log List overflow is to enter an Offline/Log List Overflow state, which looks quite similar to the Invisible state: The DRU sends SIF69 to machines wishing to send material to the DRU; and the DRU drops the Ready stop and Scan so that carriers just pass through the DRU.

The List Manager is said to be in the Edit Mode while it is performing a batch of Add or Delete operations for the SECS Controller, which uses unique commands to begin and end Edit Mode. A particular Edit session will either Add or Delete entries, but it cannot do both; it can, however, deal with multiple Lists.

It is essential that all entries in a particular batch of Edits (adds or deletes) remain invisible to the Carrier Controller (actually to the entire DRU) until the entire Edit is complete.

Because of anti-CPU-monopolizing requirements, the SECS Controller might not complete an entire batch of edits during a single polling loop. In the meantime, the Carrier Controller must not be denied access to the List Manager long enough to allow carriers to back up on the main line. To meet this requirement, and others, the List Manager will not lock out other List operations during Edit Mode.

The List Download Sequence is as follows:
1. The host downloads a batch of list entries to the DRU using Update Entry List Send (S127,F131).
2. The SECS Controller receives the entire message and sends the protocol ACK for each block to the host.
3. The SECS Controller passes the EditAdd command to the List Manager.
4. The List Manager sets its Edit/Add Mode flag and prepares four "Phantom" list chains: The Destiny, Block, History, and Log Phantom Chains. These chains will hold the new entries until the Edit is complete. As entries are added, all Access Tables, etc., will be updated to reflect the new entries, but each new entry will be flagged such that it will be ignored by other list operations that happen to run across them through the use of an Access Table. Normally the host is not allowed to add to the History or Log Lists, but the SECS Controller maintains a special debug flag that allows such operations.
5. The SECS Controller begins passing the contents of the host's download to the List Manager using Add commands.
6. The List Manager checks each entry for validity and passes the appropriate ACKC127 codes back to the SECS Controller. It also appends each new entry to the appropriate temporary "Phantom Chain", flags them as "not really here yet", and adds them to all appropriate Access Tables. During this time, the new entries are invisible to any other modules using the List Manager.
7. The SECS Controller buffers up the ACKC127s in order to build the S127,F132 ACK message.
8. After the last downloaded entry has been added, The SECS Controller transmits the S127,F132 message to the host.
9. After the SECS Controller receives the host's low-level protocol ACK for the S127,F132 message, it passes the EditEnd command to the List Manager.
10. Upon receiving the EditEnd command, the List Manager sets all new entries to "active", and tacks the Phantom Chains onto the end of the real List Chains.
11. If the DRU's power fails at any time before the SECS Controller sends the S127,F32 and receives the host's protocol ACK for the last block: upon Warm Boot, the List Manager will delete all entries in the Phantom Lists, turn off Edit Mode, etc. The SECS Controller will delete any tasks associated with the failed download. The host, having not received the DRU's S127,F132 ACK of the download, will re-transmit the original S127,F131.
12. If the host dies such that the SECS Controller is unable to successfully transmit the S127,F132 to the host, the SECS Controller will pass the EditAbort command to the List Manager, which will delete all entries in the Phantom Lists, turn off Edit Mode, etc.

The Delete List Entry Sequence is as follows:
1. The host sends a batch of to-be-deleted list entries to the DRU using Delete Entry List Send (S127,F129).
2. The SECS Controller receives the entire message and sends the protocol ACK for each block to the host.
3. The SECS Controller passes the Edit command to the List Manager.
4. The List Manager sets its Edit/Delete Mode flag, etc.

5. The SECS Controller uses the Delete command to relay each of the host-supplied delete keys.
6. The List Manager checks each command for validity and passes the appropriate ACKC127 codes back to the SECS Controller, but it does not actually delete the entries at this time. Instead, it flags them as "doomed". Doomed entries are still visible to all other modules using the List Manager and they still appear in all appropriate Access Tables.
7. The SECS Controller buffers up the ACKC127s in order to build the S127,F130 ACK message.
8. After the last entry has been "deleted", the SECS Controller transmits the S127,F130 message to the host.
9. After the SECS Controller receives the host's low-level protocol ACK for the S127,F130 message, it passes the EditEnd command to the List Manager.
10. Upon receiving the EditEnd command, the List Manager sets its "Murdering Doomed Entries" flag (which is stored in battery backed RAM), and begins actually deleting all "doomed" entries (flagging them as deleted and removing them from the Access Tables and List Chains). When this is done, the List Manager resets the "Murdering Doomed Entries" flag.
11. If the DRU's power fails at any time before the SECS Controller sends the S127,F130 and receives the host's low-level protocol ACK: upon Warm Boot, the List Manager will do one of two thing depending on the state of the "Murdering Doomed Entries" flag: (1) If the flag is not set, it will reinstate all "doomed" entries. (2) If the flag is set, it will delete all "doomed" entries. The SECS Controller will delete any Tasks associated with the failed Delete Entry List Send. The host having not received the DRU's S127,F130 ACK of the download will re-transmit the original S127,F129.
12. If the host dies such that the SECS Controller is unable to successfully transmit the S127,F130 to the host, it will pass the EditAbort command to the List Manager. The List Manager will reinstate all "doomed" entries.

A limit of 120 mS is imposed on how long any polled module can retain control before returning to the Executive. This limit is imposed by the following requirements:

1. The AC Fail signal provides about 170 mS of warning before +5V power dies. Execution must be stopped while power is still valid so that all data in battery-backed RAM is consistent and valid.
2. The interrupt-driven SECS input buffers are 300 bytes long; at 9600 baud, any given buffer will fill up in 300 mS. The SECS Controller some advance on that to be completely sure the buffers can must be given ever overflow.
3. The PIO de-bouncing routine is called twice per polling loop, once after each major polled module. If the de-bouncing routine is not called often enough, it will slow the Carrier Controller's response to PIO status changes unacceptably.
4. If the Carrier Controller itself is not called often enough (because another module hogs the CPU), it will slow the Carrier Controller's handling of carriers unacceptably.
5. A one-shot added to stretch the pulse from the Ready sensor allows the Carrier Controller to detect on the fly carriers arriving at Ready (as long as no carrier is in or about to enter Scan). This may generate a requirement not to de-bounce the Ready sensor signal and, in any case, will require the PIO module to be called no less often than 120 mS.

Some of the List Manager's searches will undoubtedly require a long time, perhaps several seconds. Further, the 120 mS limit applies, not to the List Manager, but to the major polled modules Carrier Controller or SECS Controller, so the List Manager will only be allowed some fraction of the 120 mS.

Just before each major polled module is called, the Executive starts an up-timer. The polled module can call an "Allotment-Remaining" utility procedure (or function) at any point to find out how much of its allotted time slot is gone. To make this procedure largely hardware independent (of CPU speed, AC-Fail lead-time, etc.), it returns the remaining fraction of the current time-slice expressed as a percentage.

The SECS Controller and Carrier Controller interrogate this Allotment-Remaining procedure between Active Tasks (carriers, for the Carrier Controller) to see if they have enough time to continue. This allows these modules to relinquish control partway through their internal Task polling, if that should prove necessary to meet the anti-monopolizing requirement. In this case, these modules would have to be able to pick up where they left off on the next call.

The List Manager's problem is even more difficult: When it is called, some unpredictable fraction of the 120 mS will be left, and the List Manager must return control to its caller with enough of the 120 mS remaining so that the caller will not exceed its allotment. This requires that the List Manager interrogate the Allotment-Remaining procedure fairly frequently and to return control to its caller while some reasonably large percentage (like 40%) of its caller's allotment is remaining.

This requires that the List Manager be "quasi-reentrant", that is, it must be able to relinquish control before it has completed an operation such as a search and to pick up where it left off on the next call. Such an incomplete operation is said to be deferred.

It's not possible for more than two list operations to be deferred at the same time, one for the SECS Controller and one for the Carrier Controller. This is true because it is required that the caller pick up precisely where it left off (with the same task) next time around the polling loop. When the Carrier Controller or SECS Controller gets back around to calling the List Manager to resume a deferred operation, it calls the List Manager passing its identity and a new "continue" command. The List Manager picks up where it left off. The List Manager uses the caller's identity to determine which of two possible deferred operation tables to use.

The List Manager will not allow EditEnd operations while a Carrier Controller operation has been deferred. This eliminates possible problems caused by a number of entries appearing or disappearing in the middle of a Carrier Controller operation.

The same set of ACK Codes is used by both the DRU and the host in similar but not identical ways. Furthermore, the same set of ACK codes is used for all stream 127 messages (List uploads, downloads, and deletes). Therefore, some of the definitions change slightly depending on the circumstances.

The DRU will send an S9 message in response to messages that have SECS-incorrect data (e.g., incorrect format, length, etc.).

The DRU sends the following ACK Codes in response to S127,F131 List downloads from the host:

0. Accepted: This is only appropriate for Destiny or Block List downloads. The DRU should not accept downloads of History List or Log List; these should be acknowledged with ACK Code 7. There is a debug flag that enables this operation for test purposes; the SECS Controller will maintain this flag and reject any disabled operation by the host. The List Manager will allow downloads to all lists.
1. Permission not granted, entry ignored, resend: Not used.
2. Matrix overflow, entry ignored: The List Array is completely full. OR: The Free Chain +Suppressed Log List entries is less than LJLSBV.
3. Unknown list, list ignored: The LSTID is not in the defined range of 1...4. The SECS Controller must check for this condition because if the LSTID is bad, the SECS Controller can't possibly call the List Manager (the List Manager's caller must pass it a list name).
4. Incorrect field format, entry ignored: Destiny (and in some cases Block) List entry contains logically incorrect data. Some examples:
    The Destination field of a Destiny List entry contains wildcards.
    The List Entry Identifier of a to-be-added Destiny/Block List entry does not contain all wildcards in the DRU Sub-LEID.
    The List Entry Identifier of a to-be-added List Entry contains wildcards in the host Sub-LEID.
    The BIS in a Destiny List entry that handshakes a carrier into a machine contains wildcards.
    Wildcard value ($FFFF) in Action code for Adds to Destiny List.
    Non-ASCII decimal characters in Source, Destination, or Time-Stamps.
    The main reason for this is to make it easier in debugging to detect errors and identify their source.
5. Duplicate entry, entry ignored: Duplicate entries are defined in terms of only the BIS, Bar Code and Source fields for the Destiny List and, additionally, the Destination field for the Block List. For this purpose, '%' counts as just another character, not as a wildcard. Duplicate entries are not allowed in either the Destiny or the Block List.
6. Delete entry: Not used.
7. Permission not granted, illegal action: The host tried to download a list that it isn't supposed to (e.g., History or log). A special debug switch will allow these operations to facilitate testing.
8. Duplicate List Entry Identifier, entry ignored: The host tried to download a Destiny or Block List entry with a List Entry Identifier that is already present in the DRU. List Entry Identifiers must be unique across both the Destiny and the Block Lists.
9. No Match: Not used.

The host can send the following ACK Codes in response to S127,F131 automatic History/Log List uploads from the DRU:

0. Accepted, do not delete entry, do not automatically upload again: The host uses this to acknowledge that it has received a list entry. In the case of automatic History List uploads, the present DRU software deletes History List entries upon acknowledgement. The new software must not delete any list entries unless the DRU receives an ACK Code of 6.
1. Permission not granted, entry ignored, resend: The DRU doesn't know what went wrong, so it just tries again. If this causes an endless it. It's the host's responsibility to end the infinite loop, perhaps by replying with an ACK Code of 6 (Delete entry) or of 0 (Accepted, don't delete).
2. Matrix overflow, entry ignored: Presumably the host is temporarily out of space for the upload, so it is tried again.
3. Unknown list, list ignored: The host doesn't recognize the LSTID, but the DRU tries again. Again, it's the host's responsibility to end the infinite loop that may result.
4. Incorrect field format, entry ignored: The host doesn't recognize something about at least one field format, but the DRU tries again. Again, it's the host's responsibility to end the infinite loop that may result.
5. Duplicate entry, entry ignored: Not used.
6. Delete entry: The host uses this to acknowledge that it has received the entry and that the entry in question has been safely stored in two places, so it can be deleted from the DRU. Note that deleted History List entries are moved to the Log List. In the case of the Log List, ACK 6 is treated like ACK 0.
7. Permission not granted, illegal action: Not used.
8. Duplicate List Entry Identifier, entry ignored: Not used.
9. No Match: Not used.

If the host sends an ACK Code that is not defined or not used, the DRU will respond with an S9 message.

The DRU sends the following ACK Codes in response to S127,F129 Delete entry List Sends from the host:

0. Accepted: At least one match was found for the supplied delete key.
1. Permission not granted, entry ignored, resend: Not used.
2. Matrix overflow, entry ignored: Not used.
3. Unknown list, list ignored: The LSTID is not in the defined range of 1...4. The SECS Controller must check for this condition because if the LSTID is bad, the SECS Controller can't possibly call the List Manager (the List Manager's caller must pass it a list name).
4. Incorrect field format, entry ignored: The List Entry Identifier is improperly specified in a Delete operation (it has wildcards where it shouldn't).
5. Duplicate entry, entry ignored: Not used.
6. Delete entry: Not used.
7. Permission not granted, illegal action: Not used.
8. Duplicate List Entry Identifier, entry ignored: Not used.
9. No Match: No match was found for the supplied delete key.

COMMAND: Add

Add a single entry to the specified list after checking for duplicate entries, invalid field content, insufficient room in list, etc.

If LJLSBV is set and adding an entry to any list would result in less than LJLSBV available "free" entries (the Free Chain plus suppressed entries in the Log List), the List Manager will:

Return ACK code 2 (Matrix Overflow) to the caller.

Send the LJLSBV Alarm to the host.
Send an automatic Log List upload Command Queue message to the SECS Controller.
Set its Auto Log Upload Notification flag (in BB-RAM).
Space for the new entry is obtained from one of the following sources (in order of preference):
1. The oldest element in the Free Chain.
2. The oldest Suppressed Log List entry.
3. The oldest non-Suppressed Log List entry.

Additions to the History and Log Lists have their Query Time Stamp set to zero.

It is the responsibility of the caller SECS Controller or Carrier Controller to supply the host Sub-LEID (with %'s in the DRU Sub-LEID); in the SES Controller's case, the host does this.

COMMAND: Continue

Used by the caller to resume processing a previously deferred operation. It is not necessary to pass all of the parameters associated with the original deferred operation. Only the caller's identity and the Continue command are required.

COMMAND: Delete

This command is used to delete entries from any of the DRU's four lists. The caller supplies a delete key for every field; wildcards are valid (i.e., the % character will match any character). This means that a single delete command can delete multiple list entries.

The host must insure that it doesn't issue a delete command that wipes out more entries than intended.

The use of wildcards within the List Entry Identifier is restricted as follows:
1. The host may only supply the DRU Sub-LEID if it has also supplied a full, non-wildcarded, host Sub-LEID.
2. The DRU Sub-LEID must contain either all or no wildcards. The List Manager returns an error (in the form of ACK code 4), if the above rules are broken.

Wildcard characters within a List Entry are treated as just another character; they are not treated as wildcards:

|  | MATCH | NO MATCH | MATCH |
|---|---|---|---|
| Delete key: | AB%%EFGH | ABCDEFGH | AB%%%%GH |
| List entry: | ABCDEFGH | AB%%EFGH | AB%%EFGH |

The List Manager optimizes its strategy for locating potential victims as shown in Table 35:

TABLE 35

| TYP | LEID KEY SUPPLIED | LIST(S) | LOCATION STRATEGY | MAX NUM |
|---|---|---|---|---|
| A | Full LEID | All | Tag points to the entry | 1 |
| B | Full Host ID | Destiny/Block | Use Access Table 1 | 1 |
| C | Full Host ID | History/Log | Seq. search entire List | n |
| D | Part Host ID | All | Seq. search entire List | n |
| E | Wild LEID | All | Seq. search entire List | n |

This is by far the fastest strategy. The right four bytes of the LEID contain the List Array index of the element to be deleted. If that entry is in the specified List and all of its fields match the delete key, the entry will be deleted. Using this method, the caller can only delete one entry per Delete command. This will normally be used by the host to delete History List entries after they have been stored.

This strategy is also very fast, but it only works for deletes from the Destiny and Block Lists. Access Table 1 is a hashing table of the host Sub-LEID that spans both the Destiny and Block Lists. The List Manager searches the short Access Chain associated with the delete key LEID's hashing value, attempting to locate the key's LEID. If an entry with a matching LEID is found, that entry is in the specified list, and all of its fields match the delete key, the entry will be deleted. As with strategy A, the caller can only delete one entry per Delete command, so the List Manager stops searching when it finds the first match.

Deletes within the History and Log Lists that do not supply a full LEID in the delete key must simply search the entire specified list looking for all matches (even if the caller supplied the host Sub-LEID).

Deletes that do not supply a partially wildcarded host Sub-LEID are treated just like strategy E deletes, except that only entries that match the supplied LEID will be deleted.

This is the slow train. The List Manager searches the entire specified List for all entries that match the delete key. In this situation, several list entries can be deleted with a single Delete command. The location algorithm should search for an entry that matches the first supplied field. If this field matches, the second supplied field is compared; if this matches, go on to the third field, if not, skip to the next entry.

Although the List Manager tries to optimize its method of locating potential matches as described above, it requires that all fields of the delete key match those of the located list entry.

Deleted History List entries are converted to Log List entries. Deleted entries in all other lists are returned to the Free Chain. When converting deleted History List entries to Log List entries, the Query Time Stamp must be set to zero. Also, it is not necessary to check LJLSBV because this operation does not use up any more space in the List Array.

COMMAND: DeleteByTag

Used by both the SECS Controller and Carrier Controller to delete an entry quickly by specifying the entry's Tag (array index).
1. The caller must supply the correct list name.
2. Use an integer Tag value to avoid a lot of extra conversions.
3. The Carrier Controller will use this outside of edit mode.
4. Must tolerate target entry having already been soft deleted.

COMMAND: EditAdd, EditDelete, EditAbort, EditEnd

Used by the SECS Controller to bracket a batch of Add or Delete commands for Delete Entry List Send (S127,F129) and Update List Send (S127,F131), and a batch of DeleteByTag and SuppressByTag commands used during automatic History/Log List uploads.
1. These commands put the List Manager in and out of Edit Mode.
2. If a Carrier Controller operation is deferred at the time the SECS Controller passes the EditEnd command, the List Manager will return a Not Complete result code.

3. Any Add or Delete operations are invisible until the SECS Controller finally says EditEnd. This allows other List Manager operations to be performed by the Carrier Controller during Edit Mode.
4. Generate a descriptive fatal error if the SECS Controller tries to do anything other than Add or Delete (whichever is appropriate), EditEnd, EditAbort, or Continue while it's in Edit Mode.
5. Use Doomed Chain for deletes. A doomed flag must also be set in each doomed entry so that the Carrier Controller can ignore them if the List Manager is Murdering Doomed Entries.

COMMAND: Find

Used by the Carrier Controller to do a "Hierarchical Search" of the Destiny and Block Lists.
1. The caller must specify "Both" as the list to be searched.
2. Destiny and Block List entries are ignored if the current time is earlier than the entry's Task Enabled Time-Stamp (TETS), unless TETS is zero.
3. Return the blocking entry's LEID (used by the Carrier Controller in ALTX, etc.).
4. List Manager's "Both" command refers to a Hierarchical Search that checks "both" the Destiny and Block Lists.
5. Always check the Block List even if the carrier is misoriented.
6. If the Murdering Doomed Entries flag is set, doomed entries will not be visible to the Carrier Controller. If the flag is not set, doomed entries are visible.

COMMAND: ReadByTag

Used by the SECS Controller to support Search List Send (S127,F137). After using SearchStart and SearchNext to locate all host-specified entries, sorting them, etc., the SECS Controller uses this command to actually read the contents of all located entries in preparation for sending them to the host.

COMMAND: DeleteAll (formerly Reset)

This initializes the specified list(s) to their "virgin" state.

Only the SECS Controller uses this command. The Executive uses the ColdBoot and WarmBoot commands to reset Lists, etc.

COMMAND: SearchStart, SearchNext, SearchAbort, SearchDone

These commands support Search List Send (S127,F137).
1. SearchStart contains the search key and the name of the list to search (can be a specific list or all lists).
2. The List Manager performs the entire search operation when it receives the SearchStart command.
   It may return several Not Complete results as required to prevent CPU hogging.
   It keeps a count of the number of matches and stores each match's Tag in an array.
   After all matches have been found it returns the number of matches in UploadCount (formerly SnapCount), along with the Tag values of the first three matching entries.
3. The list Manager saves the time of the first SearchStart command; this is used later for time-stamping.
4. The SECS Controller uses SearchNext to get the Tags for any additional matches, in blocks of three.
5. The SECS Controller may issue the SearchStart command several times before it issues the closing SearchDone command (the host might supply multiple search keys).
6. All matching entries will be returned, including those that have been Suppressed.
7. All returned entries will have their Uploaded status bit set. When the SearchDone command is received, the List Manager will set the Query Time Stamp of all entries (in all Lists) that have their Uploaded bit set. The List Manager will also Suppress any uploaded Log List entries. The List Manager should set flags that indicate which Lists contain uploaded entries so that it doesn't waste time looking through lists that were not involved in the operation. This also applies to the Upload commands.
8. Search uploads of Log List entries result in the uploaded entries being Suppressed (in addition to having their Query Time Stamp set). The List Manager does this when it receives the SearchDone command.
9. SearchAbort causes the List Manager to release the snapshot and at the same time reset any Uploaded bits.
10. Don't allow Upload commands, etc., while a Search operation is active.
11. Use flags to indicate whether anything was Added or Deleted to/from a particular List while the snapshot was set. This saves the List Manager from looking through unchanged lists for Added and Deleted entries when the snapshot is released. This also applies to the Upload commands.

COMMAND: SuppressByTag

Used by the SECS Controller to Suppress future automatic uploads of History and Log List entries that have been automatically uploaded to the host and received an ACK 0 (also ACK 6 in the Log List's case) from the host.
1. The List Manager does this by setting the entry's Suppress bit.
2. The List Manager also sets the entry's Query Time Stamp to the time that the current upload sequence was started (the time that the UploadAuto command was received).
3. The Carrier Controller does not use this command.
4. Fatal error if not History or Log List, or if not in UploadAuto mode.
5. Must tolerate target entry having already been soft deleted.

COMMAND: Tickle

Used by the Executive to call the List Manager from the polling loop. The List Manager checks for Automatic History and Log List uploads, timeouts, etc.

COMMAND: UploadAuto, UploadRequest, UploadNext, UploadAbort, UploadDone

Used by the SECS Controller to upload the contents of the specified list to the host.
1. UploadAuto indicates that this is an automatic History/Log List upload. The List Manager will not upload Suppressed entries.
2. UploadRequest is used when the host has issued a Dump List Send (S127,F135). The List Manager will upload the entire list, including any Suppressed entries.
3. Requested uploads of the Log List result in the uploaded entries being Suppressed. The LM does this when it receives the UploadDone command.
4. The List Manager saves the time of the UploadAuto or UploadRequest for later use in setting the Query Time Stamp.
5. In the case of UploadRequest, all returned entries will have their Uploaded status bit set. When the UploadDone command is received, the List Manager will set the Query Time Stamp of all entries (in all lists) that have their Uploaded bit set. The List Manager will also Suppress any uploaded Log List entries. The List Manager should set flags that indicate which lists contain uploaded entries, so that it doesn't waste time looking through Lists that were not involved in the upload. This also applies to the Search commands.
6. In the case of UploadAuto, the SECS Controller will selectively DeleteByTag and SuppressByTag uploaded entries in response to the host's ACK codes. The SECS Controller will surround this batch of operations with Edit and EditEnd commands.
7. Uploads of Log List entries result in the uploaded entries being Suppressed (in addition to having their Query Time Stamp set). The List Manager does this when it receives the UploadDone command.
8. UploadAbort causes the List Manager to release the snapshot and at the same time reset any Uploaded bits.
9. Don't allow Search commands (as distinct from Find operation), etc., while an Upload operation is active.
10. Use flags to indicate whether anything was Added or Deleted to/from a particular list while the snapshot was set. This saves the List Manager from looking through unchanged lists for Added and Deleted entries. This also applies to the Search commands.
11. Fatal error if UploadAuto is not History or Log List.
12. The sequence looks something like this:

| | |
|---|---|
| UploadAuto | Snapshot set |
| UploadNext . . . | |
|    DeleteByTag . . . | |
|    SuppressByTag . . . | |
| UploadDone | Snapshot released |

13. The SECS Controller cannot issue the UploadDone until after the host has protocol-ACKed the S127,F132.
14. DeleteByTag and SuppressByTag must tolerate their targets having already been soft deleted.

COMMAND: WarmBoot and ColdBoot

Only the Executive uses these commands. The following provides a description of how the List Manager is organized, what procedures it contains, and how they are related.

In Pascal code, the data type descriptor "CHAR" (in upper-case) is used to define "byte" types. OmegaSoft Pascal treats "byte" and "char" as synonyms, however, the two are different in Turbo Pascal. In order to make the code as compatible as possible with both compilers, all 8-bit values are defined as "CHAR" (using upper-case to flag where this has been done). The data type descriptor "INTEGER" (in upper-case) is used to define "longinteger" types. This allows the DRU code to be tested in Turbo Pascal. Global procedure declarations are written as "{entry;}" so that the code can be tested under Turbo Pascal.

The following section lists the Utilities that the List Manager uses. The timers that the List Manager uses, are broken down into three categories:
1. Typical Maximum—These numbers a for reference only; they attempt to reflect Timer usage during normal operation.
2. Functional Maximum—These are the numbers that should be used by the writer of the Timer module when estimating the maximum number of Timers that may be simultaneously active. They reflect the functional limitations of the List Manager.
3. Absolute Maximum—These numbers are for reference only; they reflect the number of elements allocated to the data structures which use Timers.

The Serial Input/Output (SIO) Module handles all and output to and from the serial ports serving the DRU's three SECS ports and Bar Code Scanner port.

The SIO module provides interrupt-driven, self-emptying and self-filling data output and input buffers.

The SIO module consists of the following procedures:
1. Init SIO: Initializes the four serial ports under the control of the SIO module;
2. Set SIO: Sets the direction of a given port to either transmit, receive, or neither;
3. SIO Stat: Returns the status of a specified port;
4. SIO In: Reads a character from the specified port; and
5. SIO Out: Sends a character to the specified port.

Each of the above procedures operates on all four ports controlled by the SIO module: Host, Machine 2, Machine 4, Bar Code Scanner Buffer sizes are set at 300 bytes for both read and write buffers for each of the four channels.

The following provides the information required to call the collection of procedures that make up the SIO module and properly pass parameters to them.
1. Procedure Init SIO; Entry;

Calling this procedure does the following:
Clears the input buffer of any characters.
Resets any error status information.
Performs any low-level ACIA resetting deemed necessary from Pascal.
Opens four Device Drivers, gets their file handles and saves them for later.
Sets all channels to Receive Mode.
This procedure will normally only be called by the Initialization module at Cold Boot or Warm Boot.
2. Procedure Set SIO(Schan : Channel; Smode : Mode); Entry;

This procedure sets the SIO channel selected by the "Schan" parameter to the mode specified by "Smode" parameter. Calling this procedure, even if all values are set exactly as they were before, resets the error flags (Receive Buffer Overflow, etc.) for the selected channel. Changing the Mode does nothing to the contents of the internal Receive or Transmit Buffers; they continue to "self-fill" or "self-drain" until done. Thus, for example, a number of characters could be sent to the serial port, then the line mode immediately changed to Receive without having to wait until the characters are actually sent. The only exception is that if an error (253, 254, 255) occurs, then the input buffer for that channel is cleared and the SIO driver waits until the output (write) buffer finishes draining before returning to the calling program. If a calling program has set the Mode of a given Channel and then attempts an incorrect operation, for example, setting a channel to RCV and attempting an SIO Out operation, the request will be ignored and an appropriate error message will be displayed on the DRU console.

3. Procedure SIO Stat(Schan : Channel; VAR Smode : Mode; VAR Bufstat : Byte); Entry;

This procedure accepts a call with one of the four possible channels specified in the Schan parameter. It returns the current channel mode in Smode and returns a status byte in Bufstat. The possible values returned by Bufstat are listed below:

| Bufstat | Meaning |
|---------|---------|
| 0 | Receive buffer empty. |
| 1 | Normal - no other specific condition exists. |
| 2 | Transmit buffer full. |
| 253 | UART receive ERROR. |
| 254 | Transmit character ignored ERROR- buffer was full and an outgoing character was dropped. |
| 255 | Receive buffer overflow ERROR. |

In general, the "low-value" Bufstat values reflect normal situations and the "high-value" Bufstat values reflect errors. The "low-value" Bufstat values reflect the current state of the port. The "high-value" values are set on an error and are only reset by changing the value of the Mode for that channel. Bufstat values 0, 1, 253, or 255 may be returned when the channel is in the Receive mode. Bufstat values 1, 2, or 254 may be returned when the channel is in the Transmit mode. If a channel is in the Receive mode and the receive buffer fills to 300 characters or more without being emptied, the receive buffer overflow error flag will be set for this channel in the SIO Stat function buffer, causing this condition to be displayed when checking SIO Stat for that channel prior to reading a character. The error condition flag must be reset by a call to Set SIO for that channel.

4. Function SIO In(Schan: Channel) : Byte; Entry;

This function reads an incoming byte from the specified channel and returns it to the calling operation. This function should never be called unless a character is available in the read buffer, as determined by SIO Stat. Thus, normal operation is to check SIO Stat, read a character, check SIO Stat, read a character, etc. If this function is mistakenly called when the read buffer is empty, it will return a value of zero and an error message will be displayed on the console.

5. Procedure SIO Out(Schan : Channel; Outchar : Byte); Entry;

This procedure transmits characters. Normal operation for sending a character out is similar to that for reading a character: check status to verify that the transmit buffer isn't full, send a character, check status, send a character, etc. Assuming that the character output buffer starts empty, this loop can go on until the device driver internal write buffer, nominally 300 characters long, is full. At that time the status information will say that the write buffer is full and that no more characters can be sent until the self-draining buffer empties itself somewhat. If, erroneously, a calling program attempts to write a character when the write buffer status says "buffer full", the character will be ignored, the Transmit Character Ignored error flag will be set, and an error message will be sent to the console.

The SIO module requires a maximum of four timers, one per channel.

The SIO module includes several special features:
1. The four channels supported by this module will send and receive the full 0–255 range of Char values. XON, XOFF, control-C, etc. will have no special effects and will be passed through the same as any other characters. To support this, the standard assembly-language device driver source code must set the "no handshake" byte in the code itself and the appropriate device driver header bytes must be set to block special treatment of the DRU console editing keys.
2. The SIO module must be initialized by the Initialization routine at cold and warm boots before any modules that will use it are called.
3. All four serial ports driven by this module are to:
   9600 Baud
   1 Start bit
   1 Stop bit
   No parity
   8 Data bits
   Full Duplex The PIO module supports the transmission of signals between the DRU software and the DRU sensors and actuators. It also provides the means to read the status of the 16-bit hardware I.D. switch, the state of the lobotomy switch (a hardware reset), and the level of the A.C. Fail indicator line driven by the A.C. Fail hardware module. This module enforces the non-overlapment of "up" and "down" commands for lift mechanisms and also forces a delay during motor reversal to allow a motor to come to a stop before being started up in the opposite direction.

The PIO Module includes the following major data structures:

1. The Motor Status Array (UTMOTSTA[]) contains entries for the seven motors controlled by the DRU: The Scan Transfer motor, the possible transfer motors on each of the four ports, and the two spur motors. The array is a 7-element array of records, organized as shown below. The record field identifiers are shown in parentheses above the column function information.

|  | Column Labels | |
|---|---|---|
| Row Label Motor | (Timeout) Waiting for timer number | (Direction) Direction to run motor at timeout |
| MotorScan | 0-N (Byte) 0=no timer timing. <>0=timer number. | -1, 0, +1 (Integer) -1=in (all but Scan), =Spur2 (Scan). 0=Stop. +1=out (all but Scan), =Spur4 (Scan). |
| Motor21 | 0-N (Byte) 0=no timer timing. <>0=timer number. | -1, 0, +1 (Integer) -1=in (all but Scan), =Spur2 (Scan). 0=Stop. +1=out (all but Scan), =Spur4 (Scan). |
| Motor22 | 0-N (Byte) 0=no timer timing. <>0=timer number. | -1, 0, +1 (Integer) -1=in (all but Scan), =Spur2 (Scan). 0=Stop. +1=out (all but Scan), =Spur4 (Scan). |
| Motor41 | 0-N (Byte) 0=no timer timing. <>0=timer number. | -1, 0, +1 (Integer) -1=in (all but Scan), =Spur2 (Scan). 0=Stop. +1=out (all but Scan), =Spur4 (Scan). |
| Motor42 | 0-N (Byte) 0=no timer timing. <>0=timer number. | -1, 0, +1 (Integer) -1=in (all but Scan), =Spur2 (Scan). 0=Stop. +1=out (all but Scan), =Spur4 (Scan). |
| Spur2Motor | 0-N (Byte) 0=no timer timing. <>0=timer number. | -1, 0, +1 (Integer) -1=in (all but Scan), =Spur2 (Scan). 0=Stop. +1=out (all but Scan), =Spur4 (Scan). |
| Spur4Motor | 0-N (Byte) 0=no timer timing. <>0=timer number. | -1, 0, +1 (Integer) -1=in (all but Scan), =Spur2 (Scan). 0=Stop. +1=out (all but Scan), =Spur4 (Scan). |

The "Motor" axis is declared as a subset of the Enumerated Type PIO Device. When a motor command is given, the appropriate motor output is shut off immediately. The appropriate action to be taken later is entered into the array and a timer is started. When the timer has timed out, the time out is detected during the PIO Tikl operation and the appropriate motor is started using a low-level routine to drive the desired PIO lines. The timer just used will be cancelled, the timer entry will be set to zero, and the motor-direction entry will remain, to be used to answer status inquiries. If any request to drive a motor is received while a timer is active for that motor, a "PIOError" error indication is returned and the operation ignored. Even a "shut off" command must set a timer to ensure no further commands are accepted until the motor has braked to a halt. The time used for all motor delays is nominally one second and is set by the global variable UTMOTREV—a long integer—which holds the time in milliseconds. This will be set during DRU Initialization and may not be modified by the PIO module. Note, however, that the PIO module must treat any value below 100 milliseconds as being equal to 100 milliseconds, just to be safe. A command to set a motor to the operation to which it is already set will be ignored and no error will be flagged. Motor status is determined by checking the UTMOTSTA array. If a timer is enabled for a given motor, the status must be "Changing". Otherwise, the status is assumed to be the same as the last command put into the array in the right-most column. The array should be initialized to all zeros by PIO Init so that "never driven" motors will return a status of "Stopped". Since PIO Init turns all PAMUX outputs off and waits for UTSETTLE before returning, the motors are actually stopped by that time.

2. Lift Status Array:

The Lift Status Array (UTLFTSTA[]) contains entries for the five lift mechanisms controlled by the DRU: The Scan lift mechanism, plus the four possible lift mechanisms at the four real ports controlled by the DRU. The structure of the array is roughly the same as for the UTMOTSTA array, but the UTLFTSTA array has an extra column. The array is a 5-element array of records, organized as shown below. The record field identifiers are shown in parentheses above the column function information.

|  | Column Labels | | |
|---|---|---|---|
| Row Label Lift Mechanism | (Timeout) Centering Timer # | (Moving Flag) Moving Flag | (Direction) Commanded Direction |
| LiftScan | 0-N (Byte) 0=no timer timing. <>0=timer number. | 0 or 1 (Byte) 0=stable 1=moving | -1, 0, +1 -2, +2 (Integer) L/T dev's: -1 = Down 0 = Center +1 = Up L/I dev's: -2 = Down +2 = Up |
| Lift21 | 0-N (Byte) 0=no timer timing. <>0=timer number. | 0 or 1 (Byte) 0=stable 1=moving | -1, 0, +1 -2, +2 (Integer) L/T dev's: -1 = Down 0 = Center +1 = Up L/I dev's: -2 = Down +2 = Up |
| Lift22 | 0-N (Byte) 0=no timer timing. <>0=timer number. | 0 or 1 (Byte) 0=stable 1=moving | -1, 0, +1 -2, +2 (Integer) L/T dev's: -1 = Down 0 = Center +1 = Up L/I dev's: -2 = Down +2 = Up |
| Lift41 | 0-N (Byte) 0=no timer timing. <>0=timer number. | 0 or 1 (Byte) 0=stable 1=moving | -1, 0, +1 -2, +2 (Integer) L/T dev's: -1 = Down 0 = Center +1 = Up L/I dev's: -2 = Down +2 = Up |
| Lift42 | 0-N (Byte) 0=no timer timing. <>0=timer number. | 0 or 1 (Byte) 0=stable 1=moving | -1, 0, +1 -2, +2 (Integer) L/T dev's: -1 = Down 0 = Center +1 = Up |

-continued

| Row Label Lift Mechanism | Column Labels | | |
|---|---|---|---|
| | (Timeout) Centering Timer # | (Moving Flag) Moving Flag | (Direction) Commanded Direction |
| | | | L/I dev's: −2 = Down +2 = Up |

The "Lift Mechanism" axis is declared as a subset of the Enumerated Type PIO Device. A discussion of the three different types of lift mechanisms is provided below.

As with the motor-driving setup, no operations should be accepted if a lift mechanism is "changing", and a PIOError error will be returned if this is tried. Operations on the above array are facilitated through the use of the procedure Drive Mech(PIO Device, Position) and the function Read Mech(Device).

Driving lift mechanisms:
Lift/Transfer mechanisms:
When a command is received to drive a List Transfer mechanism, the Moving Flag is always set. If the commanded direction is towards Center, then a Centering Timer is also started and stored in the appropriate column. During PIO Tikl operations, when the Centering Timer exists and has timed out, then the Centering Timer and Moving Flag entries are cleared to zeros. During PIO Tikl operations, if the destination is not Center (no Centering Timer exists) then when the Read Mech function says the device has reached the commanded destination, the Moving Flag is cleared to zero. The Centering Timer should always be set to the value held in the global variable UTLFTCTR. Note that there is no apparent difference between the Scan and all other Lift/Transfer mechanisms at this level, as the Drive Mech and Read Mech operations "hide" the different combination of command lines required to drive the two types.

Lift/Index mechanism:
Driving the Lift/Index mechanism is virtually the same as driving the Lift/Transfer mechanism, with the following differences:
(i) There is no "Center" destination.
(ii) The drive to the mechanism should be completely removed once the mechanism is sensed as having reached its destination, since it will be latched there. In fact, the drive could be removed earlier without problems, but there is no convenient milestone prior to the mechanism having reached its destination.

The program (Tikl routines) can know whether to remove the drive by checking the Commanded Destination location to see if the command was for a Lift Index or Lift/Transfer device.

Sensing lift mechanisms:
Sensing the status of lift mechanisms is similar to the situation with motor-sensing. If the Moving Flag is non-zero, then the status is "Changing". If it is zero, then the location of the mechanism is assumed to be that stored in the Commanded Direction column of the UTLFTSTA array. Note that when the PIO module is given a status request for a lift mechanism, it must be generated from the UTLFTSTA array, not from the Read Mech function, since that will not give "Changing" status information. Also note that "never driven" lift mechanisms should return a status that reflects the status as seen by Read Mech if it is High or Low, but it should return the status of Centered if it is neither, not Changing.

Initializing the lift status array:
The array should be initialized to all zeros by PIO Init, so "never driven" lift mechanisms will return a status of "Centered". Since PIO Init turns all PAMUX outputs off and waits for UTSETTLE time before doing anything, the lift mechanisms should be in stable states by that time. The UTSETTLE time is partly to allow any lift/index mechanisms that were interrupted in mid-move by a power outage to complete their motion and settle into stable locations prior to sensing them with the PIO routines.

3. Action OK Array:

This array is normally read by the PIO Param OK function to determine if a combination of PIO Device and PIO Action is permissible. It is a one-dimensional array called UTACT OK[]. The index consists of the device to be commanded, with the range of possible values defined as those contained in the Enumerated Type PIO Device. Each element is the set of all allowable actions for the indexed device. This array will be virtually the only "filter" used by the PIO module to verify that an operation is permissible, so it must be complete.

4. Hardware Organization:

The PAMUX is controlled via port P1 of the Mizar VME 8305 PIO board. The hardware I.D. switch is read via port P2 of the 8305 board. The A.C. Fail and the Lobotomy switch are both read via P2 of the 8305 board.

The only significant algorithm used in the PIO module is that used for "debouncing"—aka digital filtering.
The individual procedures used in interfacing with the PIO module are discussed below. In general, for all but PIO Init and PIO Tikl, the following sequence will be followed:
(i) Check if the command parameter combination is a valid one, if parameters are passed to the module, return error code and do nothing if parameters are invalid;
(ii) Perform the requested operation;
(iii) Set PIO Response if appropriate; and
(iv) Return to the calling module.

1. Procedure PIO Init; Entry;

This procedure resets all PAMUX outputs to the OFF state and resets internal PAMUX registers by dropping A7, initializes the processor on the PIO board, clears all PIO global variables to the "brand new" state, and sets various global arrays to their proper starting values. It also turns off the motors, etc., so that the hardware state agrees with the array contents. This procedure also initializes the state of the "sensor history" data arrays used in the debouncing operation. It clears both UTRAW-SEN and UTFLTSEN arrays to all zeros. Note that this procedure, while it clears the various status arrays of any timer information, does not actually cancel any outstanding timers. It assumes that whenever the PIO module is initialized (Cold or Warm Boots), the Timer module will be initialized also, removing any active timers. The alternative, to cancel timers without regard to error messages saying they were already cancelled, is more dangerous. It also enforces the delay time of UTSET-TLE (nominal one second) to allow motors to brake to a stop and lift mechanisms to come to their final resting places. This procedure must be called after the Timer module is initialized, since it uses timers in its initialization operation.

2. Procedure PIO Tikl; Entry;

This procedure is typically activated by the Executive module, as part of its standard polling sequence. The PIO module checks to see if it has any previously-commanded timer-related operations that require action and performs the actions if required. Before it calls the Tikl Motor or Tikl Mechs procedures, PIO Tikl also performs "debouncing," or "digital filtering". This must be done first, so the current data is available to the two indicated internal "Tikl" routines. When called, the debouncing operation updates the raw sensor data array, called UTRAWSEN, with the latest raw data from the 24 input lines, bit numbers 41-64. The most recent data goes into column 1 of the array and the other three columns are all shifted over one place. The procedure then computes the new "filtered" values for the 24 input lines and places those values into the UTFLTSEN array for use by the Read Bit internal procedure. The rule for updating the filtered data is this: If all four values for a given bit in the UTRAWSEN array are the same value, then the UTFLTSEN array bit must be set to that value. If any of the four values do not agree, then the value of UTFLTSEN remains as it was. In general, only the PAMUX IN and PAMUX OUT deal with the raw data from the sensors. All other operations use the filtered data returned by Read Bit. Note that Read Bit only filters the data from the 24 sensor inputs. If requested to read the state of an output, it returns it directly, since this just reflects the status of an internal PAMUX flip-flop and needs no filtering.

3. Function PIO Stat(Device : PIO Device): PIO Response; Entry;

This function gives the caller the status of ports, motors, etc. on the conveyor hardware. It does not return the raw 64 I/O lines, but instead returns information in a function-oriented form. The caller can read inputs or the current status of any output.

4. Procedure PIO Do(Device : PIO Deice; Action : PIO Action; VAR Response : PIO Response); Entry;

This procedure lets the calling routine give commands to the conveyor hardware.

5. Procedure PIO Barf(VAR Barfup : Barf Bucket); Entry;

This procedure disgorges the "logical" state (from the procedure Read Logical Bit) of all 64 I/O lines, one line per bit, in 8 bytes. It returns the "filtered" values for the 24 sensor inputs.

The Barfup array is of type Byte and holds eight bytes, bytes #1 through 8. The state of PIO it #1 appears in byte 1, bit 0, PIO Bit #8 appears in byte 1, bit 7, and PIO Bit #9 appears in byte 2, bit 0, etc.

6. Function PIO EQID : Integer; Entry;

This function reads the state of the DRU 16-bit DIP switch and returns the value as an integer.

The procedures and functions that make up the internal structure of the PIO module are discussed below.

1. Parameters:

The procedure will be passed, in the Device parameter, one of the five lift mechanism Enumerated Names. The Position parameter will hold one of the following values:

| Position Value | Meaning |
|---|---|
| −255 | Turn off both drives to the mechanism (only given to L/I mechanisms) |
| −1 | Drive mechanism to down |
| 0 | Drive mechanism to center |
| +1 | Drive mechanism to up |

2. Function OK To Drive(Bitnum : Byte): Boolean;

This function returns TRUE if a specific output bit can be set without creating a possibly smoke-generating conflict in a motor or lift mechanism, otherwise it returns FALSE. This is a last-ditch check to verify that a program gone wild doesn't try to drive a motor both ways at once, or to drive a mechanism both up and down at once. This function operates at the physical, not logical, signal levels, to keep it at the lowest possible level. Thus, if signal polarities change, this function must change also. If the function generates a FALSE output, the action is not acted on and a large error message is displayed on the system console.

3. Function Read Mech(Device : PIO Device): Integer;

This is the companion to Drive Mech. It senses the lift mechanism sensor lines and returns one of three possible values:

| Position Value | Meaning |
|---|---|
| −1 | Drive mechanism is down |
| 0 | Drive mechanism is centered, or at least neither sensor registers it |

| Position Value | Meaning |
| --- | --- |
| +1 | Drive mechanism is up |

Since a non-existent lift mechanism will have its two sensor outputs tied to the Toggle signal, they may be both up or both down at any given time. Therefore, either of these two cases should be returned as Position Value 0.

4. Procedure Drive Motor(Device: PIO Device; Direction: Integer);

This procedure controls the seven possible motors on the conveyor hardware. Possible parameters are:
Device: MotorScan, Motor21, Motor22, Motor41, Motor42, Spur2Motor, Spur4Motor
Action: SpurIn, SpurOut, XferIn, XferOut, ScanTo2, ScanTo4, MotorOff
This procedure is "dumb," and will accept any command given it. It is assumed that the PIO module will have already blocked any improper command combination before it gets here.

5. Function Read Motor(Device: PIO Device): Integer;

This function is the companion to the above procedure. The Device parameter is the same as that for the Drive Motor procedure and can have the same range of values.

6. Procedure Tikl Motors;

This procedure examines the UTMOTSTA array and takes whatever operations are indicated. The operations will not include originating any operations, just continuing operations that have already been put into the array.

7. Procedure Tikl Mechs;

This procedure examines the UTLFTSTA array and takes whatever operations are indicated. The operations will not include originating any operations, just continuing operations that have already been put into the array.

8. Function Read Logical Bit(Bitnum: Byte): Byte;

The purpose of this function is to make all stops appear to operate the same for the same logical command levels, instead of a "1" driving some low and others high. It is the companion to the procedure Write Logical Bit. This procedure should report that, if a stop is being driven low, the status is 0. If it is being driven high, the status is 1. Only the lines indicated below are affected; all others are passed through unaltered. "Bitnum" refers the I/O numbers from 1 to 64 referred to in Appendix 2 at the end of this discussion, where bits 1-32 are in PAMUX #1, and 33-64 are in PAMUX #2. This function returns the LOGICAL value of the given bit. This is the same as the ACTUAL value of the bit, except for the following lines, which should have their true status inverted:

| Bitnum | FUN-Spec Name |
| --- | --- |
| 13 | WAIT2A lower (pop-up) |
| 14 | WAIT2B lower |
| 15 | STOP21A lower |
| 16 | STOP21B lower |
| 19 | WAIT4A lower (pop-up) |
| 20 | WAIT4B lower |
| 21 | STOP41A lower |
| 22 | STOP41B lower |
| 25 | STOP22A lower |
| 26 | STOP22B lower |
| 29 | STOP42A lower |
| 30 | STOP42B lower |

9. Function Read Bit(Bitnum: Byte): Byte;

This is the companion to the above function and operates the same, except it reads the information without modifying it. This may also be used by functions other than its companion, so it must remain a stand-alone function. This function operates differently, based on the bit number. If the bit number is 1-40, it reads the actual data currently in the PAMUX, which reflects the state the outputs were last driven to. If the bit number is 41-64, then it reads its data from the appropriate byte in the UTFLTSEN array, which holds the filtered/debounced sensor data.

10. Function Translate Bit(Bitnum, Bitval: Byte): Byte;

This function decides if a given bit value should be inverted or not.

11. Function PAMUX In(PAMUX Addr: Byte): Byte;

Given the "address", this function returns the eight data bits associated with the two I/O modules at that address.

12. Function Two To The(Exponent: Byte): Byte;

Used in the above routine, this function returns 2 raised to the Exponent power, where Exponent is between 0 and 7 inclusive.

13. Procedure Write Logical Bit(Bitnum, Bitval: Byte);

This procedure is the companion to the Read Logical Bit function discussed above. It inverts the bit being written when sending an output to the ten PAMUX outputs.

14. Procedure Write Bit(Bitnum, Bitval: Byte);

This procedure is the same as the above procedure, except it operates without modifying any information.

15. Procedure PAMUX Out(PAMUX Addr, PAMUX Data: Byte);

This procedure puts the eight data bits in the byte into the two I/O modules located at the specified PAMUX address.

16. Function PIO Param OK(Device: PIO Device; Action: PIO Action): Boolean;

This function returns True if a combination of Device and Action is acceptable, otherwise it returns False. The decision is based on the contents of the UTAct OK[..]array. As parameters, it may be passed all possible PIO Device types and all possible PIO Action types.

The following provides the information required to call the collection of procedures that make up the PIO module and properly pass parameters to them. Discussions of the parameter meanings and uses follow each declaration.

1. Procedure PIO Init; Entry;

This procedure will normally only be called during initialization related to cold or warm boots. Its sets all PAMUX outputs to the OFF state, clears all PIO global variables to the "brand new" state, sets various used-internally-by-the-PIO global arrays to their proper starting values.

2. Procedure PIO Tikl; Entry;

This procedure, called by the Executive during normal polling, checks to see if it has any previously-commanded timer-related operations that require action and performs the actions if required, then returns to the calling module. This procedure performs the sampling of raw sensor data and the digital filtering of that data, providing filtered data for use during PIO operations to follow. This is done before this procedure uses the lower-level procedures Tikl Motors and Tikl Mechs.

3. Function PIO Stat(Device: PIO Device): PIO Response; Entry;

The PIO Stat function returns to the caller the status of any port or sensor on the conveyor hardware. It does not return the raw 64 I/O lines, but instead returns information in a function-oriented form. Note that there are no entries shown for the 10 Lift Sensors - Lift21 Up, etc. The outputs of these sensors are used by the PIO module internally, in generating the lift status information shown below, but the individual sensor signals for these lines are not brought outside of the PIO module. Different types of devices have different possible status values. Possible values for each type are indicated and discussed below. The following responses will be generated for error situations caused by a "Carrier Controller Running Amok":
(i) If the Carrier Controller erroneously requests the status of a non-existent lift mechanism, the status will be returned as IsCentered.
(ii) If the Carrier Controller erroneously requests the status of a non-existent sensor, the result will be randomly returned as IsOn or IsOff, depending on the state of the Toggle line, to which the sensor line is assumed to be connected.
(iii) If the Carrier Controller erroneously requests the status of a non-existent motor, the status will be returned as Stopped.

4. Procedure PIO Do(Device: PIO Device; Action: PIO Action; VAR Response PIO Response); Entry;

This procedure lets the calling routine give commands to the conveyor hardware. Acceptable command combinations are listed below. The only two allowed PIO Response elements are PIO OK or PIOError. PIOError will be returned if the combination of PIO Device and PIO Action elements is not an acceptable combination. If a command is issued to a lift or motor while its status reports "changing", the PIO module will ignore the command and return a PIOError error response. If a command is given to a device, telling it to do what its status says it is already doing, it will ignore the command but not return an error indication.

5. Procedure PIO Barf(VAR Barfup: Barf Bucket); Entry;

This procedure disgorges the "logical" state (from the procedure Read Logical Bit) of all 64 I/O lines, one line per bit, in 8 bytes. The information supplied from the sensor inputs (bits 41–64) is "debounced" information. The Barfup array is of type Byte, and holds eight bytes, bytes #1 through 8. The state of PIO Bit #1 appears in byte 1, bit 0, PIO Bit #8 appears in byte 1, bit 7, and PIO Bit #9 appears in byte 2, bit 0, etc. Note that, if this PIO operation is to be used by Debugger functions, the PIO Tikl operation must be called periodically. Otherwise the debounced sensor information will not be kept current.

6. Function PIO EQID: Integer;

This function reads the state of the Lobotomy Board 16-bit DIP switch and return the value as an integer. The expected value should have 64 in the MSB and 1 in the LSB.

The PIO module utilizes the TIMER Utility procedures.
The maximum number of timers required by the PIO module is 7.
The PIO module will wait forever for a lift mechanism to reach Up or Down, reporting the status as Changing until the mechanism's sensors say it has reached its destination. Sticking lift mechanisms will not be flagged here. It is assumed that other timeouts will occur in this case, flagging the problem.

The Timer module provides access to a large number of independent countdown timers for any program modules requiring this function. Facilities are supplied to set, read, or cancel a timer.

Additionally, "Uptimers" have been added to this module. Where the standard Timers provide a countdown operation, with status only specifying whether they are timed-out or not, Uptimers act like stopwatches that can be set to start at a settable time and then will report the total indicated time whenever interrogated until they are turned off.

The Uptimer operations are organized along the same lines as the standard Timer operations and generally use most of the same procedures as do the standard Timer operations.

Although the calling modules need have no concern with the internal operation of this module, the following summarizes its hardware interface: The timing is actually performed by a countdown timer in a the microprocessor on the Mizar PIO board. While the requested time is specified in milliseconds, "ticks" of the timer occur every 128 microseconds; that is the basic resolution of the timer. When a countdown time is requested, this module computes the number of 128-microsecond "ticks" that will give the closest timeout and uses that number internally.

The timer in the 32000 I.C. on the PIO board must be initialized properly by the Initialization module before the Timer module will operate properly.

The Timer module contains the following major data elements (all global variables, to enable them to "live" from one invocation of this module to the next, but not to be used by any other module):

1. UTLasTim: A 32-bit Longhex variable that holds the extended 24-bit counter time resulting from the last operation of this module.
2. ThisTime: Same as UTLasTim, except it holds the current time, i.e., the time determined at the start of this module activation.

Timer Table is a set of three arrays, all indexed by the timer number, which runs from 1 through Max timers. Arrays are:

1. UTDwnSta[N]: (Byte)—holds the timer status
2. UTDwnTim[N]: (Longhex)—holds the timeout time
3. UTDwnUsr[N]: (type MODIDENT)—holds the user/owner name
4. UTFREEDN[N]: (Integer)—holds the 'stack' of available downtimer numbers.

The "Dwn" in each name is to show that these arrays are used in the down-counter (standard) timers, not in the Uptimers, which have a similar array, except its elements are UTUpSta[N] and so on.

This table is used to hold the status and the timeout time for each timer. Its contents may be visualized as:

| Timer # (array index) | Timer Status | Timeout Time | User I.D. Enumerated Type |
|---|---|---|---|
| 1 | 0, 1, 2 | 32-bit # | INT, CC, SC, etc. |
| 2 | 0, 1, 2 | 32-bit # | INT, CC, SC, etc. |
| 3 | 0, 1, 2 | 32-bit # | INT, CC, SC, etc. |
| etc. | | | |

The Timer # is simply the array index, which starts with one, not zero. It is not an array element per se. This number is the number of the timer being used by the calling program.

The only time the procedure will return a timer # of zero is when reporting an error condition under opcode 1 operation, when some number must be returned in this spot.

The Timer Status is a variable of type Byte, which may have the values 0, 1, or 2. 0 corresponds to "cancelled," 1 corresponds to "still got time to go," and 2 corresponds to "timed out."

The Timeout Time is a variable of type Longhex. This value is established when the individual timer is activated. It is computed based on the current value of ThisTime and represents the value that the 32-bit timer value ThisTime will have at the time the timer has timed out. If the resulting time would "underflow" and result in a value past 0, this is allowed to happen.

The User I.D. identifies the user that last used the timer. It is initially set to NOMODULE during Initialization. It remains set to the identification of the last using module until changed by a new user.

UTLasTim is a Longhex variable. It essentially acts as an extended version of the 24-bit hardware timer. It counts down one count per 128 microseconds. It has a range of 0 to $FFFFFFFF. It is used to determine if the value of ThisTime has just underflowed through zero.

ThisTime has the same format as UTLasTim. Its bottom three bytes are identical to the 24-bit counter value at the time of invocation of this module. When it is updated, it is checked to see if the bottom three bytes have underflowed and, if so, the top byte is decremented. When it reaches zero, it returns to $FFFFFFFF and continues counting down from there.

The data structures used by the Uptimers are the same as those used by the normal (down-) timers -UTLasTim and ThisTime are used by both, depending on which timer type is activated.

The only data structure that is different between Timers and Uptimers is that the Uptimers have their own Timer Table array collection. It is structured as follows:

Arrays are:

1. UTUpSta[N]: (Byte)—holds the timer status
2. UTUpTim[N]: (Longhex)—holds the timer start time
3. UTUpTim[N]: (Longhex)—holds the timer start time
4. UTUpUsr[N]: (type MODIDENT)—holds the user/owner name
5. UTFREEUP[N]: (Integer)—holds a 'stack' of available uptimer numbers This table is used to hold the status and the timeout time for each timer. Its contents may be visualized as:

| Timer # (array index) | Timer Status | Timer Start Time | User I.D. Enumerated Type |
|---|---|---|---|
| 1 | 0, 1, 2 | 32-bit # | INT, CC, SC, etc. |
| 2 | 0, 1, 2 | 32-bit # | INT, CC, SC, etc. |
| 3 | 0, 1, 2 | 32-bit # | INT, CC, SC, etc. |
| etc. | | | |

Interpretation of the table for the Uptimers is the same as for the standard Timers, except that the Timer Status, when holding the value of 2, now means "overflowed" signifying the timer reached greater than 250,000,000 milliseconds. When this occurs, the Uptimer time will return a fixed value of 250,000,000 and the error flag will indicate an error to the reader.

The following describes how the Timer Module maintains proper timeouts during 24-bit and 32-bit counter underflows. It also discusses how the timeout values are computed before being placed in the timer table and the compensation used to minimize the effect of stopping the counter so it can be read.

The ThisTime value is updated whenever the Timer Module is activated. A 24-bit downcounter exists in the 32000, used as the basis for all the timers. It is initialized to $FFFFFF, counts down to zero, then resumes at $FFFFFF. This counter becomes the new three LSBs of the 4-byte ThisTime variable, its MSB being retained from the UTLasTim value unless the 24-bit counter has underflowed.

Underflowing of the 24-bit counter between accesses by the Timer module are detected in the following manner:
1. generate a 32-bit number containing the MSB from UTLasTim and using the 24-bit timer value as the three LSBs.
2. compare it to UTLasTim.
   If it is less, there has been no underflow.
   If it is greater, then an underflow has occurred.
   If there has been no underflow, this 32-bit number becomes the new value of ThisTime.
   If there was underflow, decrement the MSB of the 32-bit number by one, and make it the new value of ThisTime. Note: If the MSB was already 0, it should be set to 255.

This method of dealing with counter wraparound requires that the counter be read and adjusted at least once per $FFFFFF counts. At 128 microseconds per count, this implies an update time of no longer than 2147 seconds, or 35.7 minutes.

Each entry in the timer table will be updated through the following procedure:
If the Timer Status is Cancelled or Timed Out, do nothing, and go on to the next item in the table. Otherwise, do:
Compare the item's Timeout Time with ThisTime.
If the high bits of the Timeout Time and ThisTime are the same, then:
If Timeout Time is higher than ThisTime then set the item's status to Timed Out.
If the high bits of the Timeout Time and ThisTime differ, then:
If ThisTime is higher than Timeout Time (ignoring the high bits) then set the item's status to Timed Out.

The Timeout Time is computed as follows:
Compute the number of 128-microsecond "ticks" that yield the time closest to the requested time. Note that this may yield a time that is slightly lower OR higher than the requested time, by a maximum of 64 microseconds.
Subtract this from the value of ThisTime (both the result and ThisTime are longhex numbers) and store the value in the Timeout Time location in the array. It is acceptable for the number of ticks to be larger than the value of ThisTime
the value of the result of this subtraction will be properly rolled over automatically.
The maximum allowable time is computed thus:
The maximum count that can be allowed is maxlint, which is 2147483647. To provide "margin," it is limited to 2147483640.
The maximum time this represents, at 128 microseconds per count, is 274878 seconds, or 274,878,000 milliseconds.
Therefore, maximum number of milliseconds that can legally be specified is limited to 250,000,000 milliseconds (shaving a bit for more margin again). This is 69.4 hours.

The 24-bit hardware timer must be stopped to be read. To minimize the error due to this stopped period, two things are done:
1. The period that the timer will be stopped will be minimized, processing of its data will be done only after it has been restarted.
2. A compensating value will be subtracted from the counter before it is restarted, to set it to what it would have been if it had not been stopped to be read. It is estimated that the total residual error will be on the order of 1% or less. Techniques are available to reduce this error further if required.

The Start Time, which is stored in the Uptimer array, is the basis for the time reported when an Uptimer is read. If the "offset" specified by the caller is zero, then the Start Time value is just that of ThisTime.

If the "offset" specified by the caller is more than 0, then the Start Time is computed by adding the "offset time" specified by the user to the value of ThisTime. Since the value of ThisTime counts down, this gives the effect of having started the timer before the current time by the amount specified in the "offset time" specified when the timer is started.

If, when the "offset" is added to the value of ThisTime, an overflow occurs, it is ignored because it will not generate any runtime errors and this will not affect the results.

To obtain Reported-time calculations, subtract ThisTime from StartTime. This automatically produces the right result. The Longhex numbers roll over automatically and don't generate any runtime errors in the process. If the Reported Time is >250,000,000 milliseconds (not 128-microsecond ticks), then a time overflow has occurred, and an error condition should be returned.

When called the Timer module does the following:
1. Updates the 32-bit ThisTime and UTLasTim values.
2. Checks the passed parameters for being within allowed ranges.
3. Performs one of four possible valid operations if commanded.
4. and then returns.

What follows is a list of the major Timer modules identified above, the procedures used within the modules, and the program flow within them in outline form. When a procedure or function below is a true, standalone "called" operation, the characters "()" are used to indicate that.

1. Update ThisTime():
   - Stop 24-bit timer
   - Read 24-bit timer value
   - Subtract compensating time
   - Write the new 24-bit timer value
   - Restart the timer
   - Compute the new ThisTime.
2. Update timer table():
   - Scan through all entries in the Timer Table, and perform the operations specified above on each item.
3. Timer params check():
   - Set Timer error to 0.
   - If Opcode=4 then just return, else do the following:
   - Is User I.D. outside INT . . . SIO?
     - Yes, set Timer error to 6.
     - No, do nothing.
   - Is Timer info not in range of 0–250,000,000 and is Opcode=1?
     - No, do nothing.
     - Yes, set Timer error to 2.
   - Check Timernum:—Is Opcode either 2 or 3?
     - Yes—therefore either cancelling or checking timer.
       - Is Timernum in range of 1-Max timers?

- Yes. Do nothing.
- No. Set Timer error to 4.
- Is the caller the proper owner?
  - Yes. Do nothing.
  - No. set Timer error to 1, display message on the console, and return.
    {Timernum ignored for opcodes 0, 1, or 4.}
- Is Opcode in range of 0-4?
  - Yes, do nothing
  - No, set error code in Timer error to 5.
4. Opcode decode():
   Select one of the following four procedures based on the value of Opcode:
5. Do nothing():
   Return from the overall Timer() procedure without taking any other action.
6. Starttimer():
   - Look to 'free timers' stack to see if any timers are available.
     - If none found, set Timer error to 3 and end this whole procedure.
     If one found, put it into Timernum and adjust the free timers stack pointer.
   - Set Timer Table entry to "timing" state.
   - Compute timeout time, per paragraph 3.4., store the info in the Timer Table.
   - Add Caller ID info to the Timer Table.
   - Return from the overall Timer() procedure.
7. Cancel timer():
   - Perform function allocated (Timernum). Timer If returns True then continue.
   - If returns False then set Timer error to 1 and return from the overall Timer() procedure.
   - Set Timer Status byte to 0.
   - Put Timernum back onto the 'free timers' stack and adjust the stack pointer.
   - Return from the overall Timer() procedure.
8. Timer allocated(Timernum) function:
   - Check the Timer Table for item Timernum, and return the value True if the timer is allocated, False if not.
9. Check timer():
   - Check the Timernum-th entry in the Timer Status column of the Timer Table to determine its status:
     - If it is Cancelled, set Timer info to 1.
     - If it is Timing, set Timer info to 2.
   - Return from the overall Timer() procedure.
10. Init timers():
    Initialize the 32000 I.C.
    Initialize all global variables.
    Initialize the 'free timers' stack and pointer.
11. One timer update():
    - Perform the same actions as Update timer table, except only do them for the indicated timer.

The detailed Uptimer routines are not discussed, as they are essentially identical to those used by the standard timers. Most of the routines, in fact, are used by the Timer and Uptimer operations equally.

The program structure of the Uptimer routines is nearly identical to that for the Timer routines, and is outlined in FIG. 19. The following provides the information required to call the "standard" (down-timers) timer procedure:

| Procedure Timer (Opcode | : Byte; |
| Caller ID | : MODIDENT; |
| VAR Timernum | : Byte; |
| VAR Timeinfo | : longinteger; |
| VAR Timererror | : Byte); Entry; |

1. Opcode:
   - This is always supplied by the calling module.
   - It has a legal range of 0-3.
   - The values represent:
     0: Do nothing but keep internal timers current. (affects both Timers and Uptimers)
     1: Request to start a timer.
     2: Request to cancel a timer.
     3: Request to check a timer.
     4: Initialize the whole Timer Module. (affects both Timers and Uptimers)
   - Invalid Opcodes result in an error code of 5 being returned in Timererror.
2. CallerID:
   - This is supplied by the calling module. Its purpose is to identify which module is using which timer. In cases of the system running out of available timers, this information is used to determine which module isn't properly cancelling its timers when it's done with them, through debugger routines.
   This parameter is of the type MODIDENT. The allowed values for this parameter are described below:

| Value | Calling Module |
|---|---|
| INT | Initialization |
| EX | Executive |
| SC | SECS Controller |
| CC | Carrier Controller |
| LM | List Manager |
| ACFAIL | A.C. Fail |
| UT | Misc. Utilities |
| TM | Timers |
| PIO | Parallel I/O |
| CCAL | Clock/calendar |
| SIO | Serial I/O |

3. Timernum:
   - This is set by the calling module for Opcodes 2 and 3, and set/returned by the Timer module for Opcode 1, to indicate the timer number granted. It is not affected by the Timer Module during Opcode 0 operation.
   The legal range for this is 1-Max timers when set by the calling module. Values beyond this range result in Timer error returning a value of 4.
   - This parameter may be returned as 0 during error conditions when Opcode 1 is being executed.
   - The value of this parameter will not be altered by the Timer module during execution of Opcodes 2 or 3.
4. Timer info:
   - This parameter is not used while executing Opcodes 0 or 2.
   This is set by the calling module while requesting an Opcode 1 operation (starting a timer). For that case this holds the desired time to timeout of the timer, expressed in milliseconds.
   - The legal range for this when specifying time is 0-250,000,000.
   - Values outside of 0-250,000,000 result in a value of 2 being returned in Timer error.

- While executing Opcode 3, this parameter is set by the Timer Module, and returns the Timer Status information, with the following possible values:
  0: Value returned if Timer error indicates error.
  1: No longer returned (- was "Timer Cancelled").
  2: Timer still timing.
  3: Timer timed out.
  Note: All timers must be cancelled when the calling module is done with them, to make them available to other modules.

5. Timer error:
  This is an error flag for the Timer module. It is always set by the Timer module, and returns the following possible values:
  0: No error occurred.
  1: Not your timer. This error code will be returned if an operation is commanded on a timer number that is allocated to another module, or if the caller attempts any operation on a cancelled timer.
  2: Requested timer duration out of allowed range.
  3: No timers available for allocation.
  4: Invalid timer number.
  5: Invalid Opcode.
  6: Invalid caller I.D.

The following provides the information required to call the Uptimer procedure and properly pass parameters back and forth:

| Procedure Uptimer (Opcode | : Byte; |
|---|---|
| Caller ID | : MODIDENT; |
| VAR Timernum | : Byte; |
| VAR Time | : Longinteger; |
| VAR Timer error | : Byte); Entry; |

Opcode: Roughly same as standard Timer procedure:
  0: Do nothing but update internal counters/status (affects both Timers and Uptimers)
  1: Start a timer with a specified starting value.
  2: Cancel a timer
  3: Read a timer value
  4: Initialize all timer arrays/status (affects both Timers and Uptimers)
  5: Restart a currently-running timer with a new starting value, without having to cancel the current one and request a new one. (new opcode, for Uptimers only)
2. Caller ID: Same as for standard timers.
3. Timernum: Same as for standard timers.
4. Time: This holds the time, in Longinteger format, in milliseconds, same as for the existing Timer procedure. The allowed range is 0–250,000,000 milliseconds. This is used to set the time when starting or restarting a timer, or it returns the current time when reading a timer value.
5. Timer error:
  0: No error occurred
  1: Not your timer. This error code will be returned if an operation is commanded on a timer number that is allocated to another module. This will also be returned if the caller attempts any operation on a timer that has already been cancelled, as the owner gives up ownership of the timer when he cancels it.
  2: Requested timer duration out of allowed range.
  3: No timers available for allocation.
  4: Invalid timer number.
  5: Invalid Opcode.
  6: Invalid caller I.D.
  7: Timer has run up to over 250,000, milliseconds (Unique to Uptimers)

The timer tables must be updated at least once every 35.7 minutes ($FFFFFF × 128 microseconds), or timer operation will not be reliable. The Executive or Initialization modules will update all timer tables during polling operation to ensure this requirement is met.

Delay Allowed: 69.4 hours. This is 250,000,000 milliseconds.
  Maximum Number of Timers: It is assumed that a maximum of 100 standard timers and 20 uptimers will be required.
  Timer Clearing at Reset: All timers will be reset at either warm or cold boot by the Initialization module.

The Clock/Calendar module supports reading and setting the date and time, down to one-second resolution.

Although the calling modules need have no concern with the internal operation of this module, the following summarizes its hardware interface: The actual tracking of the date, time, etc. is performed by a Mizar VME8315 Battery Backed Real Time Clock board in the DRU system.

The 8315 board is battery-backed and updates the date/time through use of its own crystal-controlled clock. It does not generate any interrupts to keep itself updated.

Elements dealt with are year, month, day, hour, minute and second.

Because of its simplicity, the Clock/Calendar module contains no significant data structures other than the passed parameters that define the current date and time. These are covered in the discussion of parameters below.

No significant algorithms are used in this program module. Year, month, etc. are set directly into the RTC I.C. and read out in the same format.

This module performs two major operations:
  1. Set date/time.
  2. Read date/time.

These operations are followed through their program flow in outline form below.
  1. Set time():
    Check that all passed parameters are within valid ranges.
    If not, set clock error to 4 and return to the calling program.
    If all O.K., continue.
    - Set clock to "stopped."
    - Initialize settings for crystal frequency divide ratio, 12/24-hour mode, etc.
    - Set date/time per passed parameters.
    - Start clock running.
    - Set UTClkRun global variable to "1."
    - Return to the calling program.
  2. Read time():
    - Check UTClkRun global variable. Is it a "1"?
    - If no, set clock error to "1," all date/time parameters to 0's, and return to the calling program.
    - If yes, continue to the next step.
    - Check if "about to update self" flag is set by RTC I.C.

- If yes, loop for no more than 5 milliseconds.
- If 5 ms. is up and flag still hasn't fallen, set clock error to 2, all date/time parameters to 0's, and return to the calling program.
- If flag falls within 5 ms., continue to next step.
- Read date/time into the passed parameters.
- Return to the calling program.

The following provides the information required to call this module and properly pass parameters back and forth:

```
Procedure ClockCal (Opcode        : integer;
VAR year, month, day,
     hour, minute, second,
     clock error : integer); Entry;
```

Opcode:
- This is always supplied by the calling module.
- It has legal values of 0 or 1.
- The values represent:
    0: Read current date/time.
    1: Set date/time.
- Invalid Opcodes result in an error code of 3 being returned in clock error.

Year: Valid range is 0–99.
Month: Valid range is 1–12.
Day: Valid range is 1–31.
Hour: Valid range is 0–23.
Minute: Valid range is 0–59.
Second: Valid range is 0–59.
Clock error: The following values are defined:
    0: No error.
    1: Clock not set yet, not running.
    2: Clock I.C. hung up in "update" cycle.
    3: Invalid opcode. (This is checked before either Set time or Read time is called.)
    4: Invalid parameter value supplied for date/-time setting operation.

If an error occurs during date/time setting, the date/-time parameters are returned unmodified. If an error occurs during date/time reading, the date/time parameters are returned as all zeros.

If an Invalid Opcode is detected, Clock error is set to 3 and the procedure returns with all other parameters unaltered.

Note that the RTC I.C. on the 8315 board need not be initialized by the Initialization module, as setting it automatically initializes it. However, the Initialization module must determine if the clock is running or not during initialization and set the global variable UTClkRun to reflect this state during initialization. The clock could be running because it is battery-backed and may have survived a previous system shutdown.

The Reality Checker module, using data from the "toggle" output, compares the actual configuration of the five "stations" (Scan, Port 21, Port 22, Port 41, Port 42) with the information indicated by the ECIDs. Any disagreement between the two sources of information results in error flags being sent to the appropriate modules.

This module is a polled module, activated by the Executive, and communicates with other modules via the Command Queue. It accepts three commands—"Cold Boot," "Init Complete" and "ECIDs Received." "Cold Boot" is accepted, but ignored. Either an "Init Complete" or "ECIDs Received" message causes the Reality Checker module to send an "ECIDs Verified" message to the SECS Controller and Carrier Controller modules. All other commands are treated as errors and flagged to the DRU console.

The main procedure for the Reality Checker module is declared as:

Procedure Check reality; Entry;

No parameters are passed, since the module examines the Command Queue for messages when it is activated. The following is the list of Command Queue commands this module will receive and recognize as valid:

| Command Queue Opcode | Description/discussion |
|---|---|
| 01 | Cold Boot |
| 04 | Init Complete |
| 06 | PJCJ ECIDs Received |

Any other opcodes will be ignored and thrown away, with an error message being sent to the console.

The Cold Boot command will be accepted as valid, but no externally-visible action will be taken. Internally, this module only initializes the variable Cmnd Template.

The Init Complete message will result in this module placing ECIDs Verified messages on the command queue for the SC and CC modules.

The PJCJ ECIDs Received message will result in exactly the same action as for the Init Complete message.

This module must be the first module polled when the Executive starts its polling cycle.

It should be understood that various alternatives to the embodiment illustrated herein may be employed in practicing the present invention. It is intended that the claims following Appendix A define the invention, and that the structure and methods within the scope of these claims and their equivalents be covered thereby.

APPENDIX A

DRU SECS INTERFACE

SUMMARY OF DRU TO MACHINE MESSAGES

```
+=========================================================+
| MESSAGE SENT BY DRU              EXPECTED MACHINE RESPONSE |
+---------------------------------------------------------+
|S x,F 0         Abort Transaction         ---------       |
|=========================================================|
|S 1,F 1         Are you there             S 1,F 2         |
|---------------------------------------------------------|
|S 1,F 2         On Line data              -------         |
```

| | | |
|---|---|---|
| S 1,F69 | Going Off Line | -------- |
| S 4,F 1 | Ready to Send Material | -------- |
| S 4,F 3 | Send Material | -------- |
| S 4,F 5 | Handshake Complete | -------- |
| S 4,F 7 | Not Ready to Send | -------- |
| S 4,F63 | Not Ready to Receive | -------- |
| S 4,F65 | Still in sender (SSN) (NSC) | -------- |
| S 4,F67 | Still in Receiver (SRN) (NSC) | -------- |
| S 4,F69 | Unsuccessful Transfer Handshake complete | ---- |

| MESSAGE FROM MACHINE | | DRU RESPONSE |
|---|---|---|
| S x,F 0 | Abort Transaction | -------- |
| S 1,F 1 | Are you there | S 1,F 2 |
| S 1,F 2 | On Line data | -------- |
| S 1,F69 | Going Off Line | -------- |
| S 4,F 1 | Ready to Send Material | -------- |
| S 4,F 3 | Send Material | -------- |
| S 4,F 5 | Handshake Complete | -------- |
| S 4,F 7 | Not Ready to Send | -------- |
| S 4,F63 | Not Ready to Receive | -------- |
| S 4,F65 | Still in sender (SSN) (NSC) | -------- |
| S 4,F67 | Still in Receiver (SRN) (NSC) | -------- |
| S 4,F69 | Unsuccessful Transfer Handshake complete | ---- |
| S 9,F 1 | Unrecognized Device ID | -------- |
| S 9,F 3 | Unrecognized Stream Type | -------- |
| S 9,F 5 | Unrecognized Function Type | -------- |
| S 9,F 7 | Illegal Data | -------- |
| S 9,F 9 | Transaction Timer Timeout | -------- |
| S 9,F11 | Data Too Long (DLN) | -------- |
| S 9,F65 | Incorrect Header Bit (IBH) | -------- |

| MESSAGE FROM HOST | | DRU RESPONSE |
|---|---|---|
| S x,F 0 | Abort Transaction | -------- |
| S 1,F 1 | Are you there | S 1,F 2 |
| S 1,F 2 | On Line data | -------- |

| | | |
|---|---|---|
| S 1,F 3 | Selected Equip Status Request | S 1,F 4 |
| S 1,F69 | Going Off Line | ------- |
| S 2,F 1 | Service Program load inquire | S 2,F 2 |
| S 2,F 2 | Service Program load Grant | ------- |
| S 2,F 3 | Service Program Send | S 2,F 4 |
| S 2,F 4 | Service Program Send Acknowledge | ------- |
| S 2,F 5 | Service Program load request | S 2,F 6 |
| S 2,F 6 | Service Program load Data | ------- |
| S 2,F 7 | Service Program Run Send | S 2,F 8 |
| S 2,F 8 | Service Program Run Acknowledge | ------- |
| S 2,F 9 | Service Program Results Request | S 2,F10 |
| S 2,F10 | Service Program Results Data | ------- |
| S 2,F11 | Service Program Directory Request | S 2,F12 |
| S 2,F12 | Service Program Directory Data | ------- |
| S 2,F13 | Equipment Constant Request | S 2,F14 |
| S 2,F17 | Date and Time Request | S 2,F18 |
| S 2,F18 | Date and Time Data | ------- |
| S 2,F21 | Remote Command Send | S 2,F22 |
| S 2,F23 | Trace Initialize Send | S 2,F24 |
| S 2,F25 | String Diagnostic Request | S 2,F26 |
| S 2,F67 | List Equipment Constant Send | S 2,F68 |
| S 5,F67 | Report Alarm Status | S 5,F68 |
| S127,F129 | Delete Entry List Send | S127,F130 |
| S127,F131 | Update List Send | S127,F132 |
| S127,F132 | Update List Acknoledge | ------- |
| S127,F135 | Dump List Send/Ack | S127,F136 |
| S127,F137 | Search List Send/Ack | S127,F138 |

| MESSAGE SENT BY DRU | | EXPECTED HOST RESPONSE |
|---|---|---|
| S x,F 0 | Abort Transaction | ------- |
| S 1,F 1 | Are you there | S 1,F 2 |
| S 1,F 2 | On Line data | ------- |
| S 1,F 3 | Selected Equip Status Request/Data | S 1,F 4 |
| S 1,F69 | Going Off Line | ------- |
| S 2,F 1 | Service Program load inquire | S 2,F 2 |

| | | |
|---|---|---|
| S 2,F 2 | Service Program Load Grant | ------- |
| S 2,F 3 | Service Program Send | S 2,F 4 |
| S 2,F 4 | Service Program Send Acknowledge | ------- |
| S 2,F 5 | Service Program Load request | S 2,F 6 |
| S 2,F 6 | Service Program Load Data | ------- |
| S 2,F 7 | Service Program Run Send | S 2,F 8 |
| S 2,F 8 | Service Program Run Acknowledge | ------- |
| S 2,F 9 | Service Program Results Request | S 2,F10 |
| S 2,F10 | Service Program Results Data | ------- |
| S 2,F11 | Service Program Directory Request | S 2,F12 |
| S 2,F12 | Service Program Directory Data | ------- |
| S 2,F14 | Equipment Constant Data | ------- |
| S 2,F17 | Date and Time Request | S 2,F18 |
| S 2,F18 | Date and Time Data | ------- |
| S 2,F22 | Remote Command Acknowledge | ------- |
| S 2,F23 | Trace Initialize Send | S 2,F24 |
| S 2,F24 | Trace Initialize Acknowledge | ------- |
| S 2,F25 | String Diagnostic Request | S 2,F26 |
| S 2,F26 | String Diagnostic Data | ------- |
| S 2,F68 | List Equipment Constant Acknowledge | ------- |
| S 5,F 1 | Alarm Report Send | S 5,F 2 |
| S 5,F68 | Alarm Status Data | ------- |
| S 9,F 1 | Unrecognized Device ID | ------- |
| S 9,F 3 | Unrecognized Stream Type | ------- |
| S 9,F 5 | Unrecognized Function Type | ------- |
| S 9,F 7 | Illegal Data | ------- |
| S 9,F 9 | Transaction Timer Timeout | ------- |
| S 9,F11 | Data Too Long (DLN) | ------- |
| S 9,F65 | Incorrect Header Bit (IBH) | ------- |
| S 9,F69 | Message Out of Context (MOC) | ------- |
| S127,F131 | Update List Send/Ack | S127,F132 |
| S127,F132 | Update List Acknowledge | ------- |

STREAM 1

---
Sx,F0 Abort Transaction                                               S,H<->E
---

Description:   May occur in a multi-block message or in reply to a
               primary message. Terminates further work on this
               transaction. A similar function exists in each stream.

Structure:     Header only. The header is constructed from the stored
               header for the transaction in progress by changing the
               function code to 0 and the E-bit to a 1.

===========================================================================

MDLN Equipment model type 6 bytes max.            Format: 20

SOFTREV Software revision code 6 bytes max.       Format: 20

---
S1,F1, Are You There Request (R)                              S,H<->E, reply
---

Description:   Establishes if the equipment is on line. A function 0 is
               equivalent to a timeout on the receive timer after issuing
               S1,F1 to the host.

Structure:     Header only

---
S1,F2 On Line Data (D)                                              S,H<->E
---

Description:   Data signifying that the equipment is alive.

Structure:     L,2
                 1. <MDLN>
                 2. <SOFTREV>

Exceptions:    The host sends a zero length list to the equipment.
===========================================================================

Define:        Status variables may include any parameter that can be
               sampled in time such as input/output status.

<SVID>=STATUS: Status format code            Format: 20
                       IOBY01: Input/output byte 1          Format: 20
                       IOBY02: Input/output byte 2          Format: 20
                       IOBY03: Input/output byte 3          Format: 20
                       IOBY04: Input/output byte 4          Format: 20
                       IOBY05: Input/output byte 5          Format: 20
                       IOBY06: Input/output byte 6          Format: 20
                       IOBY07: Input/output byte 7          Format: 20
                       IOBY08: Input/output byte 8          Format: 20

SV        Status variable data              Format: 10,31,51

<STATUS> = 00000001 : Up and                 Format: 51
                                     running
                 00000010 - 01111111 : Reserved for equipment usage
                          00000010 : equipment up, no material

```
00000011 : schedule downtime
00000100 : unscheduled downtime, waiting repair
00000101 : unscheduled downtime, under repair
10000000 - 11111111 : Reserved for DRU usage
```

NOTE x= status (i.e. 1=high or 0=low) This is used for remotely checking I/O line status for system trouble shooting.

Format: 10

```
<IOBY01>=xxxxxxxx :  I/O 1-8
<IOBY02>=xxxxxxxx :  I/O 9-16
<IOBY03>=xxxxxxxx :  I/O 17-24
<IOBY04>=xxxxxxxx :  I/O 25-32
<IOBY05>=xxxxxxxx :  I/O 33-40
<IOBY06>=xxxxxxxx :  I/O 41-48
<IOBY07>=xxxxxxxx :  I/O 49-56
<IOBY08>=xxxxxxxx :  I/O 57-64
```

I/O BYTE DEFINITIONS

The I/O status byte has 8 bits each representing the activity of an I/O line on the DRU. The physical device that any particular bit is representing is defined in the following table.

| Byte/bit | Physical I/O device |
|---|---|
| Byte 1 | |
| Bit 0: | |
| Bit 1: | |
| Bit 2: | |
| Bit 3: | |
| Bit 4: | |
| Bit 5: | |
| Bit 6: | |
| Bit 7: | |
| Byte 2 | |
| Bit 0: | |
| Bit 1: | |
| Bit 2: | |
| Bit 3: | |
| Bit 4: | |
| Bit 5: | |
| Bit 6: | |
| Bit 7: | |
| Byte 3 | |
| Bit 0: | |
| Bit 1: | |
| Bit 2: | |
| Bit 3: | |
| Bit 4: | |
| Bit 5: | |
| Bit 6: | |
| Bit 7: | |

|Byte 4
|
|Bit 0:
|Bit 1:
|Bit 2:
|Bit 3:
|Bit 4:
|Bit 5:
|Bit 6:
|Bit 7:
|
|Byte 5
|
|Bit 0:
|Bit 1:
|Bit 2:
|Bit 3:
|Bit 4:
|Bit 5:
|Bit 6:
|Bit 7:
|
|Byte 6
|
|Bit 0:
|Bit 1:
|Bit 2:
|Bit 3:
|Bit 4:
|Bit 5:
|Bit 6:
|Bit 7:
|
|Byte 7
|
|Bit 0:
|Bit 1:
|Bit 2:
|Bit 3:
|Bit 4:
|Bit 5:
|Bit 6:
|Bit 7:
|
|Byte 8
|
|Bit 0:
|Bit 1:
|Bit 2:
|Bit 3:
|Bit 4:
|Bit 5:
|Bit 6:
|Bit 7:
|

S1,F3 Selected Equipment Status                                    S,H->E, reply
      Request (SSR)
------------------------------------

Description:   A request to the equipment to report selected values of
               its status.

Structure:     L,n
                  1.   <SVID1>
                  2.   <SVID2>
                   •
                   •

```
            n.   <SVIDn>
```

Exceptions:    A zero length list means report all SVID's.

S1,F4 Selected Equipment Status (SSD)                                          M,H<-E
     Data Description:   The equipment reports the value of each SVID requested in
               the order requested. The host remembers the names of
               values requested.

Structure:     L,n
```
               1.   <SV1>
                    .
                    .
                    .
               n.   <SVn>
```

Exceptions:    If n=0, no response can be made. A zero length returned
               for SVi means that SVIDi does not exist.

================================================================

S1,F69 Going Off Line (GOF)                                                    S,H<->E Description:   This message informs the receiver that the sender is going
               off line (i.e. M/C is going to 'Local mode', but the
               communication link is still active)

Structure:     Header only
================================================================

STREAM 2

Define:
```
   GRANT Grant code, 1 byte                                                Format: 10
         0 = positive response, load OK
         1 = busy, try again
         2 = no space
         3 = duplicate name
        <3 = equipment specific error code
        4-63                                                               reserved.
   LENGTH Length of the service program in bytes.
         Format: 3(),5()
   SPID Service program ID, 6 characters.                                  Format: 20
```

S2,F1 Service Program Load Inquire (SPI)                                       S,H<-->E,reply Description:   Either the host or equipment wants to send the specific
               program.

Structure:
```
               L,2
                  1.   <SPID>
                  2.   <LENGTH>
```
S2,F2 Service Program Load grant (SPG)                                         M,H<-->E Description: Provides permission to load.

Structure: <GRANT>

==================================================================

See Secs manual for definition.
==================================================================

S2,F5 Service Program Load Request (SPR)                S,H<-->E,reply
----------------------------------------

Description: A service program is requested.

Structure: <SPID>
S2,F6 Service Program Load data (SPD)                   M,H<-->E
----------------------------------------

Description: A service program is sent.

Structure: <SPD>

Exceptions: A zero length item means that the requested program can not be returned.

==================================================================

See Secs manual for definition.

==================================================================

Define: SPR Service program results                     Format: Device dependent
S2,F9 Service Program Results Request (SRR)             S,H<-->E,reply
----------------------------------------

Description: Ask results of service program.

Structure: <SPID>
S2,F10 Service Program Results data (SRD)               M,H<-->E
----------------------------------------

Description: Get the results back.

Structure: <SPP>

Exceptions: A zero length item means SPR does not exist.
==================================================================

See Secs manual for definition.

==================================================================

Define:
ECID Equipment Constant ID                                             Format: 20

```
<ECID> = LNHSLS :  length of history list
         LNDELS :  length of destiny list
         LNPBLS :  length of pass list
         LNBOLS :  length of block list
         LNDLLS :  length of default list
         CJLK01 :  communication link 1 (Who are you
                   talking to)
         CJLK02 :  communication link 2 (See below)
         CJLK03 :  communication link 3
         CJLK04 :  communication link 4
         TQTM00 :  threshold time for how long a lift
                   index is allowed to block a material
                   path without sending an alarm.
         FXTM00 :  fixed time constant 0 (used for allowed
                   lift index blocked path time)
         FXTM01 :  fixed time constant 1 (used for stream
                   4 wait between request s)
         FXTM02 :  fixed time constant 2 (time till purged
                   in sec)
         FXTM03 :  fixed time constant 3 (time wait till
                   S2,F25)
         FXTM04 :  fixed time constant 4 (maximum transfer
                   time between sensors)
         IOMS01 :  I/O mask 1 (bytes 1-4)
         IOMS02 :  I/O mask 2 (bytes 5-8)
         ROTDIR :  rotate direction for DRU
         PURDIR :  purge direction for DRU
         NRDDIR :  no read direction for DRU
         PPLSSU :  Pass list status
         S4F1CT :  Retry count for S4F1
         RQFQS4 :  Request frequency for S4F1 retries
         MLXFT1 :  Material transfer timer t1
         MLXFT2 :  Material transfer timer t2
         MLXFT3 :  Material transfer timer t3
         PJCJ00 :  Port Configuration 00
         PJCJ11 :  Port Configuration 11
         PJCJ31 :  Port Configuration 31
         PJCJ21 :  Port Configuration 21
         PJCJ22 :  Port Configuration 22
         PJCJ23 :  Port Configuration 23
         PJCJ41 :  Port Configuration 41
         PJCJ42 :  Port Configuration 42
         PJCJ43 :  Port Configuration 43
```

ECV Equipment Constant Value

<ECV>        Variable Description

```
LNHSLS : 1-byte unsigned integer                          Format: 51
LNDELS : 1-byte unsigned integer                          Format: 51
LNPBLS : 1-byte unsigned integer                          Format: 51
LNBOLS : 1-byte unsigned integer                          Format: 51
LNDELS : 1-byte unsigned integer                          Format: 51

CJLK01 : 2-byte unsigned integer                          Format: 52
CJLK02 : 2-byte unsigned integer                          Format: 52
CJLK03 : 2-byte unsigned integer                          Format: 52
CJLK04 : 2-byte unsigned integer                          Format: 52

FXTM01 : 2-byte unsigned integer                          Format: 52
```

```
FXTM02           : 2-byte unsigned integer                    Format: 52
FXTM03 : 2-byte unsigned integer                              Format: 52

IOMS01 : 4-byte unsigned integer                              Format: 54
IOMS02 : 4-byte unsigned integer                              Format: 54

ROTDIR           : 4-byte unsigned integer                    Format: 54
PURDIR           : 4-byte unsigned integer                    Format: 54
NRDDIR : 4-byte unsigned integer                              Format: 54

S4F1CT           : 2-byte unsigned integer                    Format: 52
RQFQS4           : 2-byte unsigned integer                    Format: 52
MLXFT1 : 2-byte unsigned integer                              Format: 52
MLXFT2 : 2-byte unsigned integer                              Format: 52
MLXFT3 : 2-byte unsigned integer                              Format: 52

PJCJ00 : 2-byte unsigned integer                              Format: 52
PJCJ31 : 2-byte unsigned integer                              Format: 52
PJCJ21 : 2-byte unsigned integer                              Format: 52
PJCJ22 : 2-byte unsigned integer                              Format: 52
PJCJ23 : 2-byte unsigned integer                              Format: 52
PJCJ41 : 2-byte unsigned integer                              Format: 52
PJCJ42 : 2-byte unsigned integer                              Format: 52
PJCJ43 : 2-byte unsigned integer                              Format: 52

PSLSSU :                                          Format: 51
```

DEFAULT VALUES

```
LNHSLS The default length of the history list is 200 entries
LNDELS The default length of the destiny list is 200 entries
LNPSLS The default length of the pass list is 200 entries
LNBOLS The default length of the block list is 200 entries
LNDELS The default length of the default list is 200 entries
```

```
CJLK01 Communication link default all zeros
CJLK02 Communication link default all zeros
CJLK03 Communication link default all zeros
CJLK04 Communication link default all zeros
```

The communication link contains the first 2 bytes of the header of the machine that the DRU is talking to.

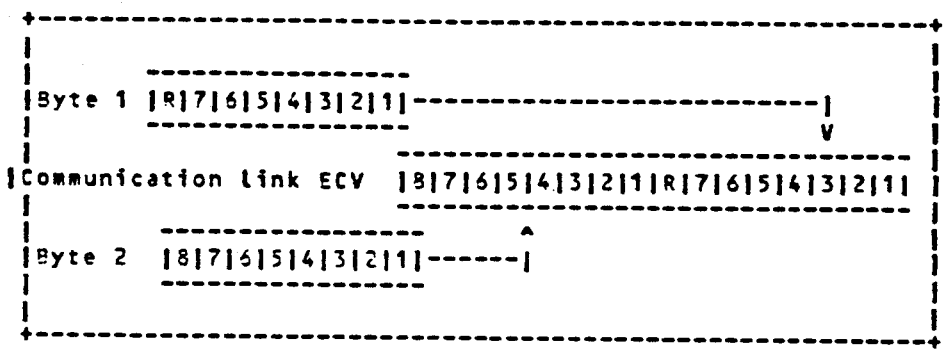

The four communication links will be used as follows: 1 = Host, 2 = M/C 2, 3 = Bar code Reader, 4 = M/C 4. Non SECS speaking SECS ID to be used for bar code readers and the like will be defined as 01000000xxxxxxxx.

```
FXTM01 default 10 seconds
FXTM02 default 10 seconds
FXTM03 default 10 seconds
```

IOMS01 I/O monitor status default all zeros or disabled
IOMS02 I/O monitor status default all zeros or disabled

---

The PURDIR, NRDDIR, and ROTDIR ECIDs will have the following internal byte configuration and usage:

```
        | spur | port | action code |
        |------|------|-------------|
        |  4      3     2    1      | bytes
```

The spur and port bytes are actually ASCII.
ROTDIR default 3100 (i.e 3 for byte 4, 1 for byte 3, 0 for bytes 2 and 1 respectively )
PURDIR default 3100 (i.e 3 for byte 4, 1 for byte 3, 0 for bytes 2 and 1 respectively )
NRDDIR default 3100 (i.e 3 for byte 4, 1 for byte 3, 0 for bytes 2 and 1 respectively )
This will cause all these to be set to gone with no handshake.

---

S4F1CT Stream 4 function 1 number of times to poll default 10 times

---

RQFQS4 default 10 seconds
The units for RQFQS4 will be seconds between messages.

---

MLXFT1 default 10 seconds.
MLXFT2 default 60 seconds.
MLXFT3 default 70 seconds.

---

PJCJxx Default Values:

```
PORT:  00 21 22 23 31 41 42 43
bit1    0  0  0  0  0  0  0  0 stopA
bit2    x  0  0  0  x  0  0  0 stopB
bit3    x  0  0  0  x  0  0  0 lift index
bit4    1  0  0  0  x  0  0  0 lift transfer
bit5    0  0  0  0  0  0  0  0 rotate
bit6    x  0  0  0  0  0  0  0 handshake available
bit7    x  0  0  0  0  0  0  0 receiving material
bit8    x  0  0  1  0  0  0  1 sending material
bit9    x  x  x  x  x  x  x  x
bit10   x  x  x  x  x  x  x  x
bit11   x  x  x  x  x  x  x  x
bit12   x  x  x  x  x  x  x  x
bit13   x  x  x  x  x  x  x  x
bit14   x  x  x  x  x  x  x  x
bit15   x  x  x  x  x  x  x  x
bit16   x  x  x  x  x  x  x  x
```

DEFINED

-------- bit 1 stop A exists
bit 2 stop B exists (false when a lift transfer is used)
bit 3 lift index exists
bit 4 lift transfer exists
bit 5 rotate exists
bit 6 handshake available
bit 7 capable of receiving material from a machine
bit 8 capable of sending material to a machine
bit 9 reserved
bit 10 reserved
bit 11 reserved
bit 12 reserved
bit 13 reserved

```
        bit 14 reserved
        bit 15 reserved
        bit 16 reserved
            x denotes not checked or don't care  or  not  a  valid
            component.
        1 denotes exists
        0 denotes does not exist
        00 is scan station
        21 and 22 are physical ports along spur 2
        41 and 42 are physical ports along spur 4
        31 is zone station
        23 and 43 are virtual ports
```
--------------------------------------------------------------------

PBLSSU default pass list status (PBLSSU) to all zeros
    00000000 : Permit lost pass list entries
    11111111 : Report pass list entries  when unreported entry is at end of the list S2,F13 Equipment Constant Request (ECR)                       S,H->E,reply
---------------------------------------

Description:    Constants such as  fixed  timers,  I/O  masks,  and  other
                values that are changed infrequently can be obtained using
                this message.

Structure:
                L,n
                    1.  <ECID1>
                    2.  <ECID2>
                         .
                    n.  <ECIDn>

Exceptions:     A zero length list requests all constants according  to  a
                pre-defined format.

S2,F14 Equipment Constant Data (ECD)                               M,H<-E
---------------------------------------

Description:    Data response to F13 in the order requested.

Structure:
                L,n
                    1.  <ECV1>
                    2.  <ECV2>
                         .
                    n.  <ECVn>

Exceptions:     If n=0, then no response exists.  A zero length ECVi means
                that ECIDi does not exist.

=============================================================== efine:
                TIME time of day, 12 bytes yymmddhhmmss        Format: 20

2,F17 Date And Time Request (DTR)                             S,H<->E,reply
---------------------------------
Description:    Useful to check equipment time base or  for  equipment  to
                synchronize with host time base.

```
Structure:      Header only
S2,F18 Date And Timedata (DTD)                                  S,H<->E
------------------------------

Description:    Actual time data.

Structure:      <TIME>

Exceptions:     A zero length item means no time exists.

================================================================

Define:
                RCMD Remote command code or string          Format: 51

<RCMD>=
                  0 :  Restart conveyor
                  1 :  Continue machine operation
                  2 :  Ask host for time (S2,F17) and synchronize 20 :  Initialize DRU to new off the shelf status.
                           Clear all lists. Return all ECIDs to Powerup
                           default values.  Initialize bar code reader.
                           Turn off all outputs.
                 21 :  Go off line.
                           Allow all pallets to pass to purge (not
                           necessarily gone). Record transactions on
                           pass list only. Send S1F69 to machines, No
                           DRU initiated messages to host. Ignore
                           changes in carrier status (beamed in and
                           beamed out).
                 22 :  Go on line
                 23 :  Reinitialize BC reader 33 :  Vaporize pallet at ready
                 34 :  Vaporize pallet at scan
                 35 :  Vaporize pallet at gone
                 36 :  Vaporize pallet at wait2
                 36 :  Vaporize pallet at wait2
                 38 :  Vaporize pallet at port 21
                 39 :  Vaporize pallet at port 22
                 40 :  Vaporize pallet at port 41
                 41 :  Vaporize pallet at port 42
                 42 :  Vaporize pallet on spur 2
                 43 :  Vaporize pallet on spur 4
                 64 -96 reserved for Manufacturer Equipment specific usage
                           until March 1986.

99 :  clear work area
                100 :  empty all buffers
                101 :  empty material buffer  1
                102 :  empty material buffer  2
                103 :  empty material buffer  3
                104 :  empty material buffer  4

127 :  Reset all SVIDs of machine to default value. If
                           default value is not defined for a specific
                           SVID, reset it to zero.

NOTE
```

All clear commands assume that the equipment will reply with a <CMDA> = 2 if it is still processing a BIS when a S2F21 comes in.

123 : execute self-diagnostic tests

254 : Put machine into 'LOCAL' mode ;
255 : Stop conveyer operation.
Stop all motors, drop ready stop and scan station. Hold all other stations at there current states. Send S1F63 to machines that request transfers. Wait for Restart conveyor remote command 0.

CMDA Command acknowledge code        Format: 51
    0 = completed or done
    1 = command does not exist
    2 = can not perform now
    3-63 reserved.

S2,F21 Remote Command Send (RCS)                              S,H->E,[reply]
---------------------------------

Description:   Causes some equipment activity to commence or to cease.

Structure:    <RCMD>

S2,F22 Remote Command Acknowledge (RCA)                              S,H<-E
---------------------------------------

Description:   Acknowledge or error.
Structure:    <CMDA>

=====================================================================

Define:
   TRID  Trace request ID 16 bytes max.           Format: 20
   DSPER Data sample period  hhmmss, 6 bytes      Format: 20
   TOTSMP Total samples to be made.               Format: 52
   REPGSZ Reporting group size.                   Format: 51
   SVID  Status variable ID                       Format: 20

ACKC2 Acknowledge code, 1 byte                 Format: 10
        0  = Everything correct
        64 = SVID not available, trace initiated
        65 = SVID not available, trace not initiated
       <64 = equipment specific error code
        4-63 reserved.

S2,F23 Trace Initialize Send (TIS)                              S,H-->E,Reply
----------------------------------

Description:   Status variables exist at all times. This function provides a way to sample a subset of those status variables as a function of time. The trace data is returned on S6,F1 and is related to the original request by the trace request ID. Multiple trace requests may be made to that equipment allowing it.

```
Structure:      L,5
                    1.<TRID>
                    2.<DSPER>
                    3.<TOTSMP>
                    4.<REPGSZ>
                    5.<SVID1,...,SVIDn>
```

S2,F24 Trace Initialize Acknowledge (TIA)                                S,H<--E
-----------------------------------------

Description:    Acknowledge of error.

Structure:      <ACKC2>

================================================================

Define:         ABS Any binary string                                    Format: 10

S2,F25 String Diagnostic Request (SDR)                                   S,H<-->E,Reply
-----------------------------------------

Description:    A diagnostic message for checkout of protocol and communication circuits.

Structure:      <ABS>

S2,F26 String Diagnostic Data (SDD)                                      S,H<->E
-----------------------------------------

Description:    The echoed binary string.

Structure:      <ABS>

================================================================
Define:
                EAC Equipment acknowledge code,1 byte                    Format: 10
                    0 = Acknowledge
                    1 = Constant does not exist
                    2 = Can not change constants now
                    >2 = Other equipment-specific error
                    3-63 reserved.
                    64 = Not allowed to change S2,F67 List Equipment Constant Send (LES)                                S,H->E,reply
-----------------------------------------

Description:    Change one or more equipment constants.

Structure:
```
                L,n
                    1.L,2
                        1.<ECID1>
                        2.<ECV1>
                    2.L,2
                        1.<ECID1>
                        2.<ECV1>
                        .
                        .
                    n.L,2
                        1.<ECIDn>
                        2.<ECVn>
```

S2,F65 List Equipment Constant Acknowledge (LEA)                          S,H<-E
------------------------------------------------

Description:  Acknowledge or error.

Structure:
                L,n
                    1.L,2
                         1.<ECID1>
                         2.<EAC1>
                    2.L,2
                         1.<ECID1>
                         2.<EAC1>
                         .
                         .
                         .
                    n.L,2
                         1.<ECIDn>
                         2.<EACn>
================================================================

STREAM 4

---
Define:      MID Material ID, 16 char. max.                     Format: 20

NOTE

BIS ID is MID

PTN DRU Port number, 1 byte                        Format: 10

PTN

Port number is spur-relative, 1 or 2.

S4,F1 Ready To Send Material (RSN)                                    S,H<->E
------------------------------------

Description:  The sender advises the receiver that some material is
              awaiting transfer.

Structure:    L,2
                 1.  <PTN>
                 2.  <MID>

S4,F2 NOT USED

================================================================

S4,F3 Send Material (SMN)                                             S,H<->E
-------------------------

Description:  The receiver advises the sender that it is ready to
              receive material and that its transfer mechanism is
              running.

Structure:    L,2

```
               1.  <PTN>
               2.  <MID>
```

S4,F4 NOT USED
==============================================================

S4,F5 Handshake Complete (HCN)                              S,H<->E
------------------------------

Description:   Receiver advises sender that the handshake is complete.
               The sender may now stop its transfer mechanism.

Structure:     L,2
                  1.  <PTN>
                  2.  <MID>

S4,F6 NOT USED

==============================================================

S4,F7 Not ready to send (A3N)                               S,H<->E
------------------------------

Description:   Sender advises receiver that no material is being sent.
               The receiver may now stop its transfer mechanism.

Structure:     L,2
                  1.  <PTN>
                  2.  <MID>

S4,F8 NOT USED

==============================================================

S4,F63 Not ready to receive (NRR)                           S,H<->E
------------------------------

Description:   Receiver advises Sender that no material is being sent.
               The sender may now stop its transfer mechanism.

Structure:     L,2
                  1.  <PTN>
                  2.  <MID>

S4,F64 NOT USED
==============================================================

S4,F65 Still In Sender (SSN)                                S,H<->E
------------------------------

Description:   An error from the sender to the receiver. The time
               between the receipt of Send Material (SMN) and the
               material leaving the sender's sensor exceeds the sender's
               t1 timeout. The sender goes to a hold state until the
               disposition of the stuck material is determined.

Structure:    L/2
              1.  <PTN>
              2.  <MID>

S4,F66 NOT USED

============================================================

S4,F67 Still In Receiver (SRN)                                    S/H<->E
------------------------------

Description:  An error from the receiver to the sender. The time
              between Send Material (SMN) and detection of the material
              at the receiver exceeds the receiver's t2 timeout. The
              receiver goes to a hold state until the disposition of
              material is determined.

Structure:    L/2
              1.  <PTN>
              2.  <MID>

S4,F68 NOT USED

============================================================

S4,F69 Unsuccessful Transfer Handshake Complete (UHCN)            S/H<->E
--------------------------------------------------

Description:  Receiver advises sender that the handshake is completed
              unsuccessfully. The sender may now stop its transfer
              mechanism in order to abort attempt to send the pallet.

Structure:    L/2
              1.  <PTN>
              2.  <MID>

S4,F70 NOT USED

============================================================

STREAM 5
---------------

Define:
        ALCD    Alarm Code Byte                                    Format: 10
                bit 8 = 1 means alarm set
                bit 8 = 0 means alarm cleared
                bits 1-7 categorize the alarm
                    0 - not used
                    1 - Personal safety
                    2 - Equipment safety
                    3 - Parameter control warning
                    4 - Parameter control error
                    5 - Irrecoverable error
                    6 - Equipment status warning

```
         7 - Attention flags
         8 - Data integrity
              9-63 - Reserved by SEMI 64 - Recognition error
        65 - Material handling error
        66 - Facilities error
        67 - Material quantity warning
        68 - Material quantity error
        69 - Material timeout
        70 - List error
        71 - Topology error
        72 - Bar code scanner error
```

NOTE

Please note that National Semiconductor will
         use ALCD's 64-79 for defining alarm categories
         not included in the Semi Standard. Vendors
         may use ALCD's 80-128 and ALID's 127-255 on
         consultation with National Semiconductor.

ALID  Alarm ID                                          Format: 51
ALTX  Alarm text limited to 40 char                     Format: 20
<ALCD>    <ALID>         <ALTX>

6 Equipment Status Warning
          0     :  THIS ALARM IS UNDEFINED
          1     :  <--time--><------data----------->

The following are the details of the Text for
                    alcd 6, alid 1. This text contains the encoded
                    values for the I/O ports on the DRU in the
                    following format:

<--time--><------data----------->
                    DDHHMMSSCCCHAR1CHAR2 ... CHAR13

TIME
                    DD = DAY
                    HH = HOUR
                    MM = MINUTE
                    SS = SECOND
                    CC =1/100 SECOND

If the clock being used, is not accurate to
                    1/100 of a second, C should be set to 0 for the
                    unavailable digits.

DATA

CHAR1-13 ASCII 040-077 where the lower 5 bits
                    contain the status of the I/O lines. CHAR1
                    contains I/O bits 1-5, CHAR2 contains I/O bits
                    6-10, ... CHAR13 contains I/O bits 61-65 where
                    65 is currently not used.

I/O bit  1 is in bit 5 of CHAR1
                    I/O bit  2 is in bit 4 of CHAR1
                        .
                        .
                        .

```
                    I/O bit 63 is in bit 3 of CHAR13
                    I/O bit 64 is in bit 2 of CHAR13
    2    :  Change in PPID = xxxxxxxxxxxxxxxx
    3    :  Change in BQ   = xxxxxxxxxxxxxxxx  This was in the
                    machine specific range RDS 15-DEC-1986
    126  :  Change in equipment <STATUS>

7 Attention Flags
    1    :  adjacent equipment type XX id XX down
                    If type and id are unknown then place  00  (hex)
                    for both XX's 65 Material handling error
    1    :  Offline and unable to accept material   The  DRU  sends
                    the host this alarm when the machine attempts to
                    send material using a S4F1 and the DRU is
                    offline due to a remote command send, or a
                    mechanical DRU failure, or the DRU is invisable
                    due to a empty destiny list. In any of these
                    cases the DRU replys to the S4F1 with a S1F69.
    5    :  M/C Port XX Ready to send, no carrier ZZ
                    The machine sends the host this alarm to request
                    a empty pallet be delivered to the machine. ZZ
                    represents NSC's carrier code, if filled with
                    nulls then UNICYCLE will assume some default
                    carrier type for the machine sending the alarm.
```
The following carriers are defined fixture types:

| field 2 | field 3 | fixture type |
|---------|---------|--------------|
| W | 6 | 6 inch Disco wafer frame fixture |
| F | E | 14/16 Assy. lead frame magazines |
| T | 2 | 24mm Tape Pak magazine |
| T | 3 | 35mm Tape Pak magazine |
| T | 7 | 70mm Tape Pak magazine |
| C | 1 | 11mm Flow 10/60 Tape cassette |
| C | 9 | 19mm Flow 10/60 Tape cassette |
| C | 4 | 24mm Flow 10/60 Tape cassette |
| C | 5 | 35mm Flow 10/60 Tape cassette |
| E | E | 14/16 EOL 80 strip magazine |
| S | E | 14/16 Single unit carrier |
| T | P | Test pallet used for system test |

This list will expand as more fixture types are defined.

```
    6    :  t1 time to leave sender error port nn
    7    :  t2 time to receive error port nn
    8    :  t3 time to complete send error port nn
    10   :  M/C buffer full error port nn
                    When the machine has a full carrier waiting to
                    be emptied at its input port and the machine's
                    input buffers are full, the machine sends this
                    alarm to the host when the DRU attempts to send
                    more material into the machine.
    11   :  Port nn still in sender state
    12   :  Machine buffer empty error port nn
    13   :  Destiny list orientation mismatch
                    Used when a task on the destiny list matches the
                    search key for a carrier but the carrier
                    orientation does not match. Carriers which
                    trigger this alarm are assumed to be in the
                    wrong orientation and activate the task
                    associated with ECID ROTDIR.
    14   :  incomplete task entry XXXX
```

The DRU sends this alarm to the host when an identified task entry is not completed. XXXX is the ASCII representation of the entry number for the entry that was not completed. This could be because a exiting pallet forced the shell game and the opposite wait station was full causing a purge.

16 : BIP BC xxxxxxxxxxxxxxxx port nn

The DRU sends this alarm to the host when a carrier appears without a handshake at port nn that has an ECID PJCJnn that indicates carriers will be received using a handshake.

64 - 95 Reserved for ATHENA SYSTEMS

Athena Systems will supply NSC with meaningful ALTX for each defined

96 : nn port Blocked

This is used by the DRU when a lift index remains up blocking the path of another carrier for more time than ECID ?????????.

97 : BOP at port nn entry XXXX

A pallet disappears from the conveyor moving under the action of entry number XXXX last detected at port nn. This is always used when ever the entry is known for a BOP.

98 : BOP at scan bar code xxxxxxxxxxxxxxxx

The DRU sends this alarm to the host when a pallet disappears from the conveyer carrying bar code xxx...xxx that does not have an entry number associated with it.

99 : BOP at port nn BIS xxxxxxxxxxxxxxxx The Dru uses this alarm to indicate a pallet headed for port nn, has disappeared., before the bar code has been read and an entry number identified.

100 : BOP last at port nn Source mm

A pallet that was first detected at port mm disappears from the conveyer, prior to being driven to scan, that was last detected at port nn.

99 : BOP at port nn BIS xxxxxxxxxxxxxxxx The Dru uses this alarm to indicate a pallet headed for port nn, has disappeared., before the bar code has been read and an entry number identified.

69 Material Timeout
1 : Destiny entry XXXX timeout exceeded
XXXX is the ASCII representation of the entry number.
2 : History entry XXXX timeout exceeded
XXXX is the ASCII representation of the entry number.
3 : Pass entry XXXX timeout exceeded
XXXX is the ASCII representation of the entry number.
4 : Default entry XXXX timeout exceeded
XXXX is the ASCII representation of the entry number.
5 : Block entry XXXX timeout exceeded
XXXX is the ASCII representation of the entry number.

70 List Error
1 : Destiny list length quota exceeded
2 : History list length quota exceeded
3 : Pass list length quota exceeded
4 : Default list length quota exceeded
6 : Block list length quota exceeded
8 : Destiny list length quota underflow
This alarm is sent when the host attempts to set the destiny list to a length less than 10 or less than the current number of entries.

9 : History list length quota underflow
This alarm is sent when the host attempts to set the history list to a length less than 10 or less than the current number of entries.

10 : Pass list length quota underflow
This alarm is sent when the host attempts to set the pass list to a length less than 10 or less than the current number of entries that have never been reported to the host.

11 : Default list length quota underflow
This alarm is sent when the host attempts to set the default list to a length less than 10 or less than the current number of entries.

12 : Block list length quota underflow
This alarm is sent when the host attempts to set the block list to a length less than 10 or less than the current number of entries.

13 : 3C xxx...xxx from nn Not on any list
The DRU sends this alarm to the host when it can not find a task for a given bar code from a source nn.

14 : Undefined list structure
This would be used for any change in the list structure by S127,F131 not understood by the equipment, or any structure which did not have the proper arguments.

15 : Action mismatch ENTRY XXXX
The DRU sends this alarm when a task with and entry number XXXX does not comply with the ECID PJCJnn for a given destination port for example, does not call for a handshake when a hadshake is required by the port.

16 : Blocked entry number XXXX
The DRU sends this alarm to signify a match for an entry XXXX ASCII, in the destiny or default list has been blocked by an entry in the block list.

17 : BIS xxxxxxxxxxxxxxxx PTN nn not on list
This is used by the receiver to indicate that the sender has attempted to send material that can not match any entry on the receiver's lists. The receiver has sent S4F69 to the sender to end the transaction. The DRU will place this carrier in the suspend state.

71 Topology error
1 : Communication link error on CJLKOx
Equipment sends this alarm to the host when the adjacent equipment's SECS ID does not match the value specified by CJLKOx.

2 : Topology error port nn
This is sent to the host by equipment when a sender attempts to handshake to a port the receiver does not have defined, such as port number 9.

72 Bar code scanner error
1 : BCS YY xxxxxxxxxxxxxxxxxxxxxxxxxxxxxxxx
YY represent the bar code scanner error code and xxx...xxx represent the text as transmitted by the bar code scanner.

2 : Dead BCS error
This is used when the DRU can not detect DTR on pin 20 of the bar code scanner port indicating the scanner has been unplugged or shut off. It is also used when the bar code scanner fails to
                reply to a Re-init command control C.
    3   : Successive bad read errors
                This is used when a scanner fails to read a bar
                code on consecutive labels.

69 Defined By Athena Systems for the DRU
    1   : List Processing Busy - Unable to Process
                When equipment is waiting for an acknowledge to
                a list upload, and instead receives a list down
                load, the Equipment sends this alarm before the
                reply to the list down load. The host may then
                elect to abort the reply using a S127,F0.

ACKC5   Acknowledge code, 1 byte                                    Format: 10
        <ACKC5>= 00000000 : accepted
                 >0 : not accepted S5,F1 Alarm Report Send (ARS)                                       S,H<---E,[reply]
--------------------------------

Description:   This message reports a change in or presence of an alarm
               condition. One message will be issued when the alarm is
               set and one message will be issued when the alarm is
               cleared. Irrecoverable errors and recipe flags may not
               have a corresponding clear message.

Structure:
               L,3
                 1. <ALCD >
                 2. <ALID >
                 3. <ALTX >

S5,F2 Alarm Report Acknowledge (ARA)                                S,H-->E
------------------------------------

Description:   Acknowledge or inform of error.

Structure:     <ACKC5>

============================================================================

Define:        ALSU Alarm Status enabled/disabled code              Format: 10
               ALSU = 0 means alarm report disabled
               ALSU = 1 means alarm report enabled S5,F67 Report Alarm Status (RAS)                                    S,H->E,reply
--------------------------------

Description:
               This message requests the equipment to report alarm
               information to the host.
Structure:
               L,n
                 1. L,2
                     1. <ALCD1>

```
                2. <ALID1>
            2.  L,2
                    .
                    .
            n.  L,2
                1. <ALCDn>
                2. <ALIOn>
```

Exceptions:

A zero length list means send all alarms

S5,F65 Alarm Status Data (ASD)                                      M,H<-E
-----------------------------

Description:

This message contains the alarm data known to the equipment. There are m alarms in the list.

Structure:

```
L,m
    1.  L,4
        1. <ALCD1>
        2. <ALID1>
        3. <ALSU1>
        4. <ALTX1>
    2.  L,4
            .
            .
            .
    m.  L,4
        1. <ALCDm>
        2. <ALIDm>
        3. <ALSUm>
        4. <ALTXm>
```

Exceptions:

If m = 0, no response can be made. A zero length item returned for ALTXi means that value does not exist or can not be reported.

========================================================================

STREAM 9

---------------- Define:
         MHEAD    SECS message block header                    Format: 10
                  associated with message block in error.

S9,F1 Unrecognized Device (UDN)                                     S,H<--E
--------------------------------                                    no reply Description:   The device ID in the message block header did not
               correspond to any known device ID in the machine detecting
               the error.

Structure:     <MHEAD>

S9,F2 Not Used
========================================================================

S9,F3 Unrecognized Stream Type (USN)                                S,H<--E
-------------------------------------                               no reply Description:   The equipment does not recognize the stream type in the
               message block header.

Structure:     <MHEAD>

S9,F4 Not Used

================================================================

S9,F5 Unrecognized Function (UFN)                                S,H<--E
------------------------------------                             no reply Description:   This message indicates that the function in the ID is not
               recognized by the receiver.

Structure:     <MHEAD>

S9,F6 Not Used

================================================================

S9,F7 Illegal Data (IDN)                                         S,H<--E
--------------------------                                       no reply Description:   This message indicates that the stream and function were
               recognized, but the associated data format could not be
               interpreted.

Structure:     <MHEAD>

S9,F8 Not Used

================================================================

Define:
               SHEAD    Stored header related                    Format: 10
                        to the transaction timer.

S9,F9 Transaction Timer Timeout (TTN)                            S,H<--E
-------------------------------------                            no reply Description:   This message indicates that a transaction (receive) timer
               has timed out and that the corresponding transaction has
               been aborted. It is up to the host to respond to this
               error in an appropriate manner to keep the system
               operational.

Structure:     <SHEAD>

S9,F10 Not Used

================================================================

S9,F11 Data Too Long(DLN)                                        S,H<-E
-------------------------                                        no reply Description:   This message to the host indicates that the equipment has
               been sent more data than it can handle.

Structure:     <MHEAD>

S9,F12 Not Used

S9,F65 Incorrect Bits in header (IBH)　　　　　　　　　　　S,H<--E
---------------------------------------　　　　　　　　　　No Reply Description: The equipment has detected an incorrect bit in the message
             block header such as the R bit.

Structure:   <MHEAD>

S9,F66 Not Used

===============================================================

S9,F69 Message out of context (MOC)　　　　　　　　　　　　S,H<--E
---------------------------------------　　　　　　　　　　No Reply Description: The equipment has detected a SECS-II message that does not
             have any valid meaning at this point in a transaction even
             though the equipment recognizes the SECS-II message as a
             known stream and function.

Structure:   <MHEAD>

S9,F70 Not Used
===============================================================

STREAM 127

Define:

ACKC127 Acknowledge code, 1 byte　　　　　　　　　　　　　Format: 10

```
0- Accepted (do not delete entry)
1- Permission not granted, entry ignored,resend
       Rejected due to data contents.
2- Matrix overflow, entry ignored
       No memory available
3- Unknown list, list ignored
4- Incorrect field format, entry ignored
       Wrong format or length.
5- Duplicate entry, entry ignored
6- Accepted, Delete entry
7- Permission not granted, Illegal action
       attempt to load an unloadable list.
8- Duplicate task identifier, entry ignored
9- No match found
>9- Other error 9 - 63 reserved
```

LSTID　　　List ID　　　used ACKC127 codes　　　Format: 10

| <LSTID> | Description | ACKC127 --->H | ACKC127 <--- H |
|---------|-------------|---------------|----------------|
| 0       | All known lists | ALL       | ALL            |
| 1       | Destiny List | 0,1,2,4,5    | 0,1,2,3,4,6    |
| 2       | History List |          7   | 0,1,2,3,4,6    |
| 3       | Log List     |          7   | 0,1,2,3,4,6    |
| 4       | Block List   | 0,1,2,4,5    | 0,1,2,3,4,6    |
| other   | undefined    | 3            | 3              |

| ATTVAL | Attribute Value | Format: 10,20,3(),5() |
|---|---|---|
| ATTID | Attribute of a List | Format: 10 |

| <ATTID> | Description | ATTVAL Format |
|---|---|---|
| 0 : Barcode, 16 bytes ASCII | | Format 20 |
| 9 : BIS ID | | |
| | 16 bytes ASCII Format 20 | |
| 10 : Carrier Destination | | |
| | 2 bytes ASCII Format 20 | |
| 11 : Carrier Source | | |
| | 2 bytes ASCII Format 20 | |
| 16 : List Entry Identifier 8 bytes ASCII | | Format 20 |

The intent of this field is to identify which destiny list entry from the host caused reported equipment activity. The last four bytes of this field are incrementeted each time the specific entry is used.
When the Host makes additions to equipments lists, the equipment verifies the uniqueness of the first four bytes of the list entry identifier field composed by the host. If the first four bytes of a new list entries list entry identifier field are identical to the first four bytes of another list entrie ATTID 16 or ATTID 17 fields, in any of the equipments lists the equipment must reject the entry as not unique. The equipment must also reject an entries as not unique if the first four bytes of a new entry ATTID 16 field are referenced by any outstanding alarms the host has not acknowledged. Equipment does not modify the task identifier.

19 : Action code
    2 bytes unsigned Format 52
20 : List Entry timestamp
    12 bytes ASCII                                                    Format 20
    This is a data received timestamp. It is the time the host placed this data entry on the Equipment list. The value of this field is determined by the equipment clock. Equipment with out a clock must assume the host is passing in this time stamp in this field. This is used by the host as a key to query the host uploaded copies of these lists with a /SINCE or /BEFORE qualifier. The host will do all such searches internally, after asking for the entire list from the equipment. The /SINCE and /BEFORE are host internal commands. The equipment never sees them and never uses them. The above explanation was included to explain the use of this field by the host.

21 : Task Enable Time-stamp
    12 bytes ASCII Format 20
    A task may be entered on a list and to be enabled at some future time. This is used by the host to have a list entry awaken at a given absolute time. Carriers that might otherwise enable this task, do not match until after the specified time. The entry only appears to be on the list for host reports.

22 : Query timestamp
    12 bytes ASCII                                                    Format 20
    Time when report to the host caused a report of this entry (A zero time is interpreted as never queried.) Equipment places the time of the first report in this field for entries on the History list and Log list. It can also be used with PBLSSU to flag need for a DRU initiated log list upload .

24 : Cancellation timestamp
    12 bytes ASCII                                                    Format 20
    This is used for auto cancel of the entry. (A zero time is interpreted as never auto cancel and has the same format as a normal time but has zeros in all fields.) When canceling a entry, a S5F1 ALCD 69 ALID 4 alarm is sent to the host.

25 : Task Over Time Stamp
12 bytes ASCII                                                    Format 20
Time when the task was finished and entry was made to the history list. This corresponds to TS 2 or TS 8 depending on whether the pallet is entering a machine or leaving a machine. This is used by the host for material flow analysis and useful if TS 3 is unavailable.

26 : Task Initiated Time
12 bytes ASCII                                                    Format 20
Time when the task was initiated. This corresponds to TS 1 or TS 7 depending if the pallet is entering a machine or leaving a machine. This is used by the host for material flow analysis and useful if TS 6 is unavailable.

====================================================================

S127,F129 Delete Entry List Send (DELS)                    M,H-->E,reply
-----------------------------------

Description:
Delete entry/entries from any list/s or delete any/all lists. To delete entries all the appropriate LSTIDs are passed with the desired entries. To delete any or all lists only the LSTIDs (with zero entries) are passed.

Structure:
```
L,n (number of lists usec)
    1. L,2
         1. <LSTID1> (name of lists)
         2. L,x (number of records)
              1. L,a (number of ATTIDs per list record)
                   1. <ATTVAL1>
                   .
                   a. <ATTVALa>
              .
              x. L,a
                   1. <ATTVAL1>
                   .
                   a. <ATTVALa>
    .
    .
    n. L,2
         1. <LSTIDn>
         2. L,y
              1. L,b
                   1. <ATTVAL1>
                   .
                   b. <ATTVALb>
              y. L,b
                   1. <ATTVAL1>
                   .
                   b. <ATTVALb>
```

Exceptions:
If    n=0,    then    the    entire    LSTIDs    are    deleted.
If    x=0,    then    the    LSTID    is    deleted.

S127,F130 Delete Entry List Acknowledge                         M,H<--E
        (DELA)
-----------------------------------

Description:
> Acknowledge or error.

Structure:
```
L,n
    1.  L,2
          1. <LSTID1>
          2. L,x
                 1.  <ACKC127>
                 2.  <ACKC127>
                     .
                 x.  <ACKC127>
    .
    n.  L,2
          1. <LSTIDn>
          2. L,x
                 1.  <ACKC127>
                 2.  <ACKC127>
                     .
                 x.  <ACKC127>
```

===============================================================

S127,F131 Update List Send (ULS)                    M,H<->S,reply
-------------------------------------

Description:
> Update list(s) with entry/entries. List(s) can also be added this way.

Structure:
```
L,n (number of lists used)
    1.  L,2
          1. <LSTID1> (name of lists)
          2. L,x (number of records)
                 1.  L,a (number of ATTIDs per list
                     record)
                        1.  <ATTVAL1>
                            .
                        a.  <ATTVALa>
                     .
                 x.  L,a
                        1.  <ATTVAL1>
                            .
                        a.  <ATTVALa>
    .
    n.  L,2
          1. <LSTIDn>
          2. L,y
                 1.  L,b
                        1.  <ATTVAL1>
                            .
                        b.  <ATTVALb>
                     .
                 y.  L,b
                        1.  <ATTVAL1>
                            .
                        b.  <ATTVALb>
```

S127,F132 Update List Acknowledge (ULA)                    M,H<->S
-------------------------------------

Description:
> Acknowledge corresponding entries w/checksum or error.

Structure:

```
L,n
   1.  L,2
          1.  <LSTID1>
          2.  L,x
                 1.  <ACKC127>
                 2.  <ACKC127>
                     •
                 x.  <ACKC127>
   •
   n.  L,2
          1.  <LSTIDn>
          2.  L,x
                 1.  <ACKC127>
                 2.  <ACKC127>
                     •
                 x.  <ACKC127>
```

================================================================

S127,F135 Dump List Request (DLR)                     S,H-->E,reply
----------------------------------------

Description:

This message requests the equipment to send the entire contents of a list(s).

Structure:

```
L,n
   1.  <LSTID1>
   2.  <LSTID2>
   •
   n.  <LSTIDn>
```

S127,F136 Dump List Data (DLD)                        M,H<--E
----------------------------------------

Description:

Equipment returns list ID with all entries in it. Each entry is a set of attributes. If a dump of a non-existent list is requested then zero entries are returned.

Structure:

```
L,n (number of lists used)
   1.  L,2
          1.  <LSTID1> (name of lists)
          2.  L,x (number of records)
                 1.  L,a (number of ATTIDs per list record)
                        1.  <ATTVAL1>
                            •
                        a.  <ATTVALa>
                    •
                 x.  L,a
                        1.  <ATTVAL1>
                            •
                        a.  <ATTVALa>
   •
   n.  L,2
          1.  <LSTIDn>
          2.  L,y
                 1.  L,b
                        1.  <ATTVAL1>
                            •
                        b.  <ATTVALb>
```

```
                    y.  L,b
                          1.  <ATTVAL1>
                              .
                       b.  <ATTVAL5>
```

========================================================

S127,F137 Search List Send (SLS)                              M,H-->E,reply
--------------------------------

Description:
    Searches list(s) for entry/entries. The search is based
    on the list identifier and one one or more list attributes
    ( or search keys ) sent in this message. All matching
    entries found in the specified lists are returned. A list
    identifier of zero is defined as search all known lists.
    The number of ATTIDs can be any number greater than zero
    and need not corrispond to the number of ATTIDs used in
    the list structure being queried. ATVALs not supplied are
    assumed to be wild cards.

Structure:
```
    L,n (number of lists)
       1.  L,2
              1.  <LSTID1> (name of list)
              2.  L,a (number of attributes to be used)
                     1.  <ATTID1>
                         .
                     a.  <ATTIDa>

.
       n.  L,2
              1.  <LSTID1>
              2.  L,b
                     1.  <ATTID1>
                         .
                     b.  <ATTIDb>
```

S127,F138 Search List Data (SLD)                              M,H<--E
--------------------------------

Description:
    Matching entries in the specified lists are sent.

Structure:
```
    L,n (number of lists used)
       1.  L,2
              1.  <LSTID1> (name of lists)
              2.  L,x (number of records)
                     1.  L,a (number of ATTIDs per list
                         record)
                            1.  <ATTVAL1>
                                .
                            a.  <ATTVALa>
                         .
                     x.  L,a
                            1.  <ATTVAL1>
                                .
                            a.  <ATTVALa>

.
       n.  L,2
              1.  <LSTIDn>
              2.  L,y
                     1.  L,b
                            1.  <ATTVAL1>
```

```
                    b.   <ATTVAL5> y.  L,b
                    1.   <ATTVAL1> b.   <ATTVAL5>
```

What is claimed is:

1. In an automated material handling system of a type comprising a network of intersecting material paths along which segments-in-process (SIPs) of material move from a source to a destination within the network under the guidance of a host computer system, a distributed routing unit defining a domain at an intersection within the material path network, the distributed routing unit comprising:
- (a) means for storing information relating to the identity and disposition of a specific SIP moving within the network, the specific SIP having a unique identifier associated therewith;
- (b) means for comparing the SIP identifier and the stored identity information;
- (c) means for determining that the specific SIP has entered the domain of the distributed routing unit based upon the comparison of the SIP identifier and the stored identity information;
- (d) means for disposing of the specific SIP based upon the stored disposition information.

2. A distributed routing unit as in claim 1 wherein the storage means comprises means for storing information relating to the identity and disposition of a plurality of SIPs moving on the conveyor network.

3. A distributed routing unit as in claim 2 wherein the disposition means includes means for identification and disposition of each of the plurality of SIPs based on corresponding stored identity and disposition information for each SIP.

4. A distributed routing unit as in claim 3 wherein the disposition means includes means for disposing of each of the plurality of SIPs when the host computer system is off line.

5. A distributed routing unit as in claim 1 and further including means responsive to the stored disposition information for disposing of the specific SIP when the host computer system is off line.

6. In an automated material handling system of the type comprising a network of intersecting material paths on which segments-in-process (SIPs) of material move from a source to a destination within the network under the guidance of a host computer system, a plurality of distributed routing units, each being located at a material path intersection, each distributed routing unit comprising:
- means for storing information relating to the identity and disposition of specific SIPs moving on the network, each specific SIP having a unique, fixed identifier associated therewith;
- means for comparing the SIP identifier and the stored identity information;
- means for identifying SIPs to determine whether an identified SIP is one of the specific SIPs based on the comparison of the fixed SIP identifier and the stored information;
- means for disposing of specific SIPs toward specific destinations based on the stored disposition information, the means for disposing comprising means for disposing of specific SIPs toward specific destinations when the host computer system is off line.

7. A distributed routing unit 95 in claim 6 and further including means responsive to the disposition of specific SIPs for generating data indicative of the disposition of specific SIPs.

8. A distributed routing unit as in claim 7 and further including means for providing the disposition data to the host computer system.

9. An automated material handling system comprising a network of intersecting material paths for moving a segment-in-process (SIP) of material from a source to a destination within the network under the guidance of a host computer systems and including a plurality of distributed routing units, each distributed routing unit defining a domain at a respective material path intersection within the network, each distributed routing unit comprising:
- storage means for storing data relating to the identity and disposition of SIPs moving within the network, each SIP having a unique, fixed identifier associated therewith;
- means for comparing the SIP identifier and the stored identify information;
- means for identifying SIPs which have entered the domain of the distributed routing unit based on the comparison of the fixed SIP identifier and the stored identity data and for identifying a specific disposition associated with a specific identified SIP; and
- transfer means for disposing of the specific identified SIP toward its specific destination.

10. An automated material handling system comprising:
- a network of intersecting material paths along which segments-in-process (SIPs) of material move from a source to a destination within the network, each SIP having a unique, fixed identifier associated therewith;
- a host computer system which receives information relating to the specific destination of a specific SIP moving within the network; and
- a plurality of distributed routing units, each being located at a material path intersection, each distributed routing unit comprising
  - (i) storage means for receiving specific disposition information from the host computer system and for storing such information;
  - (ii) means for identifying the specific SIP based upon the fixed SIP identifier;
  - (iii) transfer means for disposing of the specific SIP toward the specific destination based on the stored disposition information, the transfer means including means for disposing of the specific SIP when the host computer system is off line.

11. An automated material handling system comprising:

a network of intersecting material paths along which segments-in-process (SIPs) of material move from a source to a destination within the network, each SIP having a unique, fixed identifier associated therewith;

a host computer system which receives information relating to the source, destination and identity of each SIP moving within the network;

a plurality of distributed routing units, each being located at a material path intersection, each distributed routing unit comprising
  (i) means for receiving source, disposition and identity information for a plurality of specific SIPs and for storing such information;
  (ii) means for comparing the SIP identifier and the stored identity information;
  (iii) means for identifying the identifier of SIPs that enter the distributed routing unit to identify a SIP as one of the specific SIPs based on the comparison of the fixed identifier and the stored identity information; and
  (iv) transfer means for disposing of identified specific SIPs toward the destination associated with the identified specific SIP based on the stored destination information, the transfer means including means for disposing of the specific SIP when the host computer system is off-line wherein the host computer system includes means for defining a sequence of distributed routing units through which a specific SIP will move from its source to its destination.

12. An automated material handling system as in claim 11 and further including means for moving a specific SIP through its associated defined sequence of distributed routing units when the host computer system is off line in response to information stored within each of the distributed routing units in the defined sequence.

13. An automated material handling system as in claim 11 and further including means for modifying the defined sequence of distributed routing units for a specific SIP after the specific SIP has begun to move through the defined sequence.

14. An automated material handling system as in claim 11 and further including means for modifying the destination of a specific SIP after the specific SIP has begun to move through the defined sequence.

15. An automated material handling system as in claim 11 wherein each distributed routing unit includes means for generating information indicative of the disposition of a specific SIP.

16. An automated material handling system as in claim 15 wherein each distributed routing unit includes means for storing the disposition information.

17. An automated material handling system as in claim 16 wherein each distributed routing unit includes means for transmitting the disposition information to the host computer system.

18. A method of routing material carriers through an automated material handling system under the guidance of an associated host computer system wherein the material handling system comprises a main conveyor and spur conveyors which intersect with the main conveyor, the spur conveyors having process machines located thereon, and wherein a distributed routing unit is located at each intersection of the main conveyor and a spur conveyor, the method comprising:

storing information in the host computer system relating to the source, destination contents and identity of a specific material carrier to be routed through the conveyor network, the destination being an identified process machine;

defining a sequence of distributed routing units through which the specific material carrier will move from the source to the identified process machine;

providing each distributed routing unit in the defined sequence with information both for identifying the specific material carrier and for defining a task to be performed by that distributed routing unit with respect to the specific material carrier;

sequentially completing the tasks such that the specific material carrier is routed through the sequence of distributed routing units to the last distributed routing unit in the sequence;

executing the task associated with the last distributed routing unit to divert the specific material carrier to the spur conveyor on which the identified process machine is located;

transmitting a request message from the last distributed routing unit to the identified process machine requesting that the identified process machine receive the specific material carrier;

transmitting a grant message from the identified process machine to the last distributed routing unit granting the request; and in response to receipt of the grant message by the last distributed routing unit, routing the specific material carrier from the spur conveyor to the identified process machine.

19. A method as in claim 18 including the additional step of transmitting an acknowledgement message from the identified process machine to the last distributed routing unit confirming that the specific material carrier has been received by the identified process machine.

20. A method as in claim 19 including the additional step of storing information in the last distributed routing unit relating to the acknowledgement message.

21. A method as in claim 20 including the additional step of transmitting a receipt message from the host computer system to the last distributed routing unit confirming receipt of the confirmation message.

22. A method as in claim 19 including the additional step of transmitting a confirmation message form the last distributed routing unit to the host computer system that the identified process machine has acknowledged receipt of the specific material carrier.

23. A method as in claim 18 including the further step of modifying the defined sequence of distributed routing units.

24. A method as in claim 18 including the further step of modifying the defined sequence of distributed routing units after the specific material carrier has begun to move through the defined sequence.

25. A method as in claim 18 including the further step of modifying the destination.

26. A method as in claim 18 including the further step of modifying the destination after the specific material carrier has begun to move through the defined sequence.

27. In an automated material handling system of the type wherein material carriers move through the material handling system under the guidance of a host computer system, the material handling system comprising a main conveyor and spur conveyors which intersect with the main conveyor, the spur conveyors having process machines located thereon, and wherein a distributed routing unit is located at each intersection of the main conveyor and a spur conveyor and defines a domain with respect to its associated intersection, the domain comprising (i) a scan station located at the conveyor intersection, (ii) a ready station located on the main conveyor upstream of the scan station, (iii) a gone station located on the main conveyor downstream of the scan station and (iv) a wait station located on an intersecting spur conveyor, a method for transferring a material carrier from a distributed routing unit along the intersecting spur conveyor to a process machine located on the intersecting spur conveyor, the method comprising:

sensing that the material carrier is entering the domain of the distributed routing unit;

moving the material carrier to the scan station;

scanning the material carrier to derive information relating to the identity of the material carrier;

comparing the derived information with identification information stored in the distributed routing unit;

if the comparison results in a match, identifying a task to be performed by the distributed routing unit with respect to the material carrier based on disposition information stored within the distributed routing unit, the task comprising transferring the material carrier to the process machine;

moving the material carrier to the spur conveyor wait station;

transmitting a request message from the distributed routing unit to the process machine identifying the material carrier and the station at which the material carrier is to be transferred;

in response to the request message, comparing the transmitted material carrier identity with carrier transfer information stored in the process machine;

in the event that the transmitted transfer information corresponds to the stored carrier transfer information, transmitting a grant message from the process machine to the distributed routing unit; and in response to receipt of the grant message by the distributed routing unit, transferring the material carrier to the process machine.

28. A method as in claim 27 including the additional step of transmitting an acknowledgement message from the process machine to the distributed routing unit that the material carrier has been received by the process machine.

29. A method as in claim 28 including the additional step of storing information in the distributed routing unit related to the acknowledgement message.

30. A method as in claim 29 including the additional step of transmitting a confirmation message from the distributed routing unit to the host computer system indicating that the process machine has acknowledged receipt of the material carrier.

31. A method as in claim 30 including the additional step of transmitting a receipt message from the host computer system to the distributed routing unit confirming receipt of the confirmation message.

32. A method as in claim 27 including the further steps of, upon the distribution routing unit sensing that the material carrier has entered its domain, prioritizing movement tasks to be performed with respect to each material carrier within its domain and performing the movement tasks in the order of priority.

33. A method as in claim 27 including the further steps of, in the event that the comparison of the derived information with the identification information stored in the distributed routing unit does not result in a match, holding the material carrier at the scan station and transmitting an alarm message to the host computer system indicating that the derived identification information does not refer to any entry in the stored information.

34. A method as in claim 33 including the further steps of editing the identification information stored in the distributed routing unit and comparing the derived information with the edited stored information.

35. A method as in claim 33 including the further step of, in the event that a second material carrier enters the domain of the distributed routing unit while the material carrier is held at the scan station awaiting editing of the stored information, transferring the material carrier from the domain of the distributed routing unit through a predetermined station.

36. A method of routing segments-in-process (SIPs) of material within an automated material handling system of the type comprising a network of intersecting material paths along which the SIPs move under the guidance of a host computer system, the network including a plurality of distributed routing units, each distributed routing unit being located at a material path intersection within the network and defining a domain with respect to the intersection, the method comprising:

providing information to the host computer system related to a source and a destination within the network for a specific SIF, the specific SIP having an unique identifier associated therewith;

defining a sequence of distributed routing units through which the specific SIP will move from the source to the destination;

storing identity and disposition information within a selected distributed routing unit in the sequence;

determining that the specific SIP has entered the domain of the selected distributed routing unit by comparing the unique SIP identifier and the stored identity information;

identifying a task to be performed by the selected distributed routing unit with respect to the specific SIP based upon the stored disposition information, the task comprising routing the specific SIP toward the next distributed routing unit in the defined sequence; and generating information indicative of the completion of the routing task.

37. A method as in claim 36 including the further step of storing the information indicative of the completion of the task in the selected distributed routing unit.

38. A method as in claim 37 including the further step of transmitting the task completion information to the host computer system.

39. A method as in claim 38 including the further step of deleting the stored task completion information from the selected distributed routing unit.

40. A method as in claim 36 including the further step of completing the task when the host computer system is off line based on the disposition information stored within the selected distributed routing unit.

* * * * *